United States Patent
Yamazaki et al.

(10) Patent No.: US 8,497,913 B2
(45) Date of Patent: Jul. 30, 2013

(54) IMAGE PICKUP APPARATUS WITH AN INCLINATION GUIDE DISPLAY

(75) Inventors: Tatsuya Yamazaki, Machida (JP);
Masahiro Shibata, Yokohama (JP);
Yoshikazu Ishikawa, Kawasaki (JP);
Kazunori Ishii, Yokohama (JP); Hideo Kawahara, Hatogaya (JP); Hitoshi Yasuda, Tokyo (JP); Daisuke Ishikawa, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 12/946,073

(22) Filed: Nov. 15, 2010

(65) Prior Publication Data

US 2011/0109757 A1 May 12, 2011

Related U.S. Application Data

(62) Division of application No. 12/044,497, filed on Mar. 7, 2008, now Pat. No. 8,022,995.

(30) Foreign Application Priority Data

| Sep. 9, 2005 | (JP) | 2005-261922 |
| Oct. 28, 2005 | (JP) | 2005-313702 |
| Oct. 28, 2005 | (JP) | 2005-313703 |
| Oct. 28, 2005 | (JP) | 2005-313704 |
| Dec. 21, 2005 | (JP) | 2005-367581 |
| Apr. 18, 2006 | (JP) | 2006-114885 |
| Jun. 16, 2006 | (JP) | 2006-167319 |
| Jun. 29, 2006 | (JP) | 2006-180206 |
| Jul. 4, 2006 | (JP) | 2006-184628 |
| Sep. 1, 2006 | (JP) | 2006-237586 |

(51) Int. Cl.
*H04N 5/228* (2006.01)
*H04N 5/222* (2006.01)

(52) U.S. Cl.
USPC .................. 348/208.15; 348/333.04

(58) Field of Classification Search
USPC .............. 348/208.99, 208.1, 208.2, 208.3, 348/208.12, 208.15, 208.16, 333.01, 333.02, 348/333.03, 333.04, 333.12; 396/291
See application file for complete search history.

(56) References Cited

U.S. PATENT DOCUMENTS

| 6,529,144 B1 * | 3/2003 | Nilsen et al. ................ 341/20 |
| 2005/0088546 A1 * | 4/2005 | Wang ........................... 348/239 |
| 2005/0117024 A1 * | 6/2005 | Lee ............................. 348/208.15 |
| 2005/0117025 A1 | 6/2005 | Yasuhito et al. |
| 2005/0231600 A1 * | 10/2005 | Caruhel et al. ............ 348/207.99 |

FOREIGN PATENT DOCUMENTS

| CN | 1630304 | 6/2005 |
| JP | 2001-318417 A | 11/2001 |
| JP | 2004-328083 | 11/2004 |
| JP | 2006-165941 A | 6/2006 |
| JP | 2006-324948 A | 11/2006 |

OTHER PUBLICATIONS

The State Intellectual Property Office of P.R. China, Notification of First Office Action for Application No. 200910177490.1 for Applicant Canon Kabushiki Kaisha, dated Mar. 10, 2011, with English Translation (8 pages).

* cited by examiner

*Primary Examiner* — Albert Cutler
(74) *Attorney, Agent, or Firm* — Canon USA Inc. IP Division

(57) ABSTRACT

An image pickup apparatus is disclosed which provides an appropriate inclination guide display in accordance with an aspect ratio of a picked-up image and the like. The image pickup apparatus includes an inclination detector which detects an inclination of the image pickup apparatus, a display device capable of superimposedly showing an inclination guide display corresponding to a detection output from the inclination detector, on a picked-up image, and an aspect ratio setter which sets the aspect ratio of a picked-up image. The apparatus includes a display controller which controls whether or not to show the inclination guide display on the display device on the basis of the aspect ratio set by the aspect ratio setter.

18 Claims, 92 Drawing Sheets

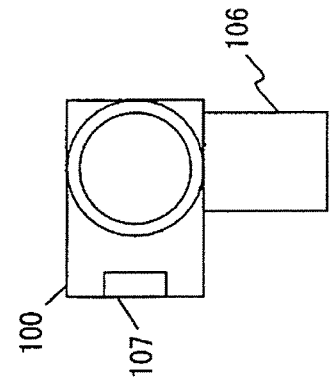
FIG. 3A-1
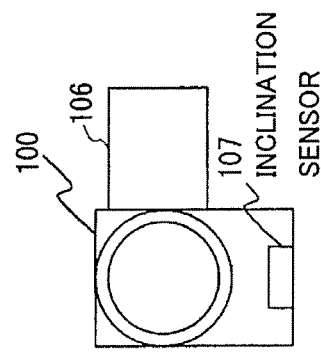
FIG. 3B-1
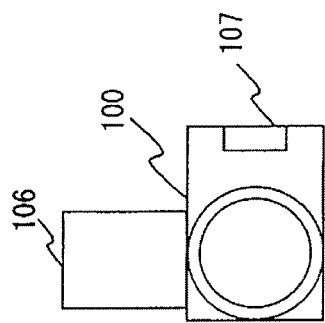
FIG. 3C-1
SENSOR OUTPUT WHEN CAMERA IS INCLINED CCW BY 90°
FIG. 3A-2
SENSOR OUTPUT AT REGULAR POSITION
FIG. 3B-2
SENSOR OUTPUT WHEN CAMERA IS INCLINED CW BY 90°
FIG. 3C-2

16 : 9

4 : 3

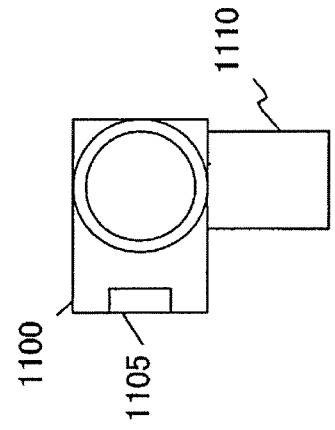
FIG. 14A-1
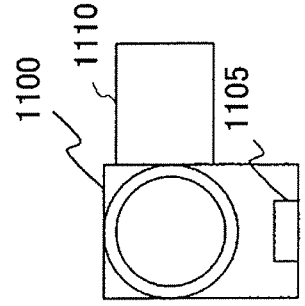
FIG. 14B-1
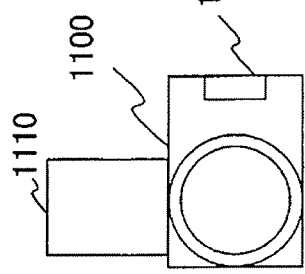
FIG. 14C-1
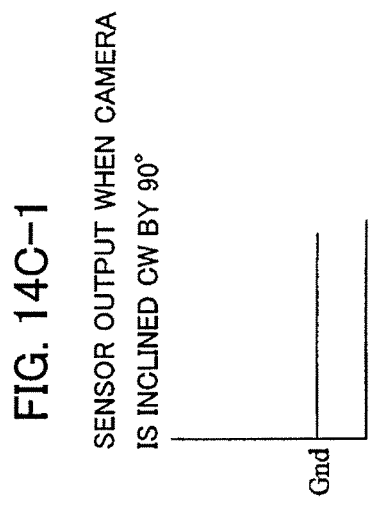
SENSOR OUTPUT WHEN CAMERA IS INCLINED CCW BY 90°
FIG. 14A-2
SENSOR OUTPUT AT REGULAR POSITION
FIG. 14B-2
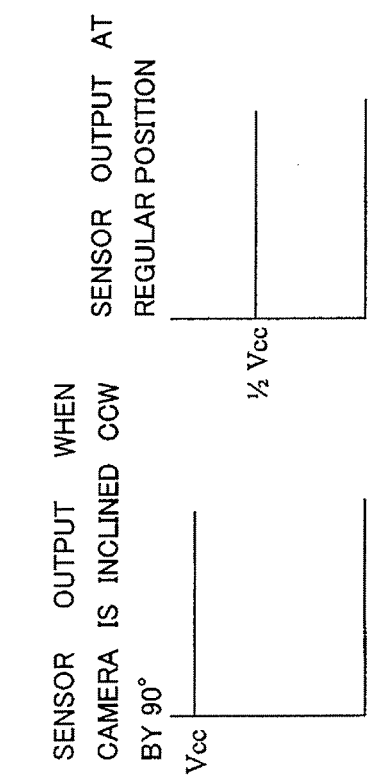
SENSOR OUTPUT WHEN CAMERA IS INCLINED CW BY 90°
FIG. 14C-2

GUIDE DISPLAY 1601

FIRST PICKED-UP IMAGE

PART OF FIRST PICKED-UP IMAGE IS SHIFTED RIGHTWARD TO DISPLAY STITCH GUIDE

STITCH GUIDE DISPLAY, SECOND OR SUBSEQUENT PICKED-UP IMAGE AND GUIDE DISPLAY

GUIDE DISPLAY 1601

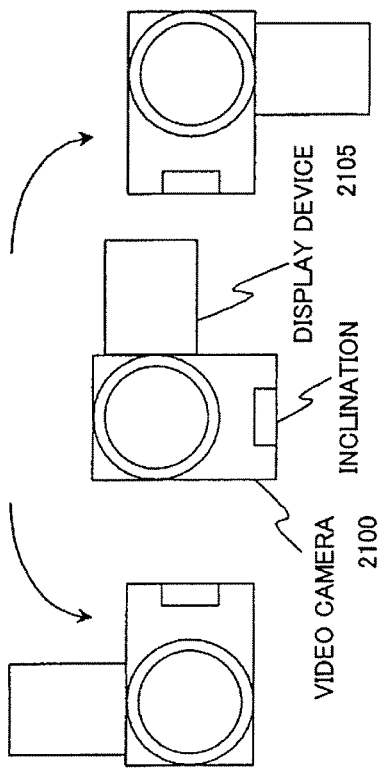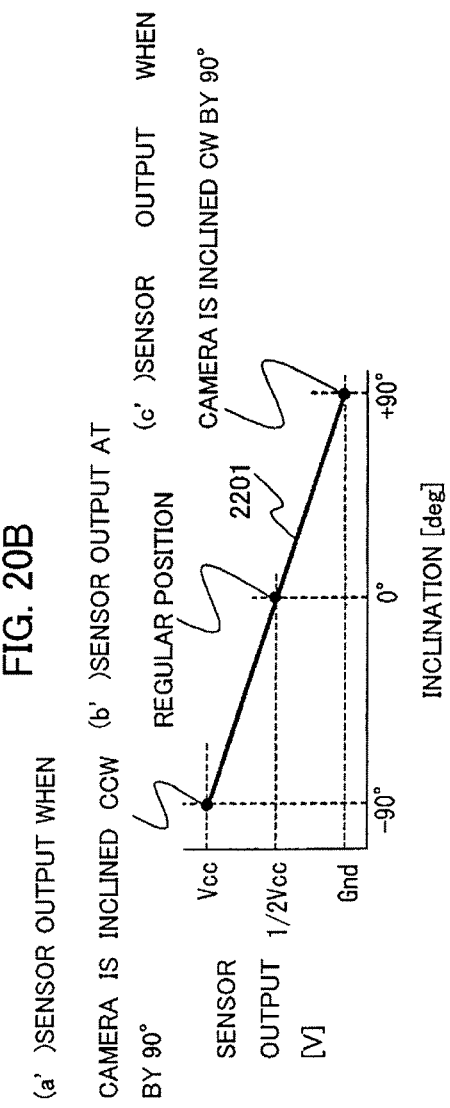

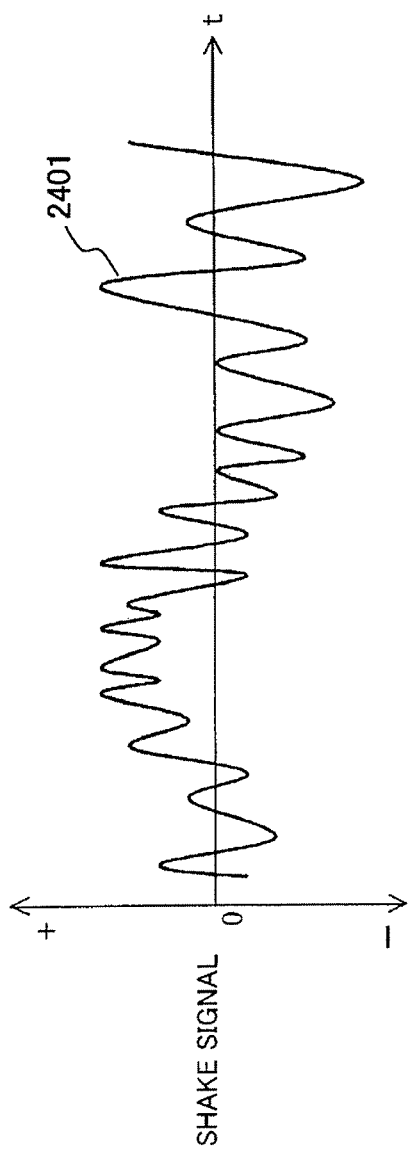
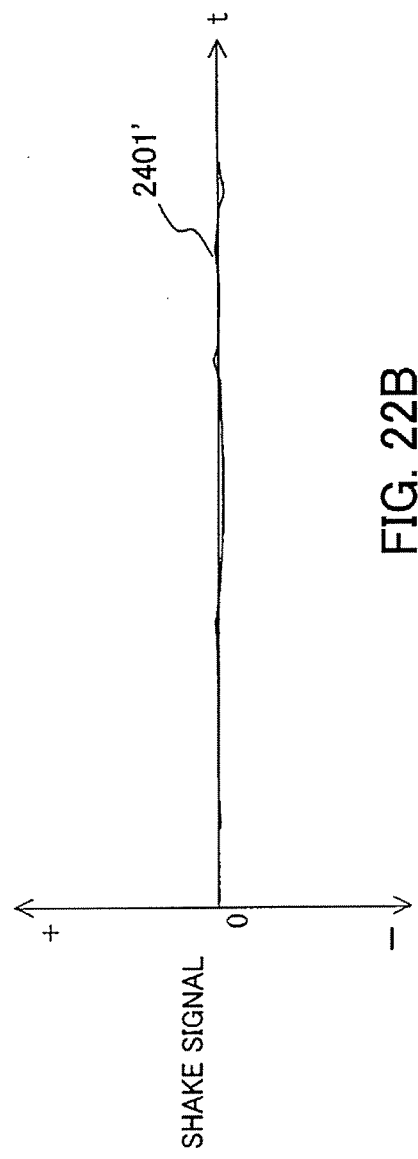

STILL IMAGE PICKUP

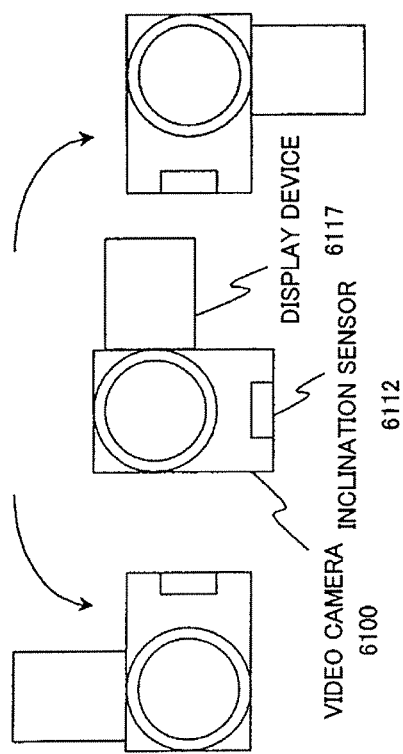
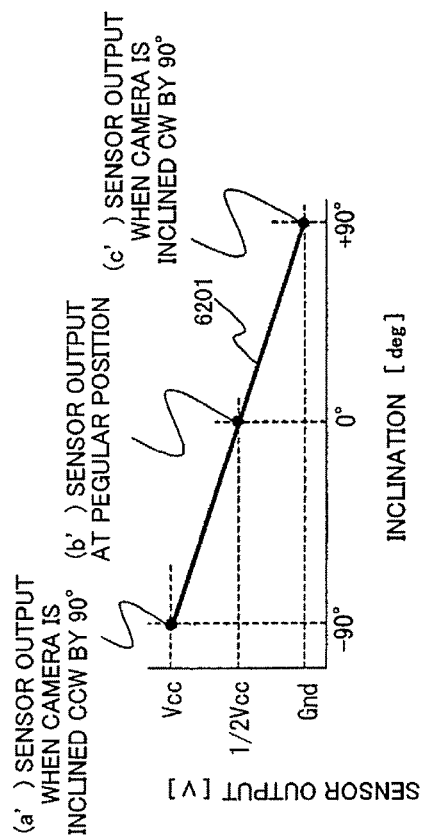

OTHER IMAGE PICKUP MODE

SCENERY IMAGE PICKUP MODE

IMAGE PICKUP APPARATUS WITH AN INCLINATION GUIDE DISPLAY

CROSS REFERENCE TO RELATED APPLICATIONS

The present application is a Divisional of U.S. patent application Ser. No. 12/044,497 filed Mar. 7, 2008, which is a Continuation of International Application No. PCT/JP2006/317651 filed Sep. 6, 2006 that claims priority from Japanese Patent Application No. 2005-261922 filed Sep. 9, 2005, Japanese Patent Application No. 2005-313702 filed Oct. 28, 2005, Japanese Patent Application No. 2005-313703 filed Oct. 28, 2005, Japanese Patent Application No. 2005-313704 filed Oct. 28, 2005, Japanese Patent Application No. 2005-367581 filed Dec. 21, 2005, Japanese Patent Application No. 2006-114885 filed Apr. 18, 2006, Japanese Patent Application No. 2006-167319 filed Jun. 16, 2006, Japanese Patent Application No. 2006-180206 filed Jun. 29, 2006, Japanese Patent Application No. 2006-184628 filed Jul. 4, 2006, and Japanese Patent Application No. 2006-237586 filed Sep. 1, 2006, the entire contents of each of which are hereby incorporated by reference.

TECHNICAL FIELD

The present invention relates to an image pickup apparatus capable of superimposedly displaying an inclination guide on a picked-up image to enable image-pickup with the apparatus horizontally held.

BACKGROUND ART

To enable video images picked up with a video camera or the like to be seen comfortably, techniques for keeping the camera horizontal have been proposed. For example, Japanese Patent Laid-Open No. 64-40824 discloses that a horizontally detector detects an inclination of the camera to display information corresponding to the detected inclination on a display device to notice and warn the user of the inclination of the camera. Further, for the display of the inclination, a proposal has been made of, for example, a technique for displaying a horizontal reference line and the inclination of the camera in different colors, and if they match, displaying them as a single line as disclosed in Japanese Patent Laid-Open No. 2002-271654.

DISCLOSURE OF THE INVENTION

An object of the present invention is to provide an image pickup apparatus that provides an appropriate inclination guide display in accordance with an image pickup mode, the aspect ratio of a picked-up image, the hand-jiggling condition of the image pickup apparatus, a zoom condition, and the like.

According to an aspect, the present invention provides an image pickup apparatus including an inclination detector which detects an inclination of the image pickup apparatus, a display device capable of superimposedly showing an inclination guide display corresponding to a detection output from the inclination detector, on a picked-up image, an aspect ratio setter which sets the aspect ratio of a picked-up image, and a display controller which controls whether or not to show the inclination guide display on the display device on the basis of the aspect ratio set by the aspect ratio setter.

According to another aspect, the present invention provides an image pickup apparatus including an inclination detector which detects an inclination of the image pickup apparatus, an aspect switcher which switches the aspect ratio of a picked-up image, and a display controller which, if inclination information detected by the inclination detector indicates a predetermined value or larger, superimposedly shows an inclination guide display on a picked-up image displayed on a display device. The display controller changes the predetermined value in accordance with the aspect ratio.

According to another aspect, the present invention provides an image pickup apparatus including an inclination detector which detects an inclination of the image pickup apparatus, an aspect switcher which switches the aspect ratio of a picked-up image, and a display controller which, if the inclination information detected by the inclination detector indicates a predetermined value or larger, superimposedly shows an inclination guide display on a picked-up image displayed on a display device. The display controller changes, when it shows the inclination guide display, the display angle of the inclination guide display relative to the inclination detected by the inclination detector, in accordance with the aspect ratio.

According to another aspect, the present invention provides an image pickup apparatus including an inclination detector which detects an inclination of the image pickup apparatus, an aspect switcher which switches the aspect ratio of a picked-up image, and a display controller which, if the inclination information detected by the inclination detector indicates a predetermined value or larger, superimposedly shows an inclination guide display on a picked-up image displayed on a display device. Sensitivity of the inclination detector is changed in accordance with the aspect ratio.

According to another aspect, the present invention provides an image pickup apparatus including an inclination detector which detects an inclination of the image pickup apparatus, an aspect switcher which switches the aspect ratio of a picked-up image, and a display controller which, if the inclination information detected by the inclination detector indicates a predetermined value or larger, superimposedly shows an inclination guide display on a picked-up image displayed on a display device. The display controller changes the predetermined value in accordance with the aspect ratio, and the display controller changes, when it shows the inclination guide display, the display angle of the inclination guide display relative to the inclination detected by the inclination detector, in accordance with the aspect ratio.

According to another aspect, the present invention provides an image pickup apparatus including an inclination detector which detects an inclination of the image pickup apparatus, a display device capable of superimposedly showing an inclination guide display corresponding to a detection output from the inclination detector, on a picked-up image, a shake detector which detects a shake of the image pickup apparatus, and a display controller which controls whether or not to cause the display device to superimposedly show the inclination guide display on the picked-up image, on the basis of the detection output from the shake detector.

According to another aspect, the present invention provides an image pickup apparatus including an inclination detector which detects an inclination of the image pickup apparatus, a display device capable of superimposedly showing an inclination guide display corresponding to a detection output from the inclination detector, on a picked-up image, and a display controller which controls whether or not to cause the display device to superimposedly show the inclination guide display on the picked-up image, on the basis of a shake variation signal obtained by a band limitation of a detection output from the inclination detector.

According to another aspect, the present invention provides an image pickup apparatus including a display device which shows a picked-up image, an inclination detector which detects an inclination of the image pickup apparatus, a display processor which shows an inclination guide display corresponding to the inclination detected by the inclination detector, on the display device, a shake detector which detects a shake of the image pickup apparatus, and an exaggeration level changer which changes a level of exaggeration of the inclination guide display in accordance with the shake detected by the shake detector.

According to another aspect, the present invention provides an image pickup apparatus including a display device which displays a picked-up image, an inclination detector which detects an inclination of the image pickup apparatus, a display processor which shows an inclination guide display corresponding to the inclination detected by the inclination detector, on the display device, a shake detector which detects a shake of the image pickup apparatus, and a detection sensitivity changer which changes detection sensitivity of the inclination detector in accordance with the shake detected by the shake detector.

According to another aspect, the present invention provides an image pickup apparatus including an inclination detector which detects an inclination of the image pickup apparatus, a display device capable of superimposedly showing an inclination guide display corresponding to a detection output from the inclination detector, on a picked-up image, a stitch image-pickup mode switcher capable of switches at least between a normal image-pickup mode and a stitch image pickup mode in which image-pickup is performed a plural number of times and then a plural picked-up images are connected together, and a display controller which controls such that the inclination guide display is shown in the stitch image-pickup mode.

According to another aspect, the present invention provides an image pickup apparatus including an image pickup mode setter which sets one of a moving image pickup mode and a still image pickup mode, a display device which displays a picked-up image, an inclination detector which detects an inclination of the image pickup apparatus, and a display processor which shows an inclination guide display corresponding to the inclination detected by the inclination detector, on the display device. The display processor changes a display state of the inclination guide display in accordance with the image pickup mode set by the image-pickup mode setter.

According to another aspect, the present invention provides an image pickup apparatus including an image pickup mode setter which sets a moving image pickup mode and a still image pickup mode, a display device which displays a picked-up image, an inclination detector which detects an inclination of the image pickup apparatus, a display processor which shows an inclination guide display corresponding to the inclination detected by the inclination detector, on the display device, and a changer which changes detection sensitivity of the inclination detector depending on whether the moving image pickup mode or the still image pickup mode is set.

According to an aspect, the present invention provides an image pickup apparatus including an image pickup mode setter capable of setting at least a moving image pickup mode and a still image pickup mode, an inclination detector which detects an inclination of the image pickup apparatus, a display device which displays a picked-up image, and a display processor which shows an inclination guide display corresponding to the inclination detected by the inclination detector, on the display device. The display processor controls whether or not to show the inclination guide display on the display device in accordance with the image pickup mode set by the image pickup mode setter.

According to another aspect, the present invention provides an image pickup apparatus including an image pickup mode setter which sets an image pickup mode, a display device which displays a picked-up image, an inclination detector which detects an inclination of the image pickup apparatus, a display processor which shows an inclination guide display corresponding to the inclination detected by the inclination detector, on the display device, and a display controller which switches whether or not to show the inclination guide display in accordance with the inclination detected by the inclination detector and changes an inclination at which the inclination guide display is shown or not shown, in accordance with the image pickup mode set by the image pickup mode setter.

According to another aspect, the present invention provides an image pickup apparatus including an image pickup mode setter which sets an image pickup mode, a display device which displays a picked-up image, an inclination detector which detects an inclination of the image pickup apparatus, a display processor which shows an inclination guide display exaggerating the inclination detected by the inclination detector, on the display device, and a display controller which changes a level of exaggeration of the inclination guide display in accordance with the image pickup mode set by the image pickup mode setter.

According to another aspect, the present invention provides an image pickup apparatus including an image pickup mode setter which sets an image pickup mode, a display device which displays a picked-up image, an inclination detector which detects an inclination of the image pickup apparatus, a display processor which shows an inclination guide display corresponding to the inclination detected by the inclination detector, on the display device, and a detection sensitivity changer which changes detection sensitivity of the inclination detector in accordance with the image pickup mode set by the image pickup mode setter.

According to another aspect, the present invention provides an image pickup apparatus including a display device which displays a picked-up image, an inclination detector which detects an inclination of the image pickup apparatus, an inclination guide display generator which generates an inclination guide display corresponding to the inclination of the image pickup apparatus detected by the inclination detector, and a switcher which switches whether or not to show the inclination guide display on the display device on the basis of the inclination of the image pickup apparatus detected by the inclination detector. An inclination at which the inclination guide display is shown or not shown is changed depending on a zoom position of the image pickup apparatus.

According to another aspect, the present invention provides an image pickup apparatus including a display device which displays a picked-up image, an inclination detector which detects an inclination of the image pickup apparatus, and an inclination guide display generator which generates an inclination guide display corresponding to the inclination of the image pickup apparatus detected by the inclination detector. The inclination guide display generator generates the inclination guide display exaggerating the inclination of the image pickup apparatus detected by the inclination detector, in accordance with a zoom position of the image pickup apparatus.

According to another aspect, the present invention provides an image pickup apparatus including a display device which displays a picked-up image, an inclination detector which detects an inclination of the image pickup apparatus, an inclination guide display generator which generates an inclination guide display corresponding to the inclination of the image pickup apparatus detected by the inclination detector, and a detection sensitivity changer which changes detection sensitivity of the inclination detector in accordance with a zoom position of the image pickup apparatus.

According to another aspect, the present invention provides an image pickup apparatus including a display device which displays a picked-up image, an inclination detector which detects an inclination of the image pickup apparatus, and a display controller which, when the inclination detected by the inclination detector is equal to or larger than a first angle, controls such that an inclination guide display corresponding to the inclination detected by the inclination detector is shown on the display device, and when the inclination detected by the inclination detector is smaller than a second angle that is smaller than the first angle, controls such that the inclination guide display is not shown on the display device.

The other objects and features of the present invention will be apparent from embodiments described below with reference to the accompanying drawings.

BRIEF DESCRIPTION OF THE DRAWINGS

FIGS. 3A-1 to 3C-2 are diagrams showing an inclination sensor and its output characteristics that is Embodiment 1 of the present invention;

FIGS. 14A-1 to 14C-2 are diagrams showing an inclination sensor and its output characteristics that is Embodiment 5 of the present invention;

FIGS. 20A to 20D are diagrams showing an inclination detection sensor in FIG. 19 and its output characteristics;

FIGS. 22A and 22B are diagrams showing shake signals obtained when the camera is held by a user's hand and when the camera is fixed with a tripod or the like that is Embodiment 7 of the present invention;

FIGS. 33A and 33B are diagrams showing shake detection signals obtained when the video camera is held by the user's hand and when the camera is fixed with a tripod or the like;

FIGS. 63A to 63D are diagrams showing an inclination sensor and its output characteristics that is Embodiment 22 of the present invention;

FIGS. 77A-1 to 77A-3 are diagrams showing the relationship between the inclination of the video camera and an output from an inclination sensor;

FIGS. 90A-1 to 90A-3 and 90B are diagrams showing the output characteristics of an inclination sensor with respect to the inclination of the video camera;

BEST MODE FOR CARRYING OUT THE INVENTION

Preferred embodiments of the present invention will be described below with reference to the drawings.

Embodiment 1

Figure 1:
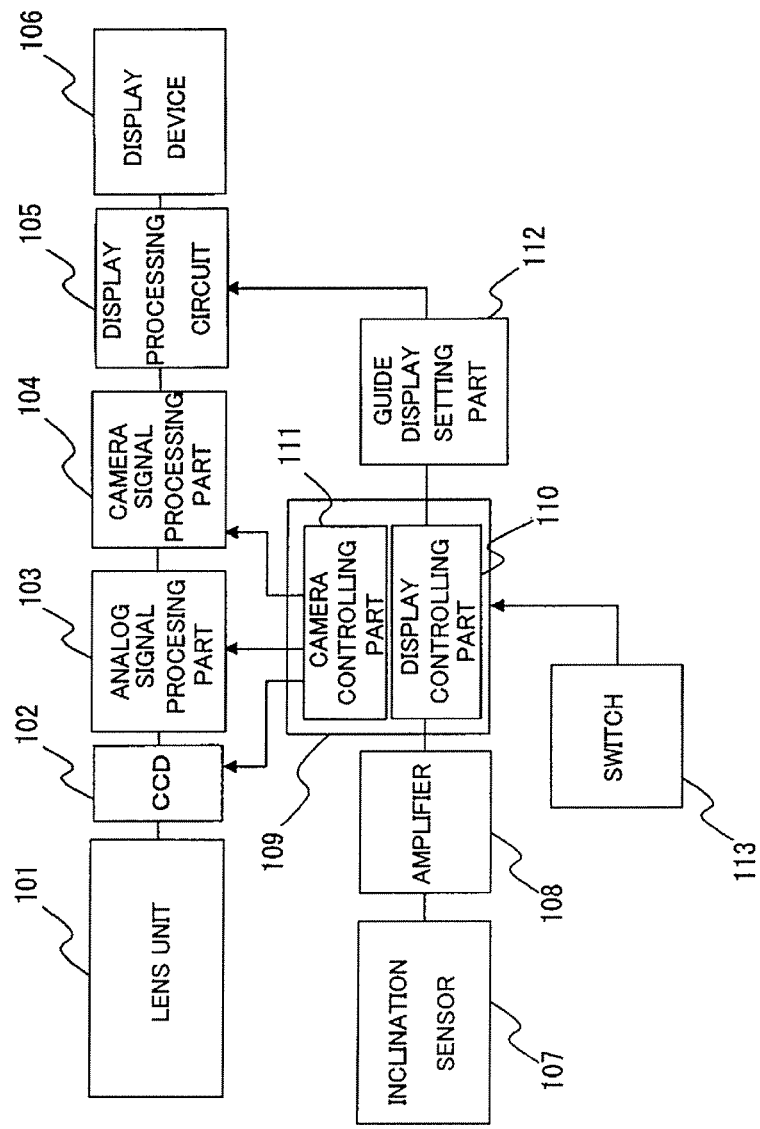
FIG. 1 is a block diagram showing the configuration of a circuit in a video camera that is Embodiment 1 of the present invention.

FIG. 1 is a block diagram showing the configuration of a circuit in a video camera that is Embodiment 1 of the present invention. In FIG. 1, reference numeral 101 denotes a lens unit used to pick up an image of an object. Reference numeral 102 denotes a CCD (Charge-Coupled Device) that photoelectrically converts an image of the object formed by the lens unit 101 into a signal. Reference numeral 103 denotes an analog signal processing part that executes predetermined processing on the signal obtained by the CCD 102 to generate an analog image pickup signal. The analog signal processing part 103 is constituted by, for example, a CDS (Co-related Double Sampling) circuit, an AGC (Automatic Gain Control) circuit, and the like. Reference numeral 104 denotes a camera signal processing part that uses a built-in A/D converter to convert an analog image pickup signal into a digital signal and that executes predetermined signal processing such as gamma correction and white balancing on the signal to generate a final output video signal.

Reference numeral 107 denotes an inclination sensor to detect an inclination of the video camera, which is an acceleration sensor in Embodiment 1. Reference numeral 108 denotes an amplifier that amplifies an output from the inclination sensor 107 (sensor output). Reference numeral 109 is a camera controlling microcomputer constituted by a display controlling part 110 and a camera controlling part 111. The camera controlling part 111 controls the drive of the CCD 102, analog signal processing part 103, and camera signal processing part 104. The display controlling part 110 loads an output from the amplifier 108 and determines whether or not to provide a display corresponding to the inclination on the basis of the detected inclination information to output display control information to a guide display setting part 112. The guide display setting part 112 outputs information on a guide display corresponding to the inclination to a display processing circuit 105. The display processing circuit 105 superimposes the guide display information on the output video signal to enable a display device 106 such as a viewfinder or a liquid crystal panel to display the resulting image.

Reference numeral 113 denotes a switch for an aspect ratio. A User can use this switch 113 to switch the aspect ratio between 4:3 and 16:9. When switching the aspect ratio, the camera controlling part 111 sets respective processing parts.

Figure 2:
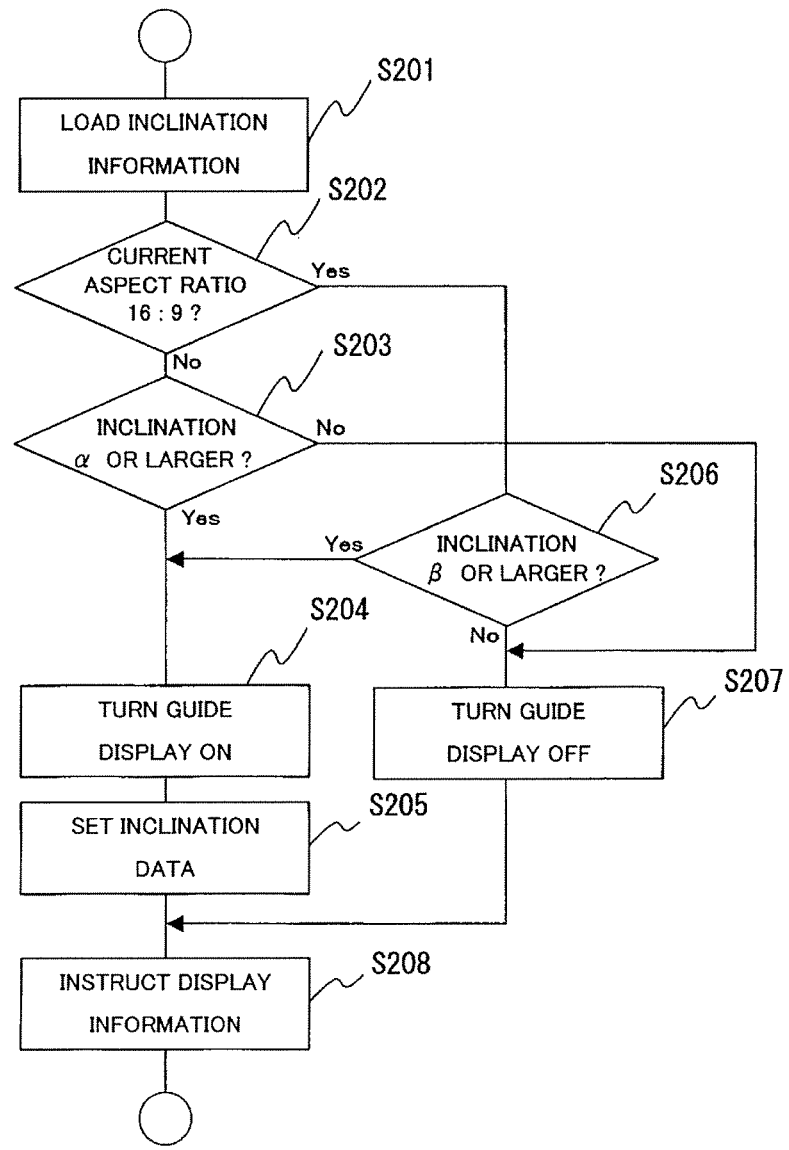
FIG. 2 is a flowchart showing an inclination guide display operation performed by the video camera that is Embodiment 1 of the present invention.

FIG. 2 is a flowchart showing the operation performed by the display controlling part 110 in the camera controlling microcomputer 109.

First, in step S201, inclination information is loaded from the inclination sensor 107 via the amplifier 108. In next step S202, the process determines whether or not the current image pickup angle of view (aspect ratio) is 4:3 or 16:9, on the basis of the state of the switch 113. As a result, if the aspect ratio is not 16:9, the process proceeds to step S203. In step S203, the process determines whether or not the current inclination of the video camera is equal to or larger than a predetermined value $\alpha$. If the inclination is equal to or larger than the predetermined value $\alpha$, the process proceeds to step S204 to turn on the guide display. On the other hand, if the inclination is smaller than the predetermined value $\alpha$, the process proceeds to step S207 to turn off the guide display.

If the image pickup angle of view is determined to be 16:9 in step S202, the process proceeds to step S206 to determine whether or not the inclination of the video camera is equal to or larger than a predetermined value $\beta$. If the inclination is equal to or larger than the predetermined value $\beta$, the process proceeds to step S204 to turn on the guide display. On the other hand, if the inclination is smaller than the predetermined value $\beta$, the process proceeds to step S207 to turn off the guide display. In step S205 and step S208, inclination data is set and display information is instructed, respectively.

The relationship between the predetermined values $\alpha$ and $\beta$ is:

$$\alpha > \beta.$$

The inclination at which the guide display is turned on is smaller for 16:9 than for 4:3. Thus, for 16:9, with which the inclination of the video camera is more noticeable, the guide display is provided at the smaller inclination.

FIGS. 3A-1 to 3C-2 are diagrams showing the relationship between the inclination of the video camera and an output from the inclination sensor 107. In FIGS. 3A-1 to 3C-1, reference numerals 100, 106, and 107 denote the video camera, the display device that is a liquid crystal panel, and the inclination sensor (acceleration sensor), respectively.

Appropriate setting of the gain of the amplifier 108 in FIG. 1 enables a sensor output from the inclination sensor 107 to be set to have the voltage range described below.

FIG. 3B-1 shows that the video camera 100 is located at a regular position. The sensor output is half of a power supply voltage as shown in FIG. 3B-2. In contrast, inclining the video camera 100 counterclockwise by 90° as shown in FIG. 3A-1 provides a sensor output equal to the power supply voltage as shown in FIG. 3A-2. In contrast, inclining the video camera 100 clockwise by 90° as shown in FIG. 3C-1 provides a sensor output at a GND level as shown in FIG. 3C-2.

For the inclinations between those shown in FIG. 3A-1 and FIG. 3B-1 or between those shown in FIG. 3B-1 and FIG. 3C-1, the sensor output changes linearly with the inclination. Thus, setting a predetermined voltage threshold for an output obtained at the regular position shown in FIG. 3B-2 makes it possible to determine whether or not a predetermined angle is reached. That is, switching the voltage threshold for the sensor output between 16:9 and 4:3 enables the setting of the angle at which the inclination guide display is turned on.

Reversing the orientation of the inclination sensor 107 reverses the voltage of the sensor output obtained when the video camera 100 is inclined with respect to that shown in FIGS. 3A-2 and 3C-2.

Figure 4:
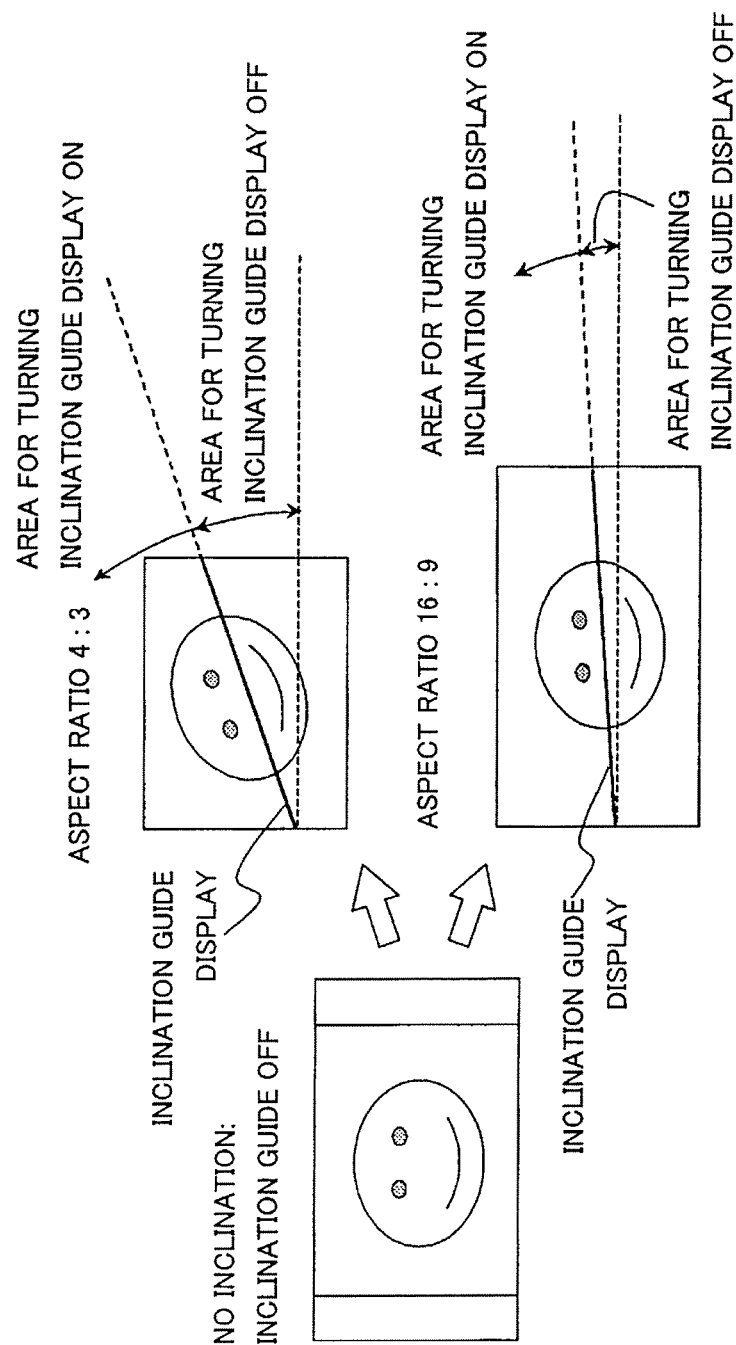
FIG. 4 is a diagram showing the range of the inclination guide display that is Embodiment 1 of the present invention.

FIG. 4 shows the range of the inclination guide display on the display device 106 such as a liquid crystal panel or a viewfinder. As described above, switching the voltage threshold of the sensor output for display between 16:9 and 4:3 makes the area in which the inclination guide display is turned off smaller for the aspect ratio of 16:9 than for the aspect ratio of 4:3. This enables the inclination of the video camera to be more quickly determined for the aspect ratio of 16:9.

Figure 5A:
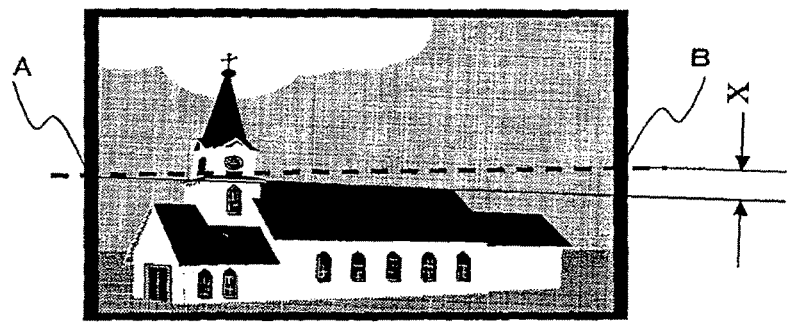
FIGS. 5A and 5B are diagrams illustrating how a display threshold is determined when aspect ratio is 16:9 or 4:3 that is Embodiment 1 of the present invention.
Figure 5B:
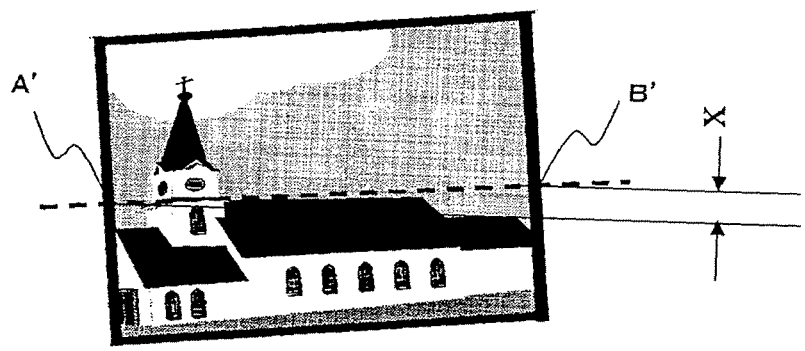

FIGS. 5A and 5B show an example of how the voltage threshold of the sensor output for the inclination guide display is determined for the aspect ratios of 16:9 and 4:3.

In FIGS. 5A and 5B, when a guide display A-B is defined as a horizontal reference for the aspect ratio of 16:9 and a guide display A'-B' is defined as a horizontal reference for the aspect ratio of 4:3, the angles at which the differences in height between points A and B and between points A' and B', resulting from the inclination of the video camera, are equal to the same width X are defined as inclinations at which the guide display corresponding to the inclination is turned on for the aspect ratios of "16:9" and "4:3". This setting makes the difference in inclination between the display with 16:9 and the display with 4:3 unnoticeable. Further, this setting makes it possible to provide the guide display for the aspect ratio of 16:9 at a smaller inclination of the video camera than for the aspect ratio of 4:3. This enables the user to be quickly noticed of the inclination of the video camera.

According to Embodiment 1, when the guide display relating to the inclination of the video camera 100 is provided on the display device 106, the inclination at which the guide display is provided is switched between the aspect ratio of 16:9 and the aspect ratio of 4:3. Specifically, the inclination at which the guide display is provided is set smaller for image pickup in the aspect ratio of 16:9, with which the inclination is more noticeable. This enables the user to be quickly noticed of the inclination of the video camera and also enables improvement of horizontal accuracy of the video camera.

Embodiment 2

Next, Embodiment 2 of the present invention will be described. The configuration of a circuit in the video camera that is Embodiment 2 of the present invention is similar to that in Embodiment 1 except for the operation in the camera controlling microcomputer 109.

Figure 6:
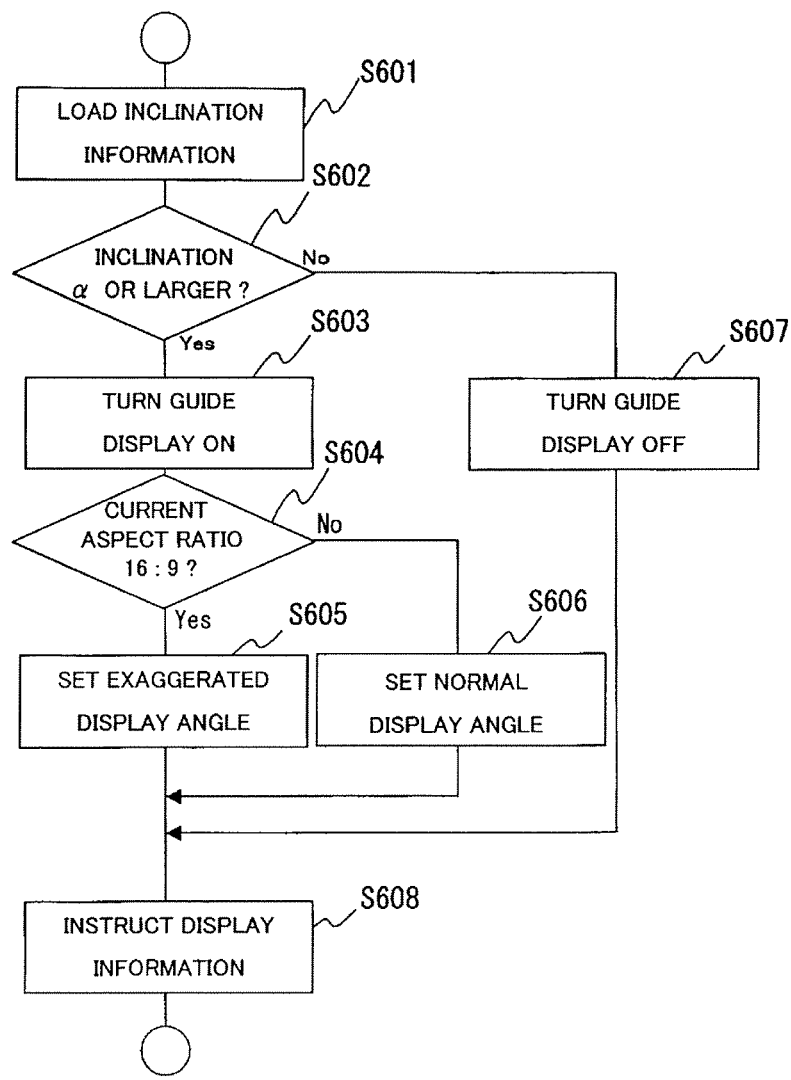
FIG. 6 is a flowchart showing an inclination guide display operation performed by a video camera that is Embodiment 2 of the present invention.

FIG. 6 is a flowchart showing the operation performed by the display controlling part 110 in the camera controlling microcomputer 109. First, in step S601, inclination information is loaded from the inclination sensor 107 via the amplifier 108. Then, in next step S602, the process determines whether or not the detected inclination is equal to or larger than a predetermined If the inclination is determined to be equal to or larger than the predetermined value α, the process proceeds to step S603 to make settings required to turn on a guide display. In next step S604, the process determines whether or not the current aspect ratio is 16:9. If the aspect ratio is determined to be 16:9, the process proceeds to step S605 to exaggeratedly set a display angle. This is an operation for exaggerating the displayed inclination compared to the actual inclination. If the aspect ratio is determined not to be 16:9, the process proceeds from step S604 to step S606 to set the display angle at a normal value. Subsequently, in both cases, the process proceeds to step S608 to provide display information instruction to the guide display setting part 112 for causing the display device 106 to show the guide display.

Figure 7A:
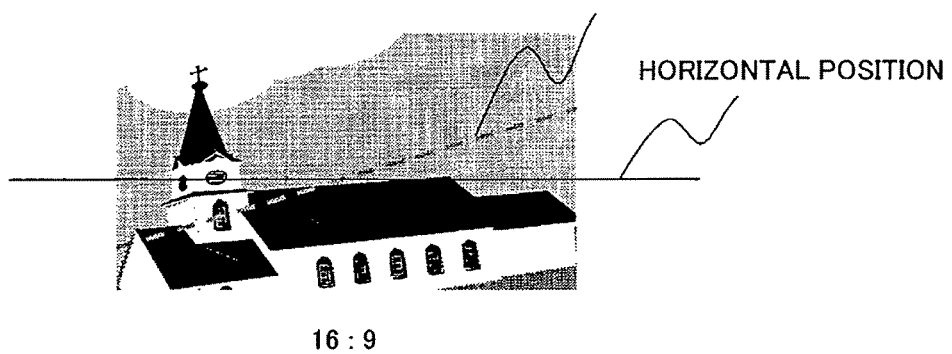
FIGS. 7A and 7B are diagrams illustrating how a guide display is provided when the aspect ratio is 16:9 or 4:3 that is Embodiment 2 of the present invention.
Figure 7B:
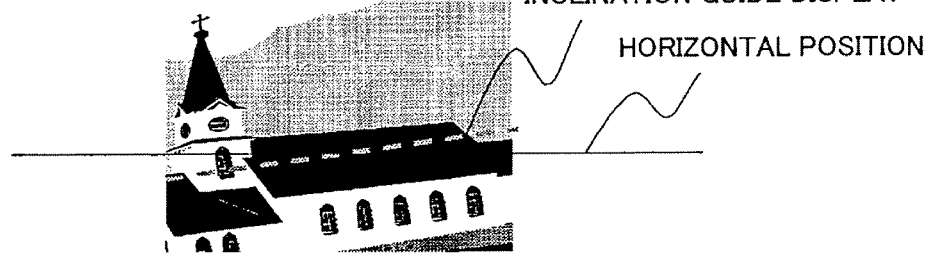

FIGS. 7A and 7B are diagrams showing the guide display (inclination guide display) corresponding to the inclination when the above sensitivity is changed in Embodiment 2. These figures indicates that even with the same inclination of the video camera from the horizontal position, selecting 16:9 enables the inclination guide display to be exaggeratedly displayed compared to selecting 4:3.

Exaggeration of the inclination guide display for the aspect ratio of 16:9 enables the inclination of the video camera to be more clearly shown; the user can easily recognize the inclination. Further, increasing the display angle for the aspect ratio of 16:9 enables a variation in inclination resulting from a slight movement to be easily recognized. This enables the video camera to be more easily set horizontal.

Referring back to FIG. 6, when the video camera 100 is set horizontal, in step S602 in FIG. 6 the inclination becomes smaller than the predetermined value α, and then the process proceeds to step S607. In step S607, the guide display is set to be turned off. In subsequent step S608, the guide display setting part 112 is instructed to turn off the display, thus turning off the guide display on the display device 106.

According to Embodiment 2, the display angle is set larger for the aspect ratio of 16:9 than for the aspect ratio of 4:3. Thus, when image pickup is carried out with the aspect ratio of 16:9, with which the inclination of the image pickup result is more noticeable, it is possible to notice the user of the inclination of the video camera in an easier-to-understand manner.

Moreover, the amount of movement of the video camera in response to its slight inclination can be clearly determined, enabling the video camera to be more easily set horizontal.

Embodiment 3

Figure 8:
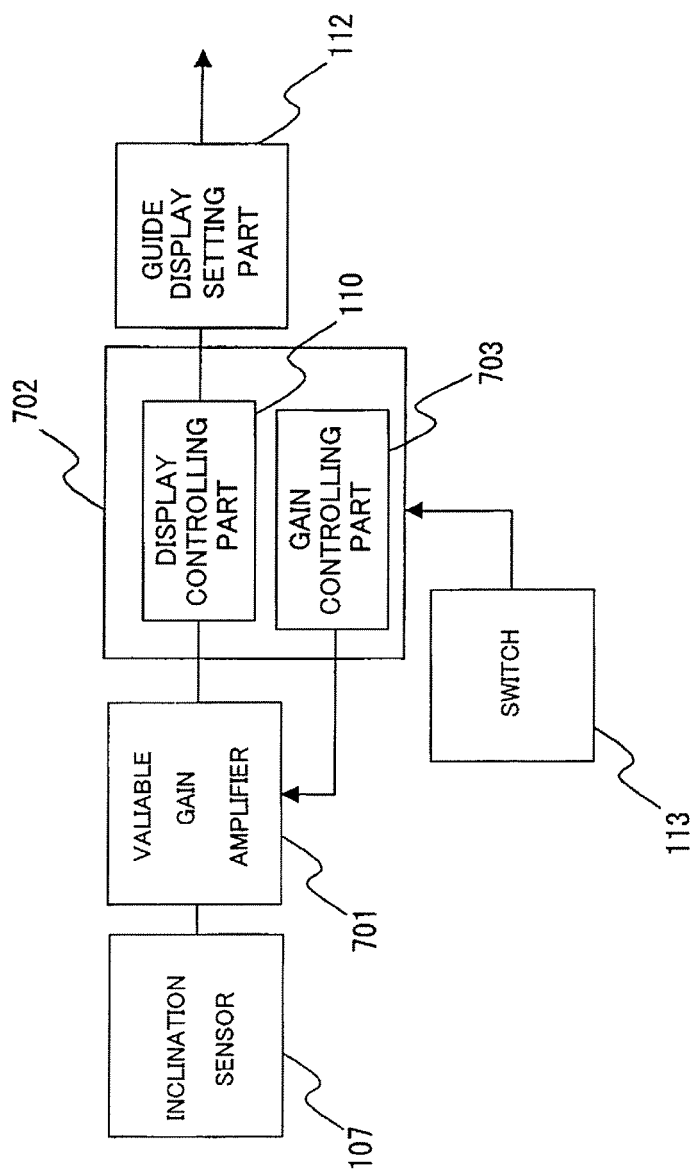
FIG. 8 is a block diagram of a circuit for an inclination guide display section of a video camera that is Embodiment 3 of the present invention.

FIG. 8 is a block diagram showing the circuit configuration of essential parts of a video camera that is Embodiment 3 of the present invention. In FIG. 8, components having the same functions as those in FIG. 1 are denoted by the same reference numerals and their description is omitted.

In FIG. 8, reference numeral 701 denotes a variable gain amplifier that can change the gain of the inclination sensor 107. In accordance with the setting of the switch 113, which switches the aspect ratio, a gain controlling part 703 provided in the camera controlling microcomputer 702 controls the variable gain amplifier 701 to change the gain.

Figure 9:
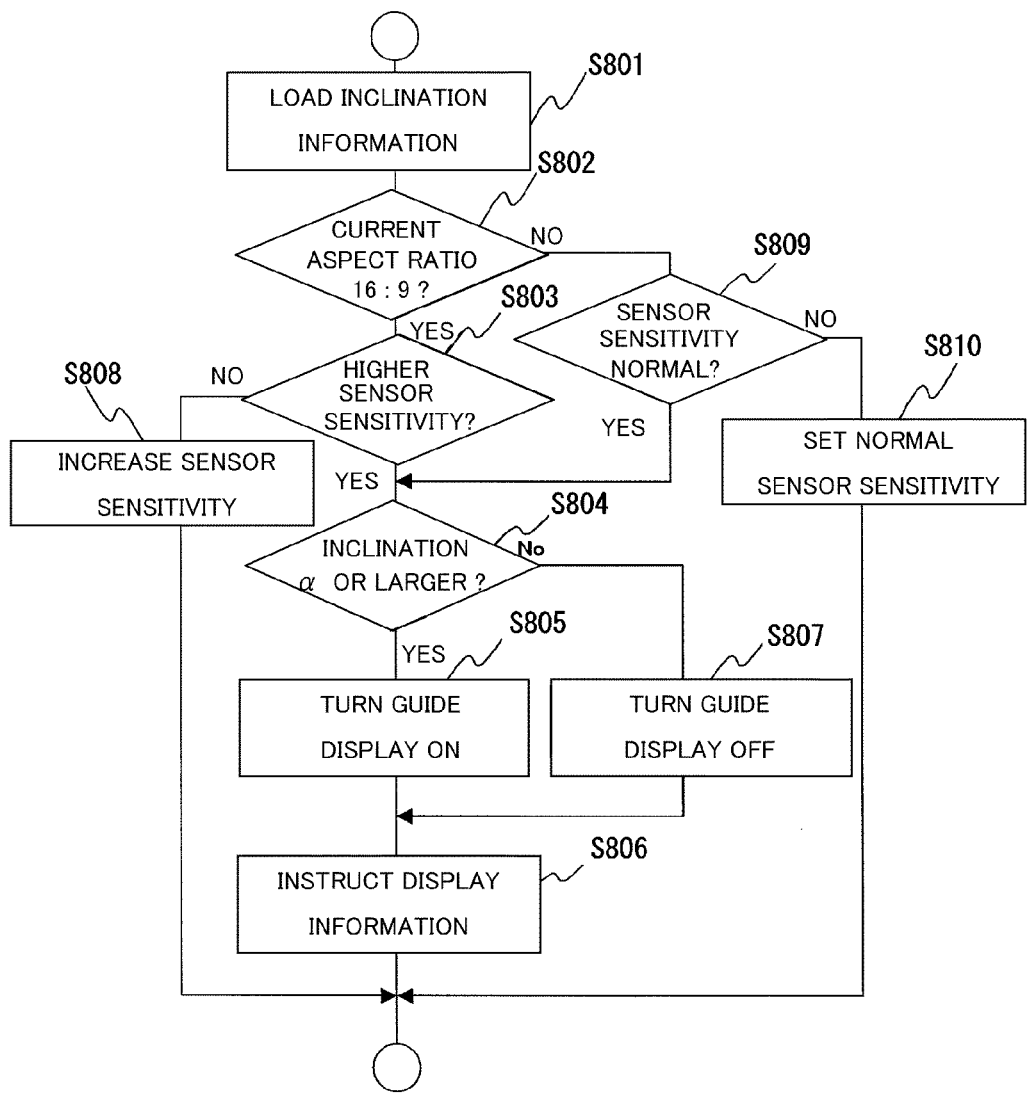
FIG. 9 is a flowchart showing an inclination guide display operation performed by a video camera that is Embodiment 3 of the present invention.

FIG. 9 is a flowchart showing the operation for the guide display control in the camera controlling microcomputer 702.

First, in step S801, inclination information is loaded from the inclination sensor 107. In next step S802, the process determines whether or not the current aspect ratio is 16:9. If the aspect ratio is 16:9, the process proceeds to step S803 to check whether or not sensor sensitivity is set higher. That is, the process determines whether or not the gain of the variable gain amplifier 701 is set higher. If the gain is not set higher, the process proceeds to step S808 to make settings for increasing the gain (sensor sensitivity).

Figure 10:
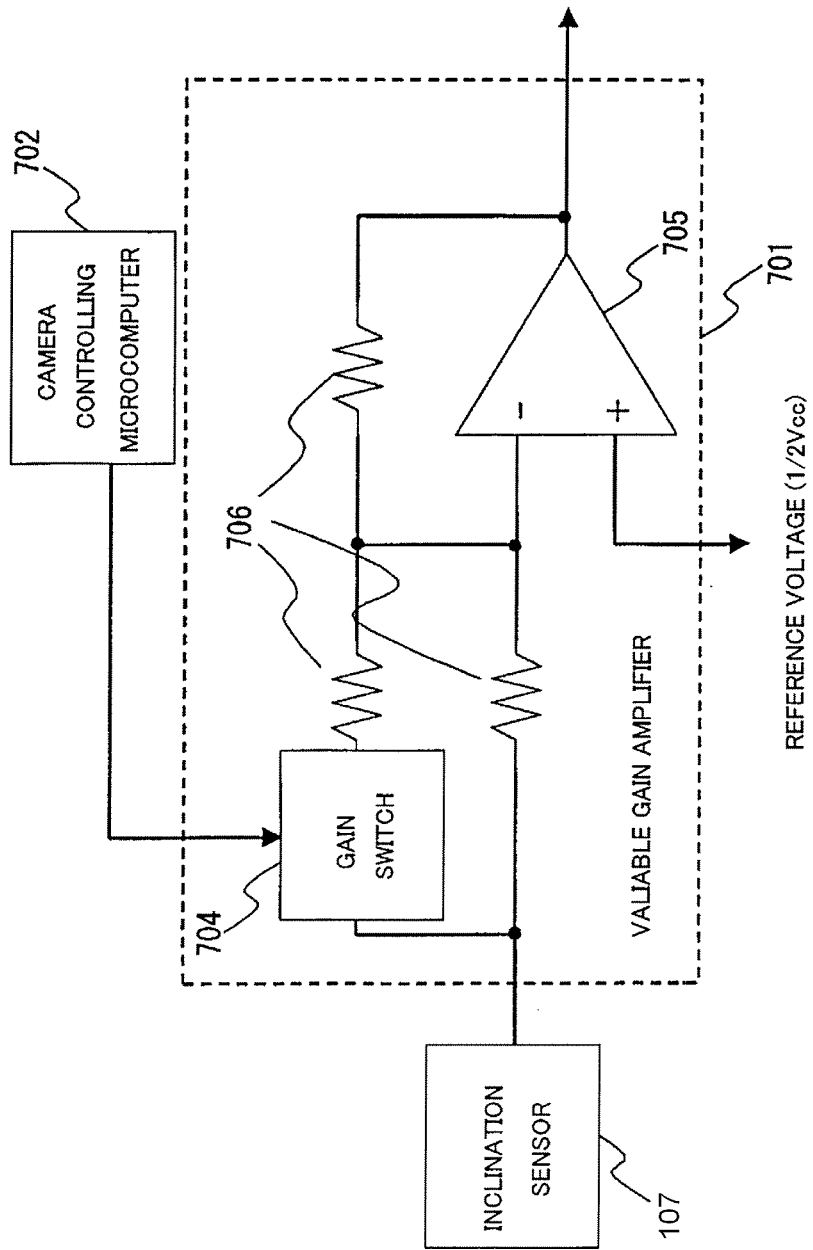
FIG. 10 is a circuit diagram showing, in detail, the circuit configuration of a variable gain amplifier in FIG. 8.

FIG. 10 is a diagram showing the detailed circuit configuration of the variable gain amplifier 701. The variable gain amplifier 701 is constituted by an amplifier 705, resistors 706, and a gain switch 704. A switch signal from the camera controlling microcomputer 702 for the gain switch 704 connects input resistors in parallel with each other with respect to the amplifier 705 to increase the amplifier gain. The gain change is effected to exaggerate the inclination in the guide display for the aspect ratio of 16:9 compared to the actual inclination.

Referring back to FIG. 9, if the process determines in step S803 that the sensor gain is set higher, it proceeds to step S804 to determine whether or not the detected inclination information is equal to or larger than a predetermined value α. If the inclination is equal to or larger than the predetermined value α, the process proceeds to step S805 to make settings for turning on the guide display. In next step S806, display information instruction is provided to the guide display setting part 112 for causing the display device 106 to show the guide display.

If the process determines in step S802 that the aspect ratio is 4:3, it proceeds to step S809 to check whether or not the sensor sensitivity is set at the normal value. If the sensor sensitivity is not set at the normal value, that is, it is set at a value for the aspect ratio of 16:9, the process proceeds to step S810 to set the sensor sensitivity to the normal value. This is an operation for turning off the gain switch 704 in the variable gain amplifier 701.

If the process determines in step S809 that the sensor sensitivity is set at the normal value, a process is executed similarly to step S804 and subsequent steps for the aspect ratio of 16:9.

Regardless of whether the aspect ratio is 16:9 or 4:3, upon determining in step S804 that the inclination is smaller than the predetermined value α, the process proceeds to step S807 to make settings for turning off the guide display. In next step S806, the guide display setting part 112 is instructed to turn off the display. Consequently, the guide display on the display device 106 is turned off.

According to Embodiment 3, if the aspect ratio is set at 16:9, setting the gain of the variable gain amplifier 701 higher than for the aspect ratio of 4:3 provides the same results as those in Embodiment 2. Thus, when image pickup is carried out with the aspect ratio of 16:9, with which the inclination of the image pickup result is more noticeable, it is possible to notice the user of the inclination of the video camera in an easier-to-understand manner.

Moreover, the amount of movement of the video camera in response to its slight inclination can be clearly determined, enabling the video camera to be more easily set horizontal.

Embodiment 4

Figure 11:
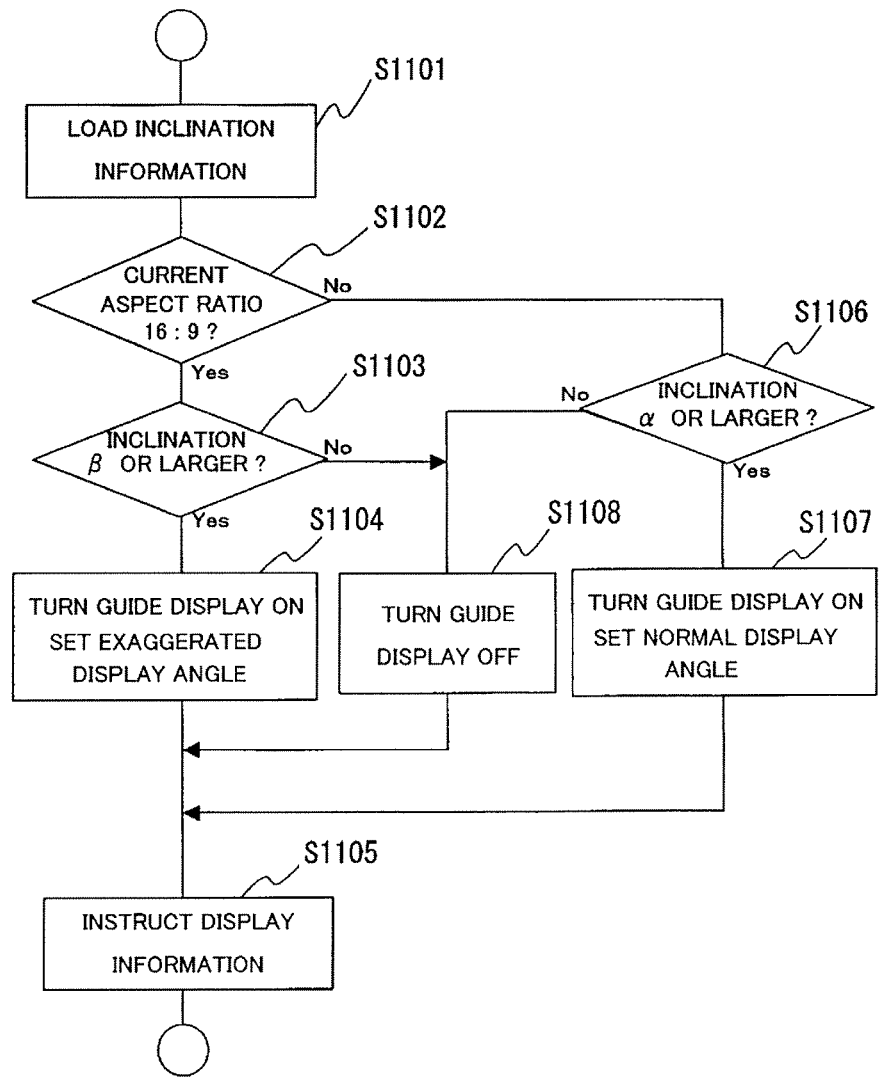
FIG. 11 is a flowchart showing an inclination guide display operation performed by a video camera that is Embodiment 4 of the present invention.

FIG. 11 is a flowchart showing the operation for the guide display for the inclination, the operation being performed in a camera controlling microcomputer of a video camera that is Embodiment 4 of the present invention.

Embodiment 4 of the present invention is an example of combination of Embodiments 1 and 2, described above. The configuration of a circuit in the video camera is the same as that in FIG. 1. In Embodiment 4, the inclination of the video camera at which the guide display is provided is changed between the aspect ratio of 16:9 and the aspect ratio of 4:3. Further, the display angle is increased for the aspect ratio of 16:9 in order to display the exaggerated inclination.

With reference to the flowchart in FIG. 11, description will be given of the operation for the guide display in Embodiment 4 of the present invention.

First, in step S1101, inclination information is loaded from the inclination sensor 107 via the amplifier 108. In next step S1102, the process determines whether or not the current image pickup angle of view is equal to the aspect ratio of 16:9 or 4:3. If the angle of view is determined to be equal to the aspect ratio of 16:9, the process proceeds to step S1103 to determine whether or not the inclination of the video camera is equal to or larger than a predetermined value $\beta$, on the basis of the loaded inclination information. If the inclination is equal to or larger than the predetermined value $\beta$, the process proceeds to step S1104 to turn on the guide display and to further increase the display angle. In next step S1105, display information instruction is provided to the guide display setting part 112 for causing the display device 106 to show the guide display.

If the process determines in step S1102 that the aspect ratio is 4:3, it proceeds to step S106 to determine whether or not the loaded inclination information is equal to or larger than a predetermined value $\alpha$. If the inclination is equal to or larger than the predetermined value $\alpha$, the process proceeds to step S1107 to make settings for turning on the guide display, while executing a process to set the normal display angle. Subsequently, as in the case of the aspect ratio of 16:9, in the step S1105, display information instruction is provided to the guide display setting part 112 for causing the display device 106 to show the guide display.

If the aspect ratio is 16:9 and the process determines in step S1103 that the inclination is smaller than the predetermined value $\beta$ or if the aspect ratio is 4:3 and the process determines in step S1106 that the inclination is smaller than the predetermined value $\alpha$, then the video camera is almost horizontal. Thus, in both cases, the process proceeds to step S1108 to make settings for turning off the guide display. In next step S1105, display information instruction is provided to the guide display setting part 112. Consequently, the guide display on the display device 106 is turned off.

The relationship between the predetermined values $\alpha$ and $\beta$ is set to be:

>display angle magnification×$\beta$.

That is, in FIG. 5A, described above, the vertical distance X between the guide display points A and B provided with the aspect ratio of 16:9 when the video camera is inclined involves the display angle magnification. Thus, the inclination at which the guide display is turned on is always smaller for the aspect ratio of 16:9 than for the aspect ratio of 4:3. The guide display for the aspect ratio of 16:9 is more significantly exaggerated as the inclination of the camera increases.

According to Embodiment 4, with the aspect ratio of 16:9, with which the inclination is more noticeable, the guide display is provided at a smaller inclination. This enables the user to be quickly noticed of the inclination of the camera. Further, an exaggerated guide display of the actual inclination is provided for a larger inclination, enabling the inclination of the camera to be more clearly recognized.

This also enables a variation in inclination resulting from a slight movement to be easily recognized. Thus, the video camera can be more easily set horizontal, enabling improvement of the horizontal accuracy.

In Embodiments 1 to 4, the inclination at which the guide display is provided when the video camera is inclined is changed depending on the aspect ratio. Consequently, even with a horizontally long image that is likely to be significantly affected by the inclination of the video camera, Embodiments 1 to 4 can urge the user to make the inclination of the camera unnoticeable. This prevents the user from viewing unsightly images.

In Embodiments 1 to 4, the aspect ratio can be switched only between 16:9 and 4:3. However, the present invention is not limited thereto but is applicable to any image sizes with various aspect ratios, such as a cinema scope size.

Embodiment 5

Figure 12:
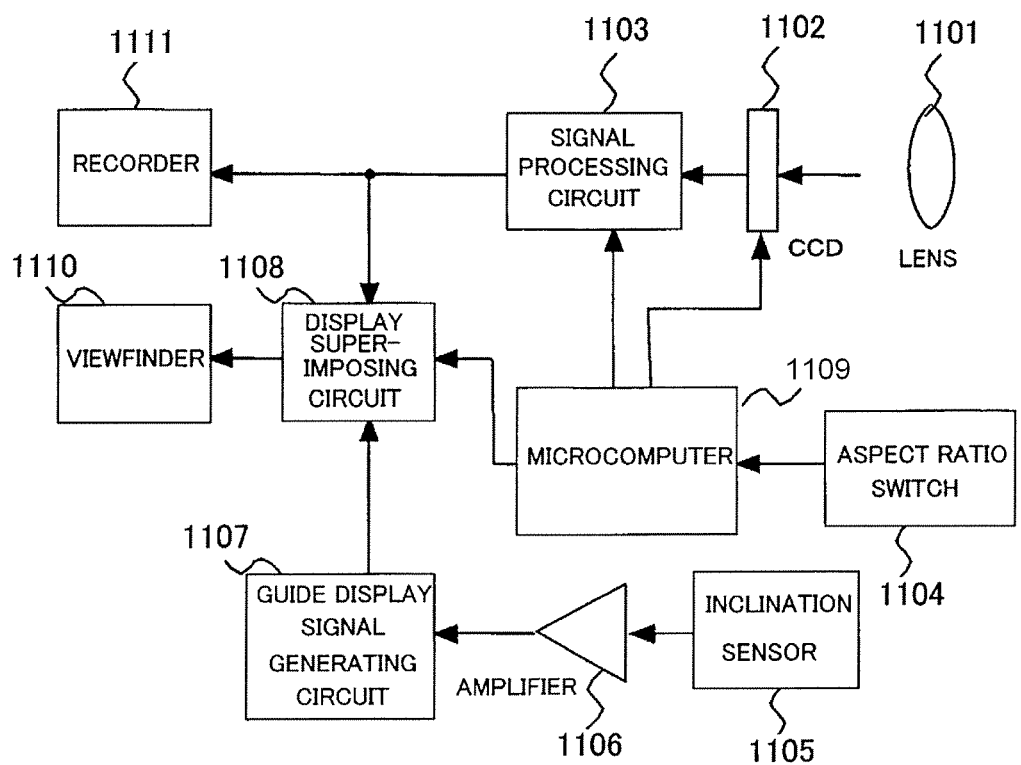
FIG. 12 is a block diagram showing the configuration of a circuit in a video camera that is Embodiment 5 of the present invention.

FIG. 12 is a block diagram showing the configuration of a circuit in a video camera that is Embodiment 5 of the present invention. In FIG. 12, reference numeral 1101 denotes a lens unit used to pick up an image of an object. Reference numeral 1102 denotes a CCD that photoelectrically converts an image of the object formed by the lens unit 1101 into an analog picked-up image signal. Reference numeral 1103 denotes a signal processing circuit that uses a built-in A/D converter to convert the analog picked-up image of the object obtained by the CCD 1102 into a digital signal. The signal processing circuit 1103 then executes predetermined signal processing such as gamma correction and white balancing on the digital signal to generate a standard video signal such as an NTSC.

Reference numeral 1104 denotes an aspect ratio switch operated by the user in accordance with the conditions of image pickup to switch the aspect ratio. Reference numeral 1105 denotes an inclination sensor that detects information on the inclination of the video camera; in Embodiment 5, an acceleration sensor is used for the inclination sensor. Reference numeral 1106 denotes an amplifier that amplifies an output from the inclination sensor 1105. Reference numeral 1107 denotes a guide display signal generating circuit that generates a guide display signal (inclination guide display signal) in accordance with the inclination information. Reference numeral 1108 denotes a display superimposing circuit that can display an image obtained by synthesizing a standard video signal obtained by the signal processing circuit 1103 with the guide display signal obtained by the guide display signal generating circuit 1107 (that is, an image obtained by superimposing a guide display (inclination guide display) on a picked-up image). Reference numeral 1109 denotes a microcomputer that controls the drive of the CCD 1102 and signal processing circuit 1103 and that controls the aspect ratio of the picked-up image and the operation of the display superimposing circuit 1108.

Reference numeral 1110 denotes a viewfinder that can display the image obtained by synthesizing the standard video signal with the guide display signal. Reference numeral 1111 denotes a recorder that records the standard video signal processed by the signal processing circuit 1103 as a picked-up image.

In the above configuration, an image of the object picked up via the lens unit 1101 is formed on the CCD 1102, which photoelectrically converts the image of the object into a signal. The signal processing circuit 1103 subsequently converts the signal from the CCD 1102 into a digital signal. The signal is then subjected to predetermined signal processing such as gamma correction and white balancing to become a standard video signal. The standard video signal is output to a recorder 1111, which records the signal as a picked-up image. The standard video signal is also output to the display superimposing circuit 1108.

On the other hand, the inclination information obtained by the inclination sensor 1105 is amplified to a predetermined amount by the amplifier 1106. The guide display signal generating circuit 1107 outputs the resulting guide display signal corresponding to the inclination information to the display superimposing circuit 1108. Thus, the image obtained by the display superimposing circuit 1108 by superimposing the guide display signal on the standard video signal is output to the viewfinder 1110. Then, on the viewfinder 1110, the guide display (which will be described later in detail with reference to FIG. 15) is superimposed on the picked-up image to enable the video camera to be held horizontal for image pickup.

Next, switching of the aspect ratio will be described. For example, it is assumed that with the video camera using the CCD with an aspect ratio of 16:9, the user operates the aspect switch 1104 to switch the aspect ratio from 16:9 to 4:3. This operation generates a switching signal from the aspect switch 1104 to be input to the microcomputer 1109. Then, the microcomputer 1109 instructs the CCD 1102 and signal processing circuit 1103 to read and process signals at the timing of change of the aspect ratio. Specifically, a picked-up image with a desired aspect ratio is obtained by preventing reading of signals from part of the image area of the CCD 1102. The mechanism of switching of the aspect ratio is not directly related to the present invention, and its detailed description is thus omitted. In the present embodiment, the aspect ratio is defined as a ratio that can be expressed by the size in the horizontal direction/the size in the vertical direction.

Further, in response to switching of the aspect ratio via the aspect ratio switch 1104, the microcomputer 1109 outputs a display superimposition control signal to the display superimposing circuit 1108. The display superimposing circuit 1108 permits or prohibits the synthesis of the guide display signal input from the guide display signal generating circuit 1107 with the standard video signal obtained by the signal processing circuit 1103, in accordance with the display superimposition control signal. For example, if the aspect ratio is switched to a smaller value, 4:3, the synthesis of the guide display signal with the standard video signal is prohibited. In contrast, if the aspect ratio is switched to a larger value, 16:9, the synthesis of the guide display signal with the standard video signal is permitted.

Figure 13:
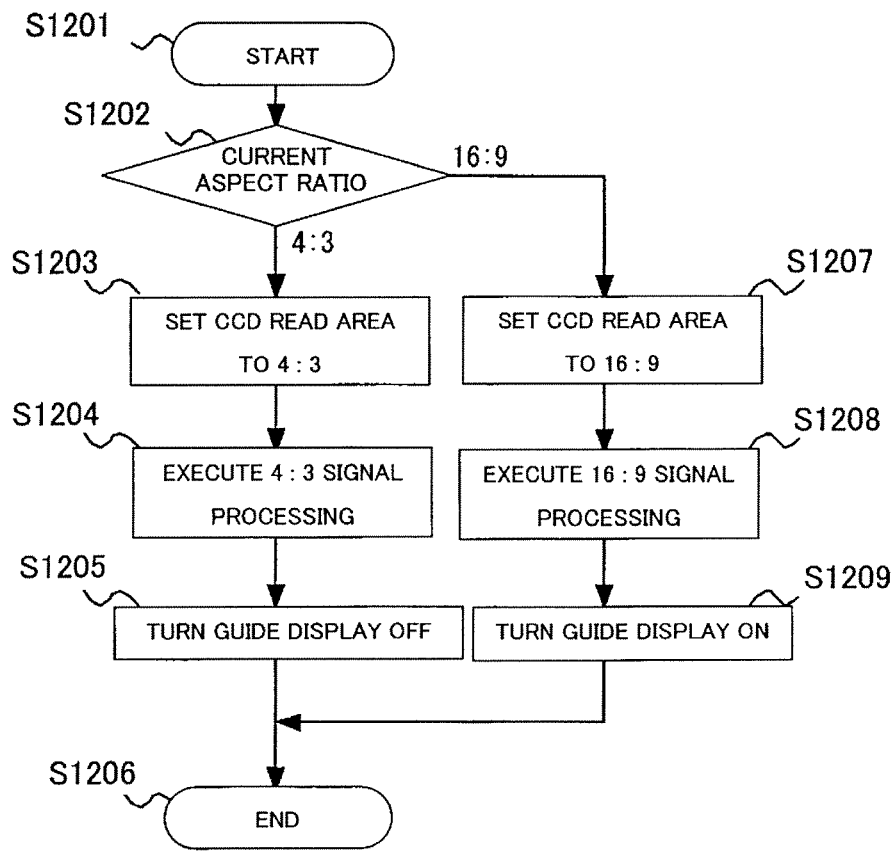
FIG. 13 is a flowchart showing the operation for guide display in the video camera that is Embodiment 5 of the present invention.

Next, processing executed by the microcomputer 1109 will be described with reference to FIG. 13. FIG. 13 is a flowchart showing the operation of the microcomputer 1109 for the guide display associated with switching of the aspect ratio.

The flowchart is repeatedly implemented at a predetermined period, for example, on the basis of video synchronization. The operation is started at step S1201, and in step S1202, the state of switching of the aspect ratio via the aspect ratio switch 1104 is checked. As a result, if the aspect ratio has been switched to 4:3, the process proceeds to step S1203. If the aspect ratio has been switched to 16:9, the process proceeds to step S1207.

First, description will be given of the case where the aspect ratio has been switched to 4:3. In this case, the process proceeds from step S1202 to step S1203 to set a 4:3 read area for the CCD 1102. In next step S1204, signal processing by the signal processing circuit 1103 is set so as to correspond to the aspect ratio of 4:3. Specifically, image processing is executed which corresponds to the number of scan lines read from the CCD 1102. In subsequent step S1205, the display superimposing circuit 1108 is prohibited from performing a superimposing operation in order to prohibit the guide display. This causes only the standard video signal to be output to the viewfinder 1110, which thus displays only the picked-up image.

Further, if the process determines in step S1202 that the aspect ratio has been switched to 16:9, it proceeds to step S1207 to set a 16:9 read area for the CCD 1102. In next step S1208, signal processing by the signal processing circuit 1103 is set so as to correspond to the aspect ratio of 16:9. Specifically, image processing is executed which corresponds to the number of scan lines read from the CCD 1102. In subsequent step S1209, the display superimposing circuit 1108 performs a superimposing operation in order to permit the guide display. This enables a signal obtained by synthesizing the standard video signal with the guide display signal to be output to the viewfinder 1110, which thus shows the guide display superimposed on the picked-up image.

After finishing the operation in step S1205 or S1209, the process proceeds to step S1206 to finish the flow.

FIGS. 14A-1 to 14C-2 are diagrams showing the relationship between the inclination of the video camera and an output from the inclination sensor 1105. In FIGS. 14A-1 to 14C-1, reference numerals 1100, 1110, and 1105 denote the video camera, the display device that is a liquid crystal panel, and the inclination sensor (acceleration sensor), respectively.

Appropriate setting of the gain of the amplifier 1106 in FIG. 12 enables a sensor output from the inclination sensor 1105 to be set to have the voltage range described below.

FIG. 14B-1 shows that the video camera 1100 is located at a regular position. The sensor output is half of a power supply voltage Vcc as shown in FIG. 14B-2. In contrast, inclining the video camera 1100 counterclockwise by 90° as shown in FIG. 14A-1 provides a sensor output equal to the power supply voltage Vcc as shown in FIG. 14A-2. Further, inclining the video camera 1100 clockwise by 90° as shown in FIG. 14C-1 provides a sensor output at a GND level as shown in FIG. 14C-2.

For the inclinations between those shown in FIG. 14A-1 and FIG. 14B-1 and between those shown in FIG. 14B-1 and FIG. 14C-1, the sensor output changes linearly with the inclination. On the basis of the voltage corresponding to the inclination, the guide display signal generating circuit 1107 generates the guide display signal indicating the inclination amount. The display superimposing circuit 1108 then synthesizes the guide display signal with the standard video signal, and the resulting signal is displayed on the viewfinder 1110.

Next, an image displayed on the viewfinder 1110 will be described with reference to FIGS. 15A and 15B.

Figure 15A:
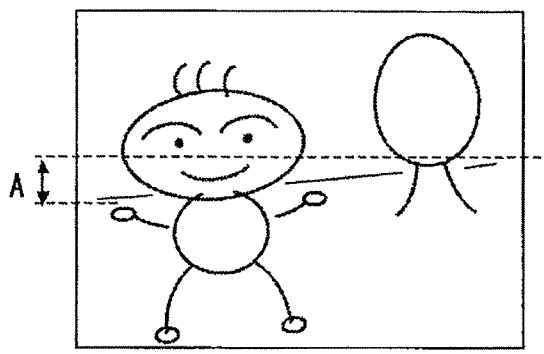
FIGS. 15A and 15B are diagrams showing an inclination guide display that is Embodiment 5 of the present invention.

FIG. 15A shows an image on the viewfinder 1110 obtained when the aspect ratio is switched to 4:3. In this case, a 4:3 picked-up image is displayed on the viewfinder 1110. Further, FIG. 15B shows an image on the viewfinder 1110 obtained when the aspect ratio is switched to 16:9. In this case, the display superimposing circuit 1108 synthesizes the standard video signal with the guide display signal generated by the guide display signal generating circuit 1107. Consequently, the guide display 1301 with an inclination 1302 is superimposedly displayed on the picked-up image shown on the viewfinder 1110. The gain of the amplifier 1106, which amplifies the output from the inclination sensor 1105, can be adjustably set equivalent to the inclination of the object (for example, the inclination of the horizon or the like in the background).

Figure 15B:
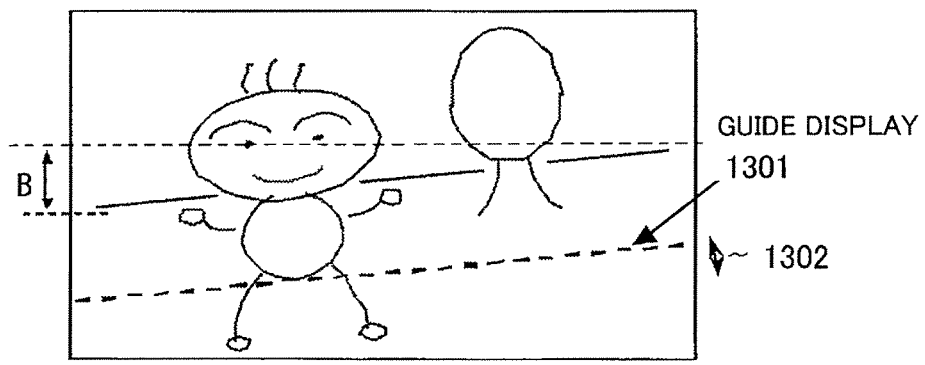

Further, FIG. 15A and FIG. 15B show the difference in display position between the laterally opposite ends of an image observed when the vide camera is inclined by the same inclination amount. As shown in these figures, with a horizontal line (the horizon or the like) crossing the screen in the lateral direction as shown in the figures, the difference B in display position for the aspect ratio of 16:9 is larger than the difference A in display position for the aspect ratio of 4:3. That is, even with the same inclination, effects on the picked-up image change depending on the aspect ratio; the level of the effect increases consistently with the aspect ratio.

Embodiment 5 has been described in conjunction with a change in the aspect ratio of the video camera. However, the description also applies to still cameras or the like. A process similar to that in the present embodiment can be executed when an aspect ratio of 3:2 and an aspect ratio for panoramic image pickup are switched.

According to Embodiment 5, if the process determines that the current aspect ratio is equal to or lower than the predetermined value, it prohibits the guide display 1301 from being superimposedly shown on the picked-up image shown on the viewfinder 1110. Further, if the process determines that the current aspect ratio is higher than the predetermined value (in this case, the aspect ratio is 16:9), it permits the guide display 1301 to be superimposedly shown on the picked-up image shown on the viewfinder 1110.

Consequently, even with a horizontally long picked-up image that is likely to be significantly affected by the inclination of the camera, it is possible to urge the user to make the inclination of the camera unnoticeable. This avoids making the image unsightly.

Embodiment 6

Next, a digital camera that is Embodiment 6 will be described. Embodiment 5 described above enables switching to the horizontally long aspect ratio. Embodiment 6 of the present invention has an image pickup mode in which a plurality of still images that form an angle of view extending in the horizontal direction can be picked up. This image pickup mode enables what is called stitch image pickup by which synthesizing image processing is executed on the images to obtain a single horizontally joined still image. A guide display is provided for the stitch image pickup.

Figure 16:
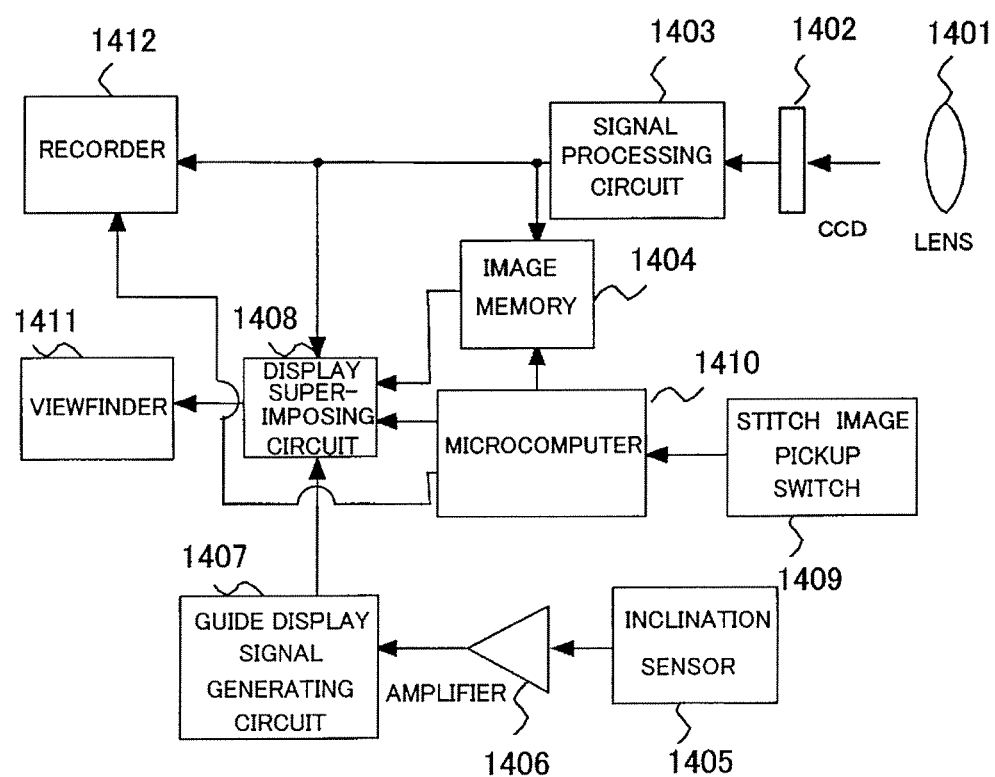
FIG. 16 is a block diagram showing the configuration of a circuit in a digital camera that is Embodiment 6 of the present invention.

FIG. 16 is a block diagram showing the configuration of a circuit in the digital camera that is Embodiment 6 of the present invention. In FIG. 16, reference numeral 1401 denotes a lens unit used to pick up an image of an object. Reference numeral 1402 denotes a CCD that photoelectrically converts an image of the object formed by the lens unit 401. Reference numeral 1403 denotes a signal processing circuit that uses a built-in A/D converter to convert the analog picked-up image of the object obtained by the CCD 1402 into a digital signal. The signal processing circuit 1403 then executes predetermined signal processing such as gamma correction and white balancing on the digital signal to generate a still image signal. Reference numeral 1404 denotes an image memory that stores the picked-up still image signal.

Reference numeral 1405 denotes an inclination sensor that detects information on the inclination of the video camera; in Embodiment 6, an acceleration sensor is used for the inclination sensor. Reference numeral 1406 denotes an amplifier that amplifies an output from the inclination sensor 1405. Reference numeral 1407 denotes a guide display signal generating circuit that generates a guide display signal (inclination guide display signal) in accordance with the inclination information. Reference numeral 1408 denotes a display superimposing circuit that synthesizes the still image signal obtained by the signal processing circuit 1403 with the guide display signal obtained by the guide display signal generating circuit 1407 and the still image stored in the image memory 1404. Reference numeral 1409 denotes a stitch image pickup switch operated by the user in accordance with situations to switch between a normal image pickup mode and the stitch image pickup mode.

Reference numeral 1410 denotes a microcomputer that controls storing and reading operations performed on the image memory and also controls the display superimposing circuit 1408. Reference numeral 1411 denotes a viewfinder that can display an image produced by superimposing the guide display signal and the still image being stored in the image memory 1404 on the still image signal. Reference numeral 1412 denotes a recorder that records the still image signal processed by the signal processing circuit 1403.

In the above configuration, an image of the object picked up via the lens unit 1401 is formed on the CCD 1402, which then photoelectrically converts the image of the object into a signal. The signal processing circuit 1403 subsequently converts the signal into a digital signal. The signal is then subjected to predetermined signal processing such as gamma correction and white balancing to become a still image signal. The still image signal is output to the recorder 1412, which records the signal as a still image. The still image signal is also output to the image memory 1404 and display superimposing circuit 1408.

On the other hand, the amplifier 1406 subjects the inclination information obtained by the inclination sensor 1405 to a predetermined magnitude of amplification. The guide display signal generating circuit 1407 then generates the guide display signal corresponding to the inclination information. Then, the display superimposing circuit 1408 synthesizes the guide display signal with the still image signal to superimposedly display these signals on the viewfinder 1411.

Next, switching for stitch image pickup will be described. Switching to the stitch image pickup via the stitch image pickup switch 1409 causes the microcomputer 1410 to control the image memory 1404 to store therein the same picked-up image that is recorded in the recorder 1412. Moreover, part of the stored image is superimposedly displayed in the right or left of the screen so as to serve as a stitch guide for setting of the angle of view for the next image pickup.

Furthermore, in conjunction with switching via the stitch image pickup switch 1409, the microcomputer 1109 outputs a display superimposition control signal to the display superimposing circuit 1408. The display superimposing circuit 1408 permits or prohibits the synthesis of the guide display signal input by the guide display signal generating circuit 1407 with the still image signal obtained by the signal processing circuit 1403, in accordance with the display superimposition control signal. Specifically, if the mode is switched to the stitch image pickup mode via the stitch image pickup switch 1409, the synthesis of the guide display signal with the still image signal is permitted. In contrast, if the image pickup mode is switched to the normal image pickup mode, the synthesis of the guide display signal with the still image signal is prohibited.

Figure 17:
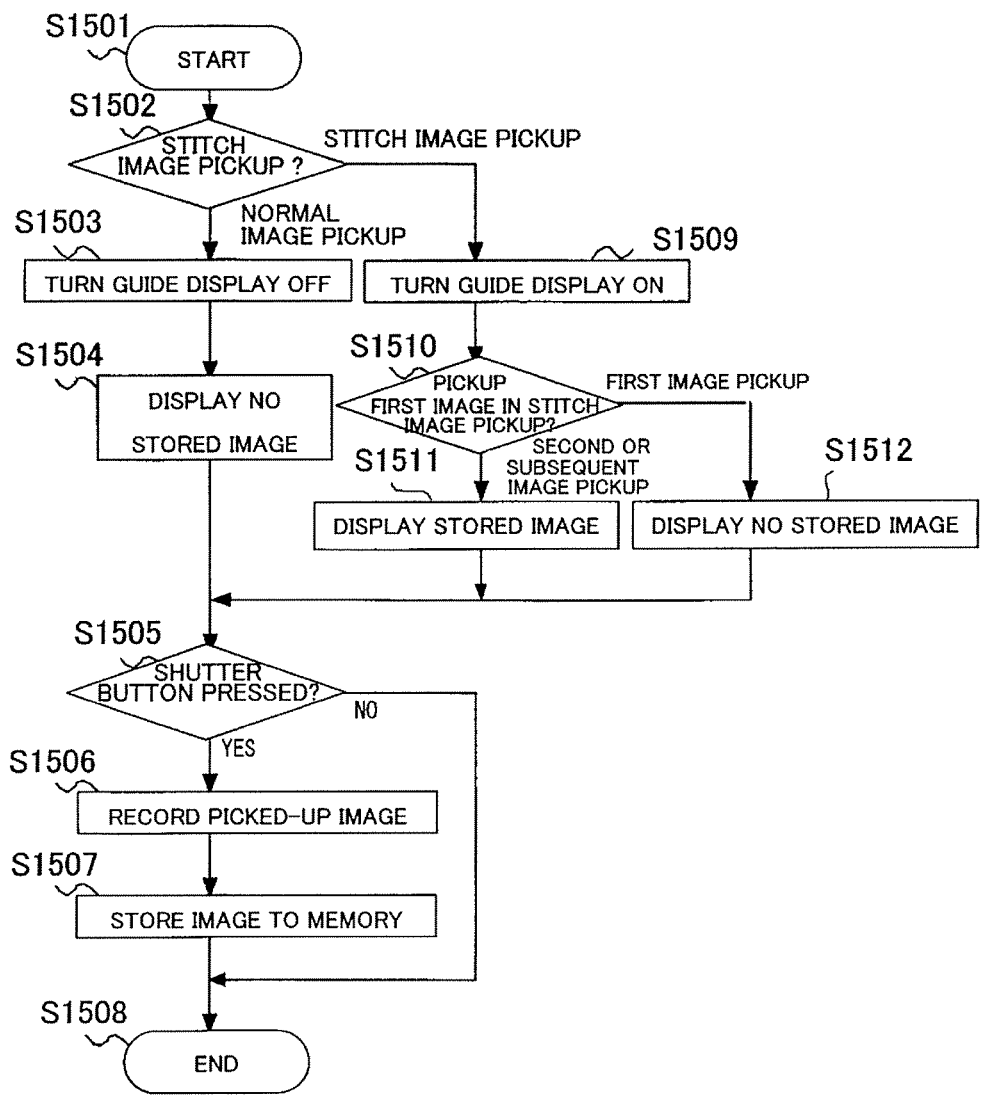
FIG. 17 is a flowchart showing the operation for a stitch guide display and a guide display performed by a digital camera that is Embodiment 5 of the present invention.

Next, processing executed by the microcomputer 1410 will be described with reference to FIG. 17. FIG. 17 is a flowchart showing the operation for the stitch guide display and the guide display which are performed in the microcomputer 1410.

The flowchart is repeatedly implemented at a predetermined period. The operation is started at step S1501, and in step S1502, the process checks whether the mode has been switched via the stitch image pickup switch 1409 to the normal image pickup mode or the stitch image pickup mode. As a result, if the mode has been switched to the normal image pickup mode, the process proceeds to step S1503. If the mode has been switched to the stitch image pickup mode, the process proceeds to step S1509.

First, description will be given of the case where the mode has been switched to the normal image pickup mode. In this case, the process proceeds from step S1502 to step S1503 to prohibit the display superimposing circuit 408 from performing a superimposing operation to prohibit the output of the guide display. This enables an image signal with no guide display superimposed thereon to be output to the viewfinder 1411, which thus displays only the picked-up image. In next step S1504, the display superimposing circuit 1408 is prohibited from performing the superimposing operation to prohibit the image stored in the image memory 1404 from being shown as the stitch guide display. This precludes an image of the stitch guide display from being displayed on the viewfinder 1411. In next step S1505, the process determines whether or not a shutter button (not shown) has been pressed. If the shutter button has not been pressed, the process proceeds to step S1508 to end the flow. If the shutter button has been pressed, the process proceeds to step S506 to, in this case, record the picked-up image in the recorder 1412. In next step S1507, the picked-up image is stored in the image memory 1404. In subsequent step S1508, the flow is ended.

Further, if the process determines in step S1502 that the mode has been switched to the stitch image pickup mode, it proceeds to step S1509, where the display superimposing circuit 1408 performs the superimposing operation in order to permit the output of the guide display. This enables an image with the guide display superimposed thereon to be output to the viewfinder 1411, which thus shows the guide display superimposed on the picked-up image. In next step S1510, the process determines whether or not this image pickup is the first one after switching to the stitch image pickup mode. If it is the first image pickup, the process proceeds to step S1512 to prohibit the display superimposing circuit 1408 from performing the superimposing operation in order to prohibit the image stored in the image memory 1404 from being shown as the stitch guide display. This enables an image signal with which no stitch guide display signal is synthesized to be output to the viewfinder 1411, which thus display only the first picked-up image.

Further, for the second or subsequent image pickup, the process proceeds from step S1510 to step S1511 to permit the display superimposing circuit 1408 to perform the superimposing operation in order to display the image stored in the image memory 1404 to the right or left of the previous picked-up image, as the stitch guide display. This enables an image for the stitch guide display to be output to the viewfinder 1411, which thus provides the stitch guide display.

Accordingly, if the image pickup mode is switched from the normal image pickup mode to the stitch image pickup mode via the stitch image pickup switch 1409, the guide display superimposed on the picked-up image is shown on the viewfinder 1411 to enable the digital camera to be held horizontal. Then, after the first stitch image is picked-up, part of the last picked-up image is displayed at an end of the viewfinder 1411; the partial image constitutes the stitch guide display for continuous image pickup.

Next, a flow of stitch image pickup will be described with reference to FIGS. 18A to 18C, using a superimposed image.

Figure 18A:
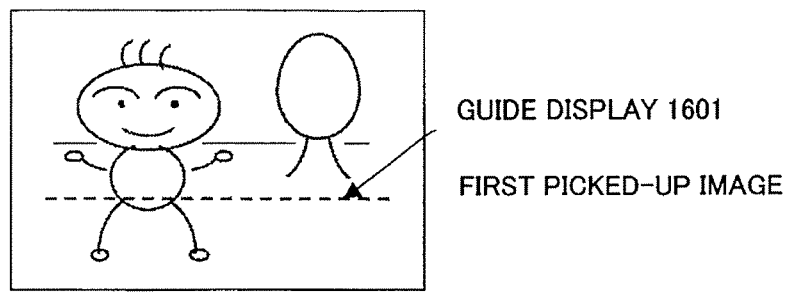
FIGS. 18A to 18C are diagrams illustrating an example of display that is Embodiment 6 of the present invention.

FIG. 18A is a diagram showing an image to be displayed on the viewfinder 1411 when the first stitch image is picked up. As described above, the guide display 1601 is superimposed on the first picked-up image. When performing still image pickup, the picked-up image of a composition shown in FIG. 18A is stored in the image memory 1404. Subsequently, in order to enable image pickup of the next still image consecutively, an image obtained by translating rightward part of the image stored in the image memory 1404 is read. The read image constitutes the stitch guide display as shown in FIG. 18B.

Figure 18B:
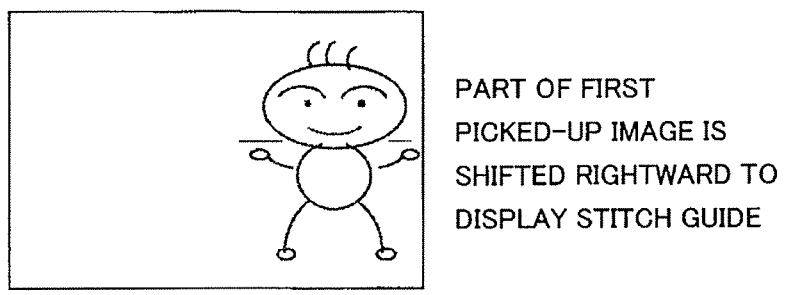
Figure 18C:
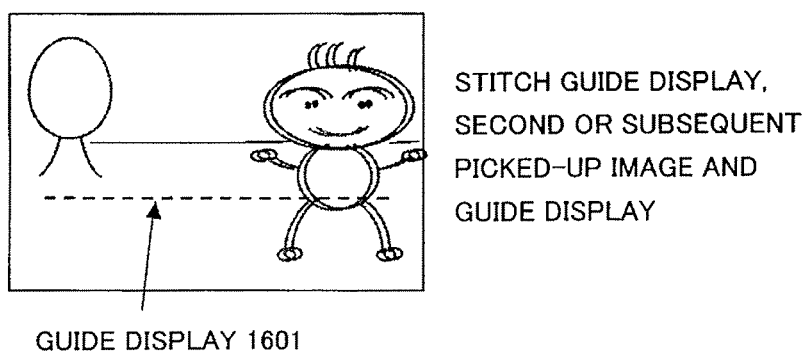

Then, in the state shown in FIG. 18B, the second picked-up image and the guide display that is superimposed thereon are shown on the viewfinder 1411 to provide a viewfinder image shown in FIG. 18C. Also for the third and subsequent picked-up images, by using the displayed image shown in FIG. 18C as a guide, the stitch guide display and the guide display 1601 are superimposedly shown on the viewfinder 1411 for enabling the camera to be held horizontal. This enables the generation of a plurality of picked-up images consecutively arranged leftward. The images are processed into a single horizontally long picked-up image. In this example, image pickup is repeated leftward. However, image pickup may be continuously performed in the opposite direction.

The step of processing the picked-up images into a single horizontally long image can be achieved by joining overlapping portions of the picked-up images together. However, the step is not directly related to the present invention, and its description is thus omitted.

According to Embodiment 6, even with a horizontally long picked-up image that is likely to be significantly affected by the inclination of the camera, it is possible to urge the user to make the inclination of the camera unnoticeable. This avoids making the image unsightly.

In the example described above in Embodiment 6, the present invention is applied to a digital camera. However, the present invention is not limited thereto but is applicable to an image pickup apparatus such as a video camera having a function of picking up still images.

Embodiment 7

Figure 19:
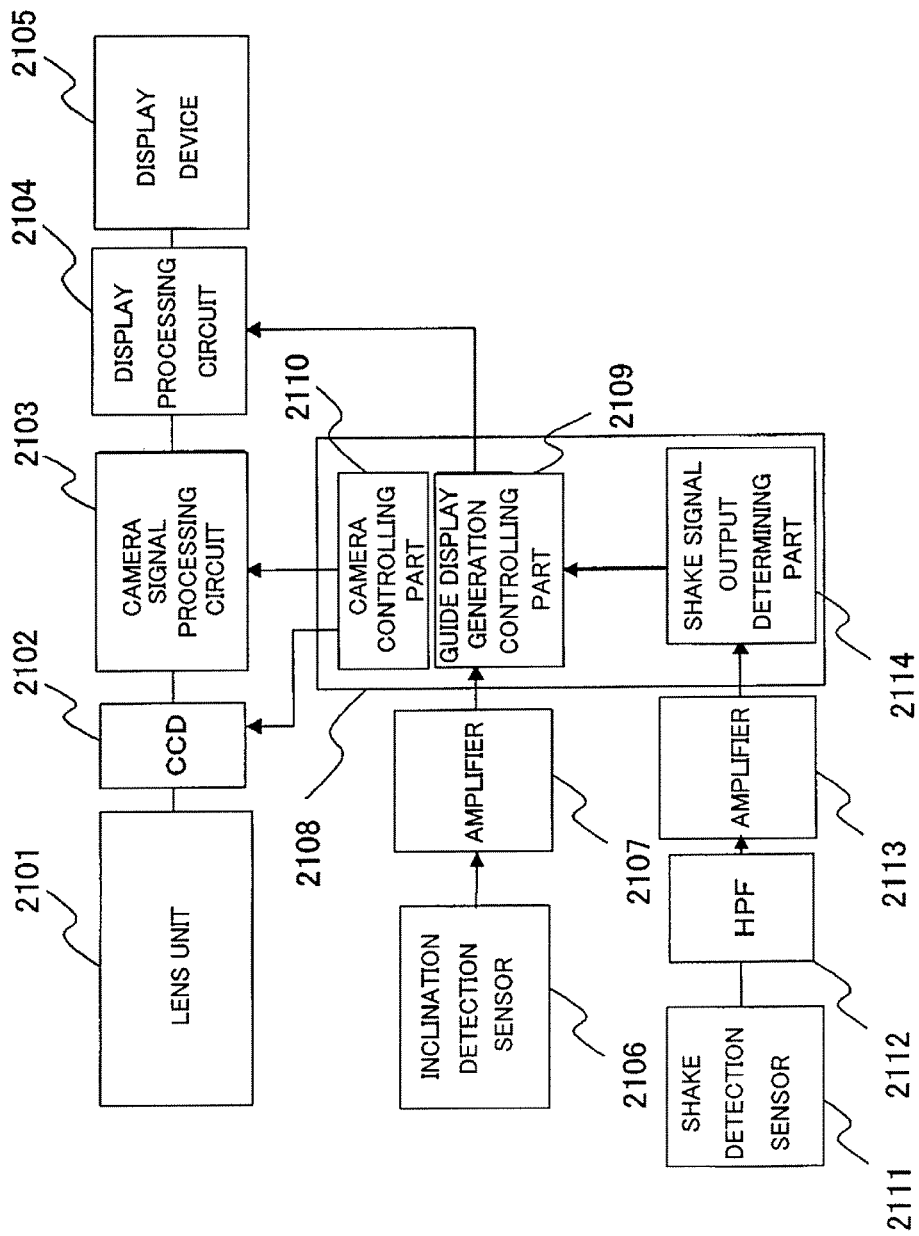
FIG. 19 is a block diagram showing the configuration of a circuit in an image pickup apparatus that is Embodiment 7 of the present invention.

FIG. 19 is a block diagram showing the configuration of a circuit in a video camera that is Embodiment 7 of the present invention. In FIG. 19, reference numeral 2101 denotes a lens unit used to pick up an image of an object. Reference numeral 2102 denotes a CCD (Charge Coupled Device), which photoelectrically converts an image of the object formed by the lens unit 2101 into an analog picked-up image signal. Reference numeral 2103 denotes a signal processing circuit that uses a built-in A/D converter to convert the analog picked-up image into a digital signal. The signal processing circuit 2103 then executes predetermined signal processing such as gamma correction and white balancing on the digital signal to generate a final standardized video signal.

Reference numeral 2106 denotes an inclination detection sensor that detects the inclination of the video camera (main body); in Embodiment 7, an acceleration sensor is used for the inclination detection sensor. Reference numeral 2107 denotes an amplifier that amplifies an output from the inclination detection sensor 2106. Reference numeral 2108 denotes a camera microcomputer (hereinafter referred to as a microcomputer) internally having a guide display generation controlling part 2109, a camera controlling part 2110, and a shake signal output determining part 2114. The camera controlling part 2110 controls the drive of the CCD 2102 and the camera signal processing circuit 2103. The guide display generation controlling part 2109 loads an output from the amplifier 2107 to generate a guide display signal corresponding to a detected inclination signal, that is, the current inclination of the video camera. In this case, if a control signal from the shake signal output determining part 2114, described below, has been input to the guide display generation controlling part 2109, the signal instructing the guide display generation controlling part 2109 to output a guide display signal to a display processing circuit 2104 described below, then the guide display generation controlling part 2109 outputs the guide display signal to the display processing circuit 2104.

Reference numeral 2104 denotes the display processing circuit that outputs an image signal from the camera signal processing circuit 2103, and that superimposes the guide display signal from the guide display generation controlling part 2109 on the image signal to output the resulting signal to a display device 2105 such as a viewfinder or a liquid crystal panel. The display device 2105 thus displays only the picked-up image or superimposedly shows the picked-up image and guide display.

Reference numeral 2111 denotes a shake detection sensor such as an angular velocity sensor, which detects shake of the video camera. Reference numeral 2112 denotes a high pass filter (hereinafter referred to as an HPF) that removes a DC component from an output from the shake detection sensor 2111. Reference numeral 2113 denotes an amplifier that amplifies an output from the HPF 2112. An output from the amplifier 2113 is input to the microcomputer 2108. Reference numeral 2114 denotes the shake signal output determining part provided in the microcomputer 2108. The shake signal output determining part 2114 compares the frequency of the output from the amplifier 2113 with a predetermined threshold to determine whether or not the frequency has continuously exceeded the predetermined threshold for a predetermined time. The shake signal output determining part 2114 then outputs, to the guide display generation controlling part 2109, the control signal based on the determination, that is, the control signal indicating whether or not to output the guide display signal to the display processing circuit 2104.

Next, description will be given of specific operations performed by the video camera configured as described above.

Entering light having passed through the lens unit 2101 is formed into an optical image on the CCD 2102, which then photoelectrically converts the image. The camera signal processing circuit 2103 A/D-converts an output from the CCD 2102 and then executes predetermined signal processing such as gamma correction and white balancing on the converted signal. The camera signal processing circuit 2103 thus outputs a standardized image (video) signal. The CCD 2102 and the camera signal processing circuit 2103 operate based on control signals from the camera controlling part 2110 in the microcomputer 2108. The image signal from the camera signal processing circuit 2103 is supplied to the display device 2105 via the display processing circuit 2104 and is then monitored as a picked-up image. Processing executed by the display processing circuit 2104 will be described below in detail.

Next, description will be given of detection of the inclination of the video camera and generation of the guide display signal.

The inclination detection sensor 2106 outputs a signal corresponding to the inclination of the video camera. An output from the inclination detection sensor 2106 is amplified by a predetermined magnitude by the amplifier 2107 and then input to the microcomputer 2108 as an inclination signal. The inclination signal input to the microcomputer 2108 is processed by the guide display generation controlling part 2109 to generate the guide display signal corresponding to the inclination of the video camera. The shake signal output determining part 2114, described below, determines whether or not the guide display generation controlling part 2109 is to output the guide display signal to the display processing circuit 2104. If the guide display signal is output to the display processing circuit 2104, it is supplied to the display device 2105 via the display processing circuit 2104 for monitoring.

FIGS. 20A to 20D shows the relationship between the inclination of the video camera and the inclination signal detected by the inclination detection sensor 2106. In FIG. 20, reference numerals 2100, 2105, and 2106 denote the video camera, the display device such as a liquid crystal panel, and the inclination detection sensor (acceleration sensor).

FIG. 20B shows a state in which the video camera is set for normal image pickup (at a regular position). FIG. 20A shows that the video camera shown in FIG. 20B has been inclined counterclockwise by 90°. Further, FIG. 20A shows that the video camera shown in FIG. 20B has been inclined clockwise by 90°.

FIG. 20D shows the characteristics of a detection output (sensor output) from the inclination detection sensor 2106, provided in the video camera 2100 shown in FIGS. 20A to 20C. In FIG. 20D, the vertical axis indicates the sensor output, and the horizontal axis indicates the inclination of the video camera 2100. A line 2201 indicates the variation in output from the inclination detection sensor 2106 based on the inclination of the video camera 2100. The illustrated output range can be obtained by appropriately setting the gain of the amplifier 2107, which amplifies the output from the inclination detection sensor 2106, shown in FIG. 19.

In FIG. 20D, (b') denotes an output from the inclination detection sensor 2106 obtained when the video camera 2100 is at the regular position; the output is equal to half of the power supply voltage Vcc. In contrast, inclining the video camera 2100 counterclockwise by 90° as shown in FIG. 22A provides an output from the inclination detection sensor 2106 equal to the power supply voltage, that is, provides the output to the value shown at (a'). Conversely, inclining the video camera 2100 clockwise by 90° as shown in FIG. 22C provides an output from the inclination detection sensor 2106 equal to a Gnd level (c'). With the inclination between (a') and (b') or between (b') and (c'), the output from the inclination detection sensor 2106 changes linearly with the inclination and offers a characteristic shown by the line 2201. Reversing the direction in which the inclination detection sensor 2106 is mounted reverses the output characteristic of the inclination detection sensor 2106 to that shown in FIG. 20D. The guide display signal is generated on the basis of this characteristic.

Next, processing executed by the display processing circuit 2104 will be described. The display processing circuit 2104 has a function of superimposing the guide display signal from the guide display generation controlling part 2109 in the microcomputer 2108 on the image signal from the camera signal processing circuit 2103. That is, in this case, the display processing circuit 2104 functions as a signal adder. Consequently, the picked-up image and guide display can be superimposedly shown on the same display device 2105 via the display processing circuit 2104.

Figure 21:
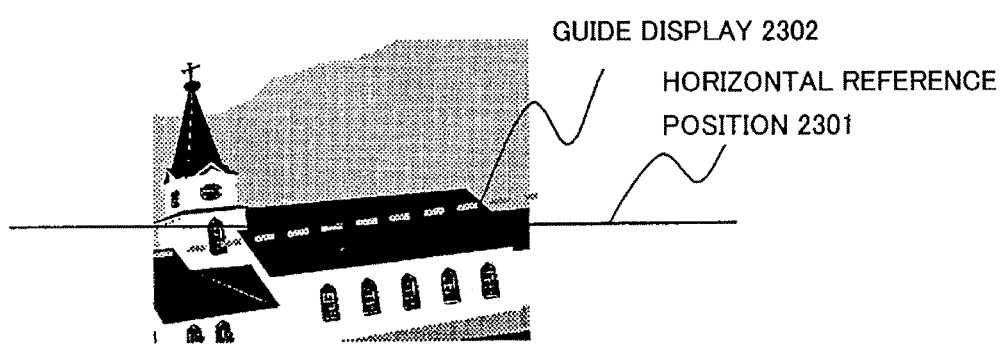
FIG. 21 is a diagram showing a picked-up image superimposed on a display device in FIG. 19 and a guide display.

The display state on the display device 2105 will be described with reference to FIG. 21. FIG. 21 is a diagram showing the guide display superimposedly shown on the picked-up image on the display device 2105 constituted by a liquid crystal panel, a viewfinder, or the like. In the figure, reference numeral 2301 denotes a horizontal reference position for the video camera, which is actually not displayed. Reference numeral 2302 denotes the guide display generated by the guide display generation controlling part 2109.

As shown in FIG. 21, superimposedly showing the guide display 2302 inclined to the horizontal reference position 2301 for the video camera makes it possible to urge the user to correct the inclination. The horizontal reference position 2301 corresponds to the sensor output obtained when the video camera is at the regular position as shown in FIG. 20B. In Embodiment 7, the horizontal reference position 2301 is not displayed on the display device 2105 but may of course be displayed. When the horizontal reference position 2301 is displayed, it may have the same shape (a solid line, a dashed line, or the like) and the same color as those of the guide display 2302 or a shape and a color different from those of the guide display 2302.

Next, description will be given of a shake component applied to the video camera 2100.

The HPF 2112 removes a DC component from a shake signal output by the shake detection sensor 2111 such as an angular velocity sensor, the shake signal corresponding to shake of the video camera 2100. Subsequently, the amplifier 2113 amplifies the shake signal and inputs the amplified signal to the microcomputer 2108. The shake signal output determining part 2114 determines the state of the shake signal input to the microcomputer 2108. Specifically, the shake signal output determining part 2114 calculates the frequency of the input shake signal per unit time to determine whether or not at least a predetermined frequency value has been continuously detected for a predetermined time. The detected frequency of at least the predetermined value has only to be equal to or greater than the frequency component of hand jiggling (for example, 5 [Hz]).

Next, the calculation of the frequency will be described. The frequency is calculated by counting the number of increase and decrease turnarounds of the shake signal per unit time. For example, two turnarounds during one period per unit time correspond to 1 [Hz], that is, the frequency is equal to half of the number of turnarounds. Consequently, for 10 turnarounds, "10/2=5", that is, a frequency of 5 [Hz] is calculated.

FIGS. 22A and 22B schematically show the shake signals obtained when the video camera 2100 is held by a user's hand and when it is fixed to a tripod or the like. In FIG. 22A and FIG. 22B, the vertical axis indicates the output of a hand jigging signal. The horizontal axis indicates time.

In FIG. 22A, reference numeral 2401 denotes a shake signal obtained when the video camera 2100 is held by the user's hand. Increase and decrease turnarounds in the output variation of the shake signal are continuous, so that the frequency of hand jiggling is detectable. In contrast, in FIG. 22B, reference numeral 2401' denotes a shake signal obtained when the video camera is fixed to a tripod or the like. The shake signal has a very small output variation and discontinuous increase and decrease turnarounds, so that it is difficult to detect the frequency corresponding to hand jiggling.

On the basis of the difference in shake signal, the shake signal determining part 2114 determines whether the video camera 2100 is held by the user's hand or fixed.

On the basis of the determination, the shake signal determining part 2114 supplies the guide display generation controlling part 2109 with a binary (Lo, Hi) control signal indicating whether or not to output the guide display signal to the display processing circuit 2104. Specifically, if the frequency of the shake signal is equal to or greater than a predetermined value and the signal has been continuously input for a predetermined time, the video camera is determined to be held by the user's hand. Thus, the Lo control signal is output to the guide display generation controlling part 2109 to prevent the guide display signal from being output to the display processing circuit 2104. Therefore, for hand-held image pickup, the guide display on the display device 2105 is prohibited.

On the other hand, if the frequency of the shake signal is not equal to or greater than the predetermined value and this state is continuous for the predetermined time, the video camera is determined to be fixed to a tripod or the like. Thus, to enable the display processing circuit 2104 to output the guide display signal, the Hi control signal is output to the guide display generation controlling part 2109. Therefore, for image pickup with the video camera fixed to a tripod or the like, the guide display is permitted. The logic of the control signal may be reversed without any problem.

Figure 23:
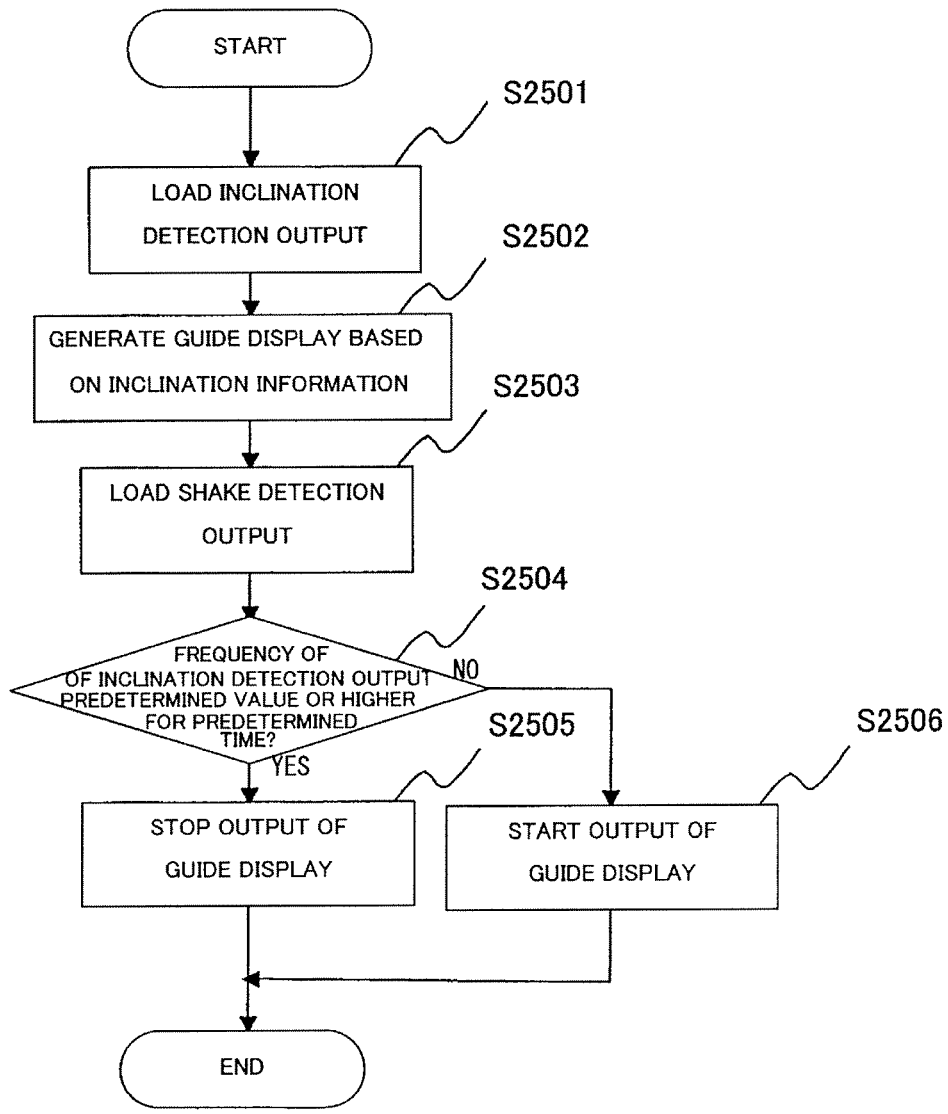
FIG. 23 is a flowchart showing an inclination guide display operation that is Embodiment 7 of the present invention.

FIG. 23 is a flowchart showing the operation performed in the microcomputer 2108 for the guide display.

In step S2501, the detection output (sensor output) from the inclination detection sensor 2106 is loaded. Then, in next step S2502, the guide display signal is generated which corresponds to the inclination detection output loaded in step S2501. In subsequent step S2503, a detection output for shake of the video camera 2100 is loaded from the shake detection sensor 2111. Then, in next step S2504, the process determines whether or not the frequency of the shake detection output loaded in step S2503 is equal to or greater than a predetermined frequency and this has continued for a predetermined time. If the frequency is equal to or greater than the predetermined frequency and this has continued for the predetermined time, it can be determined that the video camera 2100 is held by the user's hand during image pickup. The process thus proceeds to step S2505.

In step S2505, the output of the guide display signal generated in step S2502 to the display processing circuit 2104 is stopped, and then the process ends. Accordingly, if the video camera 2100 is held by the user's hand during image pickup, the display device 2105 is prohibited from showing the guide display 2302.

Further, if the process determines in step S2504 that the frequency is not equal to or greater than the predetermined value and this state has continued for the predetermined time or longer, the process can determine that the video camera 2100 is fixed to a tripod or the like, and thus proceeds to step S2506. In step S2506, the output of the guide display signal generated in step S2502 to the display processing circuit 2104 is started, and then the process ends. Accordingly, if the video camera 2100 is fixed to a tripod or the like, the display device 2105 is permitted to show the guide display.

Embodiment 7, as described above, determines that the video camera 2100 is held by the user's hand during image pickup if the shake of the video camera 2100 is detected and if the frequency of the corresponding shake detection signal is equal to or greater than the predetermined frequency and this has continued for the predetermined time. In this case, the display device 2105 is prohibited from providing the guide display 2302. This prevents user's inappropriate framing owing to his or her excessive consciousness of inclination of the video camera 2100. It is also possible to reduce disturbances to image pickup, for example, a constant movement of the guide display 2302 on the display device 2105, which makes the user feel that the monitored image is cumbersome.

On the other hand, if the shake of the video camera 2100 is detected and if the frequency of the detection signal for the shake is not equal to or greater than the predetermined value and the shake has continued for the predetermined time or longer, it is determined that the image pickup is done using a tripod. In this case, the display device 2105 is permitted to show the guide display 2302. This enables the user to adjustably correct the inclination of the digital camera 2100 more accurately on the basis of the guide display 2302.

Embodiment 7, as described above, determines that the video camera is held by the user's hand to prohibit the guide display if the frequency of the detection output from the shake detection sensor is equal to or greater than the predetermined value and if this has continued for the predetermined time. Further, Embodiment 7 determines that the video camera is fixed to a tripod to permit the guide display if the frequency of the detection output from the shake detection sensor is not equal to or greater than the predetermined value and if this has continued for the predetermined time. However, the present invention is not limited thereto but may depend on the amplitude of the detection output from the shake detection sensor 2111. That is, if the amplitude is equal to or greater than a predetermined value and this has consecutively been occurred a predetermined number of times, the guide display is prohibited. If the amplitude is not equal to or greater than the predetermined value and this has consecutively been occurred the predetermined number of times, the guide display is permitted.

The shake detection sensor in Embodiment 7 also serves to correct the shake of the video camera and need not be specifically provided in the video camera.

Embodiment 8

Figure 24:
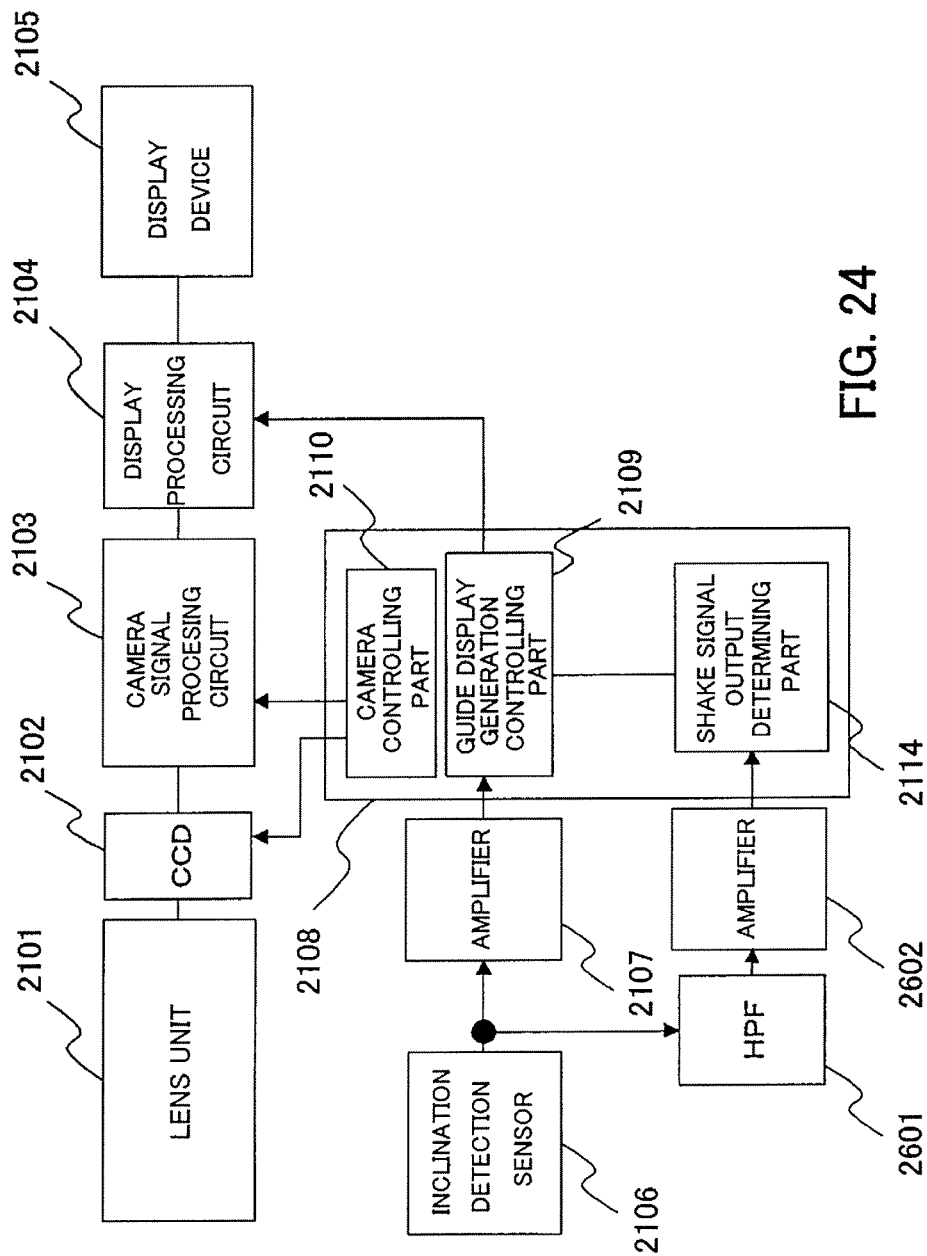
FIG. 24 is a block diagram showing the configuration of a circuit in an image pickup apparatus that is Embodiment 8 of the present invention.

FIG. 24 is a block diagram showing the circuit configuration of an image pickup apparatus that is Embodiment 8 of the present invention. Components similar to those of Embodiment 7, described above, are denoted by the same reference numerals and will not be described. The description of operations similar to those of Embodiment 7 is also omitted.

In FIG. 24, reference numeral 2601 denotes a high pass filter (HPF) that removes a DC component from the output from the inclination detection sensor 2106. Reference numeral 2602 denotes an amplifier that amplifies an output from the HPF 2601. The circuit in FIG. 24 corresponds to the configuration shown in FIG. 19 additionally provided with a path along which the output from the inclination detection sensor 2106 has its band limited by the HPF 2601 and is amplified by the amplifier 2602.

Embodiment 7 controls whether or not to output the guide display signal generated from the inclination signal on the basis of the output state of the shake signal corresponding to the shake of the video camera. Specifically, if the process determines that the camera is held by the user's hand during image pickup, on the basis of the detection output from the shake detection sensor 2111, no guide display signal is output to prohibit the display device 2105 from superimposedly showing the guide display on the picked-up image. Further, if the process determines that the camera is fixed to a tripod or the like during image pickup, on the basis of the detection output from the shake detection sensor 2111, the guide display signal is output to permit the display device 2105 to superimposedly show the guide display on the picked-up image.

In contrast, in Embodiment 8, the shake signal output determining part 2114 determines whether or not to output the guide display signal generated from the detection output from the inclination detection sensor 2106, on the basis of the state of an output signal obtained by limiting the band of the detection output from the inclination detection sensor 2106. Then, the guide display generation controlling part 2109 outputs a control signal based on the determination to the display processing circuit 2104. Thus, as is the case with Embodiment 7, for hand-held image pickup, the display device is prohibited from superimposedly showing the guide display on the picked-up image. For image pickup with the camera fixed to a tripod or the like, the display device is permitted to superimposedly show the guide display on the picked-up image.

Next, specific operations of the above configuration will be described. The output from the inclination detection sensor 2106 is supplied to the amplifier 2107. At the same time, the output from the inclination detection sensor 2106 is also supplied to the HPF 2601, and a DC component is then removed from the output from the inclination detection sensor 2106. The resulting output is amplified by the amplifier 2602 by a predetermined amount and then input to the microcomputer 2108 as a shake variation signal. Since the shake variation signal input to the microcomputer 2108 is a high frequency component of the output from the inclination detection sensor 2106, it can be considered to be a shake variation signal for the video camera, that is, the shake signal in Embodiment 7.

Figure 25A:
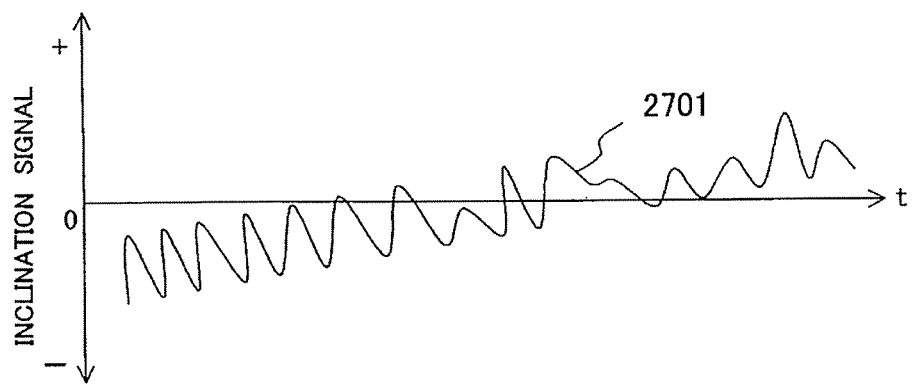
FIGS. 25A to 25C are diagrams showing an inclination detection sensor in FIG. 24 and its output characteristics.
Figure 25B:
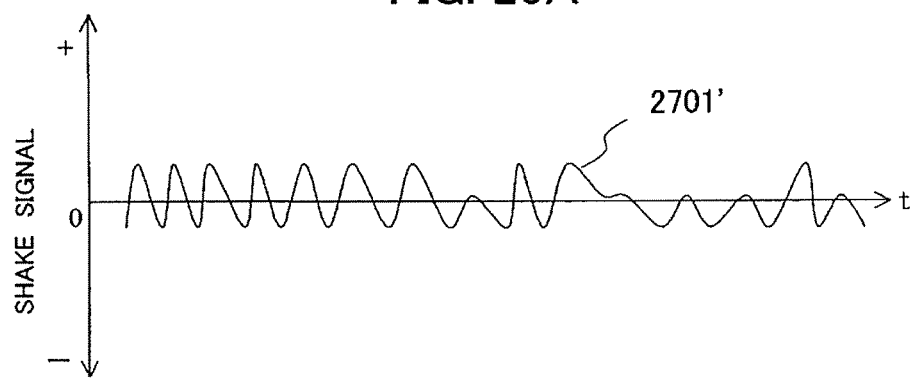
Figure 25C:
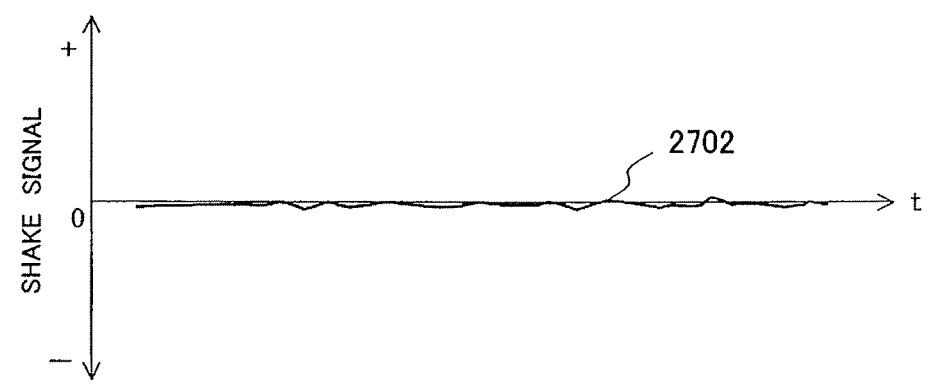

With reference to FIGS. 25A to 25C, explanation will be given of why the shake variation signal can be used as the shake signal.

In FIGS. 25A to 25*c*, the vertical axis indicates sensor output, and the horizontal axis indicates time. FIG. 25A shows a detection output (shake signal) 2701 from the inclination detection sensor 2106. The detection signal is a mixture of a low frequency signal and a high frequency signal, and the low frequency signal is used to generate the guide display. FIG. 25B shows a shake variation signal 2701' corresponding to the detection output 2701 from the inclination detection sensor 2106 having passed through the HPF 2601. The shake variation signal 2701' indicates that shake of the video camera is occurring and can thus be used as the shake signal by amplifying it by the amplifier 2602 by a predetermined amount. Further, FIG. 25C shows a shake variation signal 2702 obtained when the video camera is fixed. FIG. 25C shows almost no variation is output, indicating that shake of the video camera is not occurring.

As is apparent from FIGS. 25A to 25C, using the shake variation signal as the shake signal enables the control signal from the shake signal output determining part 2114 to be output to the guide display generation controlling part 2109 on the basis of the frequency of the predetermined value detected from the shake signal as well as the time for which the frequency is continuously detected, as is the case with Embodiment 7. This makes it possible to achieve operations for prohibiting and permitting the guide display.

Figure 26:
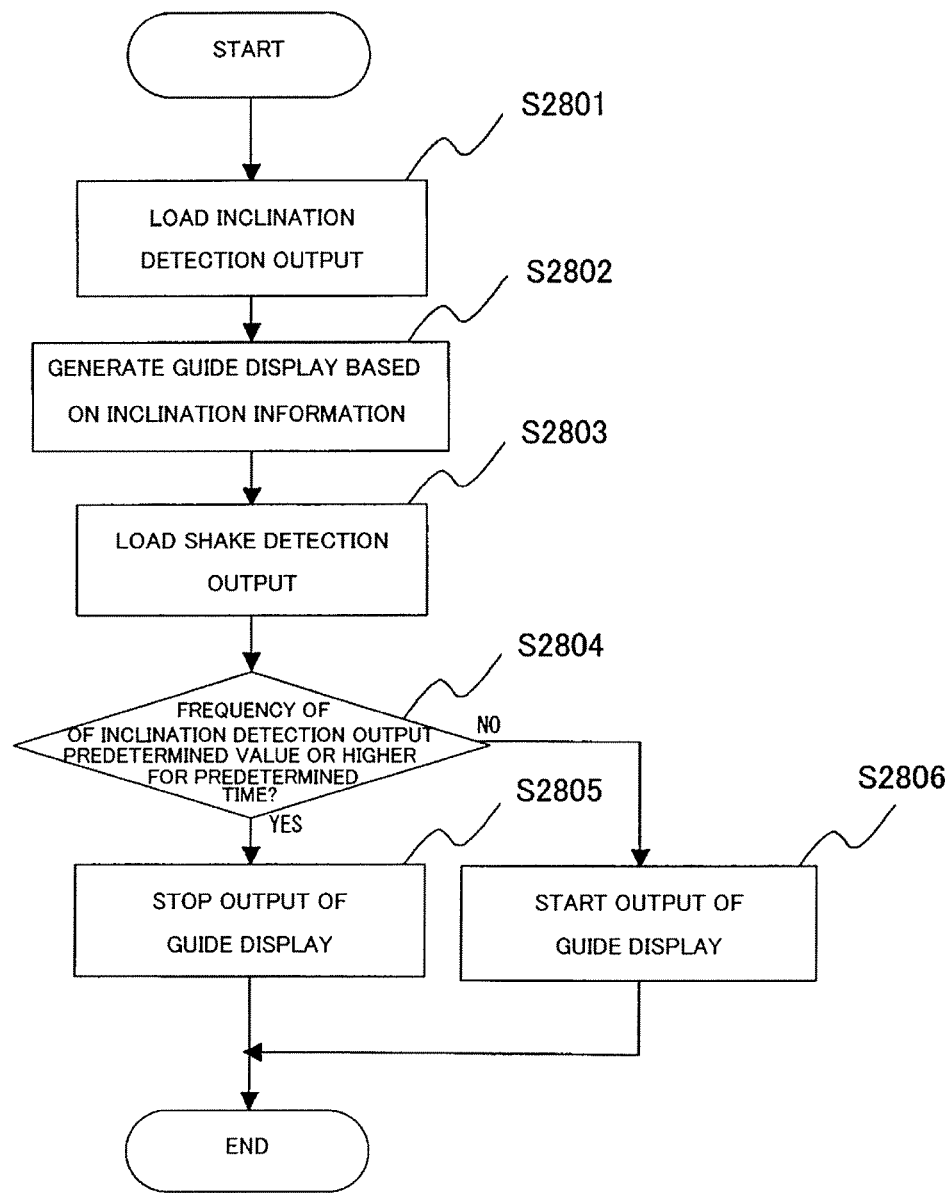
FIG. 26 is a flowchart showing an inclination guide display operation that is Embodiment 8 of the present invention.

Next, with reference to the flowchart in FIG. 26, description will be given of the operation performed by the microcomputer 2108 for the guide display.

First, in step S2801, the detection output from the inclination detection sensor 2106 is loaded. Then, in next step S2802, the guide display corresponding to the inclination detection output loaded in step S2801 is generated. In subsequent step S2803, the detection output from the inclination detection sensor 2106, which corresponds to the shake of the video camera, is passed through the HPF 2601. The detection output is then amplified by the predetermined value by the amplifier 2602 and loaded as a high frequency inclination signal.

In next step S2804, the process determines whether or not the frequency of the shake detection output loaded in step S2803 is equal to or greater than a predetermined value and this has continued for a predetermined time. If the frequency is equal to or greater than the predetermined value and this has continued for the predetermined time, the process determines that the video camera is held by the user's hand during image pickup and thus proceeds to step S2805. In step S2805, the output of the guide display generated in step S2802 is stopped, and then the process ends. Accordingly, when the video camera is held by the user's hand during image pickup, the display device 2105 is prohibited from providing the guide display.

Further, if the process determines in step S2804 that the frequency is not equal to or greater than the predetermined value and this has continued for the predetermined time, the process determines that the video camera is fixed to a tripod or the like and thus proceeds to step S2806. In step S2806, the output of the guide display generated in step S2802 is started, and then the process ends. Accordingly, when the video camera is fixed to a tripod or the like, the display device 2105 is permitted to provide the guide display.

Embodiment 8 determines that the video camera is held by the user's hand during image pickup if the frequency of the shake signal corresponding to the detected shake of the video camera is equal to or greater than the predetermined frequency and this has continued for the predetermined time. Then, the display device 2105 is prohibited from providing the guide display. This prevents user's inappropriate framing owing to his or her excessive consciousness of inclination of the video camera 2100. It is also possible to reduce disturbances to image pickup, for example, a constant movement of the guide display 2302 on the display device 2105, which makes the user feel that the monitored image is cumbersome.

On the other hand, if the frequency of the shake signal corresponding to the detected shake of the video camera is not equal to or greater than the predetermined value and if this has continued for the predetermined time, it is determined that the image pickup is done using a tripod. Then, the display device 2105 is permitted to show the guide display. This enables the user to correct the inclination of the digital camera more accurately on the basis of the guide display.

Embodiment 8 determines that the video camera is held by the user's hand if the frequency of the detection output from the inclination detection sensor 2106 having its band limited is equal to or greater than the predetermined value and this has continued for the predetermined time. In this case, the guide display is prohibited from being provided. Further, Embodiment 8 determines that the video camera is fixed to a tripod if the frequency of the detection output from the inclination detection sensor having its band limited is not equal to or greater than the predetermined value and this has continued for the predetermined time. Then, the guide display is permitted to be provided.

However, the present invention is not limited to this but may depend on the amplitude of the shake variation signal of the detection output from the inclination detection sensor 2106 having its band limited to prohibit and permit the guide display. That is, if the amplitude of the shake variation signal is equal to or greater than a predetermined value and this has consecutively been occurred a predetermined number of times, the guide display is prohibited. If the amplitude of the shake variation signal is not equal to or greater than the predetermined value and this has consecutively been occurred the predetermined number of times, the guide display is permitted.

Further, in the description of Embodiment 8, the HPF 2601, which limits the band of the output from the inclination detection sensor 2106, is constituted by hardware. However, the guide display can be similarly prohibited and permitted by providing the HPF in the microcomputer 2108, amplifying the output from the inclination detection sensor 2106 via the amplifier 2107 to generate an inclination amplified signal, limiting the band of the inclination amplified signal, and supplying the signal to the shake signal output determining part 114.

Embodiment 9

Figure 27:
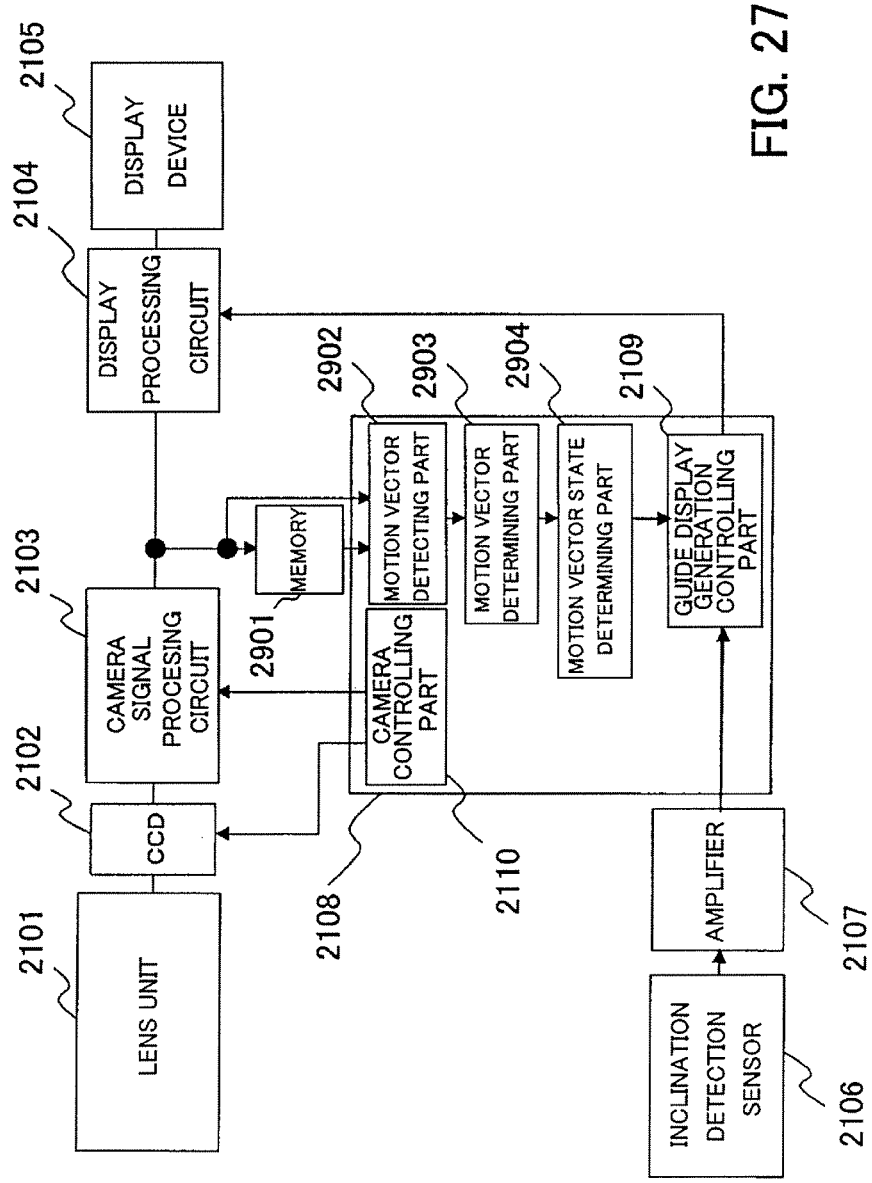
FIG. 27 is a block diagram showing the configuration of a circuit in an image pickup apparatus that is Embodiment 9 of the present invention.

FIG. 27 is a block diagram showing the circuit configuration of an image pickup apparatus that is Embodiment 9 of the present invention. Components similar to those of Embodiment 7, described above, are denoted by the same reference numerals and will not be described. The description of operations similar to those of Embodiment 7 is also omitted.

In FIG. 27, reference numeral 2901 denotes a memory that stores the signal from the camera signal processing circuit 2103. Reference numeral 2902 denotes a motion vector detecting part that detects a motion vector on the basis of the signal stored in the memory 2901 and the output from the camera signal processing circuit 2103. Reference numeral 2903 denotes a motion vector determining part that determines the motion of a picked-up image on the basis of the motion vector detected by the motion vector detecting part 2902. Reference numeral 2904 denotes a motion vector state determining part that determines the state of the motion vector on the basis of the output from the motion vector determining part 2903. The circuit in FIG. 27 corresponds to the configuration in FIG. 19 which detects motion vectors in the picked-up image to control whether or not to output the guide display on the basis of the output motion vector.

Embodiment 7 controls whether or not to output a guide display signal generated from the inclination signal on the basis of the output state of the shake signal corresponding to the shake of the video camera. Specifically, if the process determines that the camera is held by the user's hand during image pickup, on the basis of the detection output from the shake detection sensor 2111, no guide display signal is output to prohibit the display device 2105 from superimposedly showing the guide display on the picked-up image. Further, if the process determines that the camera is fixed to a tripod or the like during image pickup, on the basis of the detection output from the shake detection sensor 2111, the guide display signal is output to permit the display device 2105 to superimposedly show the guide display on the picked-up image.

In contrast, Embodiment 9 controls whether or not to output the guide display signal generated from the inclination signal on the basis of the motion vector. Specifically, if the process determines that the camera is held by the user's hand during image pickup, on the basis of the motion vector, the display device 2105 is prohibited from superimposedly showing the guide display on the picked-up image. If the process determines that the camera is fixed to a tripod or the like during image pickup, the display device 2105 is permitted to superimposedly show the guide display on the picked-up image.

A conventional block matching method is used for detecting the motion vector in Embodiment 9. Specifically, an input image signal is divided into a plurality of blocks of an appropriate size (for example, 8 pixels×8 lines). For a given range of pixels in each block, the differences in pixels in the preceding field (or frame) and the current one are calculated. Then, a block of the preceding field (or frame) having the minimum sum of the absolute values of the differences is searched for. The relative displacement of this block indicates its motion vector.

Next, specific operations of the above configuration will be described. The image signal output from the camera signal processing circuit 2103, which is a target to detect the motion vector, is input to the memory 2901, which is a field (or frame)

memory, and to the motion vector detecting part 2902 in the microcomputer 2108. The memory 2901 is used as one-field period delayer.

The motion vector detecting part 2902 calculates a correlation value between the current field and the preceding field that is stored in the memory 2901, for each block according to the block matching. Then, a signal indicating the calculation result is detected on the basis of the correlation value as the motion vector for each block. Specifically, a block of the preceding field having the maximum correlation value is searched for. The relative displacement of this block indicates its motion vector. The detected motion vector is then output to the motion vector determining part 2903.

The motion vector determining part 2903, following the motion vector detecting part 2902, determines the total motion vector on the basis of the motion vectors of the blocks. Specifically, the median or average of the motion vectors of the blocks is determined to be the total motion vector. A signal indicating the total motion vector determined by the motion vector determining part 2903 is output to the motion vector state determining part 2904.

The motion vector state determining part 2904, following the motion vector determining part 2903, supplies a binary (Lo, Hi) control signal indicating whether or not to display the guide display on the display device 2105, the guide display being generated by the guide display generation controlling part 2109. Specifically, if the absolute value of the motion vector determined for each vertical synchronization signal (hereinafter referred to as each V period) by the motion vector determining part 2903 is equal to or greater than a predetermined value and the motion vector changes with the V period, the motion vector state determining part 2904 determines that the video camera is held by the user's hand. The motion vector state determining part 2904 outputs the Lo control signal to the guide display generation controlling part 2109 so as to prevent the output of the guide display signal. Consequently, when the video camera is held by the user's hand during image pickup, the guide display on the display device 2105 is prohibited.

If the absolute value of the motion vector determined for every V period by the motion vector determining part 2903 is not equal to or greater than the predetermined value and the motion vector does not virtually change at every V period, the motion vector state determining part 2904 determines that the video camera is fixed to a tripod or the like. The motion vector state determining part 2904 outputs the Hi control signal to the guide display generation controlling part 2109 so as to permit the output of the guide display signal. Consequently, when the video camera is fixed to a tripod or the like during image pickup, the guide display on the display device 2105 is permitted. The logic of control signals controlling the prohibition and permission of the guide display may be reversed without posing any problem.

Figure 28:
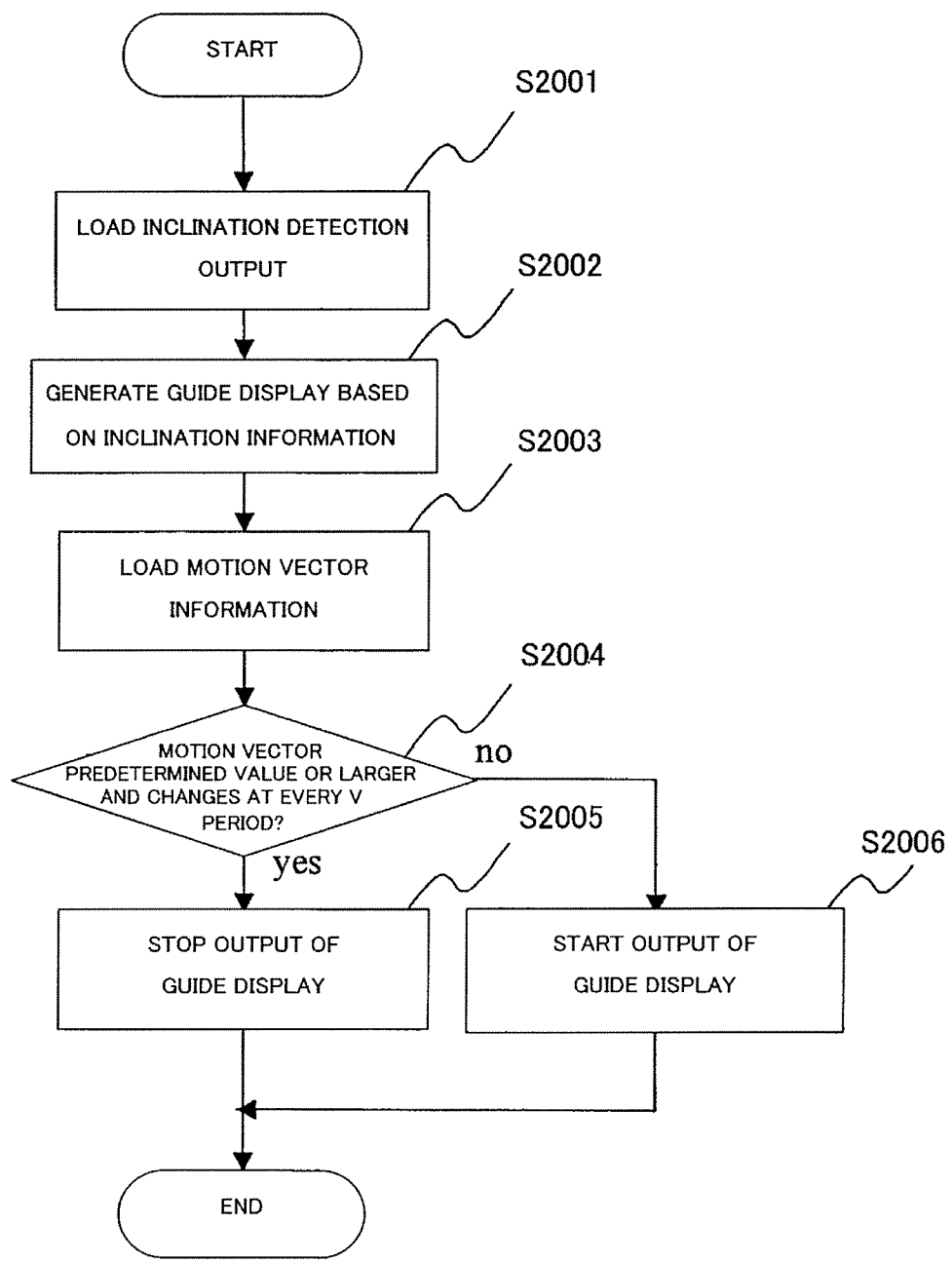
FIG. 28 is a flowchart showing an inclination guide display operation that is Embodiment 9 of the present invention.

Next, with reference to the flowchart in FIG. 28, description will be given of the operation performed by the microcomputer 2108 for the guide display.

First, in step S2001, the detection output from the inclination detection sensor 2106 is loaded. In next step S2002, the guide display is generated which corresponds to the inclination detection output loaded in step S2001. In subsequent step S2003, motion vector information detected in an image picked-up with the video camera is loaded.

In next step S2004, the process determines whether or not the absolute value of the motion vector loaded in step S2003 is equal to or greater than the predetermined value and changes at every V period. If the absolute value of the motion vector is equal to or greater than the predetermined value and changes at every V period, the process determines that the video camera is held by the user's hand during image pickup and thus proceeds to step S2005. In step S2005, the output of the guide display generated in step S2002 is stopped, and then the process ends. This prohibits the guide display on the display device 2105.

Further, if the process determines in step S2004 that the absolute value of the motion vector is not equal to or greater than the predetermined value and does not virtually change at every V period, it can determine that the video camera is fixed to a tripod or the like during image pickup and thus proceeds to step S2006. In step S2006, the output of the guide display generated in step S2002 is started, and then the process ends. This permits the guide display on the display device 2105.

Embodiment 9 detects the motion vector in the image picked-up with the video camera. If the absolute value of the motion vector determined for every vertical synchronization signal (every V period) is equal to or greater than the predetermined value and changes at every V period, the process determines that the video camera is held by the user's hand. Then, the provision of the guide display on the display device 2105 is prohibited. This prevents user's inappropriate framing owing to his or her excessive consciousness of inclination of the video camera. It is also possible to reduce disturbances to image pickup, for example, a constant movement of the guide display on the display device 2105, which makes the user feel that the monitored image is cumbersome.

If the absolute value of the motion vector determined for every vertical synchronization signal (every V period) is not equal to or greater than the predetermined value and does not virtually change at every V period, the display device 2105 is permitted to show the guide display. This enables the user to correct the inclination of the digital camera more accurately on the basis of the guide display.

Although not described in Embodiment 9, the shake of the video camera can be corrected on the basis of the motion vector by placing, between the camera signal processor 2103 and the display processing circuit 2104, an image processor capable of image controlling on the basis of the output from the motion vector determining part 2903 in the microcomputer 2108.

Embodiment 10

Figure 29:
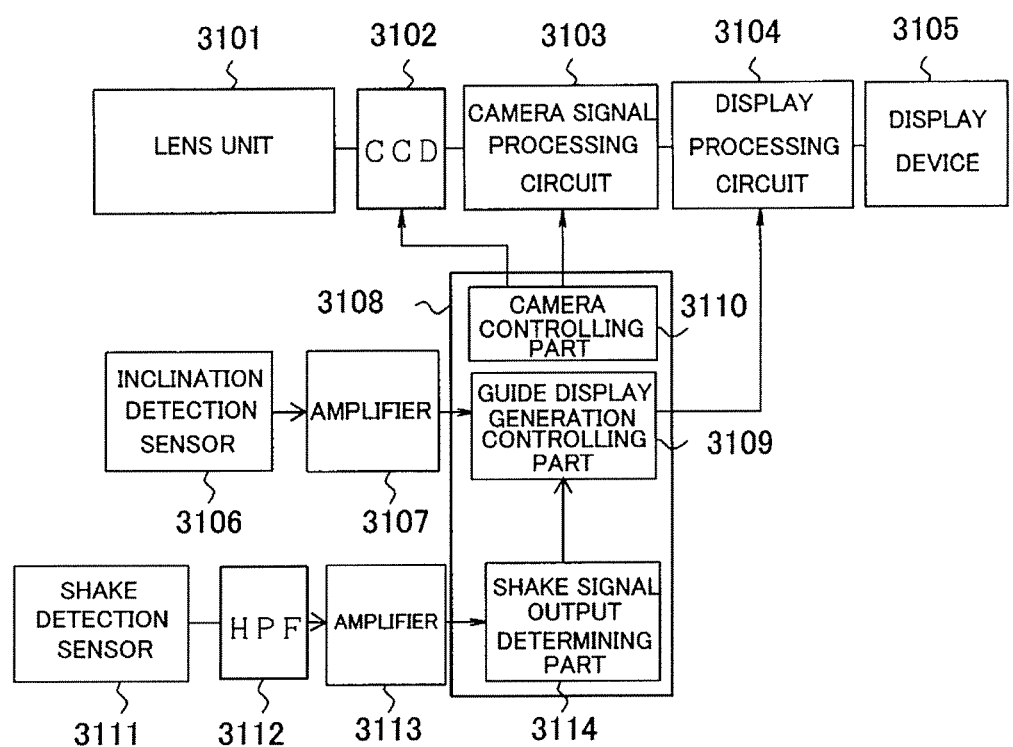
FIG. 29 is a block diagram showing the outlined configuration of a video camera that is Embodiment 10.

FIG. 29 is a block diagram showing the outlined configuration of a video camera that is Embodiment 10. Reference numeral 3101 denotes a lens unit used to pick up an image of an object. Reference numeral 3102 denotes a CCD that photoelectrically converts an object image formed by the lens unit 3101 into an analog image pickup signal.

Reference numeral 3103 denotes a camera signal processing circuit that uses a built-in A/D converter to covert the analog image pickup signal into a digital signal and executes predetermined signal processing such as gamma correction and white balancing on the digital signal to generate a final standardized video signal.

Reference numeral 3104 denotes a display processing circuit that outputs and displays the output video signal from the camera signal processing circuit 3103 on which a guide display signal (described later) is superimposed, on a display device 3105. Reference numeral 3105 denotes the display device such as a viewfinder or a liquid crystal panel.

Reference numeral 3106 denotes an inclination detection sensor that detects the inclination of the video camera and that is constituted by, for example, an acceleration sensor. Reference numeral 3107 denotes an amplifier circuit that amplifies an output from the inclination detection sensor 3106.

Reference numeral 3111 denotes a shake detection sensor that detects shake of the video camera and that is constituted by, for example, an angular velocity sensor. Reference numeral 3112 denotes a high pass filter (HPF) that removes a DC component from an output from the shake detection sensor 3111. Reference numeral 3113 denotes an amplifier circuit that amplifies an output from the HPF 3112.

Reference numeral 3108 denotes a camera system controlling microcomputer (hereinafter referred to as a microcomputer) including a camera controlling part 3110, a guide display generation controlling part 3109, and a shake signal output determining part 3114. The camera controlling part 3110 controls the drive of the CCD 3102 and the camera signal processing circuit 3103. The guide display generation controlling part 3109 loads an output from the amplifier circuit 3107 to generate the guide display signal corresponding to the detected inclination. The guide display generation controlling part 3109 then outputs the guide display signal to the display processing circuit 3104. Further, the guide display generation controlling part 3109 controls the output of the guide display signal on the basis of a control signal from the shake signal output determining part 3114. The shake signal output determining part 3114 compares the frequency of an output from the amplifier circuit 3113 with a predetermined threshold to determine whether or not the frequency has continuously exceeded the threshold for a predetermined time. On the basis of the determination, the shake signal output determining part 3114 outputs a control signal to the guide display generation controlling part 3109.

In the video camera of the present embodiment, entering light having passed through the lens unit 3101 is formed into an image on an image pickup surface of the CCD 3102, which then photoelectrically converts the image in to an analog signal. The camera signal processing circuit 3103 executes an A/D conversion on the output from the CCD 3102 and then subjects the converted output to predetermined signal processing such as gamma correction and white balancing. The camera signal processing circuit 3103 outputs the resulting signal as a standardized video signal. The output video signal from the camera signal processing circuit 3103 is supplied, via the display processing circuit 3104, to the display device 3105, on which it is monitored as a picked-up image.

Next, description will be given of detection of the inclination of the video camera and generation of the guide display. The inclination detection sensor 3106 outputs a detection signal based on the inclination of the video camera. The output from the inclination detection sensor 3106 is amplified by a predetermined amount by the amplifier circuit 3107 and then input to the microcomputer 3108 as an inclination detection signal. On the basis of the inclination detection signal input to the microcomputer 3108, the guide display generation controlling part 3109 generates the guide display signal corresponding to the inclination of the video camera. The guide display signal is controlled using the shake signal output determining part 3114. The guide display signal output by the guide display generation controlling part 3109 is supplied to the display device 3105 via the display processing circuit 3104.

Next, description will be given of a shake component acting on the video camera. The shake detection sensor 3111 outputs the shake detection signal on the basis of the shake of the video camera. A DC component from the output from the shake detection sensor 3111 is removed by the HPF 3112. The resulting output is amplified by a predetermined amount by the amplifier circuit 3113. The amplified signal is input to the microcomputer 3108 as the shake detection signal. On the basis of the shake detection signal input to the microcomputer 3108, the shake signal output determining part 3114 determines the state of the shake detection signal. Specifically, the shake signal output determining part 3114 calculates and compares the frequency of the input shake detection signal with the predetermined threshold to determine whether or not the frequency has continuously exceeded the threshold for a set time. The threshold of the frequency may be set so as to enable the frequency component of hand jiggling (for example, 5 [Hz] or higher) to be detected.

Next, the calculation of the frequency of the shake detection signal will be described. The frequency is calculated by counting increase and decrease turnarounds of the shake detection signal per unit time. For example, two turnarounds during one period per unit time is equal to 1 [Hz], that is, the frequency is half of the number of turnarounds. Accordingly, for 10 turnarounds, 10/2=5 [Hz] is calculated.

Figure 33A:
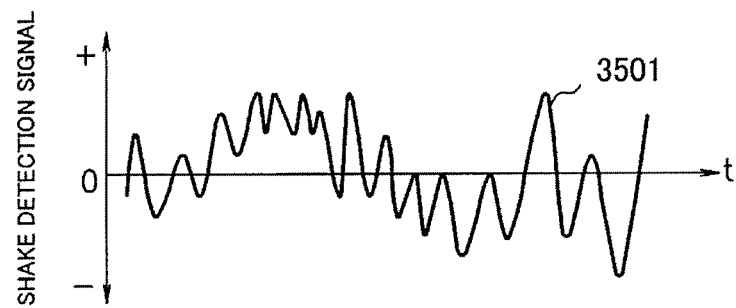
Figure 33B:
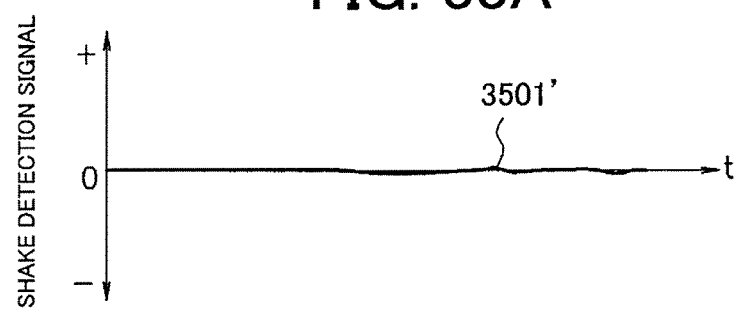

FIGS. 33A and 33B are characteristic diagrams showing shake detection signals obtained when the video camera is held by the user's hand during image pickup and when the video camera is fixed to a tripod or the like during image pickup. In FIGS. 33A and 33B, the vertical axis indicates the shake detection signal. The horizontal axis indicates time. A characteristic line 3501 in FIG. 33A indicates the shake detection signal obtained when the video camera is held by the user's hand during image pickup. Increase and decrease turnarounds in the output variation of the shake detection signal are continuous. This signal component thus enables the frequency of hand jiggling to be detected. In contrast, a characteristic line 3501' in FIG. 33B indicates the shake detection signal obtained when the video camera is fixed. The output variation of the shake detection signal is very small and increase and decrease turnarounds are discontinuous. Accordingly, this signal component does not enable the frequency equivalent to hand jiggling to be easily detected. This difference between the shake detection signals makes it possible to determine whether the video camera is held by the user's hand or fixed during image pickup.

The shake signal output determining part 3114, on the basis of this determination, supplies a control signal to the guide display generation controlling part 3109, the control signal being a binary (Lo, Hi) shake signal output determination signal indicating whether or not the camera is held by the user's hand or fixed during image pickup. That is, if the frequency of the input shake detection signal has continuously exceeded the threshold for the set time, the process determines that the camera is held by the user's hand during image pickup to output the shake output determination signal (Lo). In contrast, if the frequency of the input shake detection signal has not continuously exceeded the threshold for the set time, the process determines that the camera is fixed during image pickup to output the shake output determination signal (Hi). The logic of the control signal may be reversed without posing any problem.

Figure 30:
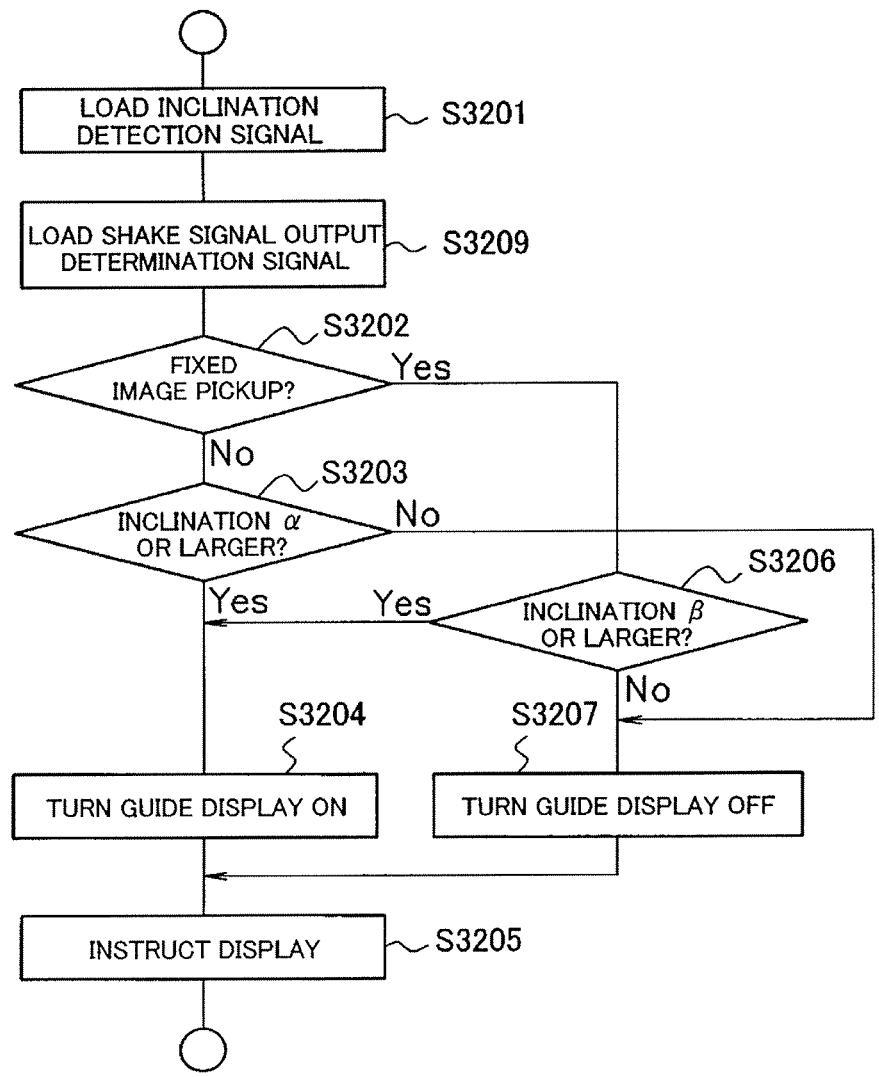
FIG. 30 is a flowchart illustrating the processing operation performed by a microcomputer that is Embodiment 10.

Next, with reference to the flowchart in FIG. 30, description will be given of output control of the guide display signal performed in the microcomputer 3108. FIG. 30 is a flowchart illustrating the processing operation performed by the guide display generation controlling part 3109 in the microcomputer 3108. First, in step S3201, the inclination detection signal is loaded from the inclination detection sensor 3106 via the amplifier circuit 3107.

Then, in step S3209, the shake signal output determination signal is loaded from the shake signal output determining part 3114. In step S3202, determination is made on the basis of the shake signal output determination signal loaded in step S3209. For fixed image pickup, the process proceeds to step S3206. For handheld image pickup, the process proceeds to step S3203.

For the handheld image pickup, the process determines in step S3203 whether or not the inclination of the video camera is equal to or larger than a set value α. If the inclination is equal to or larger than the set value α, then in step S3204, the guide display is set to be turned on. In contrast, if the inclination is smaller than the set value α, then in step S3207, the guide display is set to be turned off.

On the other hand, for the fixed image pickup, the process determines in step S3206 whether or not the inclination of the video camera is equal to or larger than a set value β. If the inclination is equal to or larger than the set value β, then in step S3204, the guide display is set to be turned on. In contrast, if the inclination is smaller than the set value β, then in step S3207, the guide display is set to be turned off.

In step S3205, the display processing circuit 3104 is instructed to provide the guide display. That is, after step S3204 is executed, the guide display signal is generated, output, and superimposed on the output video signal from the camera signal processing circuit 3103 (that is, the guide display is shown). In contrast, after step S3207 is executed, the superimposition of the guide display signal on the output video signal from the camera signal processing circuit 3103 is avoided (that is, the guide display is not shown).

In this case, the relationship between the set values α and β is α>β. The inclination at which the guide display is turned on or off is set smaller for the fixed image pickup than for the handheld image pickup. That is, for the fixed image pickup, in which the inclination of the video camera is more noticeable, the guide display is provided at the smaller inclination.

Further, the present embodiment determines that the camera is held by the user's hand during image pickup if the frequency of the output from the shake detection sensor 3111 has not continuously exceeded the threshold for the set time and determines that the camera is fixed if the frequency has continuously exceeded the threshold for the set time. However, the image pickup state may be determined on the basis of amplitude of the output from the shake detection sensor 3111.

Moreover, the present embodiment uses the shake detection sensor 3111 to detect the shaking state of the video camera. However, the shaking state can also be detected on the basis of the shake detection signal obtained by limiting the band of the detection signal from the inclination detection sensor 3106 or a motion vector detected in a picked-up image.

Figures 31A, 31B, 31C:
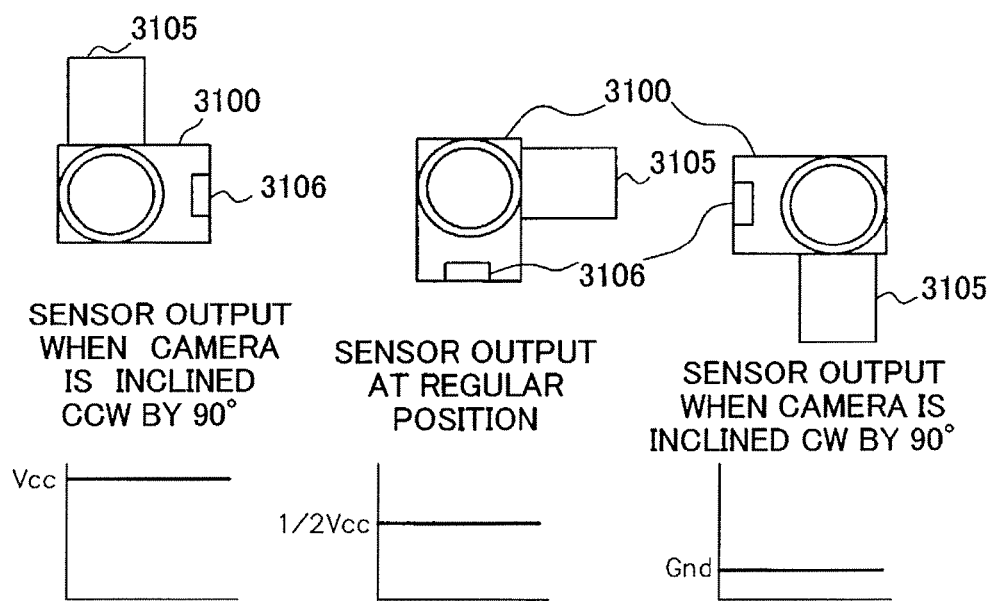
FIGS. 31A to 31C are diagrams showing the relationship between the inclination of the video camera and an output from the inclination detection sensor.

FIGS. 31A to 31B are diagrams showing the relationship between the inclination of the video camera and the output from the inclination detection sensor (acceleration sensor) 3106. In FIGS. 31A to 31C, reference numerals 3100, 3105, and 3106 denote the video camera, the liquid crystal panel as the display device, and the inclination detection sensor, respectively. Appropriately setting of the gain of the amplifier circuit 3107 enables the output from the inclination detection sensor 3106 to be set within the voltage range described below.

FIG. 31B shows a state where the video camera is at a regular position. In this state, the output from the inclination detection sensor 3106 is equal to half of a power supply voltage Vcc. In contrast, inclining the video camera 3100 clockwise by 90° as shown in FIG. 31A provides an output from the inclination detection sensor 3106 equal to the power supply voltage Vcc. Conversely, inclining the video camera 3100 counterclockwise by 90° as shown in FIG. 31C provides an output from the inclination detection sensor 3106 at a GND level.

For the inclinations between those shown in FIG. 31A and FIG. 31B and between those shown in FIG. 31B and FIG. 31C, the output from the inclination detection sensor 3106 changes linearly with the inclination. Accordingly, providing a predetermined voltage threshold for the output corresponding to the regular position shown in FIG. 31B makes it possible to determine whether or not a predetermined angle has been reached. That is, switching the voltage threshold for the sensor output between the handheld image pickup and the fixed image pickup makes it possible to set the inclination value at which the guide display is turned on or off. Reversing the orientation of the inclination detection sensor 3106 reverses the sensor output voltage obtained when the video camera is inclined, with respect to that shown in FIG. 31.

Figure 32:
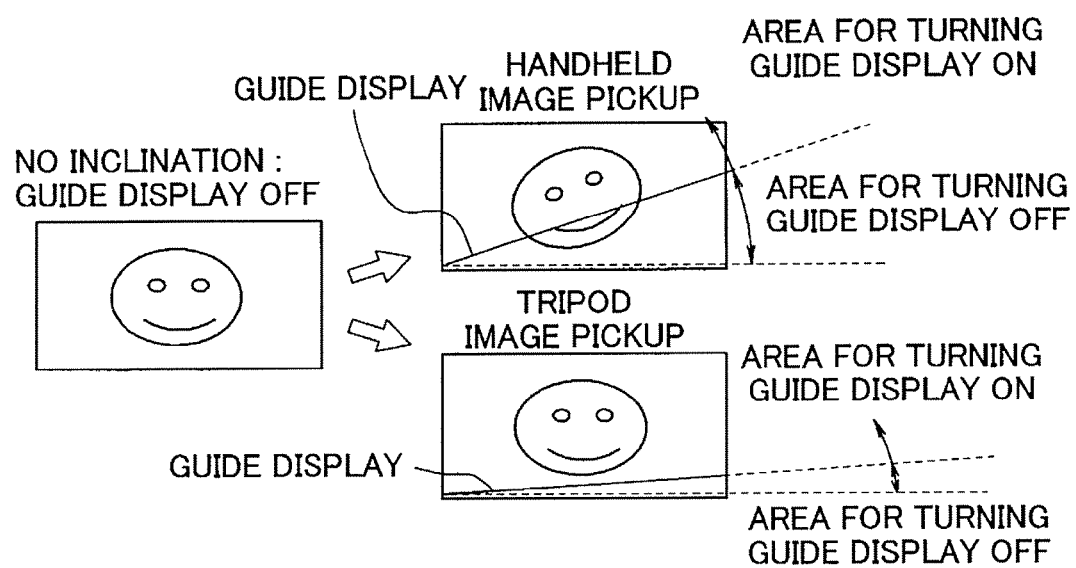
FIG. 32 is a diagram showing the range of a guide display on a display device.

FIG. 32 shows the range where the guide display is shown on the display device 3105. By switching the voltage threshold of the sensor output between the handheld image pickup and the fixed image pickup as described above, it is possible to make the area in which the guide display is turned off narrower for the fixed image pickup than for the handheld image pickup, as shown in FIG. 32. This makes it possible to more quickly determine that the video camera is inclined when the video camera is fixed to a tripod or the like.

As described above, the guide display suitable for the image pickup state can be provided by detecting the shake of the video camera to change the set value of the inclination at which the guide display is turned on or off. That is, for the handheld image pickup, the area in which the guide display is turned off is widened to prevent user's inappropriate framing owing to his or her excessive consciousness of the inclination of the video camera. This also prevents the user from feeling that the monitored image is cumbersome because of a constant movement of the guide display. Disturbances to image pickup can thus be reduced. On the other hand, for the fixed image pickup, the area in which the guide display is turned off is narrowed to enable the user to correct the inclination of the video camera on the basis of the guide display. This is effective for improving image pickup accuracy.

Embodiment 11

Embodiment 11 of the present invention will be described. The configuration of a video camera that is Embodiment 11 is similar to that in Embodiment 10 and its detailed description is thus omitted.

Figure 34:
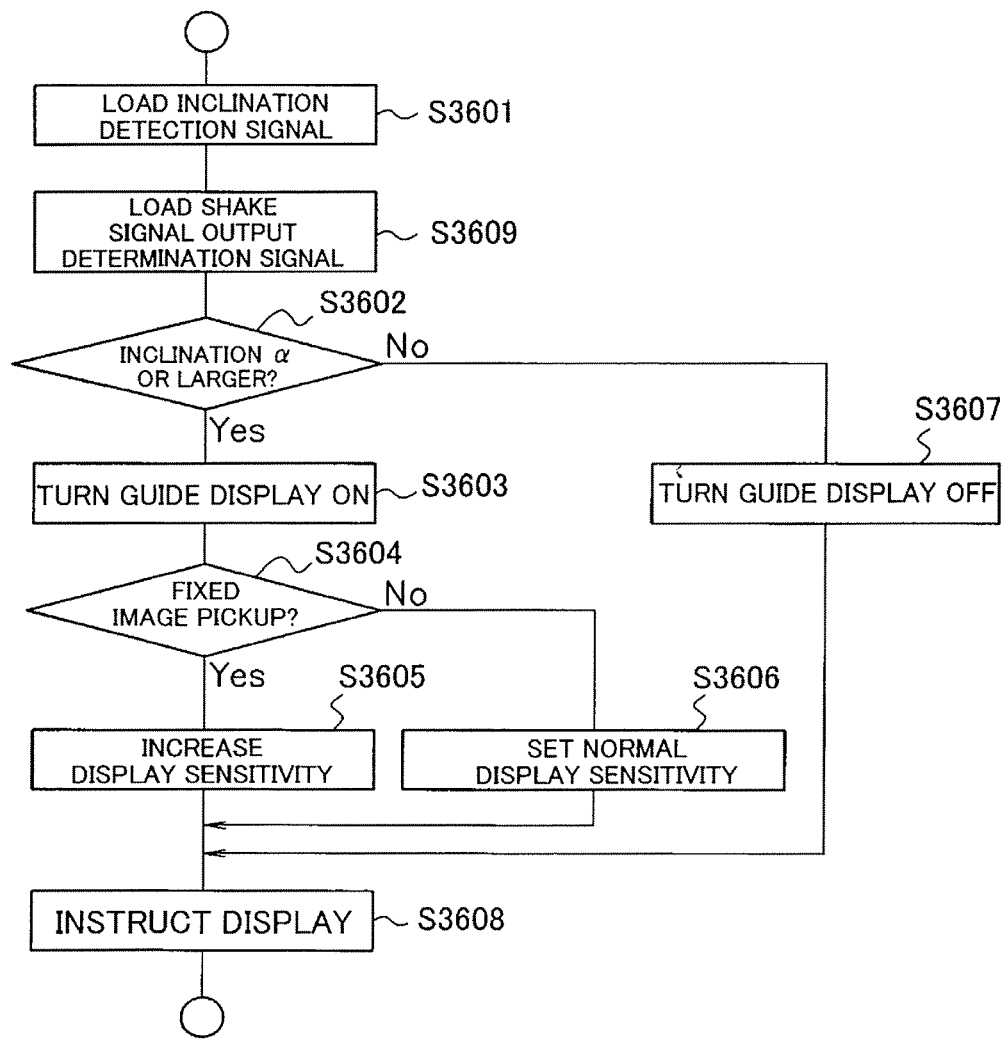
FIG. 34 is a flowchart illustrating the processing operation performed by the microcomputer that is Embodiment 11.

FIG. 34 is a flowchart illustrating the processing operation performed by the guide display generation controlling part 3109 in the microcomputer 3108. First, in step S3601, the inclination detection signal is loaded from the inclination detection sensor 3106 via the amplifier circuit 3107.

Then, in step S3609, the shake signal output determination signal is loaded from the shake signal output determining part 3114.

Then, in step S3602, the process determines whether or not the inclination of the video camera is equal to or larger than the set value α. If the inclination is equal to or larger than the set value α, then in step S3603, the guide display is set to be turned on. In contrast, if the inclination is smaller than the set value α, then in step S3607, the guide display is set to be turned off.

In step S3604, determination is made on the basis of the shake signal output determination signal loaded in step S3609. For the fixed image pickup, the process proceeds to step S3605 to increase display sensitivity. This is an operation for exaggerating the guide display. On the other hand, for the handheld image pickup, the process proceeds to step S3606, the display sensitivity (the level of exaggeration) is set to a normal value.

In step S3608, the display processing circuit 3104 is instructed to provide the guide display. That is, after step S3603 is executed, the guide display signal is generated and output to superimpose the guide display on the output video signal from the camera signal processing circuit 3103 (that is, the guide display is shown). In contrast, after step S3607 is executed, the superimposition of the guide display on the output video signal from the camera signal processing circuit 3103 is avoided (that is, the guide display is not shown).

Figure 35A:
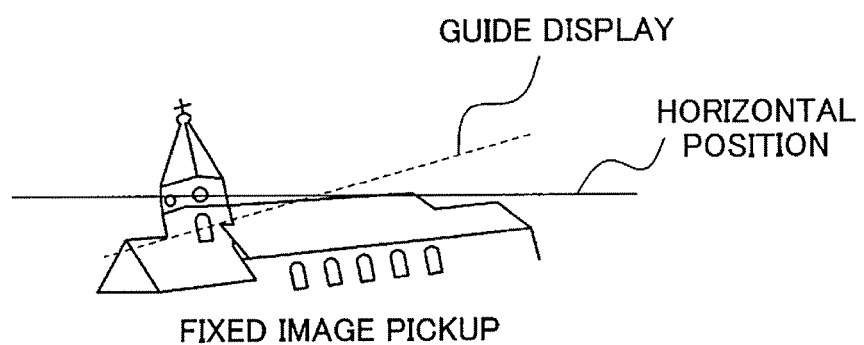
FIGS. 35A and 35B are diagrams showing a guide display obtained when display sensitivity is changed that is Embodiment 11.
Figure 35B:
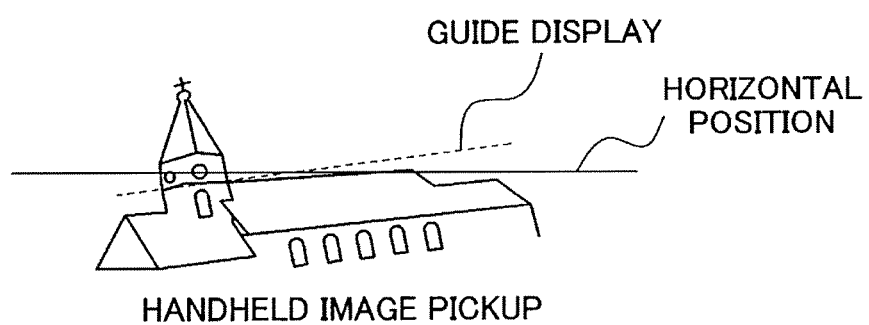

FIGS. 35A and 35B show a guide display provided when the display sensitivity is changed that is Embodiment 11. As is apparent from FIGS. 35A and 35B, even with the same inclination of the video camera from a horizontal position, the guide display for the fixed image pickup is exaggerated compared to that for the handheld image pickup (in other words, even with the same inclination, the guide display is more steeply inclined for the fixed image pickup). Exaggerating the guide display for the fixed image pickup makes the inclination of the video camera clearer to enable the user to recognize the inclination more easily. Further, during the fixed image pickup, a change in inclination in response to a slight movement can be more easily recognized, enabling the video camera to be more easily set horizontal.

As described above, the guide display suitable for the image pickup state can be provided by detecting the shake of the video camera to change the display sensitivity of the guide display (the level of exaggeration). That is, the display sensitivity (the level of exaggeration) is set higher for the fixed image pickup than for the handheld image pickup. This exaggerates the guide display to enable the user to be noticed of the inclination of the video camera when the fixed image pickup is performed in which an inclination of the image pickup result is conspicuous. This enables the user to recognize the inclination more easily. Moreover, the amount of a change in the inclination of the video camera in response to its slight movement can be clearly determined, enabling the video camera to be more easily set horizontal.

Embodiment 12

Figure 36:
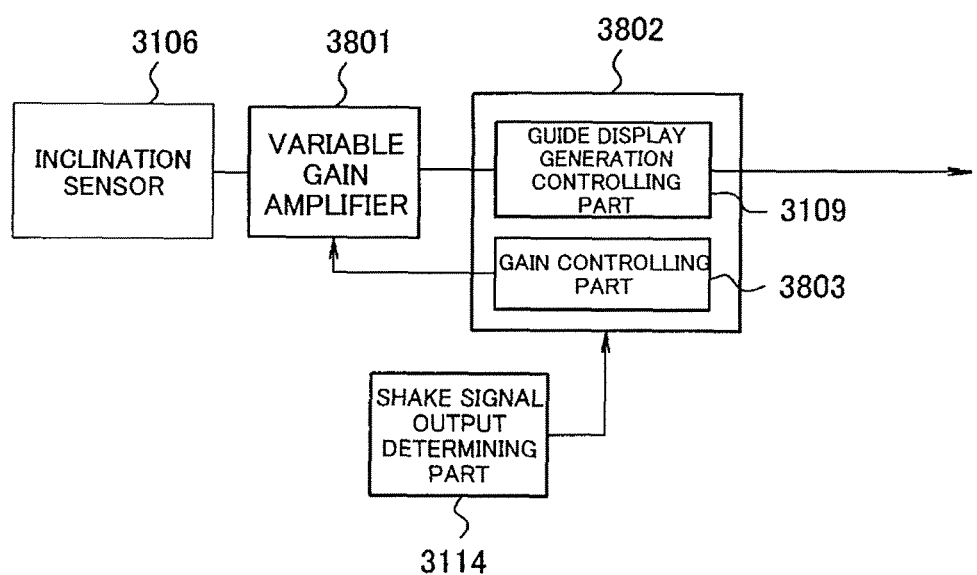
FIG. 36 is a block diagram showing the outlined configuration of a part of a video camera that is Embodiment 12.

Embodiment 12 of the present invention will be described. The basic configuration of a video camera that is Embodiment 12 is similar to that shown in FIG. 29. However, as shown in FIG. 36, a variable gain amplifier circuit 3801 replaces the amplifier circuit 3107.

A microcomputer 3802 in the present embodiment further includes a gain controlling part 3803 that changes the gain of the variable gain amplifier circuit 3801.

Figure 38:
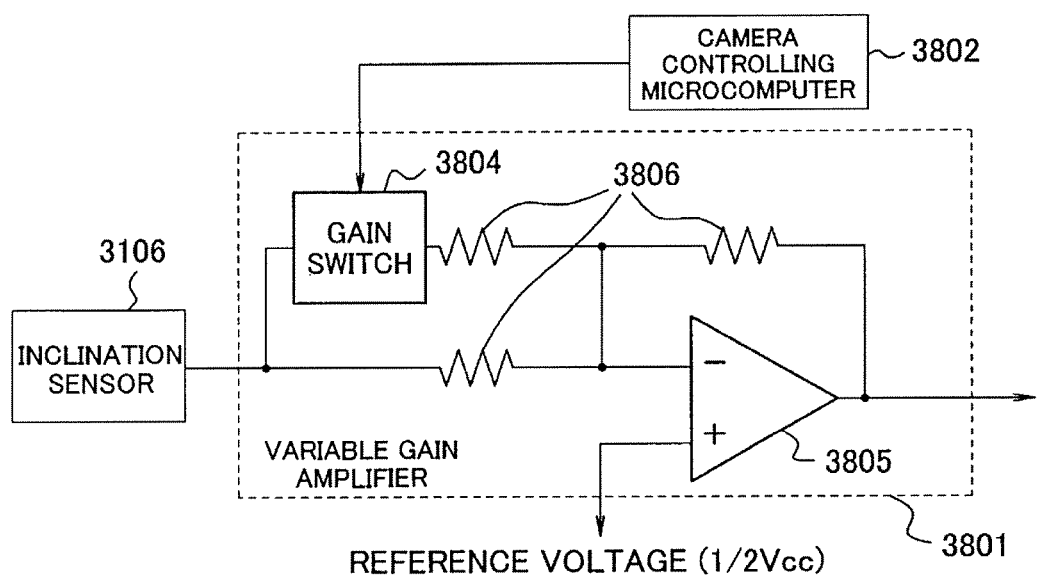
FIG. 38 is a diagram showing an example of a variable gain amplifier circuit.

FIG. 38 is a diagram showing an example of configuration of the variable gain amplifier circuit 3801. The variable gain amplifier circuit 3801 is constituted by an amplifier 3805, resistors 3806, and a gain switch 3804. A switch signal from the camera controlling microcomputer 3802 connects input resistors 3806 in parallel with each other with respect to the amplifier 3805 to increase the amplifier gain. The change of the gain is effected in order to exaggerate the guide display for the fixed image pickup.

Figure 37:
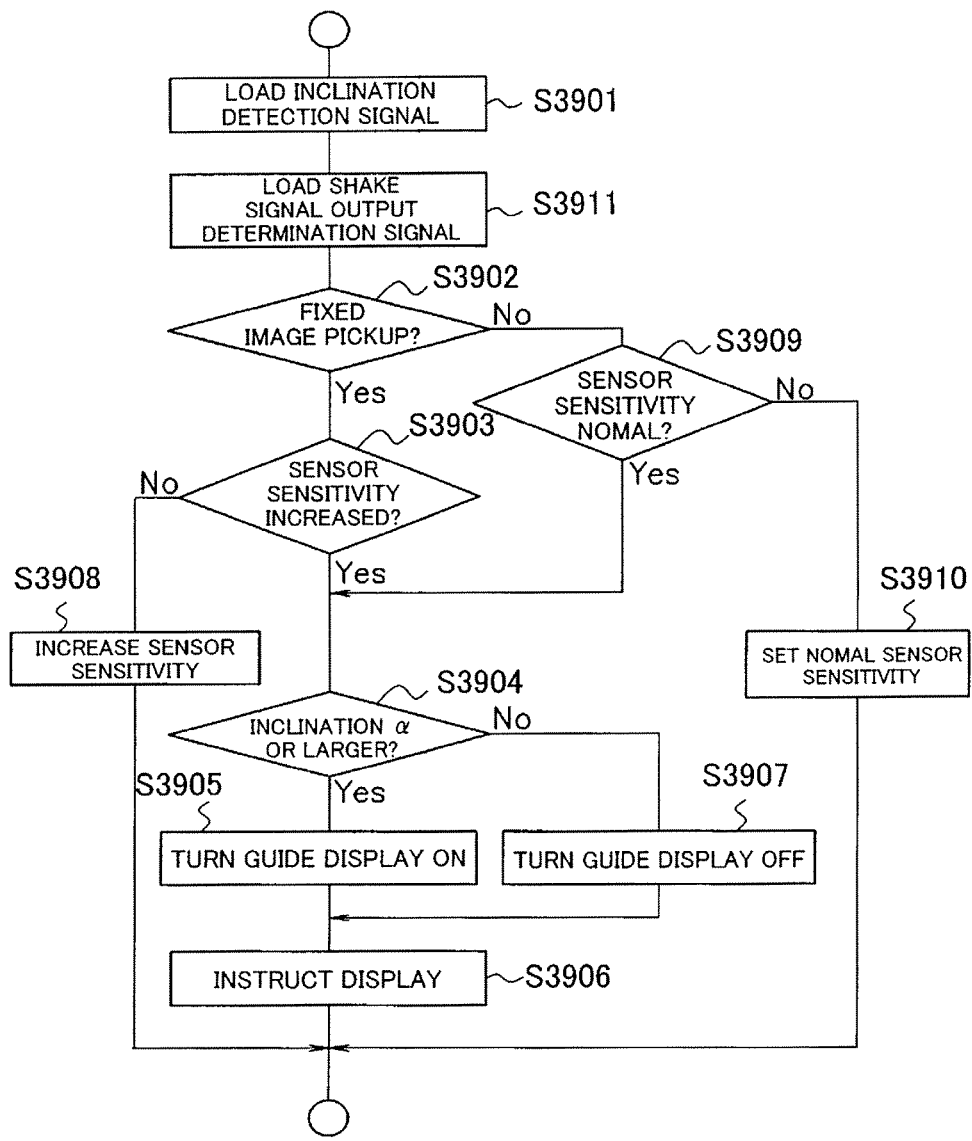
FIG. 37 is a flowchart illustrating the processing operation performed by the microcomputer that is Embodiment 12.

FIG. 37 is a flowchart illustrating the processing operation performed by the guide display generation controlling part 3109 and gain controlling part 3803 in the microcomputer 3802. First, in step S3901, the inclination detection signal is loaded from the inclination detection sensor 3106 via the variable gain amplifier circuit 3801.

Then, in step S3911, the shake signal output determination signal is loaded from the shake signal output determining part 3114. In step S3902, determination whether or not the fixed image pickup is performed is made on the basis of the shake signal output determination signal loaded in step S3911. If the fixed image pickup is performed, the process proceeds to step S3903. If the handheld image pickup is performed, the process proceeds to step S3909.

For the fixed image pickup, the process checks in step S3903 whether or not the sensor sensitivity has been increased. In this case, the process determines whether or not the gain of the variable gain amplifier circuit 3801 is set higher. In step S3903, if the sensor sensitivity has been increased, the process proceeds to step S3904. If the sensor sensitivity has not been increased, then in step S3908, setting is made so as to raise the gain to increase the sensor sensitivity.

On the other hand, for the handheld image pickup, the process checks in step S3909 whether or not the sensor sensitivity is set at a normal value. If in step S3909 the sensor sensitivity is not set at the normal value, that is, it is set for the fixed image pickup, then in step S3910, it is changed to the normal value. This is an operation for turning off the gain switch 3704 in the variable gain amplifier circuit 3801. If in step S3909 the sensor sensitivity is set at the normal value, the process proceeds to step S3904.

In step S3904, the process determines whether or not the inclination of the video camera is equal to or larger than the set value α. If the inclination is equal to or larger than the set value α, then in step S3905, the guide display is set to be turned on. In contrast, if the inclination is smaller than the set value α, then in step S3907, the guide display is set to be turned off.

In step S3906, the display processing circuit 3104 is instructed to provide the guide display. That is, after step S3905 is executed, the guide display signal is generated and output to superimpose the guide display on the output video signal from the camera signal processing circuit 3103 (that is, the guide display is shown). In contrast, after step S3907 is executed, the superimposition of the guide display on the output video signal from the camera signal processing circuit 3103 is avoided (that is, the guide display is not shown).

As described above, the guide display suitable for the image pickup state can be provided by detecting the shake of the video camera to change the sensor sensitivity of the inclination detection sensor 3106. That is, as in Embodiment 11, the gain of the variable gain amplifier circuit 3801 is set higher for the fixed image pickup than for the handheld image pickup to enable the user to be noticed of the inclination of the video camera during the fixed image pickup so as to recognize the inclination more easily. Moreover, the amount of a change in inclination of the video camera in response to its slight movement can be clearly determined, enabling the video camera to be more easily set horizontal.

Embodiment 13

Embodiment 13 of the present invention will be described. As described in Embodiments 10 and 11, Embodiment 13 switches the set value of the inclination at which the guide display is turned on or off between the handheld image pickup and the fixed image pickup, and the display sensitivity is increased during the fixed image pickup to exaggerate the guide display.

Figure 39:
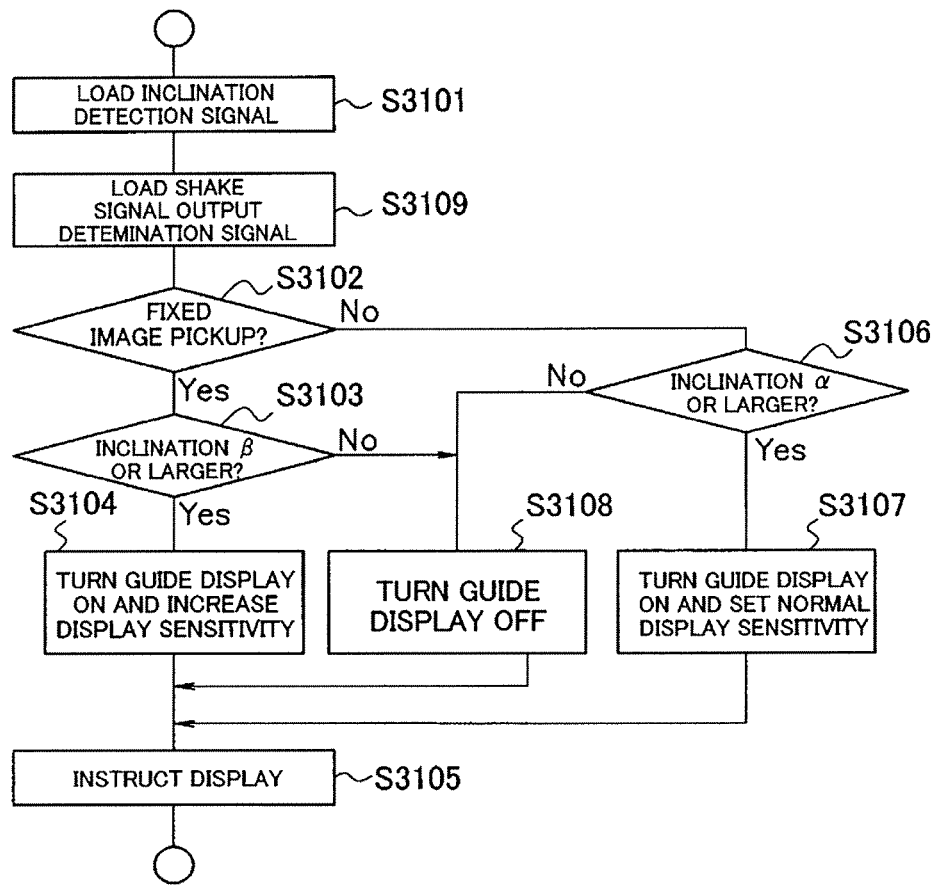
FIG. 39 is a flowchart illustrating the processing operation performed by the microcomputer that is Embodiment 13.

FIG. 39 is a flowchart illustrating the processing operation performed by the guide display generation controlling part 3109 in the microcomputer 3108. First, in step S3101, the inclination detection signal is loaded from the inclination detection sensor 3106 via the amplifier circuit 3107.

Then, in step S3109, the shake signal output determination signal is loaded from the shake output determining part 3114. In step S3102, determination whether or not the fixed image pickup is performed is made on the basis of the shake signal output determination signal loaded in step S3109. If the fixed image pickup is performed, the process proceeds to step S3103. If the handheld image pickup is performed, the process proceeds to step S1106.

For the fixed image pickup, the process determines in step S3103 whether or not the inclination of the video camera is equal to or larger than a set value β. If the inclination is equal to or larger than the set value β, then in step S3104, the guide display is set to be turned on and the display sensitivity (the level of exaggeration) is increased. In contrast, if the inclination is smaller than the set value β, then in step S3108, the guide display is set to be turned off.

On the other hand, for the handheld image pickup, in step S3106, the process determines whether or not the inclination of the video camera is equal to or larger than a set value α. If the inclination is equal to or larger than the set value α, then in step S3107, the guide display is set to be turned on. In contrast, if the inclination is smaller than the set value α, then in step S3108, the guide display is set to be turned off.

In step S3105, the display processing circuit 3104 is instructed to provide the guide display. That is, after steps S3104 and S3107 are executed, the guide display signal is generated and output to superimpose the guide display on the output video signal from the camera signal processing circuit 3103 (that is, the guide display is shown). In contrast, after step S3108 is executed, the superimposition of the guide display on the output video signal from the camera signal processing circuit 3103 is avoided (that is, the guide display is not shown).

In short, for the fixed image pickup and if in step S3103 the inclination is smaller than the set value β, or for the handheld image pickup and if in step S3106 the inclination is smaller than the set value α, then the video camera is almost horizontal. Thus, in step S3108, the guide display is set to be turned off.

In this case, the relationship between the set values α and β is set to be α>(display sensitivity magnification×β). The set value of the inclination at which the guide display is turned on is always smaller for the fixed image pickup than for the handheld image pickup. The level of exaggeration of the guide display for the fixed image pickup increases consistently with the inclination of the video camera.

As described above, for the fixed image pickup, when the inclination of the video camera is more noticeable, the guide display for the inclination of the video camera is provided at a smaller inclination. This enables the user to be quickly noticed of the inclination of the video camera. Further, at a larger inclination, the guide display that exaggerates the actual inclination is provided to make the inclination of the video camera clearer. Moreover, a change in inclination in response to a slight movement can be more easily recognized, enabling the video camera to be more easily set horizontal. This also enables horizontal accuracy to be improved.

Embodiment 14

Figure 40:
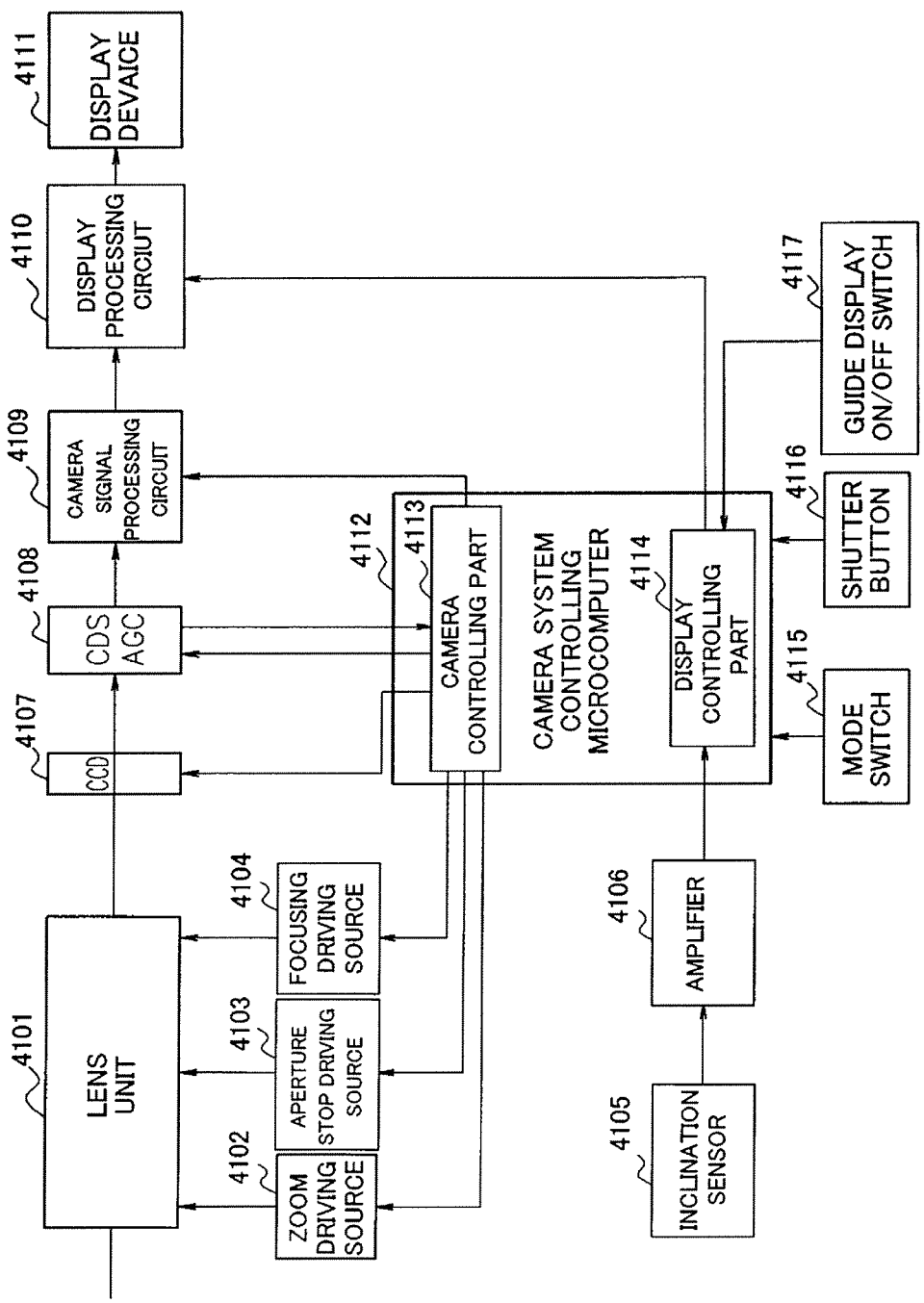
FIG. 40 is a block diagram showing the outlined configuration of a video camera that is Embodiment 14.

FIG. 40 is a block diagram showing the outlined configuration of a video camera that is Embodiment 14. Reference numeral 4101 denotes a lens unit including a first fixed lens sub-unit, a zoom lens sub-unit for zooming, an aperture stop and a second fixed lens sub-unit (they are not shown). Reference numerals 4102, 4103, and 4104 denote a zoom driving source, an aperture stop driving source, and a focusing driving source, respectively.

Reference numeral 4107 denotes a CCD that is an image pickup element. Reference numeral 4108 denotes an AGC (Auto Gain Control circuit) that amplifies an output from the CCD 4107. Reference numeral 4109 denotes a camera signal processing circuit that executes predetermined signal processing on an output signal from the AGC 4108. Reference numeral 4110 denotes a display processing circuit that converts an output signal from the camera signal processing circuit 4109 into a signal suitable for a display device 4111. Reference numeral 4111 denotes the display device such as a viewfinder or an external liquid crystal panel.

Reference numeral 4105 denotes an inclination sensor that detects the inclination of the video camera; an acceleration sensor is used as the inclination sensor in the present embodiment. Reference numeral 4106 denotes an amplifier circuit that amplifies an output from the inclination sensor 4105.

Reference numeral 4112 denotes a camera system controlling microcomputer including a camera controlling part 4113 and a display controlling part 4114. The camera controlling part 4113 controls the zoom driving source 4102 and the focusing driving source 4104 to change the angle of view and to perform focusing, respectively. The camera controlling part 4113 also controls the drive of the CCD 4107, the AGC 4108 and camera signal processing circuit 4109. Further, the display controlling part 4114 loads an output from the amplifier circuit 4106 and generates an inclination guide display signal corresponding to the detected inclination. The display controlling part 4114 also determines whether or not to provide an inclination guide display on the basis of the state of a mode switch 4115 and a guide display ON/OFF switch 4117. To provide the inclination guide display, the display controlling part 4114 outputs the inclination guide display signal to the display processing circuit 4110. This enables the display processing circuit 4110 to synthesize the inclination guide display signal on a video signal to superimposedly display an inclination guide 4403 in a picked-up image 4401 on a screen of the display device 4111.

Reference numeral 4115 denotes the mode switch that switches the image pickup mode between a moving image pickup mode and a still image pickup mode. Reference numeral 4116 denotes a shutter button that is a two-step switch instructing a still image pickup operation to be performed in accordance with its pressed position. Reference numeral 4117 denotes the guide display ON/OFF switch that enables the user to turn on and off the inclination guide display. The guide display ON/OFF switch 4117 may be an independent operation member or an item on a menu which can be subjected to a switching operation.

Figures 41A, 41B, 41C:
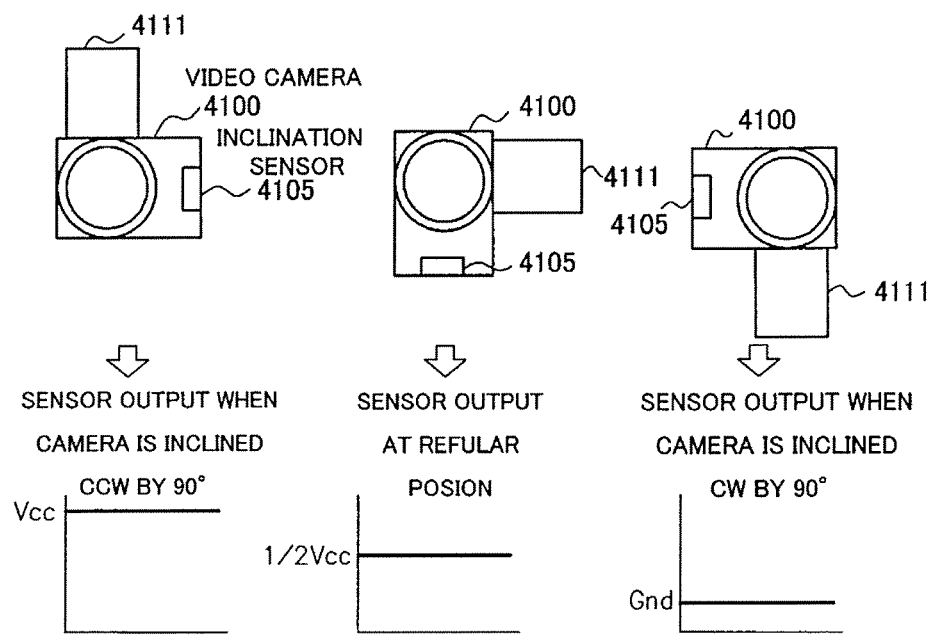
FIGS. 41A to 41C are diagrams showing the relationship between the inclination of the video camera and an output from the inclination sensor.

FIGS. 41A to 41C are diagrams showing the relationship between the inclination of the video camera and the output from the inclination sensor 4105. In FIGS. 41A to 41C, reference numerals 4100, 4111, and 4105 denote the video camera, the liquid crystal panel as the display device, and the inclination sensor (acceleration sensor), respectively. Appropriately setting of the gain of the amplifier circuit 4106 in FIG. 40 enables the sensor output from the inclination sensor 4105 to be set within the voltage range described below.

FIG. 41B shows that the video camera 4100 is at a regular position. The output from the inclination sensor 4105 is equal to half of a power supply voltage Vcc. In contrast, inclining the video camera 4100 counterclockwise by 90° as shown in FIG. 41A provides the output from the inclination sensor 4105 equal to the power supply voltage Vcc. Conversely, inclining the video camera 4100 clockwise by 90° as shown in FIG. 41C provides the output from the inclination sensor 4105 at a GND level.

For the inclinations between those shown in FIG. 41A and FIG. 41B and between those shown in FIG. 41B and FIG. 41C, the output from the inclination sensor 4105 changes linearly with the inclination. On the basis of a voltage corresponding to the inclination, the display controlling part 4114 generates the inclination guide display signal indicating the inclination. The inclination guide display signal is synthesized on the video signal via the display processing circuit 4110 to superimposedly display the inclination guide 4403 in the picked-up image 4401 on the screen of the display device 4111.

Figure 42:
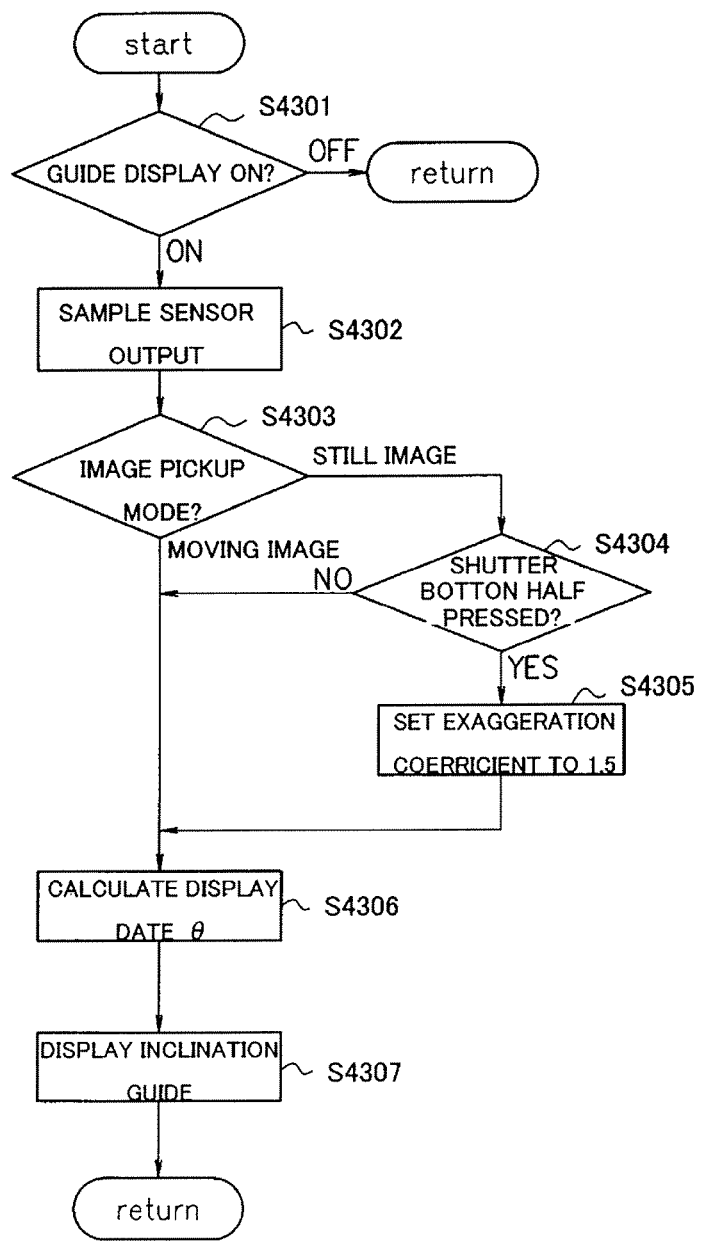
FIG. 42 is a flowchart illustrating the processing operation performed by a camera system controlling microcomputer that is Embodiment 14.

FIG. 42 is a flowchart illustrating the processing operation performed by the display controlling part 4114 in the camera system controlling microcomputer 4112 to display the inclination guide. In step S4301, the process determines whether or not the guide display ON/OFF switch 4117 is on. If the guide display ON/OFF switch 4117 is off, the process returns to a main routine without providing any output to the display processing circuit 4110. In contrast, if the guide display ON/OFF switch 4117 is on, the process proceeds to step S4302 to sample a sensor output of the inclination sensor 4105, and then proceeds to step S4303.

In step S4303, the process checks the setting of the mode switch 4115 to determine whether the image pickup mode is the moving image pickup mode or the still image pickup mode. In the moving image pickup mode, the process proceeds to step S4306 with the level of exaggeration of the inclination guide display set at the normal value. In contrast, in the still image pickup mode, the process proceeds to step S4304.

In step S4304, the process determines whether or not the shutter button 4116 is in a half pressed position. If the shutter button 4116 is in the half pressed position, the process proceeds to step S4305 to set the exaggeration of the inclination guide display at a higher level. This is an operation for exaggerating the inclination guide display. If the shutter button 4116 is not in the half pressed position, the process proceeds to step S4306 with the exaggeration of the inclination guide display at the normal level.

Specifically, the level of exaggeration of the inclination guide display is set by setting an exaggeration coefficient indicating the level of exaggeration. The exaggeration coefficient is normally set to "1". However, when the process determines in step S4304 that the shutter button 4116 is in the half pressed position, the exaggeration coefficient is set to "1.5" in step S4305.

In step S4306, display angle data θ indicating an angle at which the inclination guide is displayed is calculated on the basis of the sensor output of the inclination sensor 4105 and the inclination sensitivity set as described above. The calculation is executed as follows:

=(exaggeration coefficient)×(sensor output).

Figure 43:
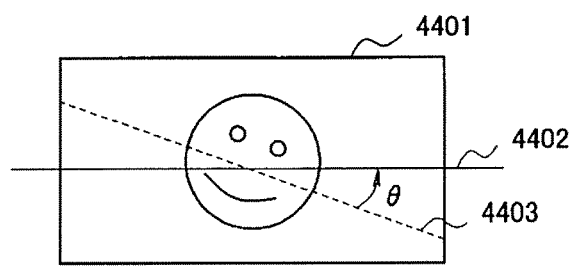
FIG. 43 is a diagram showing how an inclination guide display is provided on a display device.

The exaggeration coefficient used herein refers to the value set above, and the sensor output refers to the output from the amplifier circuit 4106 loaded in step S4301. Further, the display angle data θ indicates the angle between the inclination guide 4403 and a horizontal line 4402 shown in FIG. 43. The above equation enables the angle of the inclination guide 4403 to be exaggeratedly displayed in accordance with the image pickup mode and the pressed position of the shutter button 4116 even if the inclination sensor 4105 detects the same inclination.

After calculation of the display angle data θ, the process proceeds to step S4307, where the display processing circuit 4110 executes a displaying process and then displays the inclination guide on the display device 4111.

In many applications, in the moving image pickup mode, the user picks up an image of a moving object with the video camera held by his or her hand while panning it for chasing the object. It is thus difficult for the user to keep the camera horizontal. A sensitive movement of the inclination guide display may be cumbersome to the user. Further, in the still image pickup mode, framing is performed except for the case where the shutter button 4116 is in the half pressed position. Thus, maintaining the normal setting without exaggerating the inclination guide display makes it possible to prevent the user from feeling uncomfortable in operating the video camera.

In contrast, in the still image pickup mode, if the shutter button 4116 is in the half pressed position, then in order to record that scene, the user checks whether or not the composition is as intended, particularly whether or not the object is inclined, and attempts to hold the camera horizontal so as to avoid inclining the object. Thus, in this case, the inclination guide is displayed by exaggerating the inclination detected by the inclination sensor 4105 by 1.5 times. This enables a slighter inclination to be presented to the user so that the user can more easily recognize it.

This configuration makes it possible to prevent a recorded image from being inclined and to eliminate the need for rotational corrections during reproduction of an inclined image. Moreover, if the shutter button 4116 is in the half pressed position, AF (auto focus), AE, and the like are locked to reduce disadvantageous processing loads. This enables a smooth and sensitive inclination guide display.

Embodiment 15

Embodiment 15 of the present invention will be described. The configuration of a video camera that is Embodiment 15 is similar to that of Embodiment 14, and its detailed description is thus omitted.

Figure 44:
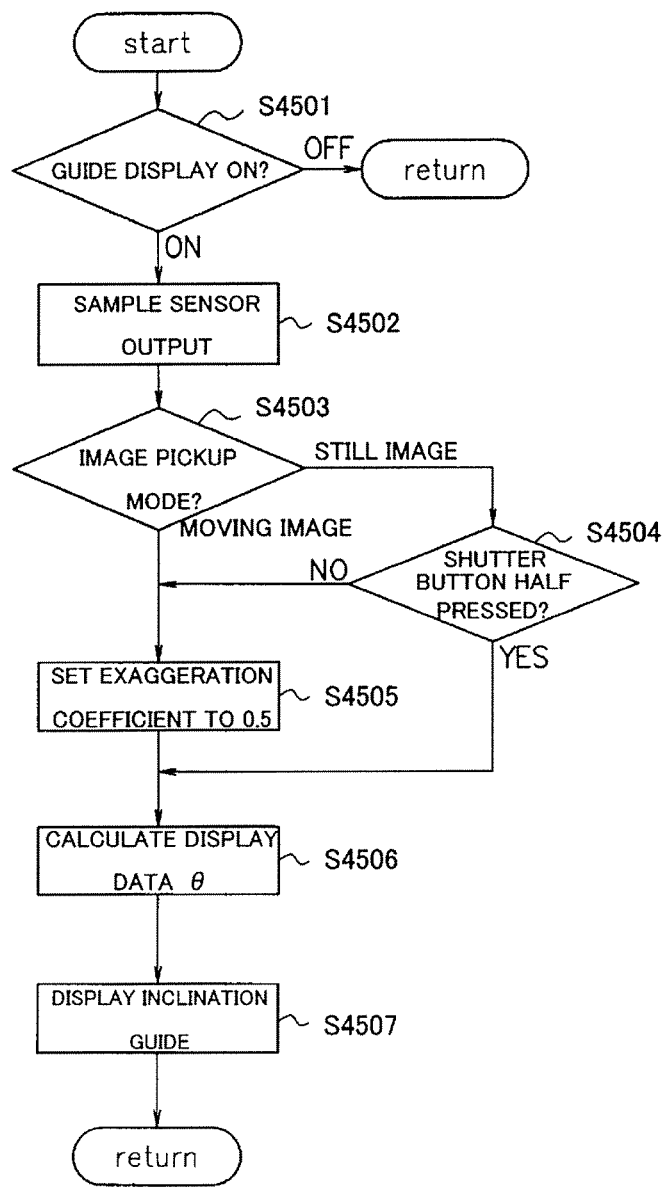
FIG. 44 is a flowchart illustrating the processing operation performed by a camera system controlling microcomputer that is Embodiment 15.

FIG. 44 is a flowchart illustrating the display processing operation performed by the display controlling part 4114 in the camera system controlling microcomputer 4112 to display the inclination guide. In step S4501, the process determines whether or not the guide display ON/OFF switch 4117 is on. If the guide display ON/OFF switch 4117 is off, the process returns to the main routine without providing any output to the display processing circuit 4110. In contrast, if the guide display ON/OFF switch 4117 is on, the process proceeds to step S4502 to sample the sensor output of the inclination sensor 4105, and then proceeds to step S4503.

In step S4503, the process checks the setting of the mode switch 4115 to determine whether the image pickup mode is the moving image pickup mode or the still image pickup mode. In the moving image pickup mode, the process proceeds to step S4505 to set the sensitivity (the level of exaggeration) of the inclination guide display at a lower level, and then, the process proceeds to step S4506. In contrast, in the still image pickup mode, the process proceeds to step S4504.

In step S4504, the process determines whether or not the shutter button 4116 is in the half pressed position. When the shutter button 4116 is in the half pressed position, the process proceeds to step S4506 with the exaggeration coefficient for the inclination guide display kept at "1", which is the normal value. If the shutter button 4116 is not in the half pressed position, the process proceeds to step S4505 to set the exaggeration coefficient for the inclination guide display at "0.5" and then proceeds to step S4506. This is an operation for making the inclination guide display unnoticeable.

Specifically, the level of exaggeration of the inclination guide display is set by setting the exaggeration coefficient indicating the level of exaggeration. The exaggeration coefficient is normally set to "1". However, when the process determines in step S4304 that the image pickup mode is the moving image pickup mode or when the shutter button 4116 is not in the half pressed position in the still image pickup mode, the exaggeration coefficient is set to "0.5" in step S4506.

In step S4506, display angle data θ indicating an angle at which the inclination guide is displayed is calculated on the basis of the sensor output from the inclination sensor 4105 and the inclination sensitivity set as described above. The calculation is executed as follows:

=(exaggeration coefficient)×(sensor output).

The exaggeration coefficient used herein refers to the value set above, and the sensor output refers to the output from the amplifier circuit 4106 loaded in step S4501. Further, the display angle data θ indicates the angle between the inclination guide 4403 and the horizontal line 4403 shown in FIG. 43. The above equation enables the angle of the inclination guide 4403 to be made unnoticeable in accordance with the image pickup mode and the pressed position of the shutter button 4116 even if the inclination sensor 4105 detects the same inclination.

After calculation of the display angle data θ, the process proceeds to step S4507, where the display processing circuit 4110 executes a displaying process and then displays the inclination guide on the display device 4111.

In many applications, in the moving image pickup mode, the user picks up an image of a moving object with the video camera held by his or her hand while panning it for chasing the object. It is thus difficult for the user to keep the camera horizontal. A sensitive movement of the inclination guide display may be cumbersome to the user. Further, in the still image pickup mode, framing is performed except for the case where the shutter button 4116 is in the half pressed position. Thus, in these cases, displaying the inclination guide at an angle smaller than the inclination detected by the inclination sensor 4105 makes it possible to prevent the user from feeling uncomfortable in operating the video camera.

In contrast, in the still image pickup mode, if the shutter button 4116 is in the half pressed position, then in order to record that scene, the user checks whether or not the composition is as intended, particularly whether or not the object is inclined, and attempts to hold the camera horizontal so as to avoid inclining the object. Thus, in this case, the inclination guide is displayed at the inclination detected by the inclination sensor 4105. This enables a slighter inclination to be presented to the user so that the user can more easily recognize it.

Embodiment 16

Figure 45:
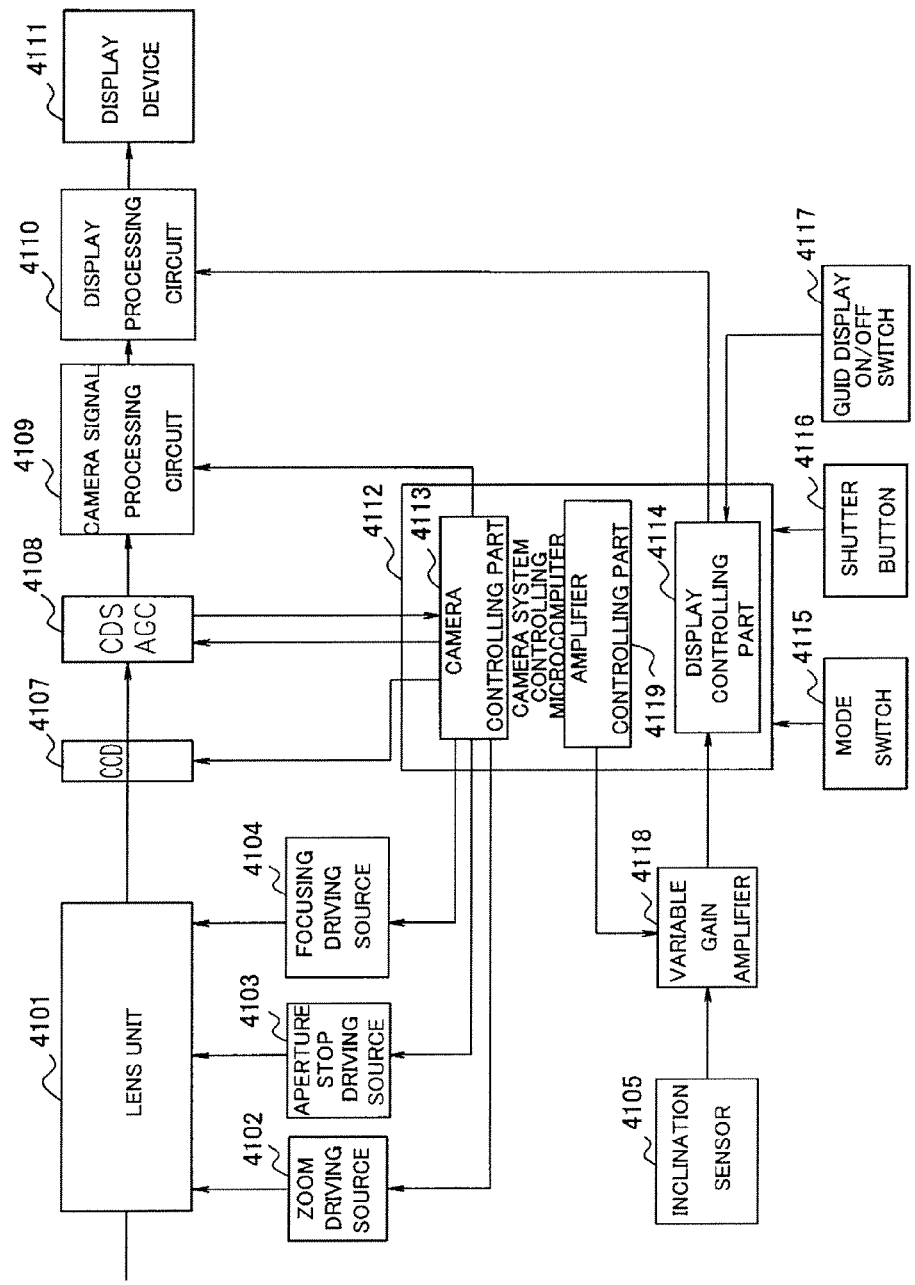
FIG. 45 is a block diagram showing the outlined configuration of a video camera that is Embodiment 16.

Embodiment 16 of the present invention will be described. As shown in FIG. 45, the basic configuration of the video camera that is Embodiment 16 is similar to that shown in FIG. 40 except that the amplifier circuit 4106 is replaced with a variable gain amplifier circuit 4118. The variable gain amplifier circuit 4118 changes the gain of the sensor output from the inclination sensor 4105. This enables a variation in the detection sensitivity of an inclination detector constituted by the inclination sensor 4105 and the variable gain amplifier circuit 4118. The gain setting can be changed by an amplifier controlling part 4119 provided in the camera system controlling microcomputer 4112, in accordance with the state of the mode switch 4115 and the pressed position of the shutter button 4116.

Figure 47:
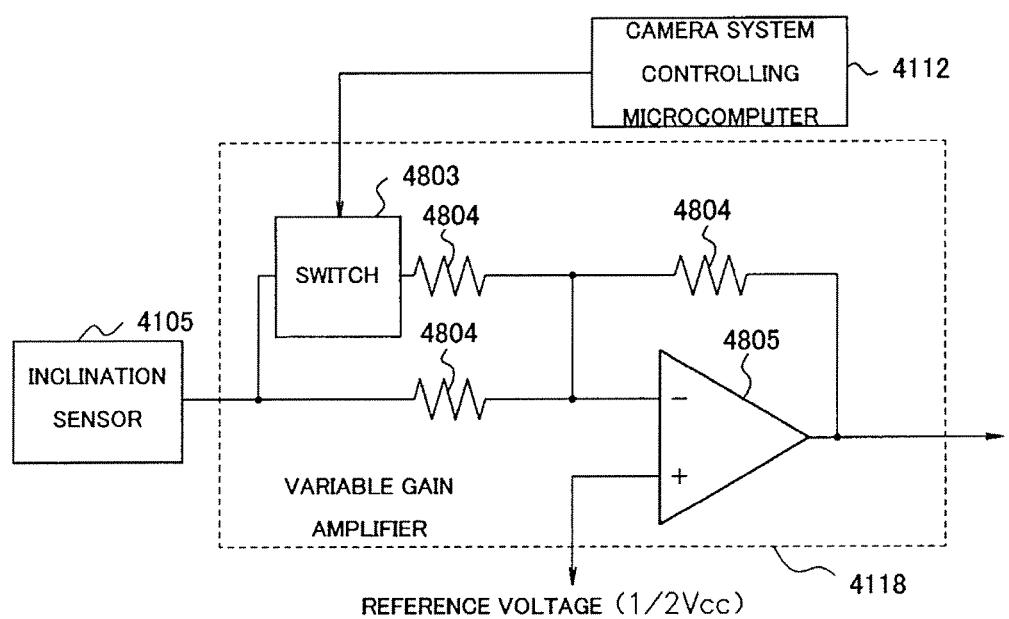
FIG. 47 is a diagram showing an example of configuration of a variable gain amplifier circuit at is Embodiment 16.

FIG. 47 is a diagram showing an example of configuration of the variable gain amplifier circuit 4118. The variable gain amplifier circuit 4118 is constituted by an amplifier 4805, resistors 4804, and a gain switch 4803. A switch signal from the camera system controlling microcomputer 4112 connects input resistors in parallel with each other with respect to the amplifier 4805 to increase the gain of the amplifier 4805. The gain change is effected in order to exaggerate the guide display for the fixed image pickup.

Figure 46:
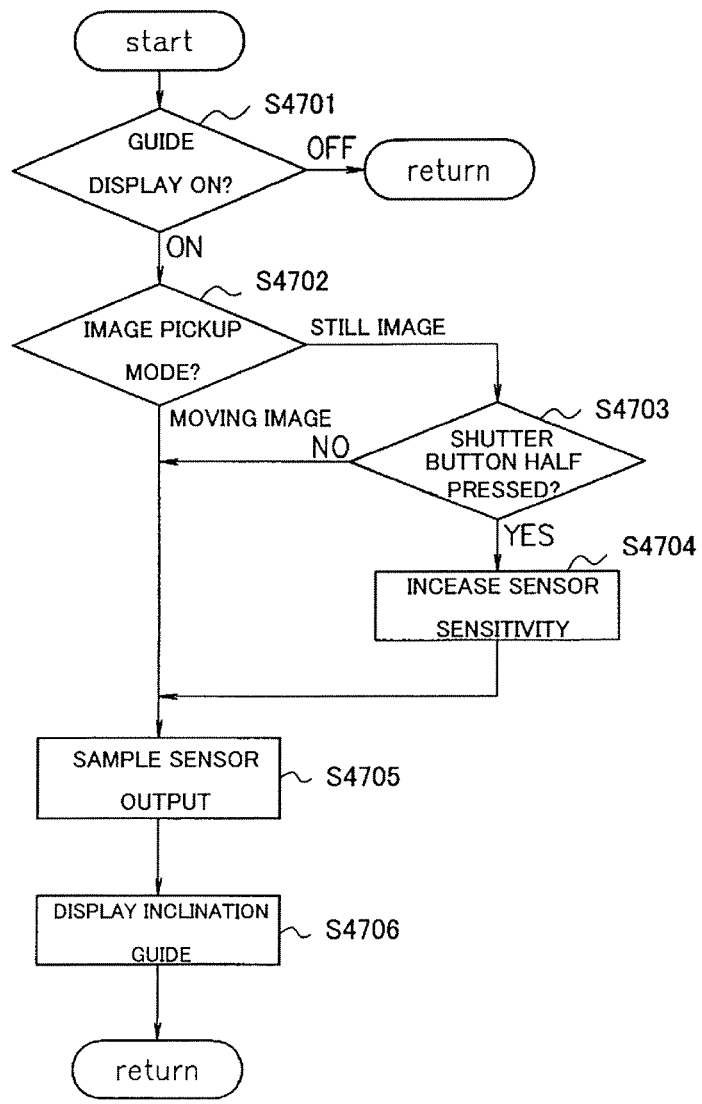
FIG. 46 is a flowchart illustrating the processing operation performed by a camera system controlling microcomputer that is Embodiment 16.

FIG. 46 is a flowchart illustrating the display processing operation performed by the guide display controlling part 4114 and amplifier controlling part 4119 in the camera system controlling microcomputer 4112 to display the inclination guide. In step S4701, the process determines whether or not the guide display ON/OFF switch 4117 is on. If the guide display ON/OFF switch 4117 is off, the process returns to the main routine without providing any output to the display processing circuit 4110. In contrast, if the guide display ON/OFF switch 4117 is on, the process proceeds to step S4702.

In step S4702, the process checks the setting of the mode switch 4115 to determine whether the image pickup mode is the moving image pickup mode or the still image pickup mode. In the moving image pickup mode, the process proceeds to step S4705 with the gain of the variable gain amplifier circuit 4118 kept at a normal set value, that is, with the detection sensitivity of the inclination detector kept at a normal set value. In contrast, in the still image pickup mode, the process proceeds to step S4703.

In step S4703, the process determines whether or not the shutter button 4116 is in the half pressed position. If the shutter button 4116 is in the half pressed position, the process proceeds to step S4704 to increase the gain of the variable gain amplifier circuit 4118, that is, to set the detection sensitivity of the inclination detector at a higher level. This is an operation for exaggerating the inclination guide display. If the shutter button 4116 is not in the half pressed position, the process proceeds to step S705 with the gain of the variable gain amplifier circuit 4118 kept at the normal set value, that is, with the detection sensitivity of the inclination detector kept at the normal set value.

In step S4705, the sensor output of the inclination sensor 4105 is sampled. In step S4706, the inclination guide is displayed on the display device 4111 via the display processing circuit 4110.

In many applications, in the moving image pickup mode, the user picks up an image of a moving object with the video camera held by the user's hand while panning it for chasing the object. It is thus difficult for the user to keep the camera horizontal. A sensitive movement of the inclination guide display may be cumbersome to the user. Further, in the still image pickup mode, framing is performed except for the case where the shutter button 4116 is in the half pressed position. Thus, in these cases, keeping the detection sensitivity of the inclination detector at the normal set value, that is, a relatively small value, makes it possible to prevent the user from feeling uncomfortable in operating the video camera.

In contrast, in the still image pickup mode, if the shutter button 4116 is in the half pressed position, then in order to record that scene, the user checks whether or not the composition is as intended, particularly whether or not the object is inclined, and attempts to hold the camera horizontal so as to avoid inclining the object. Thus, in this case, setting the detection sensitivity of the inclination detector at a higher level enables a slighter inclination to be presented to the user so that the user can more easily recognize it.

This configuration makes it possible to prevent a recorded image from being inclined and to eliminate the need for rotational corrections during reproduction of an inclined image. Moreover, if the shutter button 4116 is in the half pressed position, AF (auto focus), AE, and the like are locked to reduce disadvantageous processing loads. This enables a smooth and sensitive inclination guide display.

Embodiment 17

Embodiment 17 of the present invention will be described. The configuration of a video camera that is Embodiment 17 is similar to that in Embodiment 16 and its detailed description is thus omitted.

Figure 49:
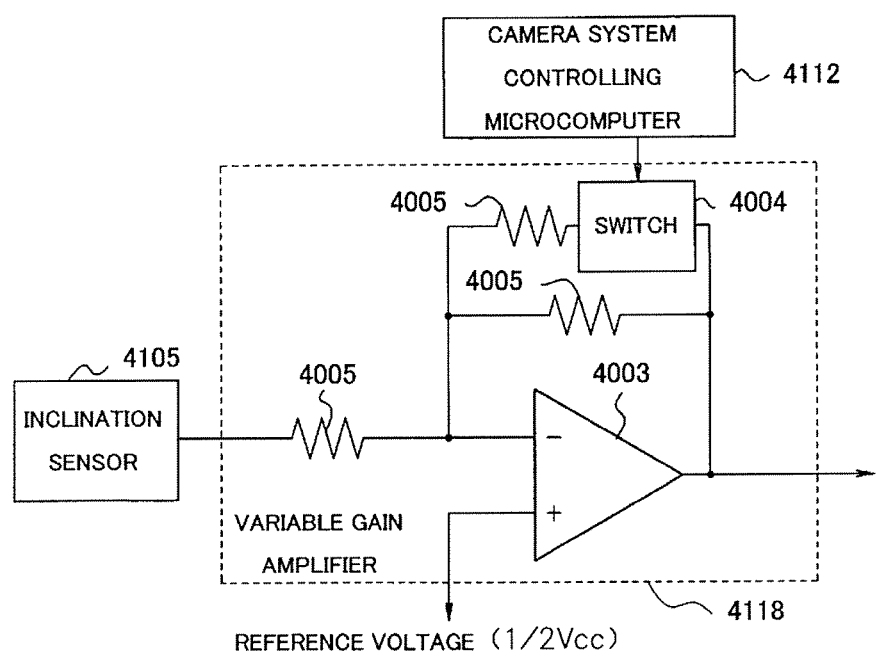
FIG. 49 is a diagram showing an example of configuration of a variable gain amplifier circuit that is Embodiment 17.

FIG. 49 is a diagram showing an example of configuration of the variable gain amplifier circuit 4118. The variable gain amplifier 4118 is constituted by an amplifier 4003, resistors 4005, and a gain switch 4004. A switch signal from the camera system controlling microcomputer 4112 connects feedback resistors in parallel with each other with respect to the amplifier 4003 to decrease the gain of the amplifier 4003. The gain change is effected in order to make the inclination guide display unnoticeable.

Figure 48:
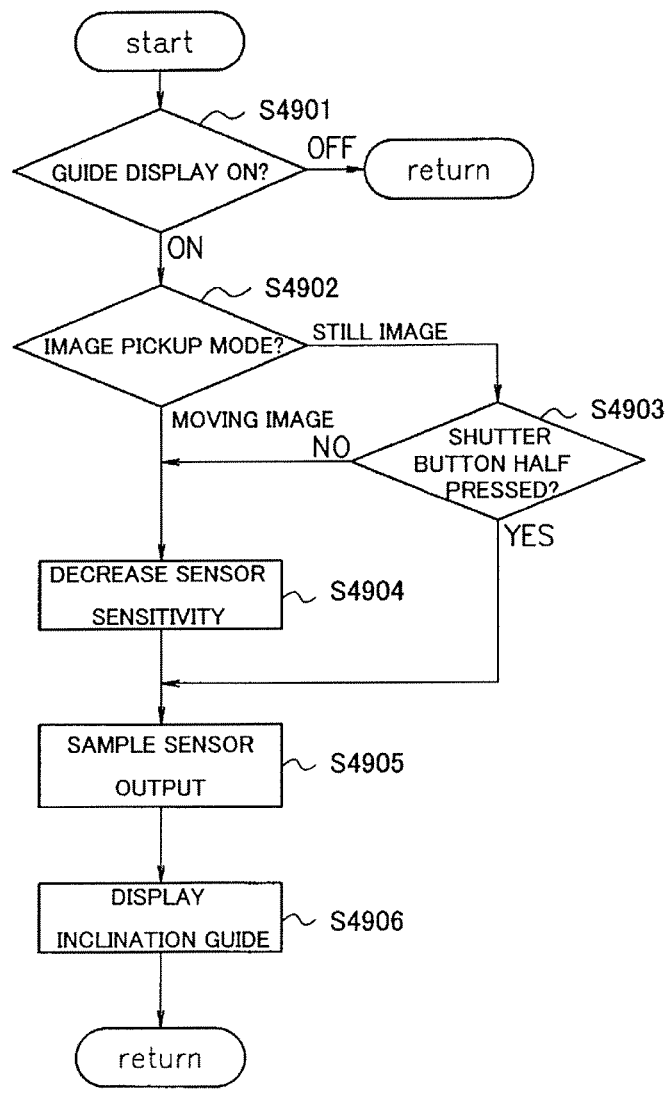
FIG. 48 is a flowchart illustrating the processing operation performed by a camera system controlling microcomputer that is Embodiment 17.

FIG. 48 is a flowchart illustrating the display processing operation performed by the guide display controlling part 4114 and amplifier controlling part 4119 in the camera system controlling microcomputer 4112 to display the inclination guide. In step S4901, the process determines whether or not the guide display ON/OFF switch 4117 is on. If the guide display ON/OFF switch 4117 is off, the process returns to the main routine without providing any output to the display processing circuit 4110. In contrast, if the guide display ON/OFF switch 4117 is on, the process proceeds to step S4902.

In step S4902, the process checks the setting of the mode switch 4115 to determine whether the image pickup mode is the moving image pickup mode or the still image pickup mode. In the moving image pickup mode, the process proceeds to step S4904 to reduce the gain of the variable gain amplifier circuit 4118, that is, to set the detection sensitivity of the inclination detector at a lower level. The process then proceeds to step S4905. In contrast, in the still image pickup mode, the process proceeds to step S4903.

In step S4903, the process determines whether or not the shutter button 4116 is in the half pressed position. If the shutter button 4116 is in the half pressed position, the process proceeds to step S4905 with the gain of the variable gain amplifier circuit 4118 kept at the normal set value, that is, with the detection sensitivity of the inclination detector kept at the normal set value. If the shutter button 4116 is not in the half pressed position, the process proceeds to step S4904 to reduce the gain of the variable gain amplifier circuit 4118, that is, to set the detection sensitivity of the inclination detector at a smaller value. This is an operation for making the inclination guide display unnoticeable.

In step S4905, the sensor output from the inclination sensor 4105 is sampled. In step S4906, the inclination guide is displayed on the display device 4111 via the display processing circuit 4110.

In many applications, in the moving image pickup mode, the user picks up an image of a moving object with the video camera held by his or her hand while panning it for chasing the object. It is thus difficult for the user to keep the camera horizontal. A sensitive movement of the inclination guide display may be cumbersome to the user. Further, in the still image pickup mode, framing is performed except for the case where the shutter button 4116 is in the half pressed position. Thus, in these cases, setting the detection sensitivity of the inclination detector at a smaller value makes it possible to prevent the user from feeling uncomfortable in operating the video camera.

In contrast, in the still image pickup mode, if the shutter button 4116 is in the half pressed position, then in order to record that scene, the user checks whether or not the composition is as intended, particularly whether or not the object is inclined, and attempts to hold the camera horizontal so as to avoid inclining the object. Thus, in this case, keeping the detection sensitivity of the inclination detector at the normal set value, that is, a relatively large value, enables a slighter inclination to be presented to the user so that the user can more easily recognize it.

Embodiment 18

Figure 50:
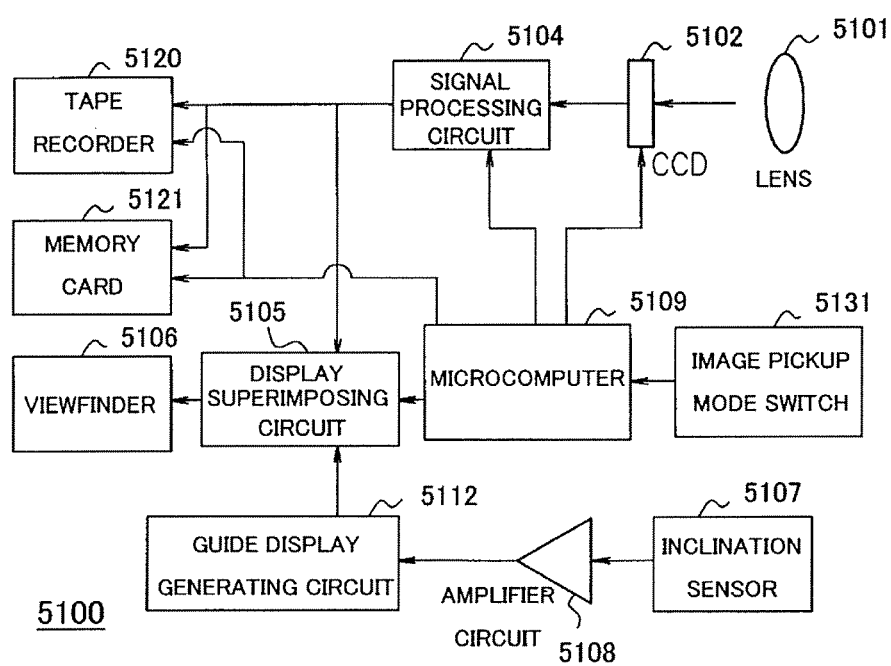
FIG. 50 is a block diagram showing the configuration of a video camera that is Embodiment 18 of the present invention.

FIG. 50 is a block diagram showing the configuration of a video camera that is Embodiment 18 of the present invention. In FIG. 50, reference numeral 5101 denotes a lens unit used to pick up an image of an object. Reference numeral 5102 denotes a CCD that photoelectrically converts an object image formed by the lens unit 5101 into an analog image pickup signal.

Reference numeral 5104 denotes a camera signal processing circuit that uses a built-in A/D converter to covert the analog image pickup signal for the object image provided by the CCD 5102 into a digital signal and executes predetermined signal processing such as gamma correction and white balancing on the digital signal to generate a standard video signal.

Reference numeral 5107 denotes an inclination sensor that detects an inclination of the video camera 5100; an acceleration sensor is used for the inclination sensor in the present embodiment. Reference numeral 5108 denotes an amplifier circuit that amplifies an output from the inclination sensor 107. Reference numeral 5112 denotes a guide display generating circuit that generates an inclination guide display signal corresponding to an inclination signal from the inclination sensor 5107 and amplifier circuit 5108.

Reference numeral 5105 denotes a display superimposing circuit that superimposes the inclination guide display signal provided by the guide display generating circuit 5112 on the standard video signal provided by the camera signal processing circuit 5104 to simultaneously display them on a viewfinder 5106.

Reference numeral 5131 denotes an image pickup mode switch operated by a user according to his or her image pickup intention to switch between a still image pickup mode and a moving image pickup mode.

Reference numeral 5120 denotes a tape recorder in which the standard video signal processed by the camera signal processing circuit 5104 is recorded. Reference numeral 5121 denotes a memory card in which a standard still image signal processed by the camera signal processing circuit 5104 is recorded.

Reference numeral 5109 denotes a microcomputer that controls the drive of the CCD 5102, the camera signal processing circuit 5104 and the like in accordance with the operation of the image pickup mode switch 5131 to switch the method for signal processing between still image processing and moving image processing. The microcomputer also controls the system so that a moving image is recorded in the tape recorder 5120, while a still image is recorded in the memory card 5121. The microcomputer further controls the display superimposing circuit 5105.

Reference numeral 5106 denotes the viewfinder that displays an image generated by superimposing the inclination guide display signal on the standard video signal by the display superimposing circuit 5105.

Next, the operation of each part will be described. First, an object image formed by the lens unit 5101 is photoelectrically converted by the CCD 5102, and the converted image is further converted into a digital signal by the camera signal processing circuit 5104. Predetermined signal processing such as gamma correction and white balancing is executed on the digital signal. As a result, the standard video signal is output and transmitted to the tape recorder 5120 and memory card 5121.

On the other hand, the inclination signal provided by the inclination sensor 5107 is subjected to predetermined amplification by the amplifier circuit 5108. The guide display generating circuit 5112 outputs the inclination guide signal corresponding to the inclination signal. The display superimposing circuit 5105 superimposes the inclination guide display signal on the standard video signal, and the resulting signal is displayed on the viewfinder 5106.

Next, description will be given of a process involved in switching of the image pickup mode. First, description will be given of the case where the image pickup mode switch 5131 is switched to select the still image pickup mode.

Selection of the still image pickup mode enables the microcomputer 5109 to control reading of all the pixels in the CCD 5102 and also switches the camera signal processing circuit 5104 to a state of performing the still image processing. At the same time, the memory card 5121 is selected as a recording medium.

Moreover, switching of the image pickup mode switch 5131 causes a display superimposition control signal to be transmitted to the display superimposing circuit 5105 via the microcomputer 5109. The display superimposing circuit 5105 performs or stops the superimposition of the guide display signal generated by the guide display generating circuit 5112 on the standard video signal provided by the camera signal processing circuit 5104, in accordance with the display superimposition control signal. Accordingly, if the still image pickup mode is selected by the image pickup mode switch 5131, the display superimposing circuit 5105 is enabled to provide an inclination guide display.

Next, description given of the case where the image pickup mode switch 5131 is switched to select the moving image pickup mode.

Selection of the moving image pickup mode enables the microcomputer 5109 to control reading of the moving image area in the CCD 5102 and also switches the camera signal processing circuit 104 to a state of performing the moving image processing. At the same time, the tape recorder 5120 is selected as a recording medium.

Moreover, if the moving image pickup mode is selected by the image pickup mode switch 5131, the display superimposing circuit 5105 prohibits the provision of the inclination guide display.

Figure 51:
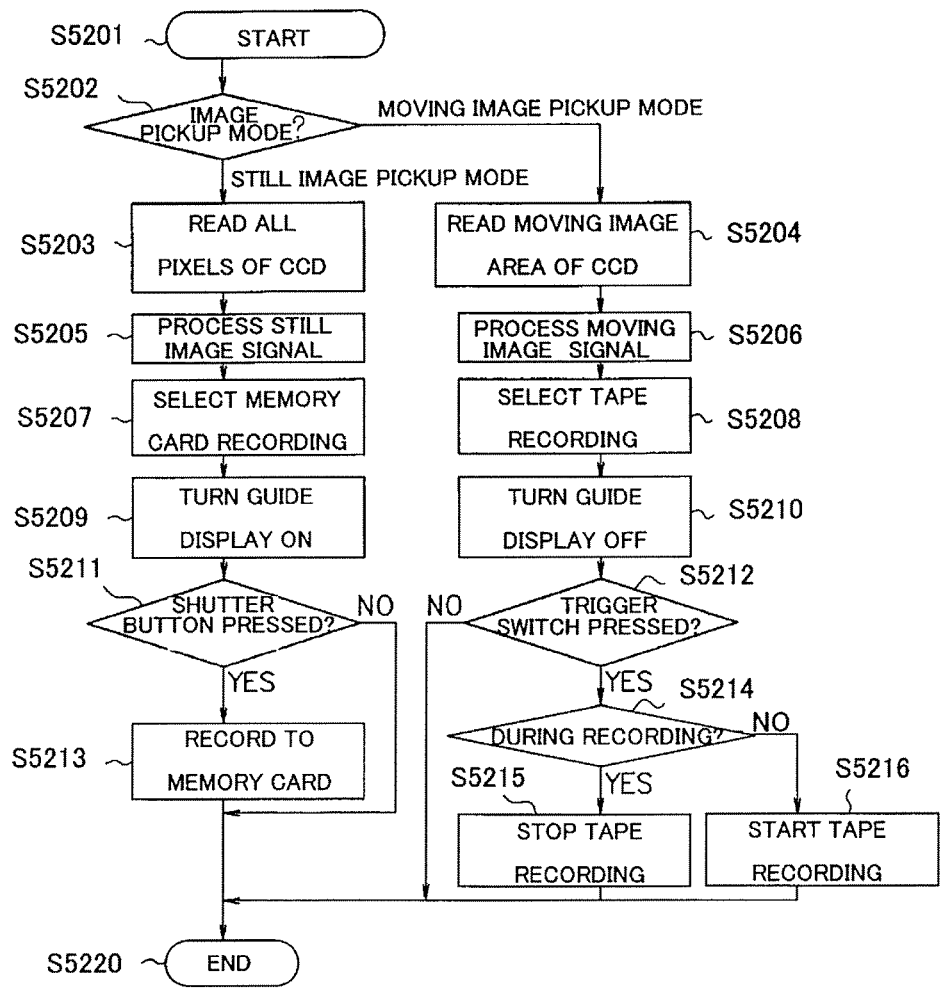
FIG. 51 is a flowchart illustrating the operation performed by the video camera that is Embodiment 18 of the present invention.

Next, processing executed by the microcomputer 5109 will be described with reference to FIG. 51. FIG. 51 is a flowchart associated with the operation of the microcomputer 5109 for switching the image pickup mode.

FIG. 51 will be sequentially described. The flow starts at step S5201, and the flow is repeatedly performed at a predetermined period corresponding to, for example, video synchronization.

In step S5202, the image pickup mode selected via the image pickup mode switch 5131 is checked. If the image pickup mode is set to the still image pickup mode, the process proceeds to step S5203. If the image pickup mode is set to the moving image pickup mode, the process proceeds to step S5204.

First, description will be given of the case where the still image pickup mode is selected as the image pickup mode. In step S5203, the selection of the still image pickup mode sets the reading mode of the CCD 5102 to an all-pixel still image reading mode.

Then, in step S5205, signal processing executed by the camera signal processing circuit 5104 is similarly switched to the still image signal processing. Specifically, an analog image signal read from the CCD 5102 is analog-to-digital converted to generate still image data. The converted digital signal is then subjected to predetermined signal processing such as still image gamma correction and white balancing. Then, standard still image data is generated at every predetermined timing such as the video synchronization.

Then, in step S5207, the memory card 5121 is selected as a recording medium.

Then, in step 5209, the output of the inclination guide display is permitted, and the display superimposing circuit 5105 performs a superimposing operation. An image signal produced by superimposing the inclination guide display on the standard video signal is transmitted to the viewfinder 5106 for display.

Then, in step S5211, the process determines whether or not the shutter button (not shown) has been pressed. If the shutter button has been pressed, the process proceeds to step S5213. If the shutter button has not been pressed, the process proceeds to step S5220 and then ends.

If the shutter button has been pressed, then in step S5213, an image picked up at that time is recorded in the memory card 5121. The process proceeds to step S5220 and then ends.

If the above process selects the still image pickup mode, the inclination guide display is displayed on the viewfinder 5106.

Next, description will be given of the case where the moving image pickup mode is selected as the image pickup mode in step S5202.

First, in step S5204, since the moving image pickup mode is selected as the image pickup mode, the reading mode of the CCD 5102 is set to a moving image reading mode.

Then, in step S5206, the signal processing by the camera signal processing circuit 5104 is also switched to the moving image signal processing. Specifically, the analog image signal read from the CCD 5102 is analog-to-digital converted to generate moving image data. The converted digital signal is then subjected to predetermined signal processing such as moving image gamma correction and white balancing to generate the standard video signal at every predetermined timing such as standard video synchronization.

In step S5208, the tape recorder 5120 is selected as a recording medium.

In step S5210, the output of the inclination guide display is prohibited to stop the superimposing operation of the display superimposing circuit 5105. The standard video signal is transmitted to and displayed on the viewfinder 5106 as it is.

In step S5212, the process determines whether or not a trigger switch (not shown) has been pressed. If the trigger switch has been pressed, the process proceeds to step S5214. If the trigger switch has not been pressed, the process proceeds to step S5220 and then ends.

If the trigger switch has been pressed, then the process determines in step S5214 whether or not moving image recording is being performed. If the moving image recording is being performed, the process proceeds to step S5215. If the moving image recording is not being performed, the process proceeds to step S5216.

If the moving image recording is being performed, then in step S5215, the moving image recording is stopped in response to the operation of the trigger switch.

If the moving image recording is not being performed, then in step S5216, the moving image recording is started in response to the operation of the trigger switch.

According to the above processes, if the moving image pickup mode is selected, the inclination guide display is not displayed on the viewfinder 106, with only the picked-up image displayed on the viewfinder 106.

Figures 52A, 52B, 52C:
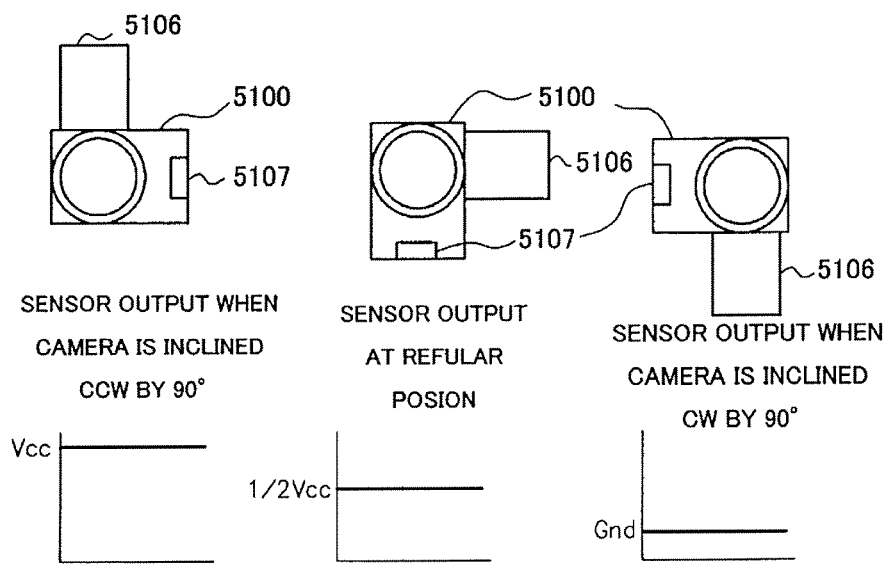
FIGS. 52A to 52C are diagrams illustrating an inclination sensor for a video camera that is a first embodiment of the present invention.

FIGS. 52A to 52C are diagrams showing the relationship between the inclination of the video camera 5100 and the output of the inclination sensor 5107 (acceleration sensor). In FIGS. 52A to 52C, reference numerals 5100, 5106, and 5107 denote the video camera, the viewfinder as the display device, and the inclination sensor (acceleration sensor) respectively. Appropriately setting of the gain of the amplifier circuit 5108 makes it possible to set the output from the inclination sensor 5107 to have the voltage range described below.

FIG. 52B shows that the video camera is at a regular position. In this state, the output of the inclination sensor 5107 is equal to about half of a power supply voltage Vcc. In contrast, inclining the video camera 5100 clockwise by 90° as shown in FIG. 52A provides the output of the inclination sensor 5107 close to the power supply voltage Vcc. Conversely, inclining the video camera 5100 counterclockwise by 90° as shown in FIG. 52C provides the output of the inclination sensor 5108 close to a GND level.

For the inclinations between those shown in FIG. 52A and FIG. 52B and between those shown in FIG. 52B and FIG. 52C, the output of the inclination sensor 5108 changes linearly with the inclination. This causes the guide display generating circuit 5112 to generate an image indicating the inclination on the basis of the voltage corresponding to the inclination. The image is synthesized on the standard video signal via the display superimposing circuit 5105. The synthesized image is displayed on the viewfinder 5106.

Figure 53:
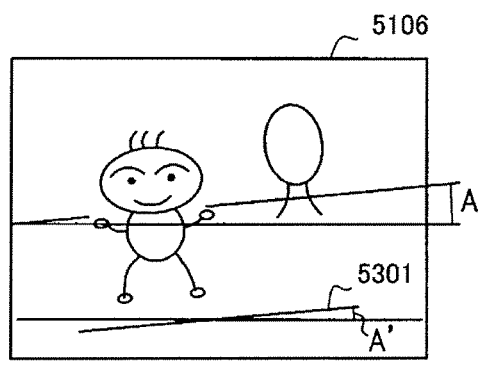
FIG. 53 is a diagram showing a display example of an inclination guide display in the video camera that is Embodiment 18 of the present invention.

The image displayed on the viewfinder 5106 will be described with reference to FIG. 53. FIG. 53 shows an example in which the inclination guide display is shown on the viewfinder 5106 when the still image recording mode is set.

In FIG. 53, reference numeral 5301 denotes the inclination guide display generated by the guide display generating circuit 5112. The inclination amount shown by the inclination guide display changes depending on the inclination signal from the inclination sensor 5107. In this case, appropriately adjusting the gain of the amplifier circuit 5108 as previously described enables the inclination to be set to "A", which is approximately equal to the object's inclination (for example, an inclination "A" with respect to the background horizon).

As described above, the video camera 5100 as Embodiment 18 of the present invention shows the inclination guide display in the still image pickup mode and not in the moving image pickup mode. This makes it possible to urge the user to make the inclination of the video camera 5100 unnoticeable in the still image pickup mode and to prevent user's moving image pickup from being disturbed in the moving image pickup mode.

Embodiment 19

Next, Embodiment 19 of the present invention will be described. The configuration of Embodiment 19 provides the inclination guide display both in the still image pickup mode and in the moving image pickup mode. In this case, in particular, when the image pickup mode is switched to the still image pickup mode, the inclination of the guide display relative to the inclination of the image pickup apparatus is increased to improve visibility for the user.

Figure 54:
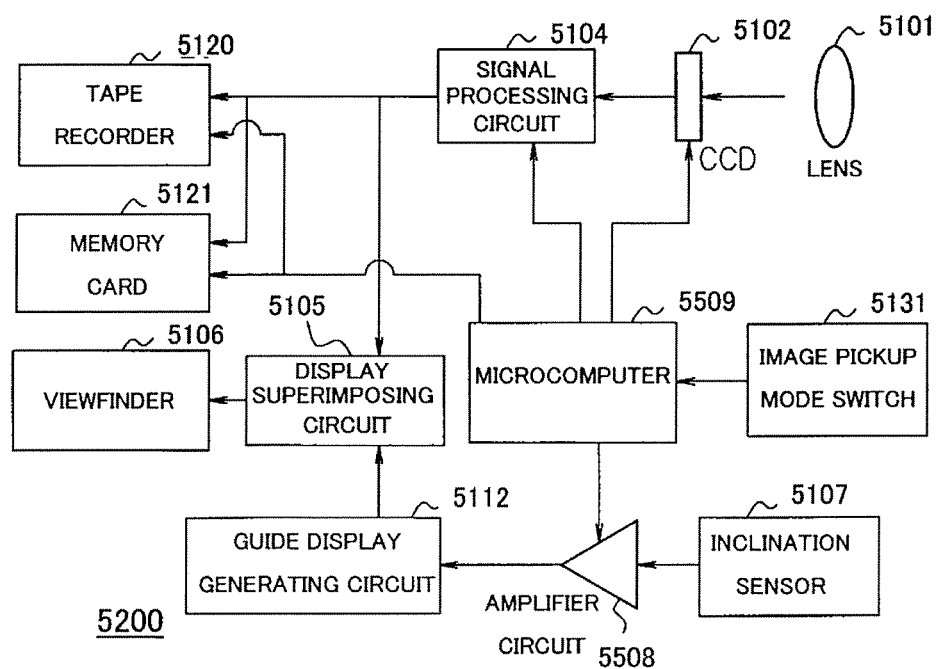
FIG. 54 is a block diagram showing the configuration of a video camera that is Embodiment 19 of the present invention.

Embodiment 19 will be described with reference to FIG. 54. FIG. 54 is a block diagram showing the configuration of a video camera 5200 that is Embodiment 19. The configuration of the video camera of Embodiment 19 is generally similar to that in Embodiment 18. Components of Embodiment 19 common to those in Embodiment 18 will not be described.

First, description will be given of the difference between the video camera 5200 of Embodiment 19 and the video camera 5100 of Embodiment 18.

The video camera 5200 of Embodiment 19 contains a microcomputer 5509 that controls the gain of an amplifier circuit 5508. Like the amplifier circuit 5108 of Embodiment 18, the amplifier circuit 5508 can amplify the output of the inclination sensor 5107 and further change the gain in accordance with an external control signal.

Next, description will be given of processes executed in association with switching of the image pickup mode by the configuration having the amplifier circuit 5508 and being able to control the gain. First, description will be given of the case where the image pickup mode switch 5131 is switched to select the still image pickup mode.

Selection of the still image pickup mode enables the microcomputer 5509 to control reading of all the pixels in the CCD 5102 and to also switch the camera signal processing circuit 5104 to a state of performing still image processing. At the same time, the memory card 5121 is selected as a recording medium.

Moreover, in response to switching of the image pickup mode switch 5131, the gain of the amplifier circuit 5508 is switched to a predetermined value for still image pickup via the microcomputer 5509.

The display superimposing circuit 5105 further superimposes the guide display signal generated by the guide display generating circuit 5112 on the standard video signal provided by the camera signal processing circuit 5104 to show the inclination guide display in the viewfinder 5106.

Next, description will be given of the case where the image pickup mode switch 5131 is switched to select the moving image pickup mode.

Selection of the moving image pickup mode enables the microcomputer 5509 to control reading from the moving image area of the CCD 5102 and to also switch the camera signal processing circuit 5104 to a state of performing moving image processing. At the same time, the tape recorder 5120 is selected as a recording medium.

Moreover, the gain of the amplifier circuit 5508 is changed to one for moving image pickup. The display superimposing circuit 5105 superimposes the guide display signal generated by the guide display generating circuit 5112 on the standard video signal provided by the camera signal processing circuit 5104 to show the inclination guide display in the viewfinder 5106.

Here, when for example, the gain of the amplifier circuit 5508 in the still image pickup mode is double that in the moving image pickup mode, then even with the same inclination, the inclination guide display shown on the viewfinder 5106 has a double inclination in the still image pickup mode.

Figure 55:
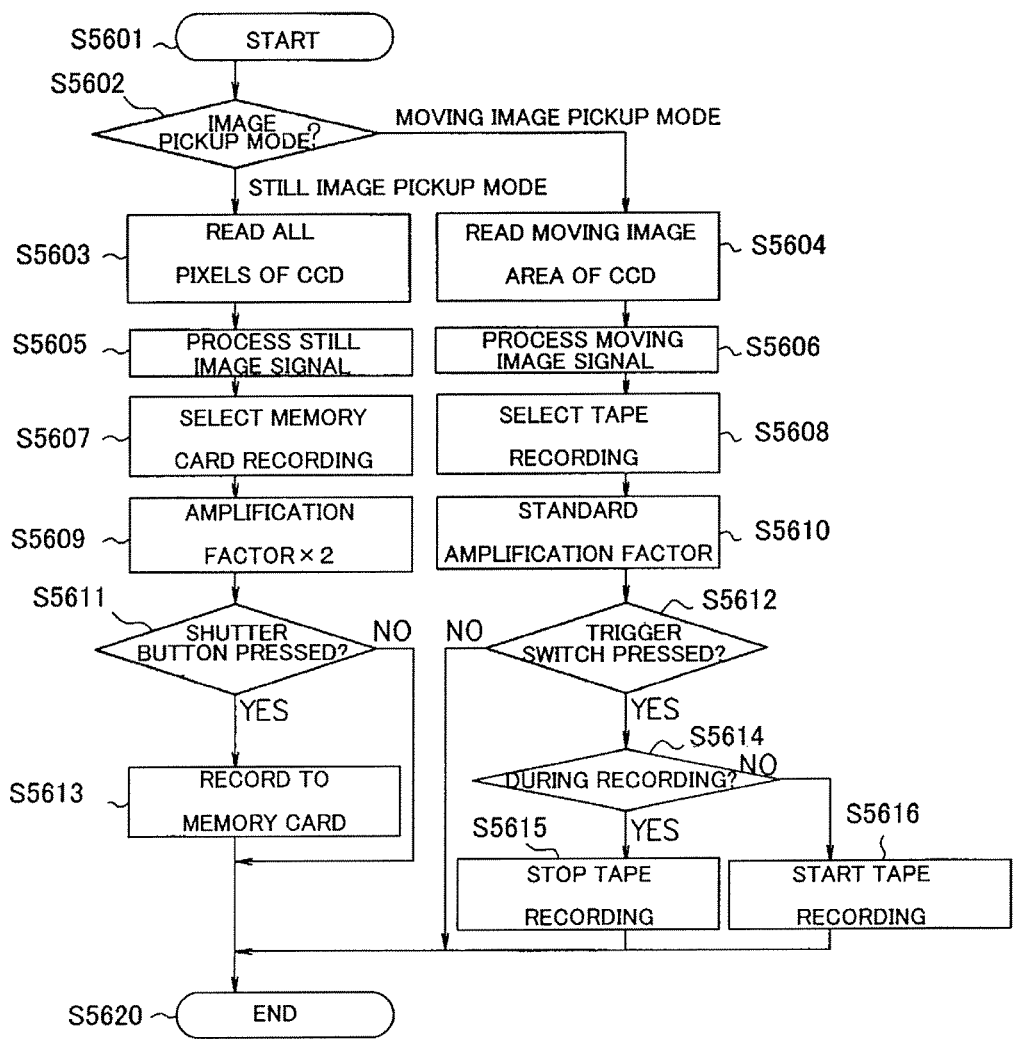
FIG. 55 is a flowchart illustrating the operation performed by the video camera that is Embodiment 19 of the present invention.

With reference to FIG. 55, description will be given of processes executed by the microcomputer 5509 in Embodiment 19. FIG. 55 shows a flowchart of the operation performed by the microcomputer 5509 for switching the image pickup mode.

FIG. 55 will be sequentially described. The flow starts at step S5601, and the flow is repeated at a predetermined period corresponding to, for example, the video synchronization.

In step S5602, the image pickup mode selected via the image pickup mode switch 5131 is checked. If the image pickup mode is set to the still image pickup mode, the process proceeds to step S5603. If the image pickup mode is set to the moving image pickup mode, the process proceeds to step S5604.

First, description will be given of the case where the still image pickup mode is selected as the image pickup mode.

In step S5603, since the still image pickup mode is selected as the image pickup mode, the reading mode of the CCD 5102 is set to the all-pixel still image reading mode.

Then, in step S5605, signal processing executed by the camera signal processing circuit 5104 is also switched to the still image signal processing. Specifically, the analog image signal read from the CCD 5102 is analog-to-digital converted to generate still image data. The converted digital signal is then subjected to predetermined signal processing such as still image gamma correction and white balancing to generate standard still image data at every predetermined timing such as the video synchronization.

In step S5607, the memory card 5121 is selected as a recording medium.

In step S5609, the microcomputer 5109 doubles the gain of the amplifier circuit 5508 (compared to that in the moving image pickup mode) to increase the inclination of the inclination guide display. An image signal containing the inclination guide display superimposed on the standard video signal is transmitted to and displayed on the viewfinder 5106.

Then, in S5611, the process determines whether or not the shutter button (not shown) has been pressed. If the shutter button has been pressed, the process proceeds to S5613. If the shutter button has not been pressed, the process proceeds to S5620 and then ends.

If the shutter button has been pressed, then in step S5613, the current picked-up image is recorded in the memory card 5121. The process then proceeds to step 5620 and then ends.

The above process enables the inclination guide display to be shown on the viewfinder 5106 when the still image pickup mode is selected.

Next, description will be given of the case where the moving image pickup mode is selected as the image pickup mode in step S5602.

First, in step S5604, since the moving image pickup mode is selected as the image pickup mode, the reading mode of the CCD 5102 is set to the moving image reading mode.

Then, in step S5606, signal processing executed by the camera signal processing circuit 5104 is also switched to the moving image signal processing. Specifically, the analog image signal read from the CCD 5102 is analog-to-digital converted to generate moving image data. The converted digital signal is then subjected to predetermined signal processing such as moving image gamma correction and white balancing to generate the standard video signal at every predetermined timing such as the standard video synchronization.

In step S5608, the tape recorder 5120 is selected as a recording medium.

Next, in step S5610, the gain of the amplifier circuit 5508 is changed back to a normal value to adjust the inclination of the inclination guide display to the value of the actual inclination. The inclination guide display is then superimposed on the standard video signal, which is then transmitted to and displayed on the viewfinder 5106.

In step S5612, the process determines whether or not the trigger switch (not shown) has been pressed. If the trigger switch has been pressed, the process proceeds to step S5614. If the trigger switch has not been pressed, the process proceeds to step S5620 and then ends.

If the trigger switch has been pressed, then the process determines in step S5614 whether or not the moving image pickup is being performed. If the moving image pickup is being performed, the process proceeds to step S5615. If the moving image recording is not being performed, the process proceeds to step S5616.

If the moving image recording is being performed, then in step S5615, the moving image recording is stopped in response to the operation of the trigger switch.

If the moving image recording is not being performed, then in step S5616, the moving image recording is started in response to the operation of the trigger switch.

The above process enables the inclination guide display with an increased sensitivity to be displayed on the viewfinder 5106 if the still image pickup mode is selected. That is, the inclination guide display can show an inclination larger than the actual one.

The relationship between the inclination of the video camera 5200 and the output of the inclination sensor 5107 (acceleration sensor) is equivalent to that described above in Embodiment 18 with reference to FIGS. 52A to 52C.

Figures 56A, 56B:
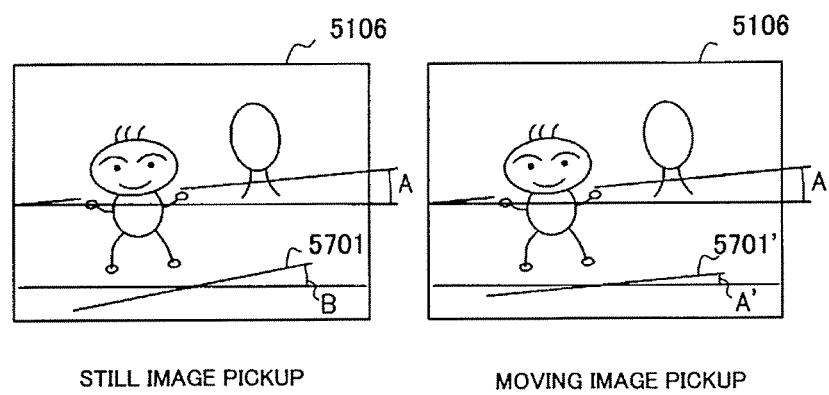
FIGS. 56A and 56B are diagrams showing a display example of an inclination guide display in the video camera that is Embodiment 19 of the present invention.

The image displayed on the viewfinder 5106 will be described with reference to FIGS. 56A and 56B. FIG. 56A shows an example in which the inclination guide display is shown on the viewfinder 5106 when the still image recording mode is set.

In FIG. 56A, reference numeral 5701 denotes the inclination guide display generated by the guide display generating circuit 5112. The inclination of the inclination guide display 5701 changes depending on the inclination signal from the inclination sensor 5107. When the still image pickup mode is set as shown in FIG. 56A, the inclination of the inclination guide display 5701, denoted by "B", is double that of the object (for example, the inclination "A" from the background horizon). This improves visibility for the user.

If the moving image pickup mode is set as shown in FIG. 56B, the inclination of the inclination guide display 5701' is set to "A'", which is the same as the inclination "A" as is the case with Embodiment 18.

As described above, the video camera 5200 of Embodiment 19 of the present invention provides the inclination guide display with an inclination larger than the actual one in the still image pickup mode to increase the visibility compared to that in the moving image pickup mode. This enables the inclination of the video camera 5200 to be displayed in the still image pickup mode so that the user can easily recognize it and in the moving image pickup mode so as not to disturb user's moving image pickup.

Embodiment 20

Next, Embodiment 20 of the present invention will be described. The configuration in Embodiment 20 provides the inclination guide display both in the still image pickup mode and in the moving image pickup mode. In this case, in particular, when the image pickup mode is switched to the still image pickup mode, the display color or form of the inclination guide display for the inclination of the image pickup apparatus is changed to improve visibility for the user.

Figure 57:
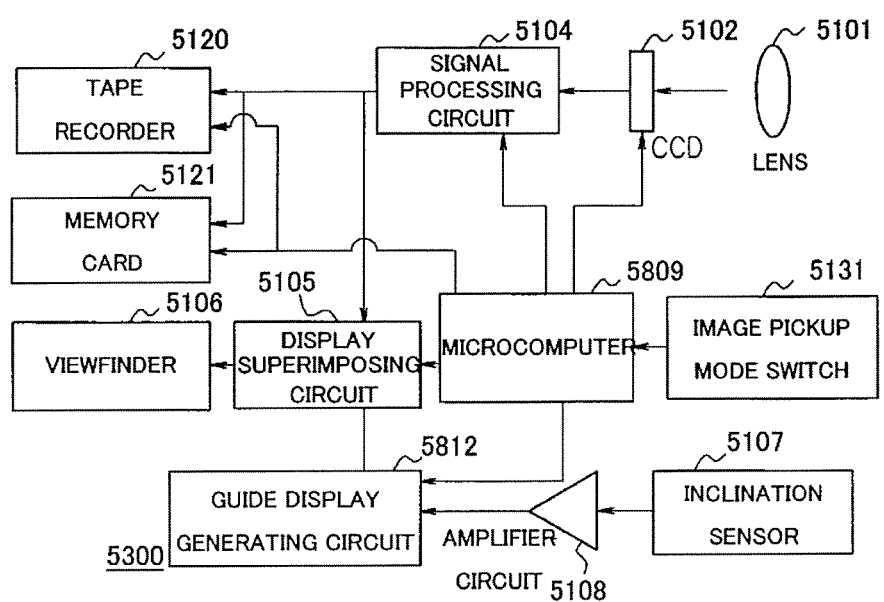
FIG. 57 is a block diagram showing the configuration of a video camera that is Embodiment 20 of the present invention.

Embodiment 20 will be described with reference to FIG. 57. FIG. 57 is a block diagram showing the configuration of a video camera 5300 that is Embodiment 20. The configuration of the video camera that is Embodiment 20 is generally similar to that in Embodiment 18. Components of Embodiment 20 common to those in Embodiment 18 will not be described.

First, description will be given of the difference between the video camera 5300 of Embodiment 20 and the video camera 5100 of Embodiment 18.

The video camera 5300 of Embodiment 20, a guide display generating circuit 5812 that generates the inclination guide display corresponding to the input inclination signal has a function of changing color or character shape of the inclination guide display in accordance with a control signal from a microcomputer 5809.

Description will be given of processes executed by the configuration having the guide display generating circuit 5812 and microcomputer 5809 in association with switching of the image pickup mode. First, description will be given of the case where the image pickup mode switch 5131 is switched to select the still image pickup mode.

Selection of the still image pickup mode enables the microcomputer 5809 to control reading of all the pixels in the CCD 5102 and to also switch the camera signal processing circuit

5104 to a state of performing the still image processing. At the same time, the memory card 5121 is selected as a recording medium.

Moreover, in response to switching of the image pickup mode switch 5131, a change is made to the color or character shape of the inclination guide display generated by the guide display generating circuit 5812 through the microcomputer 5809. The change may be made by predetermined storing two colors or character shapes and switching one of the colors or character shapes in accordance with the control signal from the microcomputer 5809.

Then, the display superimposing circuit 5105 superimposes the guide display signal generated by the guide display generating circuit 5812 on the standard video signal provided by the camera signal processing circuit 5104 to show the inclination guide display in the viewfinder 5106.

Next, description will be given of the case where the image pickup mode switch 5131 is switched to select the moving image pickup mode.

Selection of the moving image pickup mode enables the microcomputer 5809 to control reading from the moving image area of the CCD 5102 and to also switch the camera signal processing circuit 5104 to a state of performing the moving image processing. At the same time, the tape recorder 5120 is selected as a recording medium.

Moreover, the color of the inclination guide display generated by the guide display generating circuit 5812 or the character shape of the inclination guide display is changed back to a normal one.

Then, the display superimposing circuit 5105 superimposes the guide display signal generated by the guide display generating circuit 5812 on the standard video signal provided by the camera signal processing circuit 5104 to show the inclination guide display in the viewfinder 5106.

Figure 58:
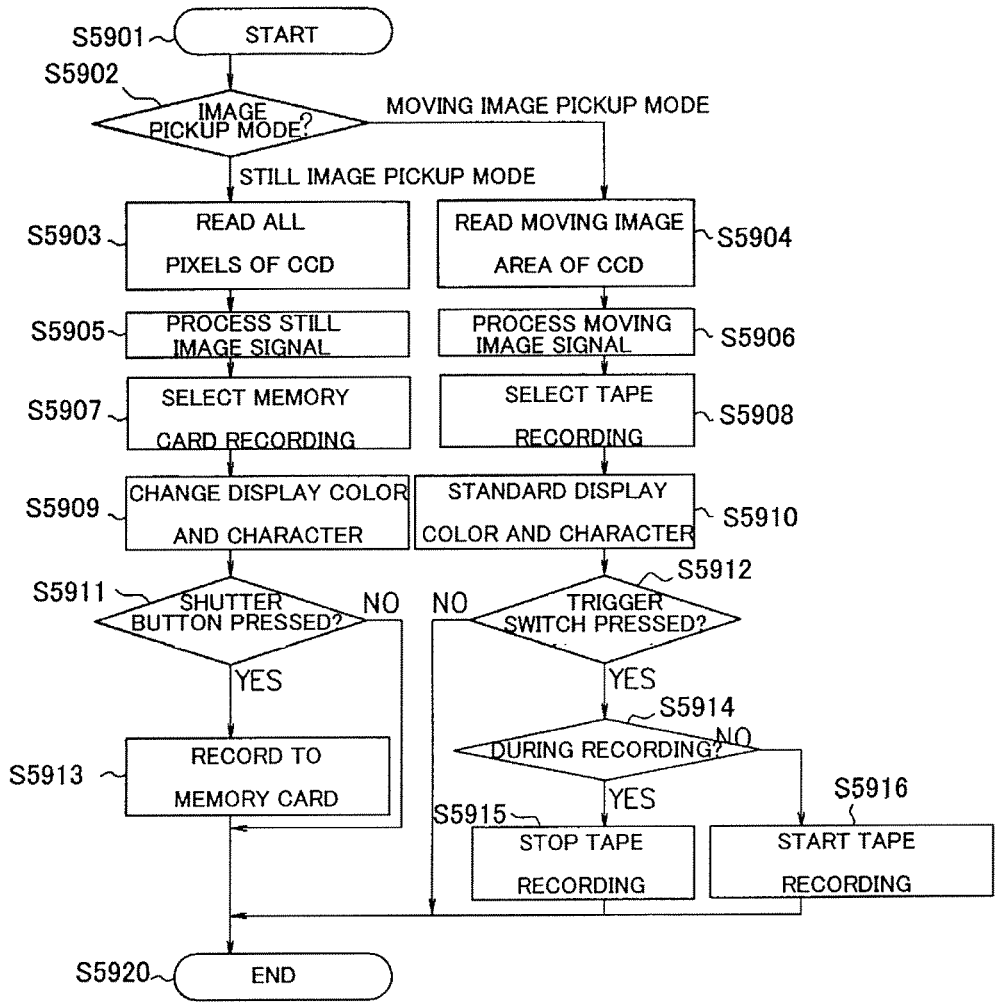
FIG. 58 is a flowchart illustrating the operation performed by the video camera that is Embodiment 20 of the present invention.

Processes executed by the microcomputer 5809 will be described with reference to FIG. 58. FIG. 58 shows a flowchart of the operation performed by the microcomputer 5809 for switching the image pickup mode.

FIG. 58 will be sequentially described. The flow starts at step S5901, and the flow is repeated at a predetermined period corresponding to, for example, the video synchronization.

In step S5902, the image pickup mode selected via the image pickup mode switch 5131 is checked. If the image pickup mode is set to the still image pickup mode, the process proceeds to step S5903. If the image pickup mode is set to the moving image pickup mode, the process proceeds to step S5904.

First, description will be given of the case where the still image pickup mode is selected as the image pickup mode.

In step S5903, since the still image pickup mode is selected as the image pickup mode, the reading mode of the CCD 5102 is set to the all-pixel still image reading mode.

Then, in step S5905, signal processing executed by the camera signal processing circuit 5104 is also switched to the still image signal processing. Specifically, the analog image signal read from the CCD 5102 is analog-to-digital converted to generate still image data. The converted digital signal is then subjected to predetermined signal processing such as still image gamma correction and white balancing to generate standard still image data at every predetermined timing such as the video synchronization.

In step S5907, the memory card 5121 is selected as a recording medium.

Then, in S5909, the microcomputer 5809 changes the color or character shape of the inclination guide display provided by the guide display generating circuit 5812 and then superimposes the inclination guide display on the standard video signal to obtain an image signal. The microcomputer 5809 then transmits the image signal to and displays it on the viewfinder 5106.

The process then determines in step S5911 whether or not the shutter button (not shown) has been pressed. If the shutter button has been pressed, the process proceeds to S5913. If the shutter button has not been pressed, the process proceeds to S5920 and then ends.

If the shutter button has been pressed, then in step S5913, the current picked-up image is recorded in the memory card 5121. The process proceeds to step 5920 and then ends.

The above process enables the inclination guide display to be shown on the viewfinder 5106 when the still image pickup mode is selected.

Next, description will be given of the case where the moving image pickup mode is selected as the image pickup mode in step S5902.

First, in step S5904, since the moving image pickup mode is selected as the image pickup mode, the reading mode of the CCD 5102 is set to the moving image reading mode.

Then, in step S5906, signal processing executed by the camera signal processing circuit 5104 is also switched to the moving image signal processing. Specifically, the analog image signal read from the CCD 5102 is analog-to-digital converted to generate moving image data. The converted digital signal is then subjected to predetermined signal processing such as moving image gamma correction and white balancing to generate the standard video signal at every predetermined timing such as the standard video synchronization.

In step S5908, the tape recorder 5120 is selected as a recording medium.

In step S5910, the microcomputer 5809 instructs the guide display generating circuit 5812 to change the color or character shape of the inclination guide display generated thereby back to the normal one. The microcomputer 5809 superimposes the inclination guide display on the standard video signal, transmits the resulting signal to and displays it on the viewfinder 5106.

In step S5912, the process determines whether or not the trigger switch (not shown) has been pressed. If the trigger switch has been pressed, the process proceeds to step S5914. If the trigger switch has not been pressed, the process proceeds to step S5920 and then ends.

If the trigger switch has been pressed, then the process determines in step S5914 whether or not the moving image pickup is being performed. If the moving image pickup is being performed, the process proceeds to step S5915. If the moving image recording is not being performed, the process proceeds to step S5916.

If the moving image recording is being performed, then in step S5915, the moving image recording is stopped in response to the operation of the trigger switch.

If the moving image recording is not being performed, then in step S5916, the moving image recording is started in response to the operation of the trigger switch.

The above process enables, when the still image pickup mode is selected, the inclination guide display whose color or character shape is changed to be displayed on the viewfinder 5106.

The relationship between the inclination of the video camera 5300 and the output of the inclination sensor 5107 (acceleration sensor) is equivalent to that described above in Embodiment 18 with reference to FIGS. 52A to 52C.

Figure 59:
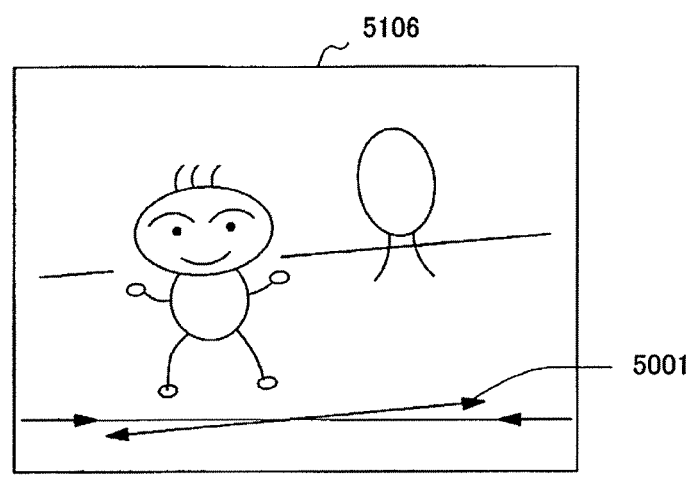
FIG. 59 is a diagram showing a display example of an inclination guide display in the video camera that is Embodiment 20 of the present invention.

The image displayed on the viewfinder 5106 will be described with reference to FIG. 59. FIG. 59 shows an example in which the inclination guide display is shown on the viewfinder 5106 when the still image pickup mode is set.

In FIG. 59, reference numeral 5001 denotes the inclination guide display generated by the guide display generating circuit 5812 and enabling the inclination to be clearly viewed in accordance with the control signal from the microcomputer 5809 compared to the inclination guide displays shown in Embodiments 18 and 19. That is, in this example, the inclination guide display is thicker and has arrows; it is exaggeratedly displayed.

The character shape of the inclination guide display is not limited to the one shown in FIG. 59. Any shape may be used which can provide a higher visibility when the image pickup mode is switched to the still image pickup mode. Similarly, any color may be used which can provide a higher visibility when the image pickup mode is switched to the still image pickup mode.

As described above, the video camera 5300 of Embodiment 20 of the present invention provides the inclination guide display with a higher visibility in the still image pickup mode than in the moving image pickup mode by changing the shape or the like of the inclination guide display. This enables the inclination of the video camera 5300 to be displayed in the still image pickup mode so that the user can easily recognize it and in the moving image pickup mode so as not to disturb user's moving image pickup.

Embodiment 21

Next, Embodiment 21 of the present invention will be described. The configuration in Embodiment 21 provides the inclination guide display both in the still image pickup mode and in the moving image pickup mode. In this case, in particular, the responsiveness of the guide display is changed between the still image pickup mode and the moving image pickup mode to reduce the complicatedness of the image displayed on the viewfinder during moving image pickup.

Figure 60:
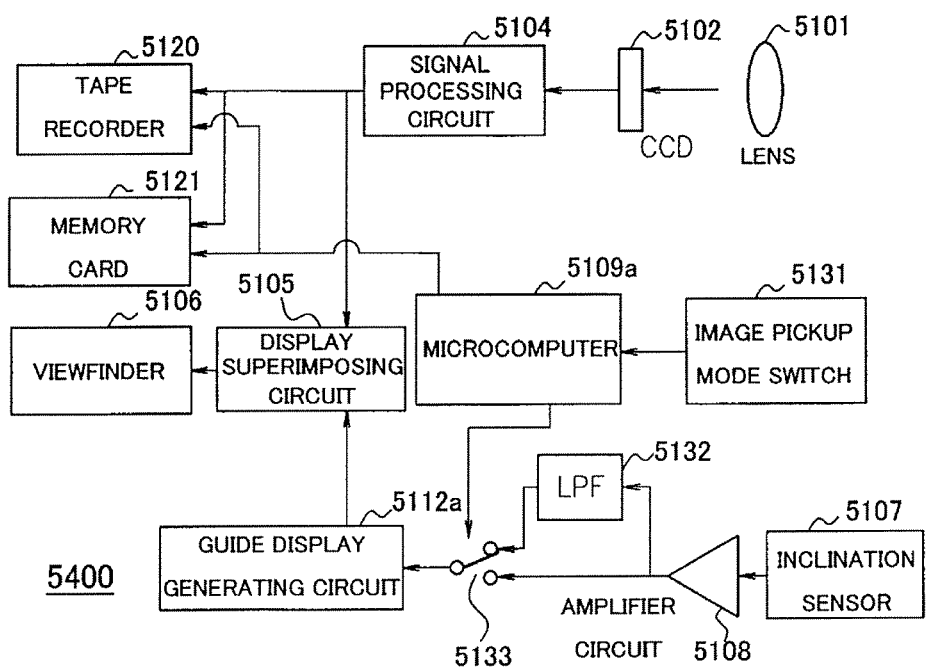
FIG. 60 is a block diagram showing the configuration of the video camera that is Embodiment 20 of the present invention.

Embodiment 21 will be described with reference to FIG. 60. FIG. 60 is a block diagram showing the configuration of a video camera 5400 that is Embodiment 21. The configuration of the video camera 5400 of Embodiment 21 is generally similar to that of Embodiment 18. Components of Embodiment 21 common to those in Embodiment 18 will not be described.

First, description will be given of the difference between the video camera 5400 of Embodiment 21 and the video camera 5100 of Embodiment 18.

The video camera 5400 of Embodiment 21 internally has a low pass filter 5132 (hereinafter referred to as an LPF) and a switch 5133. The LPF 5132 limits the frequency band of the inclination signal amplified by the amplifier circuit 5108. The switch 5133 switches between the output signal from the amplifier circuit 5108 and an output signal output from the amplified circuit 5108 and processed by the LPF 5132 so that one of the output signals is input to a guide display generating circuit 5112a, in accordance with a control signal from a microcomputer 5109a.

The LPF 5132 executes band limiting processing on the inclination signal provided by the inclination sensor 5107 and amplified by the amplifier circuit 5108 by a predetermined amount. The band-limited inclination signal is then input to the guide display generating circuit 5112a via the switch 5133. The guide display generating circuit 5112a outputs an inclination guide display signal corresponding to the band-limited inclination signal. The inclination guide signal is superimposed on the standard video signal by the display superimposing circuit 5105 to provide the inclination guide display on the viewfinder 5106.

Next, description will be given of processes executed by the configuration in Embodiment 21 in association with switching of the image pickup mode. First, description will be given of the case where the image pickup mode switch 5131 is switched to select the still image pickup mode.

Selection of the still image pickup mode enables the microcomputer 5109a to control reading of all the pixels in the CCD 5102 and to also switch the camera signal processing circuit 5104 to a state of performing the still image processing. At the same time, the memory card 5121 is selected as a recording medium.

Moreover, in response to switching of the image pickup mode switch 5131, the switch 5133 selects the amplifier circuit 5108 side via the microcomputer 5109a. That is, the inclination signal amplified by the amplifier circuit 5108 is applied to the guide display generating circuit 5112a.

The display superimposing circuit 5105 superimposes the guide display signal generated by the guide display generating circuit 5112a on the standard video signal provided by the camera signal processing circuit 5104 to show the inclination guide display on the viewfinder 5106.

Next, description will be given of the case where the image pickup mode switch 5131 is switched to select the moving image pickup mode.

Selection of the moving image pickup mode enables the microcomputer 5109a to control reading from the moving image area of the CCD 5102 and to also switch the camera signal processing circuit 5104 to a state of performing the moving image processing. At the same time, the tape recorder 5120 is selected as a recording medium.

Moreover, in response to switching of the image pickup mode switch 5131, the switch 5133 selects the LPF 5132 side via the microcomputer 5109a (the state shown in FIG. 60). That is, the inclination signal that has been amplified by the amplifier circuit 5108 and whose high frequency band has been limited by the LPF 5132 is applied to the guide display generating circuit 5112a.

The display superimposing circuit 5105 superimposes the guide display signal generated by the guide display generating circuit 5112a on the standard video signal provided by the camera signal processing circuit 5104 to show the inclination guide display in the viewfinder 5106.

Figure 61:
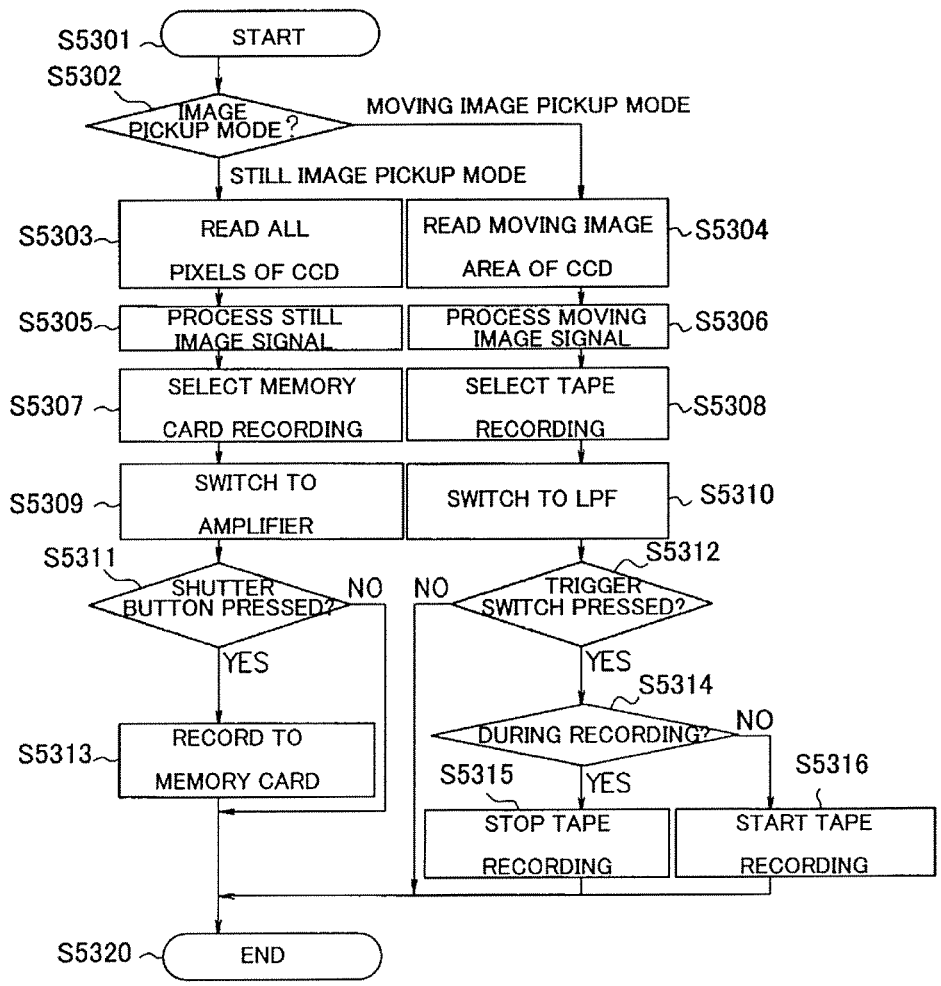
FIG. 61 is a flowchart illustrating the operation performed by the video camera that is Embodiment 21 of the present invention.

Processes executed by the microcomputer 5109a will be described with reference to FIG. 61. FIG. 61 shows a flowchart of the operation of the microcomputer 5109a for switching the image pickup mode FIG. 61 will be sequentially described. The flow starts at step S5301, and the flow is repeated at a predetermined period corresponding to, for example, the video synchronization.

In step S5302, the image pickup mode selected via the image pickup mode switch 5131 is checked. If the image pickup mode is set to the still image pickup mode, the process proceeds to step S5303. If the image pickup mode is set to the moving image pickup mode, the process proceeds to step S5304.

First, description will be given of the case where the still image pickup mode is selected as the image pickup mode.

In step S5303, since the still image pickup mode is selected as the image pickup mode, the reading mode of the CCD 5102 is set to the all-pixel still image reading mode.

Then, in step S5305, signal processing executed by the camera signal processing circuit 5104 is also switched to the still image signal processing. Specifically, the analog image signal read from the CCD 5102 is analog-to-digital converted to generate still image data. The converted digital signal is then subjected to predetermined signal processing such as still image gamma correction and white balancing to generate standard still image data at every predetermined timing such as the video synchronization.

In step S5307, the memory card 5121 is selected as a recording medium.

Then, in step S5309, the microcomputer 5109a causes the switch 5133 to select the output of the amplifier circuit 5108. Thereby, an image signal that contains the inclination guide display superimposed on the standard video signal and whose frequency band is not limited is transmitted to and displayed on the viewfinder 5106.

The process then determines in step S5311 whether or not the shutter button (not shown) has been pressed. If the shutter button has been pressed, the process proceeds to S5313. If the shutter button has not been pressed, the process proceeds to S5320 and then ends.

If the shutter button has been pressed, then in step S5313, the current picked-up image is recorded in the memory card 5121. The process then proceeds to step 5320 and ends.

The above process enables the inclination guide display to be shown on the viewfinder 5106 when the still image pickup mode is selected.

Next, description will be given of the case where the moving image pickup mode is selected as the image pickup mode in step S5302.

First, in step S5304, since the moving image pickup mode is selected as the image pickup mode, the reading mode of the CCD 5102 is set to the moving image reading mode.

Then, in step S5306, signal processing executed by the camera signal processing circuit 5104 is also switched to the moving image signal processing. Specifically, the analog image signal read from the CCD 5102 is analog-to-digital converted to generate moving image data. The converted digital signal is then subjected to predetermined signal processing such as moving image gamma correction and white balancing to generate the standard video signal at every predetermined timing such as the standard video synchronization.

In step S5308, the tape recorder 5120 is selected as a recording medium.

In step S5310, the microcomputer 5109a causes the switch 5133 to select the output of the LPF 5132. Thereby, an image signal that contains the inclination guide display that is superimposed on the standard video signal and whose frequency band has been limited is transmitted to and displayed on the viewfinder 5106.

In step S5312, the process determines whether or not the trigger switch (not shown) has been pressed. If the trigger switch has been pressed, the process proceeds to step S5314. If the trigger switch has not been pressed, the process proceeds to step S5320 and then ends.

If the trigger switch has been pressed, then the process determines in step S5314 whether or not the moving image pickup is being performed. If the moving image pickup is being performed, the process proceeds to step S5315. If the moving image recording is not being performed, the process proceeds to step S5316.

If the moving image recording is being performed, then in step S5315, the moving image recording is stopped in response to the operation of the trigger switch.

If the moving image recording is not being performed, then in step S5316, the moving image recording is started in response to the operation of the trigger switch.

According to the above processes, the inclination guide display is displayed on the viewfinder 5106 without changing its frequency responsiveness when the still image pickup mode is selected, and the inclination guide display is displayed on the viewfinder 5106 with the limitation of its frequency responsiveness when the moving image pickup mode is selected.

The relationship between the inclination of the video camera 5400 and the output of the inclination sensor 5107 (acceleration sensor) is equivalent to that described above in Embodiment 18 with reference to FIGS. 52A to 52C. The display on the viewfinder is the same as that in the other embodiments except for its responsiveness.

As described above, the video camera 400 of Embodiment 21 of the present invention provides the inclination guide display with higher responsiveness in the still image pickup mode than in the moving image pickup mode. Since the responsiveness of the inclination guide display is lower in the moving image pickup mode than in the still image pickup mode, a variation in the inclination of the inclination guide display can be prevented from being shown more clearly than required.

Embodiment 22

Figure 62:
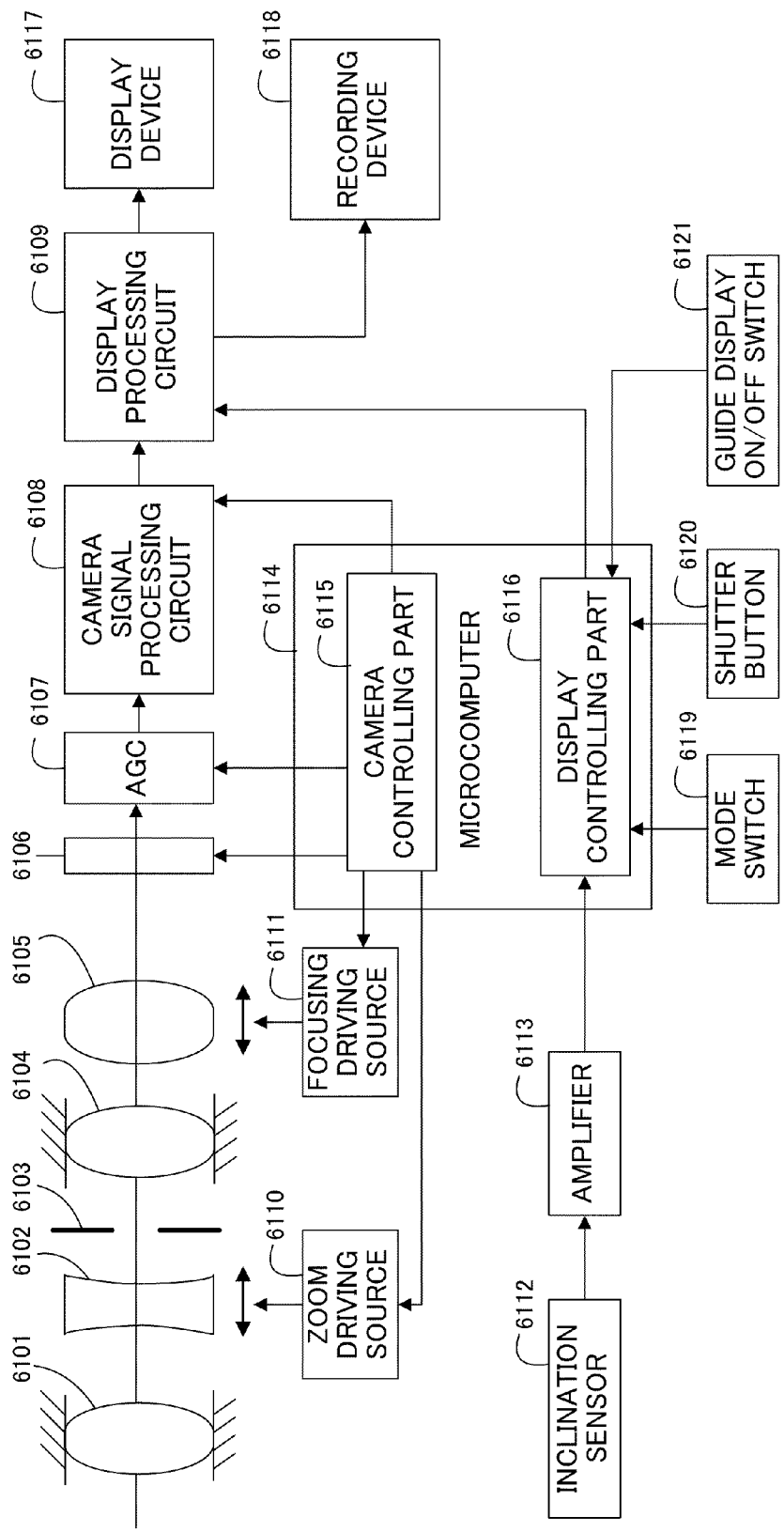
FIG. 62 is a block diagram showing the configuration of a circuit in a video camera that is Embodiment 22 of the present invention.

FIG. 62 is a block diagram showing the circuit configuration of a video camera that is Embodiment 22 of the present invention. In FIG. 62, reference numeral 6101 denotes a first fixed lens unit, and reference numeral 6102 denotes a magnification varying lens unit. Reference numeral 6103 denotes an aperture stop, and reference numeral 6104 denotes a second fixed lens unit. Reference numeral 6105 denotes a lens unit (hereinafter referred to as a focus-compensating lens) having a focusing function and a so-called compensating function for correcting movement of a focal plane resulting from magnification varying. Reference numeral 6106 denotes an image pickup element (hereinafter referred to as a CCD). Reference numerals 6110 and 6111 denote a zoom driving source and a focusing driving source, respectively. Reference numeral 6107 denotes an AGC (Auto Gain Control circuit) that amplifies an output from the CCD 6106.

Reference numeral 6108 denotes a camera signal processing circuit that converts the output signal from the AGC 6107 into a signal suitable for a recording device 6118 and a display device 6117 having a display function. Moving images and still images are recorded in the recording device 6118. A magnetic tape or a semiconductor memory is used as a recording medium. The display device 6117 is a viewfinder or an external liquid crystal panel. Reference numeral 6112 denotes an inclination sensor that detects the inclination of the video camera; an acceleration sensor is used for the inclination sensor in the present embodiment. Reference numeral 6113 denotes an amplifier that amplifies an output from the inclination sensor 6112. Reference numeral 6114 denotes a microcomputer that controls the system of the video camera.

Reference numeral 6115 denotes a camera controlling part provided in the microcomputer 6114, which controls the zoom driving source 6110 and focusing driving source 6111 for variation of the angle of view and focusing. The camera controlling part 6115 further controls the drive of the CCD 6106, AGC 6107, and camera signal processing circuit 6108. Reference numeral 6116 denotes a display controlling part provided in the microcomputer 6114 to load an output from the amplifier 6113 to generate a guide display signal corresponding to the inclination, from detected inclination information. The display controlling part 6116 determines whether or not to provide an inclination guide display on the basis of the states of a mode switch 6119 and a guide display ON/OFF switch 6121, which will be described later. To provide the inclination guide display, the display controlling part 6116 outputs the inclination guide display signal to the display processing circuit 6109. Thus, the display processing circuit 6109 synthesizes a video signal with the inclination guide display signal to superimposedly show the inclination guide display on a picked-up image on the screen of the display device 6117.

Reference numeral 6119 denotes the mode switch that switches the image pickup mode between a moving image pickup mode and a still image pickup mode. Reference numeral 6120 denotes a shutter button that is a two-step switch indicating a still image pickup operation on the basis of its pressed state. Reference numeral 6121 denotes the guide display ON/OFF switch that enables the user to optionally turn on or off the inclination guide display. The guide display ON/OFF switch 6121 may be an independent operating member or an item on a menu which can be switchably operated.

FIGS. 63A to 63D are diagrams showing the relationship between the inclination of the video camera and the output of the inclination sensor 6112. In FIGS. 63A to 63C, reference numerals 6100, 6117, and 6112 denote the video camera, the display device, and the inclination sensor (acceleration sensor) respectively.

Appropriately setting of the gain of the amplifier 6113 makes it possible to set the sensor output from the inclination sensor 6112 to have the voltage range described below.

FIG. 63B shows that the video camera 6100 is at a regular position. The sensor output is equal to about half of a power supply voltage Vcc as shown at (b') in FIG. 63D. In contrast, inclining the video camera 6100 counterclockwise by 90° as shown in FIG. 63A provides a sensor output equal to the power supply voltage Vcc as shown at (a') in FIG. 63D. Conversely, inclining the video camera 6100 clockwise by 90° as shown in FIG. 63C provides a sensor output at a GND level as shown at (c') in FIG. 63D.

For the inclinations between those shown in FIG. 63A and FIG. 63B and between those shown in FIG. 63B and FIG. 63C, the sensor output changes linearly with the inclination. On the basis of the voltage corresponding to the inclination, the display controlling part 6116 generates the guide display signal indicating the inclination. The display processing circuit 6109 synthesizes the video signal with the inclination guide display signal. Consequently, the inclination guide display is superimposed on a picked-up image on the screen of the display device 6117.

Figure 64:
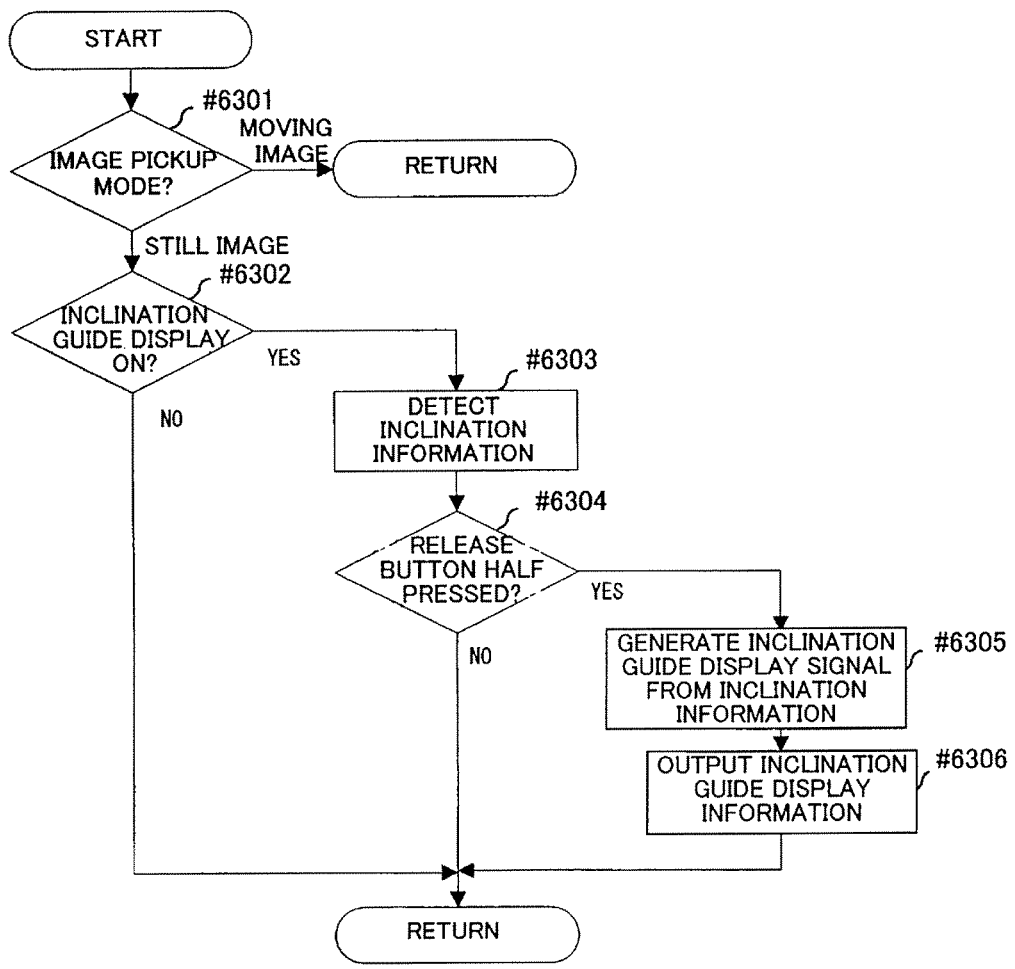
FIG. 64 is a flowchart showing the operation associated with an inclination guide display that is Embodiment 22 of the present invention.

FIG. 64 is a flowchart showing the operation of the microcomputer 6114 performed by the display controlling part 6116 for the inclination guide display.

First, in step #6301, the process determines whether the image pickup mode is set for the moving image pickup mode or the still image pickup mode on the basis of the setting of the mode switch 6119. In the moving image pickup mode, the process returns to a main routine without outputting any guide display signal to the display processing circuit 6109, that is, without providing any inclination guide display. In the still image pickup mode, the process proceeds to step #6302.

In the still image pickup mode, the process proceeds to step #6302 to determine whether or not the guide display ON/OFF switch 6121 is on. If the guide display ON/OFF switch 6121 is off, the process returns to the main routine without outputting any guide display signal to the display processing circuit 6109. On the other hand, if the guide display ON/OFF switch 6121 is on, the process proceeds to step #6303 to acquire the inclination information output by the inclination sensor 6112. Then, in next step #6304, the process determines whether or not the shutter button 6120 is in a half pressed position. If the shutter button 6120 is in a position other than the half pressed position, the process returns to the main routine without outputting any guide display signal to the display processing circuit 6109, that is, without providing any inclination guide display. If the shutter button 6120 is in the half pressed position, the process proceeds to step #6305.

In step #6305, the guide display signal is generated from the inclination information acquired in step #6303; the guide display signal indicates the position of the inclination guide display to be shown on the screen of the display device 6117. In next step #6306, the inclination guide display signal is output to the display processing circuit 6109 in order to superimpose the inclination guide display signal on the video signal from the camera signal processing circuit 6108 to show the inclination guide display on the screen of the display device 6117.

Figure 65:
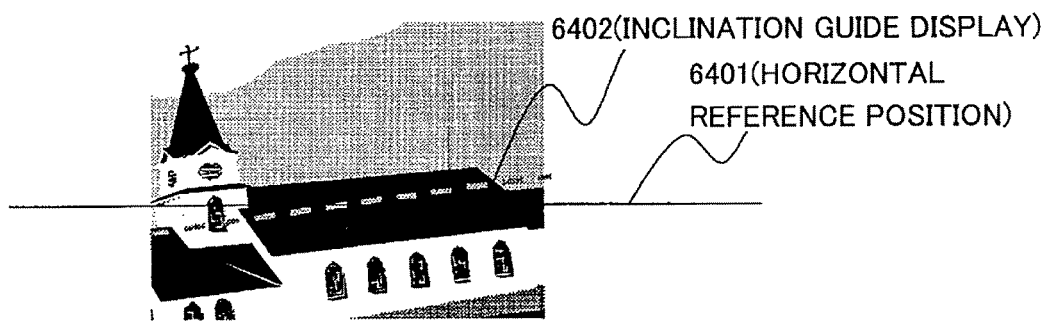
FIG. 65 is a diagram showing an example of an inclination guide display that is Embodiment 22 of the present invention.

FIG. 65 shows an example in which the process shown in FIG. 64 is executed to show, on the screen of the display device 6117, the inclination guide display and a horizontal reference position (described later) that are superimposed on a picked-up image. As illustrated in the figure, the horizontal reference position 6401 and the inclination guide display 6402 on the basis of the inclination guide display signal generated at step #6305 in FIG. 64 are shown, which enables a user to quickly recognize the inclination of the video camera from the difference between the inclination guide display and the horizontal reference position.

The detection of the inclination information in step #6303 in FIG. 64 may be performed next to the determination that the shutter button 6120 is in the half pressed position in step #6304.

In many applications, in the moving image pickup mode, the user picks up an image of a moving object at least with the video camera held by his or her hand while panning it for chasing the object. It is thus difficult for the user to keep the camera horizontal. In fact, the inclination guide display may be useless for the user. Thus, Embodiment 22 prevents the process from proceeding to steps #6305 and #6306 in FIG. 64 to prohibit the inclination guide display in such a case. This makes it possible to prevent the user from feeling uncomfortable owing to their inability to hold the video camera horizontal. The prohibition also prevents the user from feeling that a constant movement of the inclination guide display shown on the screen of the display device 6117 during image pickup is cumbersome. The prohibition also makes it possible to prevent a smooth inclination guide display from being hindered, particularly when the capability of the microcomputer 6114 is low, because the detection of the inclination information and the process of showing the inclination guide display on the screen of the display device 6117 increase loads on the moving image pickup processing.

Even in the still image pickup mode, when the shutter button 6120 is in a position other than the half pressed position (YES in step #6304), the process does not proceed to #6305 or #6306 in FIG. 64, prohibiting the inclination guide display. This makes it possible to prevent the user from feeling uncomfortable in the still image pickup mode, as is the case with the moving image pickup mode.

On the other hand, if the shutter button 6120 is in the half pressed position, the user attempts to hold the camera horizontal so as to establish his or her intended composition, particularly a composition in which the object is not inclined, in order to record that scene. Thus, if the shutter button 6120 is in the half pressed position, the provision of the inclination guide display is permitted to display the inclination of the video camera on the screen, providing beneficial information to the user. This configuration also makes it possible to prevent the recorded image from inclining or rotational corrections on the inclined image from being required during reproduction. Moreover, if the shutter button 6120 is in the half pressed position, AF (auto focus), AE, and the like are locked, thereby minimizing processing loads. A smooth inclination display guide can thus be provided.

The above process provides an image pickup apparatus such as the video camera that can provide displays meeting sufficient conditions for the user and which can be comfortably operated.

Embodiment 23

Figure 66:
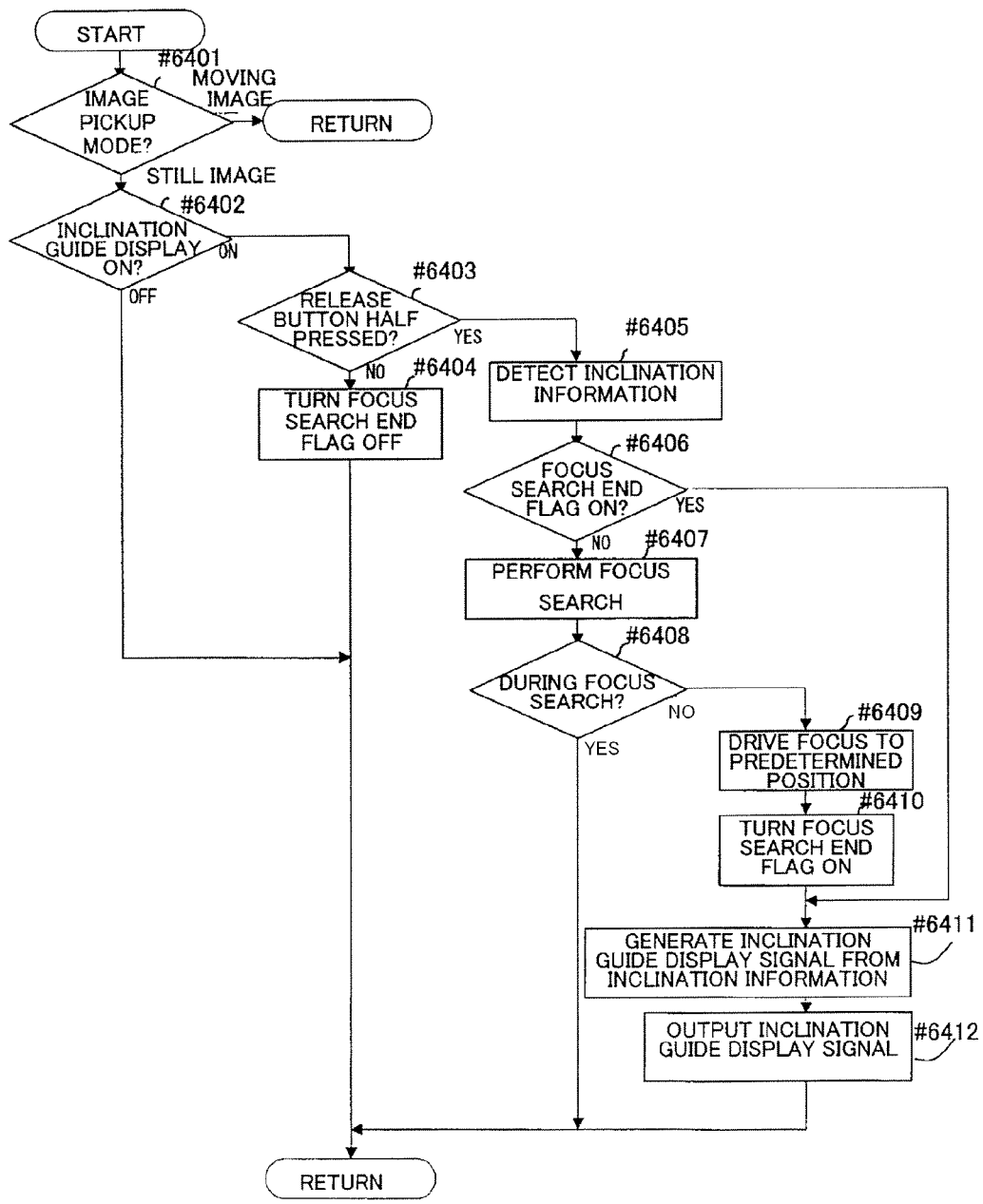
FIG. 66 is a flowchart showing the operation associated with an inclination guide display that is Embodiment 23 of the present invention.

FIG. 66 is a flowchart showing the operation of a microcomputer provided in a video camera that is Embodiment 23 of the present invention for the inclination guide display. Each step in Embodiment 23 performing the same operation as that in Embodiment 22 shown in FIG. 64 is denoted by reference numeral having the same last two digits as those in FIG. 64. The circuit configuration of the video camera is similar to that in the Embodiment 22.

First, in step #6401, the process determines whether the image pickup mode is set to the moving image pickup mode or the still image pickup mode on the basis of the setting of the mode switch 6119. In the moving image pickup mode, the process returns to the main routine without generating any inclination guide display signal, that is, without providing any inclination guide display. In the still image pickup mode, the process proceeds to step #6402.

In the still image pickup mode, the process proceeds to step #6402 to determine whether or not the guide display ON/OFF switch 6121 is on. If the guide display ON/OFF switch 6121 is off, the process returns to the main routine without generating any inclination guide display signal. On the other hand, if the guide display ON/OFF switch 6121 is on, the process proceeds to step #6403 to determine whether or not the shutter button 6120 is in the half pressed position. If the shutter button 6120 is in the half pressed position, the process proceeds to step #6405.

In step #6405, the inclination information output from the inclination sensor 6112 is acquired. Then, in next step #6406, the process determines whether or not an in-focus position is being searched for by driving of the focus-compensating lens 6105 in response to a user's half press operation of the shutter button 6120. If the focus searching has been finished and thus a focus search end flag is on, the process proceeds to step #6411.

If the focus search end flag is off, the process proceeds to step #6407 to perform the focus searching. The process then determines in next step #6408 whether or not the focus searching has been finished. The focus searching is finished when the in-focus position has successfully been detected or has not been detected for a predetermined time. Upon determining that focus searching has not been finished, the process returns to the main routine to continue the focus searching.

Upon determining in step #6408 that the focus searching has been finished, the process proceeds to step #6409 to drive the focus-compensating lens 6105 to a predetermined position. Then, in next step #6410, the focus search end flag is turned on. In subsequent step 6411, on the basis of the inclination information acquired in step #6405, the inclination guide display signal is generated which indicates the position of the inclination guide display to be displayed on the screen of the display device 6117. In next step #6412, the inclination guide display signal is output to the display processing circuit 6109 in order to show the inclination guide display superimposed on the video signal from the camera signal processing circuit 6108 on the screen of the display device 6117.

Upon determining in step #6403 that the shutter button 6120 is not in the half pressed position, the process proceeds to step #6404 to determine that the image pickup target object will change because the user has released the shutter button 6120 or fully pressed it to record the picked-up image, and thus the process turns off the focus search end flag.

In many applications, in the moving image pickup mode, the user picks up an image of a moving object at least with the video camera held by his or her hand while panning it for chasing the object. It is thus difficult for the user to keep the camera horizontal. In fact, the inclination guide display may be useless for the user. Thus, like Embodiment 22, Embodiment 23 prevents the process from proceeding to steps #6411 and #6412 in FIG. 65 to prohibit the inclination guide display. This makes it possible to prevent the user from feeling uncomfortable owing to their inability to hold the video camera horizontal. The prohibition also prevents the user from feeling that a constant movement of the inclination guide display shown on the screen of the display device 6117 during image pickup is cumbersome. The prohibition also makes it possible to prevent a smooth inclination guide display from being hindered, particularly when the capability of the microcomputer 6114 is low, because the detection of the inclination information and the process of showing the inclination guide display on the screen of the display device 6117 increase loads on the moving image pickup processing.

Further, in the still image pickup mode, even when the shutter button 6120 is in the half pressed position, the process cannot determine whether or not an in-focus state on the user-intended object is achieved during the focus searching (NO in step #6408). Further, since the focus-compensating lens 6105 is being driven to search for the in-focus position during the focus searching, processing loads are imposed as in the case of the moving image pickup mode. Thus, in particular, if the capability of the microcomputer 6114 is low, providing a smooth inclination guide display is difficult. To avoid this, Embodiment 23 prohibits the inclination guide display during the focus searching with the shutter button 6120 in the half pressed position.

On the other hand, description will be given of the case where the focus searching has been finished with the shutter button 6120 in the half pressed position and thereby an in-focus state is achieved (step #6406→step #6411 or step #6408→step #6409→step #6410→step #6411). In this case, the user attempts to hold the camera horizontal so as to establish his or her intended composition, particularly the state in which the object is not inclined. Thus, Embodiment 23 provides the inclination guide display to show the inclination of the camera (step #6412). This enables the user to obtain beneficial information for easily holding the camera horizontal. Moreover, when the focus searching is finished, AF (auto focus), AE, and the like are locked, thereby minimizing processing loads. A smooth inclination display guide can thus be provided. This makes it possible to provide a display meeting sufficient conditions for the user, thus enabling the user to comfortably operate the camera.

The detection of the inclination information in step #6405 may be performed in step next to step #6408 where the process determines that the focus searching has been finished, or in step next to step #6410 where the process determines that the focus search end flag is on. Moreover, although not shown, the process determines in step #6408 that the focus searching has been finished. However, if the in-focus position has not been detected, the inclination guide display may be prohibited.

In Embodiments 22 and 23, the inclination sensor 6112 and the amplifier 6113 may be energized only when the inclination information is detected and the inclination guide display is provided on the basis of the information. The operation of the inclination sensor 6112 is prevented under conditions that the inclination guide display is prohibited, enabling a reduction in power consumption and processing loads.

The effects of the above embodiments are listed below.

The inclination of the video camera, which is an example of the image pickup apparatus, is detected and the inclination guide display corresponding to the detected inclination is prohibited at least during the moving image pickup. This makes it possible to prevent the user from feeling that, in a situation where the user cannot hold the camera horizontal easily, the inclination guide display always shown is cumbersome. It is further possible to prevent a smooth inclination guide display from becoming difficult, particularly when the capability of the microcomputer 6114 is low, because the detection of the inclination information and the process of showing the inclination guide display overload the microcomputer 6114 during the moving image pickup. Similar effects are produced even if the shutter button is in a position other than the half pressed position during the still image pickup.

In the still image pickup, when the shutter button 6120 is in the half pressed position, the provision of the inclination guide display is permitted. Thus, the inclination guide display enables the user to hold the camera horizontal, which prevents the user from recording an image having the user's unintended composition in which, for example, the object is inclined. That is, in this case, the inclination guide display is beneficial to the user who desires to record that scene. Further, depending on situations, in order to display an unintentionally inclined image horizontally in its reproduction, it is possible to reduce the user's burden of manually performing a rotational correcting operation on the reproduced image. As for the processing loads, when the shutter button 6120 is in the half pressed position, AF (auto focus) AE, and the like are locked, so that a smooth inclination guide display can be performed without sharply increasing the processing loads.

As described above, Embodiments 22 and 23 permit the inclination guide display to be provided if the display meets sufficient conditions for the user. This enables the user to comfortably operate the camera.

Embodiment 24

Figure 67:
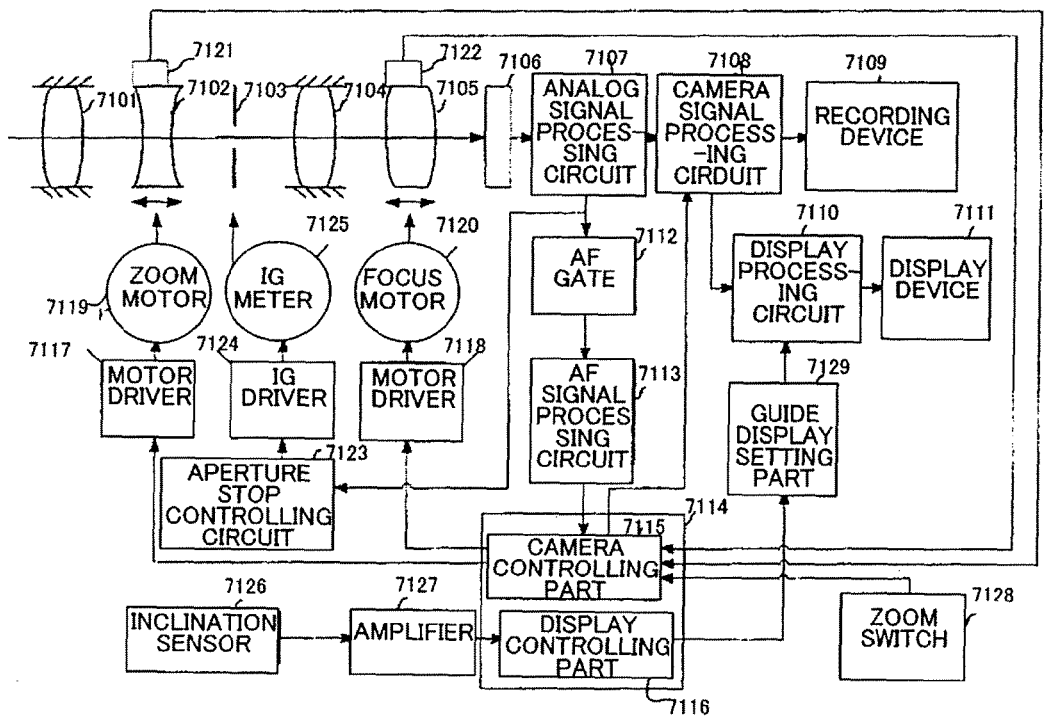
FIG. 67 is a schematic block diagram showing the system configuration of an image pickup apparatus that is Embodiment 24 of the present invention.

FIG. 67 is a schematic block diagram showing the system configuration of an image pickup apparatus 7001 that is Embodiment 24 of the present invention. The image pickup apparatus 7001 picks up an image of an object with an image pickup element, the image being formed by light from the object through an image pickup optical system. The image pickup apparatus of the present embodiment is implemented as a cam coder.

In FIG. 67, reference numeral 7101 denotes a first fixed lens unit, and reference numeral 7102 denotes a zoom lens (magnification varying lens unit) for varying the magnification. Reference numeral 7103 denotes an aperture stop, and reference numeral 7104 denotes a second fixed lens unit. Reference numeral 7105 denotes a focus lens (lens unit) having a focusing function and a so-called compensating function of correcting movement of a focal plane resulting from the magnification varying. Reference numeral 7106 denotes an image pickup element such as a CCD that photoelectrically converts an optical object image and outputs the resulting video signal.

Reference numeral 7107 denotes an analog signal processing circuit. The analog signal processing circuit 7107 executes predetermined processing on a signal provided by the image pickup element 7106 to generate an analog image pickup signal. The analog signal processing circuit 7107 is constituted by, for example, a CDS (Co-related Double Sampling) circuit and an AGC (Automatic Gain Control) circuit.

Reference numeral 7108 denotes a camera signal processing circuit including an A/D converter. The camera signal processing circuit 7108 converts the analog image pickup signal generated by the analog signal processing circuit 7107 into a digital signal. The camera signal processing circuit 7108 further executes predetermined signal processing such as gamma correction and white balancing on the digital signal to generate a final output video signal.

Reference numeral 7109 denotes a recording device in which moving images and still images are recorded. A magnetic tape or a semiconductor memory is used as a recording medium.

The analog image pickup signal amplified by the analog signal processing circuit 7107 (the AGC) is transmitted to an AF gate 7112 and an aperture stop controlling circuit 7121. The AF gate 7112 sets a region in the entire image pickup area from which the optimum signal is extracted for focusing. The size of the AF gate 7112 (that is, the region from which the signal for focusing is extracted) is variable. Alternatively, a plurality of AF gates 7112 may be provided.

Reference numeral 7113 denotes an AF signal processing circuit. The AF signal processing circuit 7113 extracts a high frequency component, a low frequency component, and a luminance difference component (the difference between the maximum and minimum values of luminance level of the video signal) which are used for focus detection.

Reference numeral 7114 denotes a main controlling part. In the present embodiment, the main controlling part 7114 is constituted by a camera controlling part 7115 and a display controlling part 7116.

The camera controlling part 7115 controls the drive of the camera signal processing circuit 7108 and an output signal therefrom and controls the focus lens 7105 on the basis of an output signal from the AF signal processing circuit 7113. The camera controlling part 7115 also reads information on the operation of the zoom switch 7128 to control zooming (a voltage corresponding to the rotation angle or slide amount of the zoom switch 7128 is output and variable-speed zooming is performed depending on the output voltage). The camera controlling part 7115 moves the focusing lens 7105 so as to maximize the level of the output signal from the AF signal processing circuit 7113. This enables automatic focusing to be accomplished.

An aperture stop controlling circuit 7123 drives the aperture stop 7103 so as to maintain an appropriate exposure. In other words, the aperture stop controlling circuit 7123 detects the level of the output signal from the analog signal processing circuit 7107. If the output signal is not at a given level (appropriate exposure), the aperture stop controlling circuit 7123 generates an aperture control signal for setting the output signal to the given level. The aperture control signal is output to an IG driver 7124 to drive the aperture stop 7103 via an IG motor 7125 so as to provide the appropriate exposure.

Reference numerals 7117 and 7118 denote drivers that output driving energy to lens driving motors in accordance with instructions on driving of the zoom lens 7102 and focus lens 7105, the instructions being output from the camera controlling part 7115 and the drivers being able to change an electric current waveform. Reference numerals 7119 and 7120 denote the lens driving motors that drive the zoom lens 7102 and focus lens 7105. The positions of the zoom lens 7102 and focus lens 7105 are detected by lens position detectors 7121 and 7122.

Each of the lens position detectors 7121 and 7122 is constituted by a photo sensor (not shown) and a light-shielding plate (not shown). The photo sensor is constituted by a light-emitting part and a light-receiving part. The light-shielding plate is fixed to each of the zoom lens 7102 and focus lens 7105. Accordingly, the movements of the zoom lens 7102 and focus lens 7105 parallel to their optical axis move the light-shielding plates integrally with the zoom lens 7102 and focus lens 7105. Thus, if the light-shielding plate blocks the optical path between the light-emitting part and the light-receiving part of the photo sensor, an output signal from the light-receiving part is at a low level. If the light-shielding plate does not block the optical path between the light-emitting part and the light-receiving part of the photo sensor, the output signal from the light-receiving part is at a high level. Thus, when the position where the output signal from the light-receiving part changes is defined as a reference position, it is possible to detect whether or not the zoom lens 7102 and the focus lens 7105 are present at the reference position. The camera controlling part 7115 can recognize the position of each lens on the basis of the reference position, the moving speed and moving direction of the lens.

The zoom switch 7128 is connected to the camera controlling part 7115. The zoom switch 7128 is operated to move the zoom lens 7102 in a wide-angle direction or in a telephoto direction. The zoom switch 7128 has a circuit configuration such that its voltage changes depending on a pressing force acting thereon. The camera controlling part 7115 detects a change in voltage when the zoom switch 7128 is pressed. The camera controlling part 7115 determines the zoom speed at which the zoom lens 7102 is driven, on the basis of the detected voltage.

Reference numeral 7126 denotes an inclination sensor. The inclination sensor 7126 detects the inclination of the image pickup apparatus 7001. In the present embodiment, an acceleration sensor is used for the inclination sensor 7126.

Reference numeral 7127 denotes an amplifier circuit. The amplifier circuit 7127 amplifies an output from the inclination sensor (acceleration sensor) 7126.

In the main controlling part 7114, the display controlling part 7116 loads an output from the amplifier circuit 7127 to determine whether or not to provide a guide display corresponding to the inclination on the basis of inclination information detected by the inclination sensor 7126. The display controlling part 7116 provides its output to a guide display setting part 7129.

The guide display setting part 7129 outputs the guide display (display showing the inclination of the image pickup apparatus 7001) corresponding to the inclination of the image pickup apparatus 7001. The display processing circuit 7110 superimposes the guide display on the output video signal. The display device 7111 such as a viewfinder or a liquid crystal panel shows the output video signal with the guide display superimposed thereon.

Figure 68:
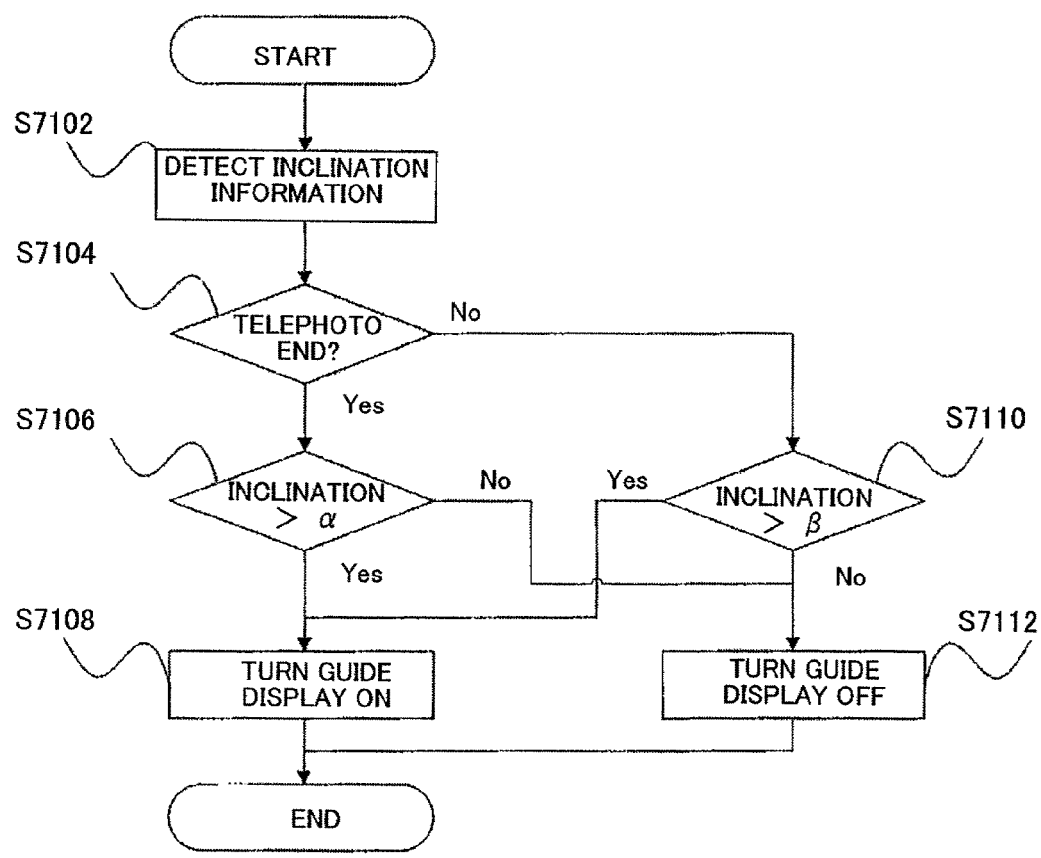
FIG. 68 is a flowchart illustrating an operation for controlling a display controlling part shown in FIG. 67.

A control operation (display method) performed by the display controlling part 7116 will be described. FIG. 68 is a flowchart illustrating the control operation performed by the display controlling part 7116.

As shown in FIG. 68, first, the inclination information on the image pickup apparatus 7001 is detected on the basis of the output from the inclination sensor 7126 (step S7102). Then, the process determines whether or not the current zoom position is on the telephoto side (or the wide-angle side) (step S7104).

In step S7104, if the current zoom position is on the telephoto side, the process determines whether or not the current inclination of the image pickup apparatus 7001 is equal to or larger than a predetermined value α (step S7106). If the current inclination of the image pickup apparatus 7001 is equal to or larger than the predetermined value α, the guide display is turned on (step S7108). If the current inclination of the image pickup apparatus 7001 is smaller than the predetermined value α, the guide display is turned off (step S7112).

On the other hand, in step S7104, if the current zoom position is on the wide-angle side, the process determines whether or not the current inclination of the image pickup apparatus 7001 is equal to or larger than a predetermined value β (step S7110). If the current inclination of the image pickup apparatus 7001 is equal to or larger than the predetermined value β, the guide display is turned on (step S7108). If the current inclination of the image pickup apparatus 7001 is smaller than the predetermined value β, the guide display is turned off (step S7112).

The relationship between the predetermined values α and β meets the following expression:

$$\alpha > \beta.$$

As is apparent from the above equation, the inclination at which the guide display is turned on is set smaller on the wide-angle side than on the telephoto side. As a result, on the wide-angle side, on which the inclination of the image pickup apparatus 7001 is more noticeable, the guide display is provided for a smaller inclination than on the telephoto side.

Figure 69:
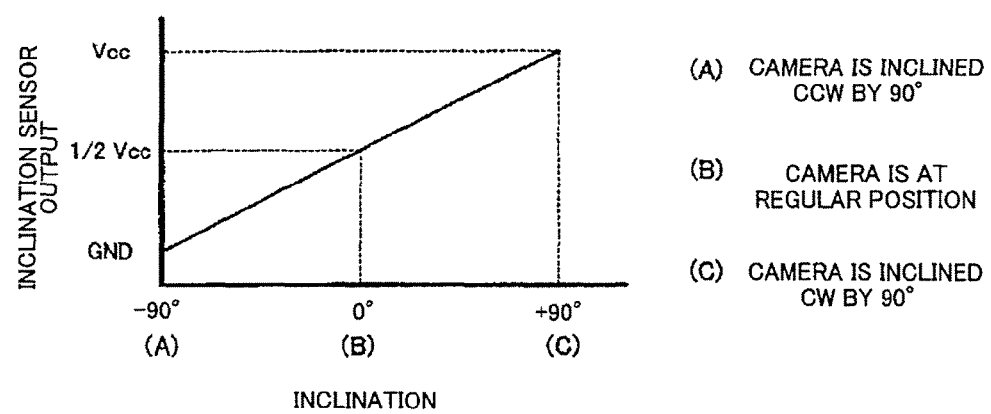
FIG. 69 is a graph showing the relationship between the inclination of the image pickup apparatus shown in FIG. 67 and an inclination sensor (acceleration sensor)

FIG. 69 is a graph showing the relationship between the inclination of the image pickup apparatus 7001 and the output from the inclination sensor (acceleration sensor) 7126. In FIG. 69, the horizontal axis indicates the inclination of the image pickup apparatus 7001. The vertical axis indicates the output from the inclination sensor 7126. Appropriately setting of the gain of the amplifier circuit 7127 makes it possible to provide the output from the inclination sensor 7126 to have the voltage ranges (A) to (C) shown in FIG. 69.

First, the voltage range (B) indicates that the output from the inclination sensor 126 is equal to half of a power supply voltage Vcc, and that the image pickup apparatus 7001 is at a regular position, that is, a picked-up image is kept horizontal. In contrast, the voltage range (A) indicates that the output from the inclination sensor 7126 is at a GND level and that the image pickup apparatus 7001 is inclined counterclockwise by 90°. The voltage range (C) indicates that the output from the inclination sensor 7126 is equal to the power supply voltage and that the image pickup apparatus 7001 is inclined clockwise by 90°.

For the inclinations between those in the voltage ranges (A) and (B) and between those in the voltage ranges (B) and (C), the output from the inclination sensor 7126 changes linearly with the inclination of the image pickup apparatus 7001. Appropriately, by setting a threshold of a predetermined voltage with respect to the output from the inclination sensor 7126 obtained at the regular position, indicated by the voltage range (B), it is possible to determine whether or not the inclination of the image pickup apparatus 7001 is equal to or larger than a predetermined angle (predetermined value α or β). In other words, the switching of the threshold (voltage value) for the output from the inclination sensor 7126 between the wide-angle side and the telephoto side enables the angle at which the guide display is turned on to be separately set for the wide-angle side and for the telephoto side. Reversing the direction of the inclination sensor 7126 reverses the variation in the output from the inclination sensor 7126 provided when the image pickup apparatus 7001 is inclined, with respect to that shown in the graph in FIG. 69.

Figure 70A:
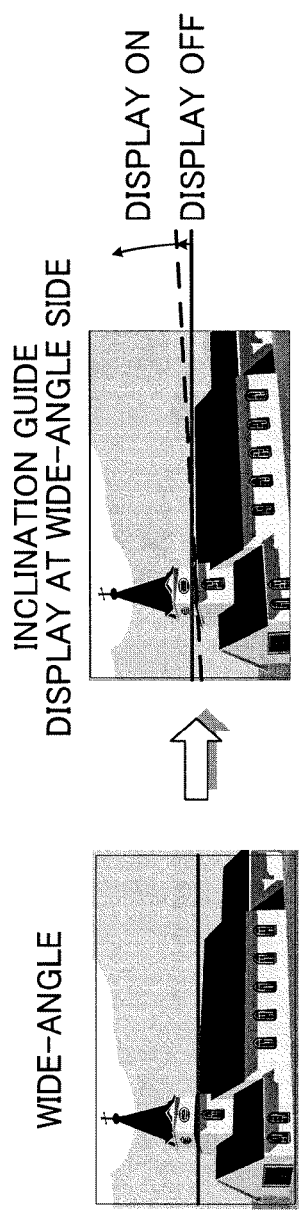
FIGS. 70A and 70B are diagrams schematically showing the range of a guide display on a display device shown in FIG. 67.
Figure 70B:
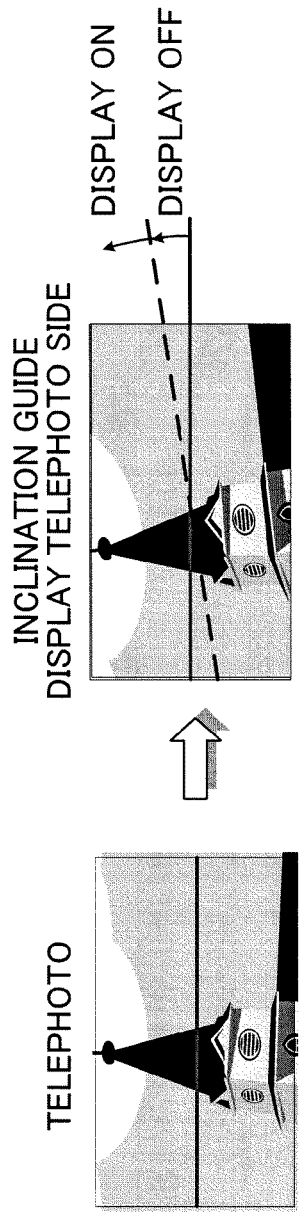

FIGS. 70A and 70B schematically show the range in which the guide display is provided on the display device 7111 such as a viewfinder or a liquid crystal panel. As described above, the threshold (voltage value) for the output from the inclination sensor 7126, providing a guide display, is switched between the wide-angle side and the telephoto side. Thus, as shown in FIGS. 70A and 70B, the area in which the guide display is turned off can be made narrower for the wide-angle side than for the telephoto side. Here, FIG. 70A shows the range in which the guide display is provided for the wide-angle side. FIG. 70B shows the range in which the guide display is provided for the telephoto side.

In step S7104 shown in FIG. 68 to determine whether or not the zoom position is on the telephoto side, a determination may be made whether or not the zoom position is closer to the telephoto end (or the wide-angle end) than a predetermined position. Further, arbitrary setting of the predetermined position enables changing the determination of whether or not the zoom position is on the telephoto side (or on the wide-angle side) on the basis of the arbitrary predetermined position. Accordingly, setting the predetermined position at the vicinity of the telephoto end enables the inclination of the image pickup apparatus 7001 to be displayed in almost entire zoom area except for the vicinity of the telephoto end. This enables the user to quickly determine how inclined the camera is. On the other hand, setting the predetermined position at the vicinity of the wide-angle end enables the guide display to be provided only in the vicinity of the wide-angle end. Thereby, in the middle zoom area and on the telephoto side, the inclination guide display is not provided unless the image pickup apparatus 7001 is significantly inclined. Thus, the user can perform image pickup while paying little attention to the horizontal state.

Thus, when showing the guide display corresponding to the inclination of the image pickup apparatus 7001, the present embodiment changes the inclination at which the guide display is provided between the wide-angle side and the telephoto side. In particular, for wide-angle side image pickup, in which the inclination of the image pickup apparatus 7001 is more noticeable, reducing the inclination at which the guide display is provided enables the user to be quickly noticed of the inclination of the image pickup apparatus 7001. This also enables an increase in the accuracy with which the image pickup apparatus 7001 is kept horizontal.

Moreover, changing the setting of the inclination of the image pickup apparatus 7001 at which the guide display is provided also makes it possible that the guide display is always provided on the wide-angle side and always avoided on the telephoto side. In this case, setting may be made such that on the wide-angle side, the guide display is turned on when the inclination of the image pickup apparatus 7001 is 0° or larger, whereas on the telephoto side, the guide display is turned off when the inclination of the image pickup apparatus 7001 is smaller than ±90°.

In the present embodiment, the guide display is switched according to the zoom position determination in two divided zoom areas, that is, the determination of whether or not the zoom position is on the telephoto side (or the wide-angle side). However, the present invention is not limited thereto. For example, by dividing the entire zoom area into three areas and defining the inclinations of the image pickup apparatus 7001 at which the guide display is provided in the respective zoom areas, as $\alpha$, $\beta$, and $\gamma$, it is possible to switch the guide display between the three zoom areas, a wide-angle area, a middle area, and a telephoto area. Moreover, by increasing the number of areas into which the entire zoom area is divided and setting the inclinations of the image pickup apparatus 7001 at which the guide display is provided, in association with the number of the resulting areas, it is possible to control the guide display for any number of zoom areas obtained by the division.

Figure 71:
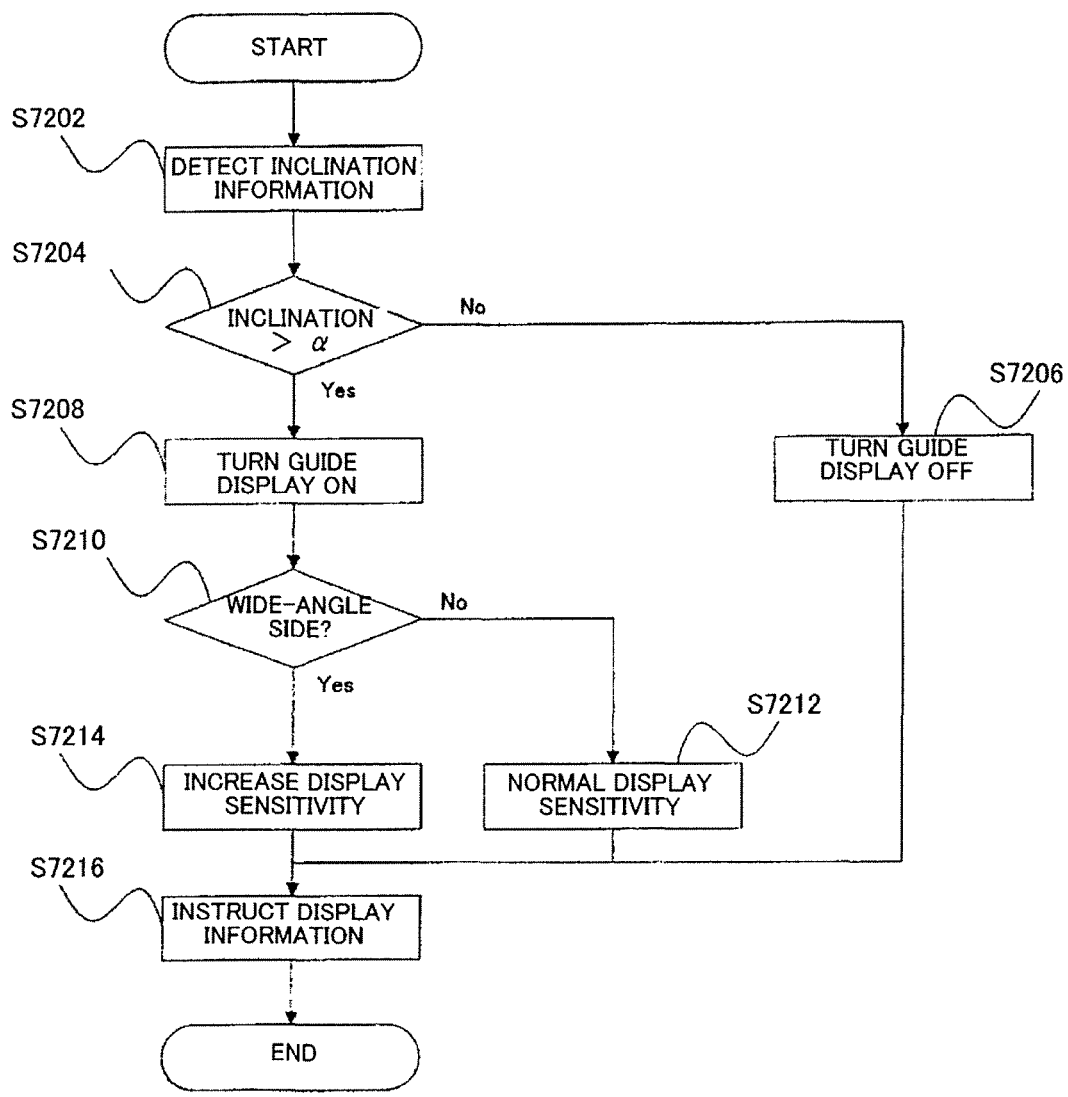
FIG. 71 is a flowchart illustrating another control operation performed by the display controlling part shown in FIG. 67.

Next, with reference to FIG. 71, description will be given of another control operation performed by the display controlling part 7116 in the main controlling part 7114. FIG. 71 is a flowchart illustrating the control operation performed by the display controlling part 7116.

As shown in FIG. 71, first, the inclination information on the image pickup apparatus 7001 is detected on the basis of the output from the inclination sensor 7126 (step S7202). Then, on the basis of the inclination information detected in step S7202, the process determines whether or not the current inclination of the image pickup apparatus 7001 (that is, the detected inclination of the image pickup apparatus 7001) is equal to or larger than the predetermined value $\alpha$ (step S7204).

If the current inclination of the image pickup apparatus 7001 is smaller than the predetermined value $\alpha$, the guide display is turned off (step S7206) and the process proceeds to step S7216, described below. On the other hand, if the current inclination of the image pickup apparatus 7001 is equal to or larger than the predetermined value $\alpha$, the guide display is turned on (step S7208). The process then determines whether or not the current zoom position is on the wide-angle side (step S7210).

In step S7210, if the current zoom position is on the telephoto side, the display sensitivity of the guide display is set to a normal level (step S7212). If the current zoom position is on the wide-angle side, the display sensitivity of the guide display is increased (step S7214). This is an operation for exaggeratedly displaying the inclination of the image pickup apparatus 7001 at which the guide display is provided; an inclination larger than the actual one is displayed. Display information is then provided to the guide display setting part 7129 (step S7216) to show the guide display on the display device 7111.

In the present embodiment, if the zoom position is on the wide-angle side, the guide display is exaggerated to make the inclination of the image pickup apparatus 7001 clearer to enable the user to easily recognize it. Further, if the zoom position is on the wide-angle side, the display sensitivity of the guide display is increased to enable the user to easily recognize a variation in the inclination of the image pickup apparatus 7001 resulting from its slight movement (shake). The user can thus easily set the image pickup apparatus 7001 horizontal. Setting the image pickup apparatus 7001 horizontal makes its inclination smaller than the predetermined value $\alpha$ in step S7204, shown in FIG. 71. This turns off the guide display.

Thus, for a wide-angle zoom position, the present embodiment changes (increases) the display sensitivity of the guide display compared to a telephoto zoom position. This enables the user to be noticed of the inclination of the image pickup apparatus 7001 in an easier-to-understand manner. Moreover, the present embodiment enables the user to clearly recognize the movement amount of the image pickup apparatus 7001 in response to its slight inclination. This enables the image pickup apparatus 7001 to be easily kept horizontal.

Figure 72:
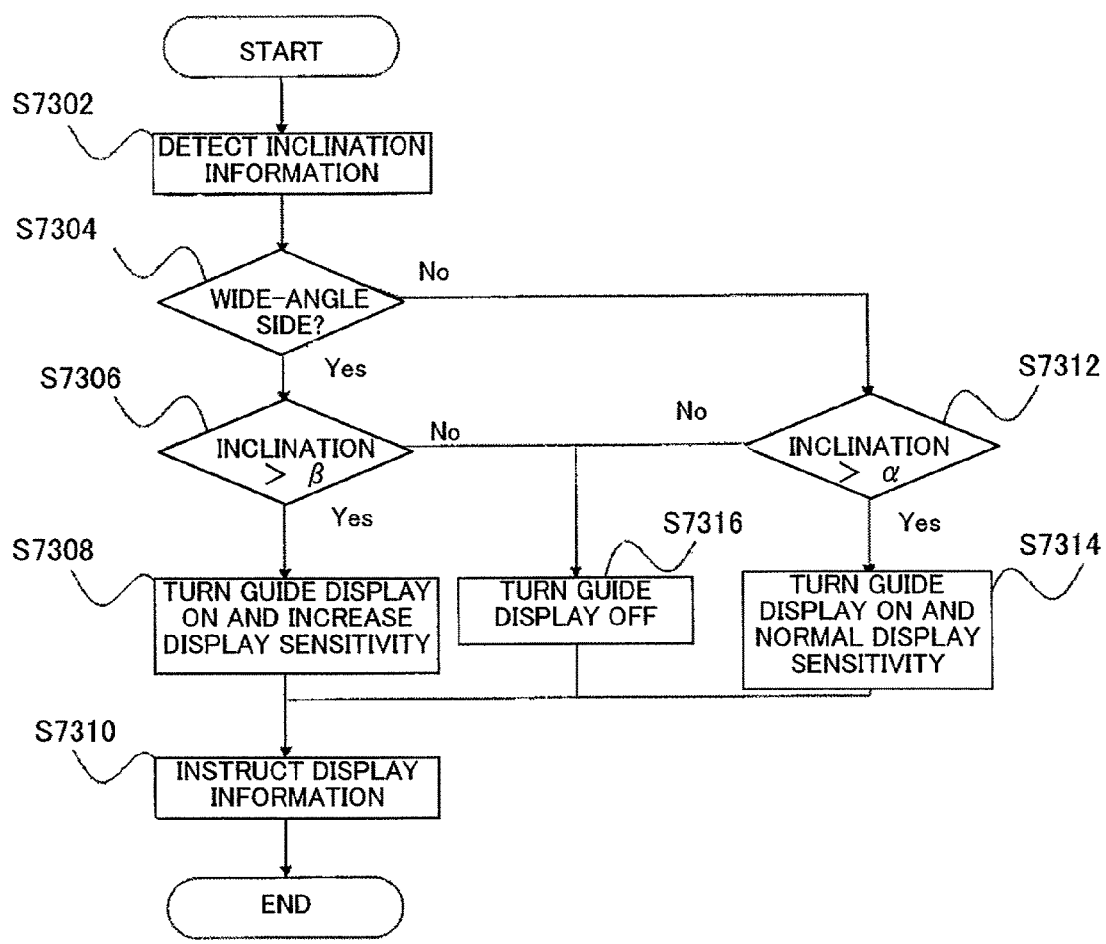
FIG. 72 is a flowchart illustrating another control operation performed by the display controlling part shown in FIG. 67.

With reference to FIG. 72, description will be given below of the control operation performed by the display controlling part 7116 and which is a combination of the control operations shown in FIG. 68 and FIG. 71. In other words, the present embodiment switches the inclination at which the guide display is provided between the wide-angle side and the telephoto side so that the display sensitivity of the guide display is increased on the wide-angle side to exaggeratedly display the inclination of the image pickup apparatus 7001. FIG. 72 is a flowchart illustrating another control operation performed by the display controlling part 7116.

As shown in FIG. 72, first, the inclination information on the image pickup apparatus 7001 is detected on the basis of the output from the inclination sensor 7126 (step S7302).

Then, the process determines whether or not the current zoom position is on the wide-angle side (or the telephoto side) (step S7304).

In step S7304, if the current zoom position is on the wide-angle side, the process determines, on the basis of the inclination information detected in step S7302, whether or not the current inclination of the image pickup apparatus 7001 (that is, the detected inclination of the image pickup apparatus 7001) is equal to or larger than the predetermined value β (step S7306). If the inclination of the image pickup apparatus 7001 is equal to or larger than the predetermined value β, the guide display is turned on and its display sensitivity is increased (step S7308). Then, display information is provided to the guide display setting part 7129 (step S7310) to show the guide display on the display device 7111.

On the other hand, in step S7304, if the current zoom position is on the telephoto side, the process determines, on the basis of the inclination information detected in step S7302, whether or not the current inclination of the image pickup apparatus 7001 is equal to or larger than the predetermined value α (step S7312). If the inclination of the image pickup apparatus 7001 is equal to or larger than the predetermined value α, the guide display is turned on and its display sensitivity is set to the normal level (step S7314). Then, as is the case with a wide-angle zoom position, display information is provided to the guide display setting part 7129 (step S7310) to show the guide display on the display device 7111.

If in step S7306, the inclination of the image pickup apparatus 7001 is smaller than the predetermined value β or if in step S7312, the inclination of the image pickup apparatus 7001 is smaller than the predetermined value α, the image pickup apparatus 7001 is kept almost horizontal. Accordingly, the guide display is turned off (step S7316). Then, the guide display setting part 7129 is instructed to turn off the guide display (step S7310). In accordance with the instruction, the guide display on the display device 7111 is turned off.

Here, the relationship between the predetermined values α and β meets:

> α >(display sensitivity magnification×β).

This makes the inclination of the image pickup apparatus 7001 at which the guide display is turned on always smaller on the wide-angle side than on the telephoto side. The exaggeration level of the guide display on the wide-angle side increases as the inclination of the image pickup apparatus 7001 increases.

The present embodiment provides the guide display at a smaller inclination on the wide-angle side, at which the inclination of the image pickup apparatus 7001 is more noticeable. This enables the user to be quickly noticed of the inclination of the image pickup apparatus 7001. Further, if the image pickup apparatus 7001 is steeply inclined, the inclination is exaggeratedly displayed compared to the actual one. This makes the inclination of the image pickup apparatus 7001 clearer. The present embodiment also enables the user to easily recognize a variation in the inclination of the image pickup apparatus 7001 resulting from its slight movement. The user can thus easily set the image pickup apparatus 7001 horizontal. The accuracy of the horizontal state can also be increased.

As described with reference to FIG. 68, changing the setting of the inclination of the image pickup apparatus 7001 at which the guide display is provided also makes it possible that the guide display is always provided on the wide-angle side and always avoided on the telephoto side. In this case, setting may be made such that on the wide-angle side, the guide display is turned on when the inclination of the image pickup apparatus 7001 is 0° or larger, whereas on the telephoto side, the guide display is turned off when the inclination of the image pickup apparatus 7001 is smaller than ±90°.

Figure 73:
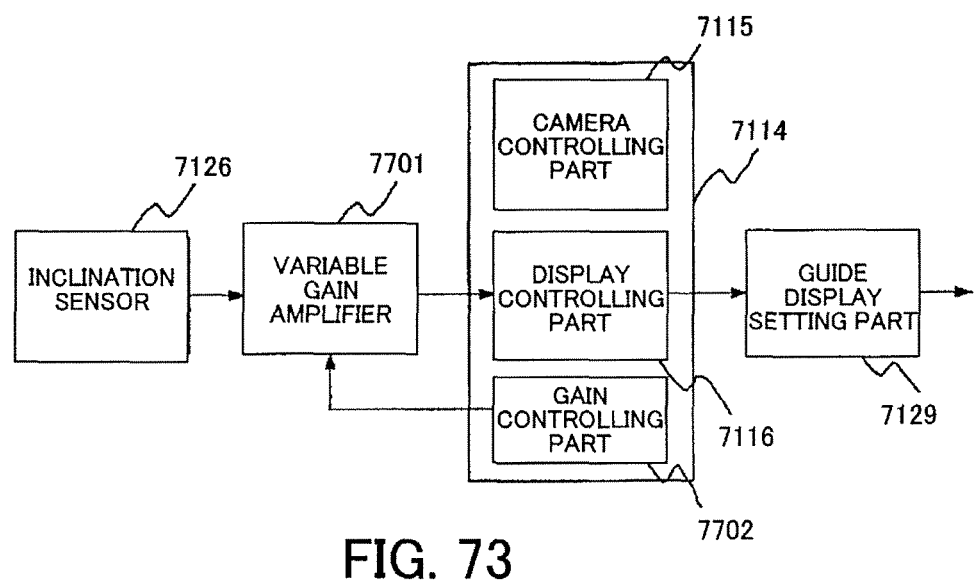
FIG. 73 is a schematic block diagram showing an example of configuration of detector of the image pickup apparatus shown in FIG. 67.

Description will be given of another configuration of a detecting means for detecting the inclination of the image pickup apparatus 7001. FIG. 73 is a schematic block diagram showing an example of the configuration of the detecting means.

Reference numeral 7701 denotes a variable gain amplifier that can change the gain for the output from the inclination sensor 7126. The variable gain amplifier 7701 can change the gain via a gain controlling part 7702 contained in the main controlling part 7714, on the basis of the zoom position determined by the camera controlling part 7115.

Figure 74:
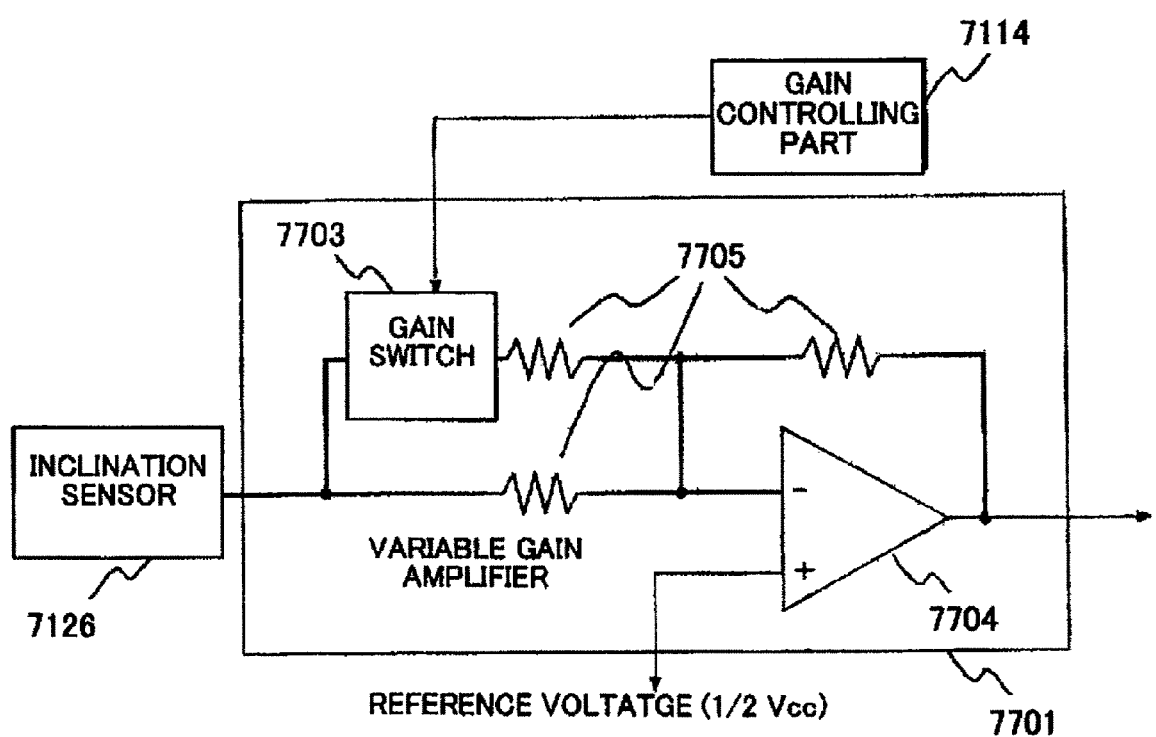
FIG. 74 is a schematic block diagram showing the configuration of a variable gain amplifier shown in FIG. 73.

FIG. 74 is a schematic block diagram showing the configuration of the variable gain amplifier 7701. The variable gain amplifier 7701 includes a gain switch 7703, an amplifier 7704, and resistors 7705, as shown in FIG. 74. A gain switch signal from the gain controlling part 7114 turns on the gain switch 7703 to connect input resistors in parallel with each other with respect to the amplifier 7704, increasing the gain of the amplifier 7701. This increases the sensor sensitivity. This gain change is made in order to exaggerate the inclination of the image pickup apparatus 7001 shown by the guide display compared to the actual one if the current zoom position is on the wide-angle side.

Figure 75:
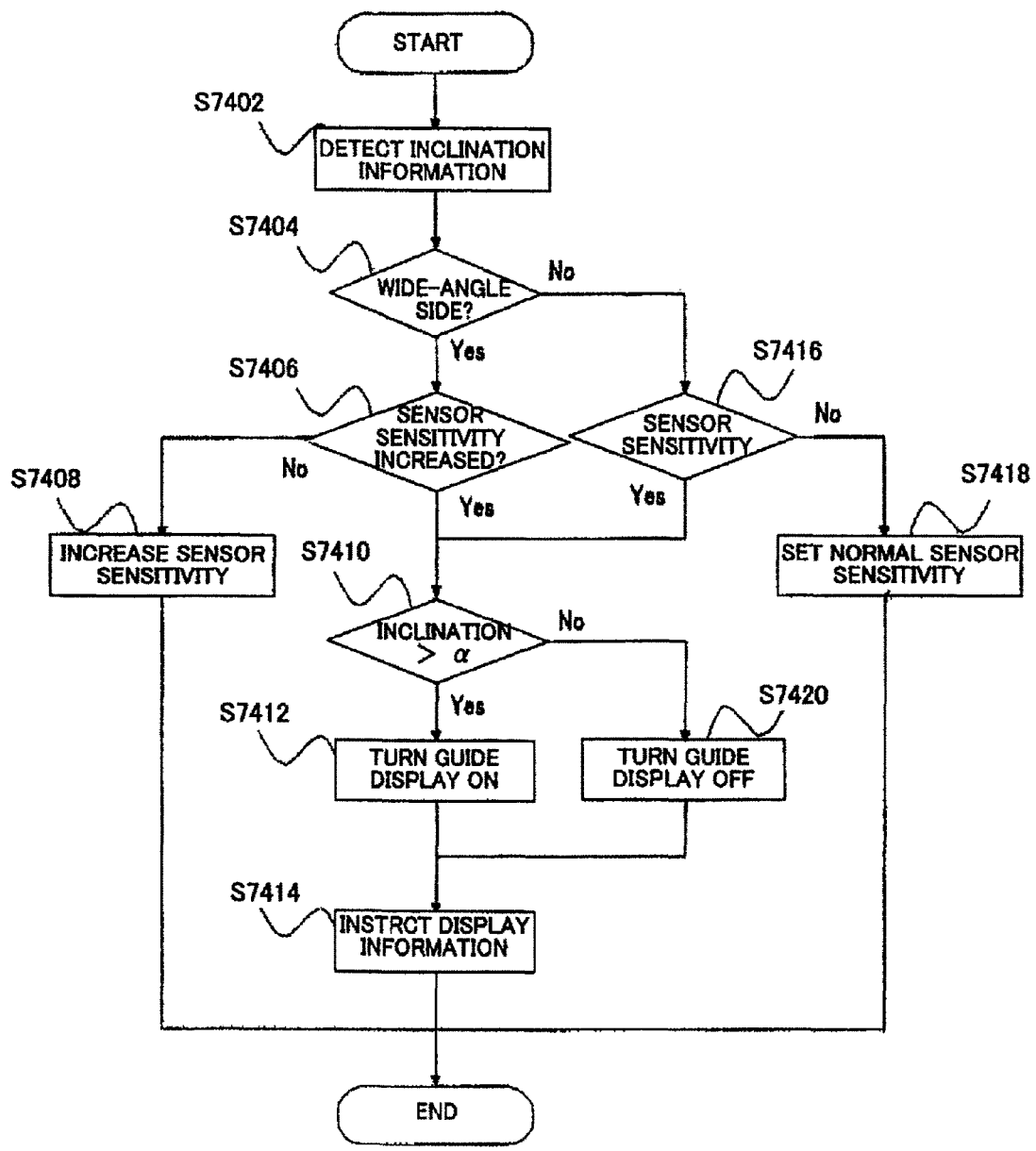
FIG. 75 is a flowchart illustrating another control operation performed by a display controlling part shown in FIG. 73.

With reference to FIG. 75, description will be given of the control operation performed by the display controlling part 7116 in connection with the configuration of the detection means shown in FIG. 73. FIG. 75 is a flowchart illustrating another control operation performed by the display controlling part 7116. With reference to FIG. 75, the inclination information of the image pickup apparatus 7001, which is the output from the variable gain amplifier 7701, is detected (step S7402). Then, the process determines whether or not the current zoom position is on the wide-angle side (step S7404).

In step S7404, if the current zoom position is on the wide-angle side, the process determines whether or not the sensor sensitivity has been increased (step S7406). In other words, the process determines whether or not the gain of the variable gain amplifier 7701 is set higher. If the sensor sensitivity has not been increased, the sensor sensitivity is increased (step S7408). On the other hand, if the sensor sensitivity has been increased, the process determines, on the basis of the inclination information detected in step S7402, whether or not the current inclination of the image pickup apparatus 7001 (that is, the detected inclination of the image pickup apparatus 7001) is equal to or larger than the predetermined value α (step S7410). If the current inclination of the image pickup apparatus 7001 is equal to or larger than the predetermined value α, the guide display is turned on (step S7412). Then, display information is provided to the guide display setting part 7129 (step S7414) to show the guide display on the display device 7111.

On the other hand, if the current zoom position is on the telephoto side, the process determines whether or not the sensor sensitivity is set at the normal level (step S7416). If the sensor sensitivity is not set at the normal level, it is changed to the normal level (step S7418). This is an operation for turning off the gain switch 7703 of the variable gain amplifier 7701. If the sensor sensitivity is set at the normal level, the process proceeds to step S7410.

Regardless of whether the current zoom position is on the wide-angle side or on the telephoto side, the guide display is turned off if the inclination of the image pickup apparatus 7001 is smaller than the predetermined value α in step S7410

(step S7420). Then, the guide display setting part 7129 is instructed to turn off the guide display (step S7414). In accordance with the instruction, the guide display on the display device 7111 is turned off.

Thus, setting the gain of the variable gain amplifier 7701 higher when the current zoom position is on the wide-angle side than when the current zoom position is on the telephoto side can obtain effects similar to those of the display control described with reference to FIG. 71. That is, the user can be made to clearly recognize the inclination of the image pickup apparatus 7001 on the wide-angle side, on which the inclination of the image pickup apparatus 7001 is more noticeable. The present embodiment also enables the user to easily recognize a variation in the inclination of the image pickup apparatus 7001 resulting from its slight movement. The user can thus easily set the image pickup apparatus 7001 horizontal. The accuracy of the horizontal state can also be increased.

As described with reference to FIG. 68, the display control shown in FIGS. 71, 72, and 75 also enables switching between the determination of whether or not the zoom position is on the wide-angle side and the determination of whether or not the zoom position is on the telephoto side, by arbitrarily setting the predetermined position on the basis of which the zoom position is determined. Further, by dividing the entire zoom area into three areas and defining the inclinations of the image pickup apparatus 7001 at which the guide display is provided in the respective areas as α, β, and γ, it is possible to switch the guide display between the three zoom areas, the wide-angle area, the middle area, and the telephoto area. Moreover, by increasing the number of areas into which the entire zoom area is divided and setting the inclinations of the image pickup apparatus 7001 at which the guide display is provided, in association with the number of the resulting areas, it is possible to control the guide display for any number of zoom areas obtained by the division.

The image pickup apparatus 7001 changes the inclination at which the guide display is displayed or not displayed depending on the zoom position. Thus, on the wide-angle side, on which the inclination of the image pickup apparatus 7001 is noticeable, the user can be noticed of even a slight inclination (that is, the user can be urged to correct the inclination). The image pickup apparatus 7001 can thus provide an image having no noticeable inclination, that is, a high quality image. Further, on the telephoto side, on which the inclination of the image pickup apparatus 7001 is unnoticeable, the display of information (guide display) on the horizontal state of the image pickup apparatus 7001 can be avoided unless the image pickup apparatus 7001 is significantly inclined. This makes it possible to prevent disorder on the displayed image. Thus, the image pickup apparatus 7001 can provide high quality images and improve convenience for the user.

Embodiment 25

Figure 76:
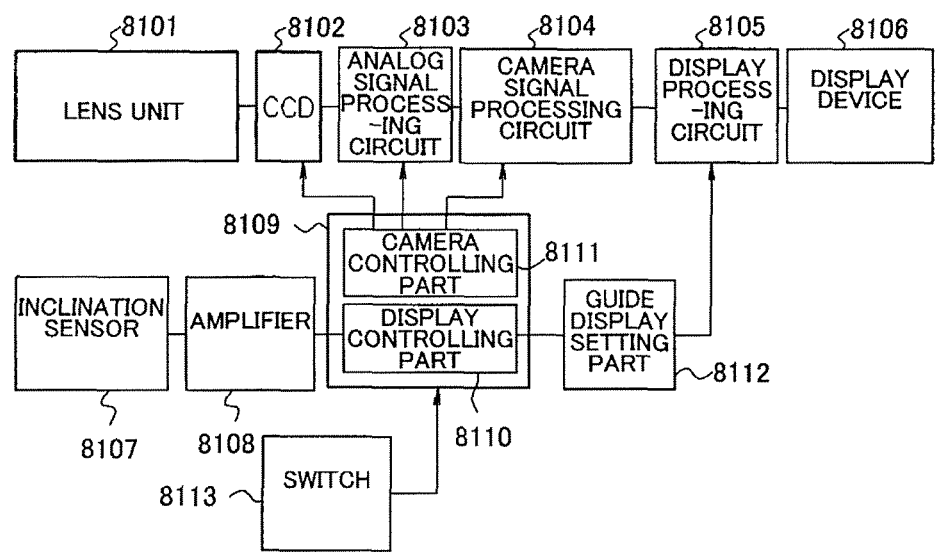
FIG. 76 is a block diagram showing the outlined configuration of a video camera that is Embodiment 25.

FIG. 76 is a block diagram showing the outlined configuration of a video camera that is Embodiment 25. Reference numeral 8101 denotes a lens unit used to pick up an image of an object. Reference numeral 8102 denotes a CCD that photoelectrically converts an object image formed by the lens unit 8101 into a signal.

Reference numeral 8103 denotes an analog signal processing circuit. The analog signal processing circuit 8103 executes predetermined processing on the signal from the CCD 8102 to generate an analog image pickup signal. The analog signal processing circuit 8103 is constituted by, for example, a CDS (Co-related Double Sampling) circuit and an AGC (Automatic Gain Control) circuit. Reference numeral 8104 denotes a camera signal processing circuit containing an A/D converter that converts the analog image pickup signal into a digital signal. The camera signal processing circuit 8104 further executes predetermined signal processing such as gamma correction and white balancing on the digital signal to generate a final output video signal.

Reference numeral 8107 denotes an inclination sensor that detects the inclination of the video camera. In the present embodiment, an acceleration sensor is used for the inclination sensor 8107. Reference numeral 8108 denotes an amplifier circuit that amplifies an output from the inclination sensor 8107.

Reference numeral 8109 denotes a camera system controlling microcomputer including a camera controlling part 8111 and a display controlling part 8110. The camera controlling part 8111 controls the drive of the CCD 8102, analog signal processing circuit 8103, and camera signal processing circuit 8104. At the same time, The display controlling part 8110 loads an output from the amplifier 8108 to determine whether or not to provide an inclination guide display corresponding to the inclination, on the basis of the detected inclination information. The display controlling part 8110 then outputs inclination guide display control information to a guide display setting part 8112.

Reference numeral 8112 denotes the guide display setting part that outputs an inclination guide display signal on the basis of the inclination guide display control information from the display controlling part 8110. Reference numeral 8105 denotes a display processing circuit that superimposes, on the basis of the inclination guide display signal, the inclination guide display on the output video signal to show them on a display device 8106. Reference numeral 8106 denotes the display device such as a liquid crystal panel or a viewfinder.

Reference numeral 8113 denotes an image pickup mode setting switch that switches the setting of the image pickup mode. The user can use the image pickup mode setting switch 8113 to select one of the image pickup modes included in specifications of the camera such as a scenery image pickup mode, a portrait image pickup mode, and a sports image pickup mode. For example, for the scenery image pickup mode, exposure control is set to offer a large depth of field so that sharp images can be picked up for near views and distant views. For the portrait image pickup mode, exposure control is set so that the background of a main object is out of focus. For the sports image pickup mode, exposure control is set so that the shutter is controlled to weight a high-speed side so as to adequately capture a fast moving object. The setting of the image pickup mode may involve modes obtained by combining camera control operations such as exposure control and white balance control. When the image pickup mode is switched, the camera controlling part 8111 performs setting for each processing circuit appropriate to the set image pickup mode.

Figures 1, 2, 3, 77A:
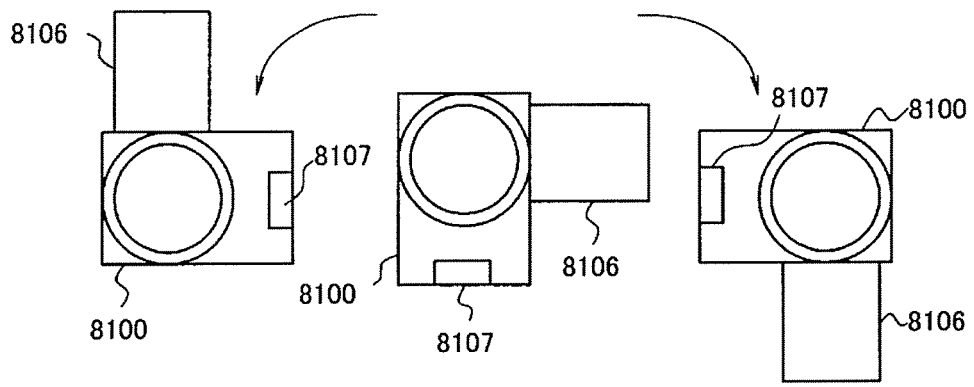

With reference to FIGS. 77A-1 to 77A-3 and FIG. 77B, description will be given of the relationship between the inclination of the video camera and the output from the inclination sensor 8107. In FIGS. 77A-1 to 77A-3, reference numerals 8100, 8106, and 8107 denote the video camera, the liquid crystal panel as the display device, and the inclination sensor (acceleration sensor), respectively. FIG. 77A-2 shows that the video camera 8100 is in a normal image pickup state (at a regular position). FIG. 77A-1 shows that the video camera 8100 is inclined counterclockwise by 90°. FIG. 77A-3 shows that the video camera 8100 is inclined clockwise by 90°.

Figure 77B:
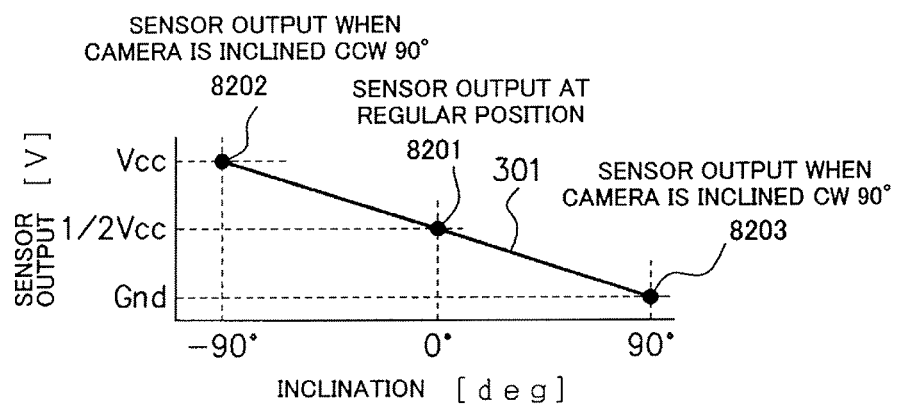
FIG. 77B is a diagram showing the relationship between the inclination of the video camera and an output from the inclination sensor.

FIG. 77B shows the output characteristics of the inclination sensor 8107 observed in the states shown in FIG. 77A-1, FIG. 77A-2, and FIG. 77A-3. In FIG. 77B, the vertical axis indicates the output from the inclination sensor 8107. The horizontal axis indicates the inclination of the inclination sensor 8107. Reference numeral 8301 denotes the amount of variation in the output from the inclination sensor 8107 corresponding to the inclination of the video camera 8100. Appropriately setting of the gain of the amplifier circuit 8108, which amplifies the output from the inclination sensor 8107, enables the illustrated output range to be obtained.

A point 8201 in FIG. 77B denotes the output from the inclination sensor 8107 obtained when the video camera 8100 is at the regular position and which is equal to half of a power supply voltage Vcc. In contrast, inclining the video camera 8100 counterclockwise by 90° as shown in FIG. 77A-1 provides the output from the inclination sensor 8107 equal to the power supply voltage Vcc (a point 8202 in FIG. 77B). Conversely, inclining the video camera 8100 clockwise by 90° as shown in FIG. 77A-3 provides the output from the inclination sensor 8107 at a GND level (a point 8203 in FIG. 77B).

For the inclinations between those at points 8201 and 8202 and between those at points 8201 and 8203 in FIG. 77B, the output from the inclination sensor 8107 has a characteristic in which it changes linearly with the inclination. Accordingly, whether or not a predetermined inclination (angle) has been reached can be determined by setting a predetermined threshold voltage higher or lower than the output voltage corresponding to the regular position shown at the point 8201 in FIG. 77B. Switching the threshold voltage for the sensor output voltage between the scenery image pickup mode and the image pickup modes other than the scenery image pickup mode (hereinafter referred to as the other image pickup modes) enables the setting of the inclination (angle) at which the guide display is turned on or off (the inclination guide display is provided or not provided) depending on the image pickup mode. Reversing the direction in which the inclination sensor 8107 is mounted reverses the characteristic of the sensor output voltage obtained when the video camera 8100 is inclined, with respect to that shown in FIG. 77B. However, the similar setting can be made.

Figure 78:
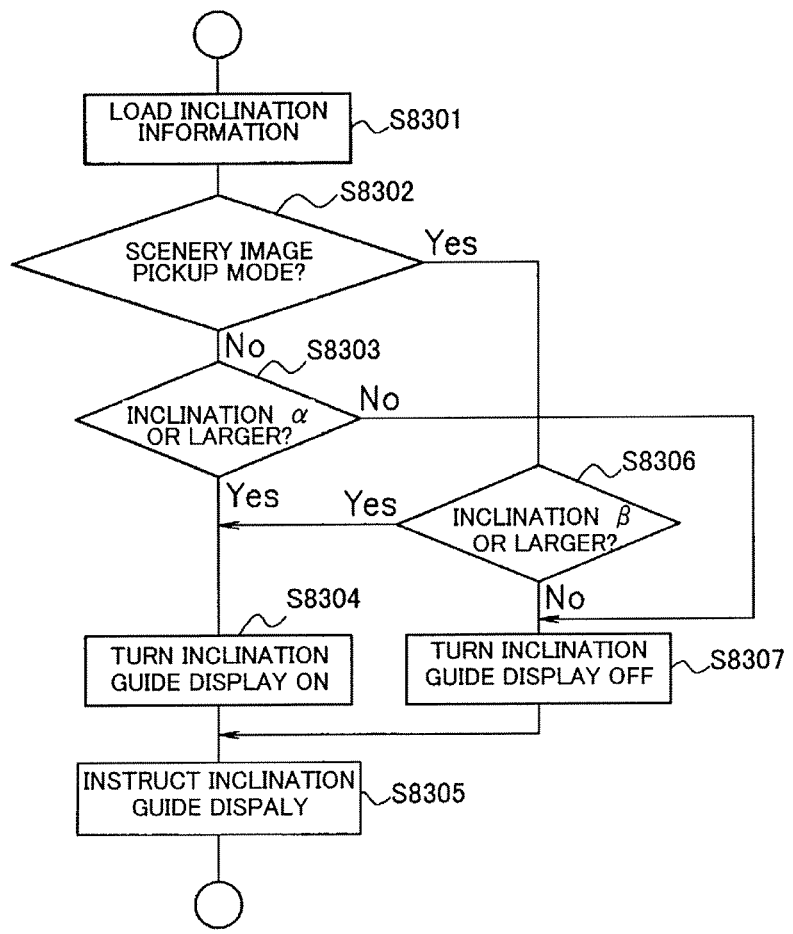
FIG. 78 is a flowchart illustrating the processing operation performed by the video camera that is Embodiment 25.

FIG. 78 is a flowchart illustrating the processing operation performed by the video camera 8100 of Embodiment 25. In step S301, the camera system controlling microcomputer 8109 loads the inclination information. In step S8302, the camera system controlling microcomputer 8109 determines the current setting of the image pickup mode. Specifically, the process determines whether or not the scenery image pickup mode is set.

In step S8302, if the scenery image pickup mode is not set, the process proceeds to step S8303, where the camera system controlling microcomputer 8109 determines whether or not the current inclination of the video camera 8100 is equal to or larger than a set value α. If the inclination is equal to or larger than the value α, the process proceeds to step S8304 to turn on the inclination guide display (the inclination guide display is provided). If the inclination is smaller than the value α, the process proceeds to step S8307 to turn off the inclination guide display (the inclination guide display is not provided).

On the other hand, if the scenery image pickup mode is set in step S8302, the process proceeds to step S8306, where the camera system controlling microcomputer 8109 determines whether or not the current inclination of the video camera 8100 is equal to or larger than a set value β. If the inclination is equal to or larger than the value β, the process proceeds to step S8304 to turn on the inclination guide display (the inclination guide display is provided). If the inclination is smaller than the value β, the process proceeds to step S8307 to turn off the inclination guide display (the inclination guide display is not provided).

Here, the relationship between α and β is α>β. The inclination of the video camera 8100 at which the inclination guide display is turned on or off (the inclination guide display is provided or not provided) is set smaller in the scenery image pickup mode than in the other image pickup modes. That is, in the scenery image pickup mode in which a wide angle of view is often used for image pickup, the inclination of the video camera being more noticeable at the wide angle of view, the inclination guide display is provided at a smaller inclination. Consequently, the user can be warned of even a slight inclination of the video camera 8100.

In step S8305, the camera system controlling microcomputer 8109 outputs the inclination guide display control information to the guide display setting part 8112 to give an instruction on the inclination guide display thereto.

Figure 79A:
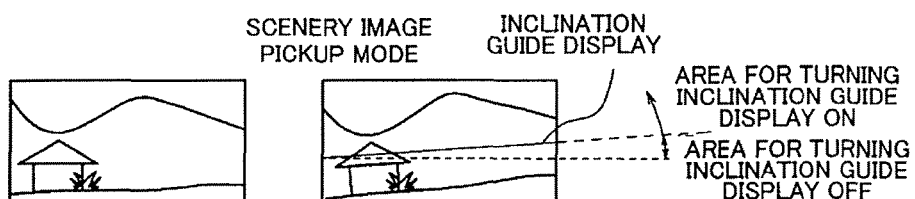
FIGS. 79A and 79B are diagrams showing how an inclination guide display is provided on a display device.
Figure 79B:
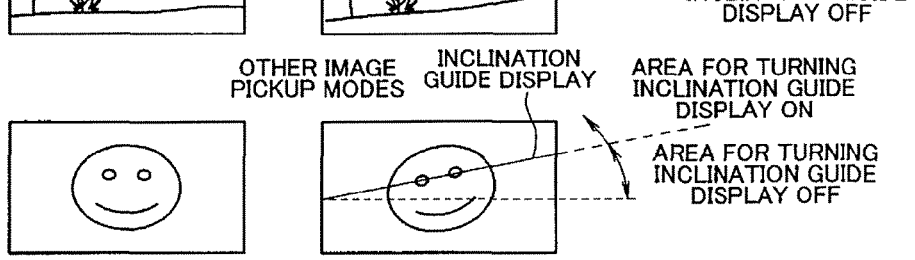

FIGS. 79A and 79B are diagrams showing how the display device 8106 provides the inclination guide display. As described above, the inclination (the threshold voltage for the sensor output) at which the inclination guide display is turned on or off changes between the scenery image pickup mode and the other image pickup modes. This makes it possible to make the range within which the inclination guide display is turned off narrower in the scenery image pickup mode (FIG. 79A) than in the other image pickup modes (FIG. 79B). Consequently, in the scenery image pickup mode, the user can more quickly determine that the video camera 8100 is inclined.

Next, description will be given of an example in which the threshold voltage for the sensor output at which the inclination guide display is provided is determined. The scenery image pickup mode is a setting mode for which exposure control is set to offer a large depth of field so that sharp images can be picked up for near views and distant views. Thus, the exposure control is mainly performed with a narrow aperture. Further, in the scenery image pickup mode, image pickup is often performed with a wider angle of view. Thus, the threshold voltage may be set equal to a sensor output voltage for turning on the inclination guide display at a small inclination when the focal length corresponds to a wide-angle side relative to a predetermined focal length (for example, half of the focal length of the lens unit) and when the aperture value is equal to or larger than a predetermined aperture value (for example, F8).

As described above, when the inclination guide display showing the inclination of the video camera 8100 is provided on the display device 8106, the inclination at which the guide display is turned on or off changes between the scenery image pickup mode and the other image pickup modes. In particular, for image pickup in the scenery image pickup mode, in which a wide angle of view, with which the inclination of the video camera is more noticeable, is often used for image pickup, the inclination at which the inclination guide display is turned on or off is set smaller. This enables the user to be quickly noticed of the inclination of the camera and also enables an increase in horizontal accuracy. On the other hand, for the sports image pickup mode or the portrait image pickup mode, in which a wide angle of view is infrequently used, the guide display is not provided unless the camera is steeply inclined. This reduces the complicatedness of the image monitored during image pickup.

Embodiment 26

Embodiment 26 of the present invention will be described. The configuration of a video camera that is Embodiment 26 is similar to that in Embodiment 25 and will not be described below in detail.

Figure 80:
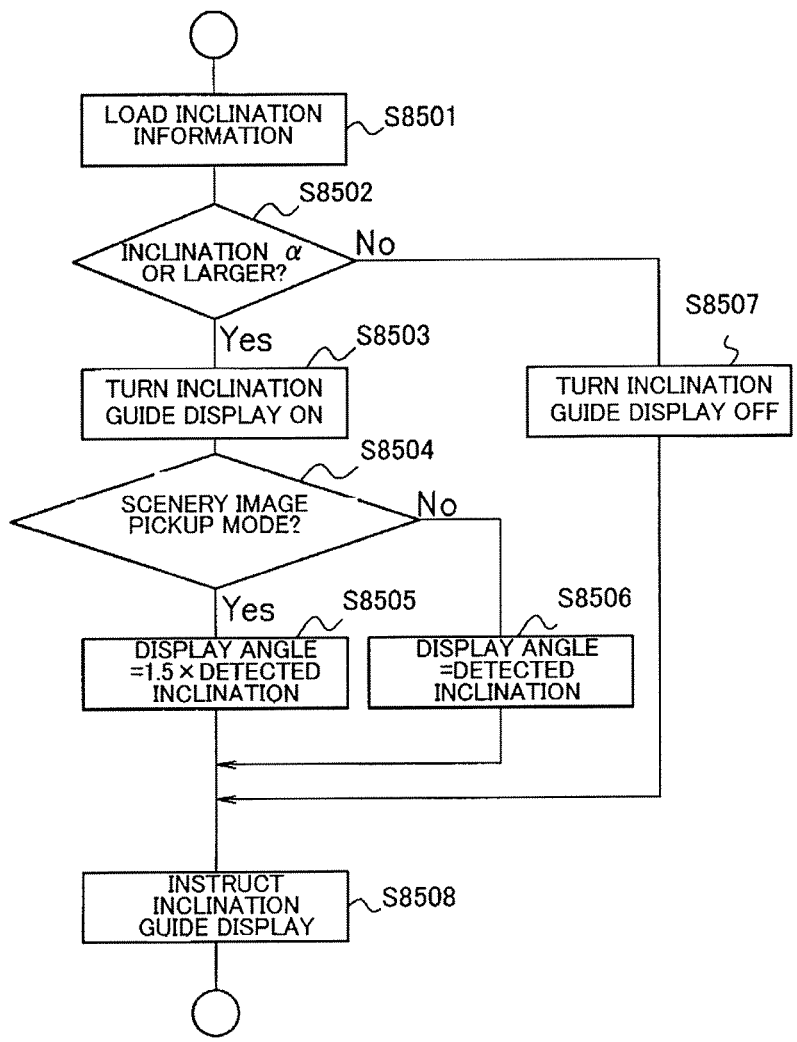
FIG. 80 is a flowchart illustrating the processing operation performed by a video camera that is Embodiment 26.

FIG. 80 is a flowchart illustrating the processing operation performed by the video camera 8100 of Embodiment 26. In step S8501, the camera system controlling microcomputer 8109 loads the inclination information. In step S8502, the camera system controlling microcomputer 8109 determines whether or not the current inclination of the video camera 8100 is equal to or larger than the set value α. If the inclination is equal to or larger than the set value α, the process proceeds to step S8503 to turn on the inclination guide display (the inclination guide display is provided). If the inclination is smaller than the set value α, the process proceeds to step S8507 to turn off the inclination guide display (the inclination guide display is not provided).

If the inclination guide display is turned on (the inclination guide display is provided) in step S8503, then the camera system controlling microcomputer 8109 determines the current setting of the image pickup mode in step S8504. Specifically, the camera system controlling microcomputer 8109 determines whether or not the scenery image pickup mode is set.

In step S8504, if the scenery image pickup mode is set, the process proceeds to step S8505 to set the angle of the inclination guide display 1.5 times as large as an output value from the inclination sensor 8107 in order to increase the level of exaggeration of the inclination guide display. On the other hand, in step S8504, if the scenery image pickup mode is not set, the process proceeds to step S8506 to set the angle of the inclination guide display equal to the output value from the inclination sensor 8107.

In step S8608, the camera system controlling microcomputer 8109 outputs the inclination guide display control information to the guide display setting part 8112 to give an instruction on the inclination guide display thereto.

Figure 83A:
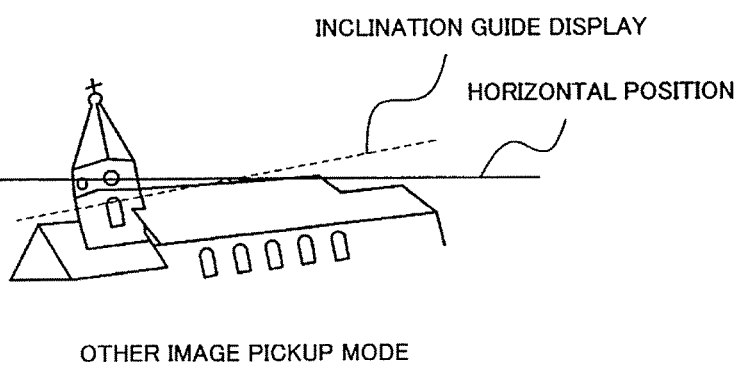
FIGS. 83A and 83B are diagrams showing how an inclination guide display is provided on a display device.
Figure 83B:
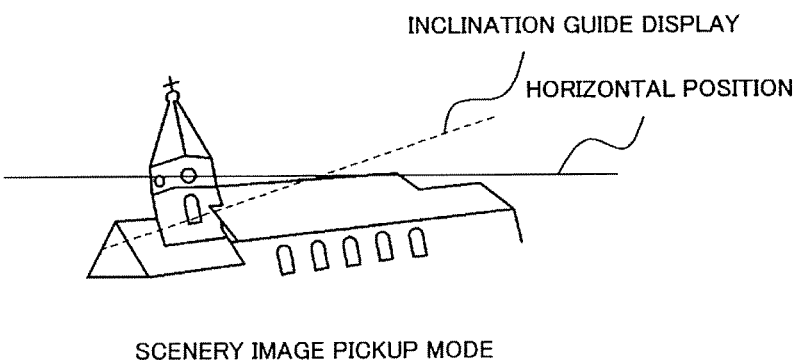

FIGS. 83A and 83B are diagrams showing how the display device 8106 provides the inclination guide display. The figure shows that even with the same inclination of the video camera 8100 to a horizontal position, the inclination guide display is exaggerated so as to show a larger angle in the scenery image pickup mode (FIG. 83B) than in the other image pickup modes (FIG. 83A). This enables the user to be warned of even a slight inclination of the video camera 8100 in the scenery image pickup mode.

Thus exaggerating the angle of the inclination guide display in the scenery image pickup mode makes the inclination of the video camera 8100 clearer to enable the user to easily recognize the inclination. Exaggerating the inclination guide display in the scenery image pickup mode enables the user to easily recognize a variation in inclination resulting from a slight movement. This enables the user to easily set the video camera horizontal.

As described above, in the scenery image pickup mode, the level of exaggeration of the inclination guide display is set higher than in the other image pickup modes. Thus, in the scenery image pickup mode, in which the inclination of a picked-up image is noticeable, the user can be noticed of the inclination of the video camera 8100 in an easier-to-understand manner. Moreover, the user can clearly recognize the inclining displacement amount of the video camera 8100 resulting from its slight inclination, so that the user can easily set the video camera 8100 in the horizontal state. On the other hand, the inclination guide display is not exaggerated in the sports image pickup mode or the portrait image pickup mode, in which a wide angle of view is infrequently used. This makes it possible to reduce the complicatedness of the image monitored during image pickup.

Embodiment 27

Figure 81:
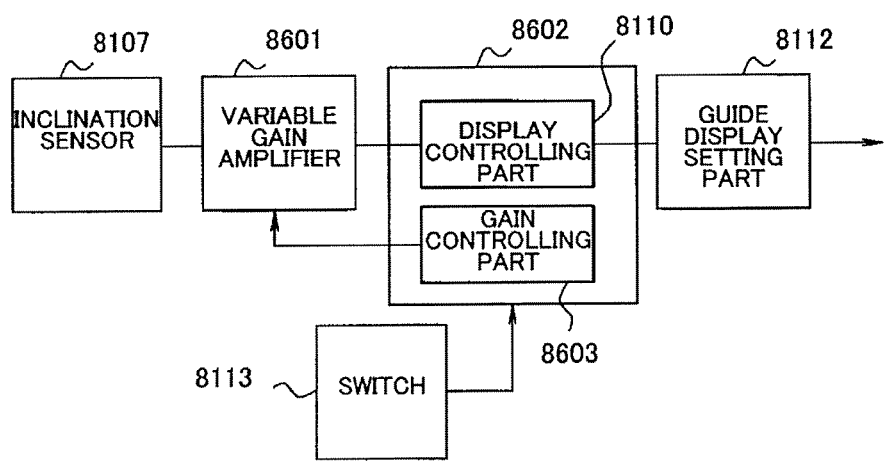
FIG. 81 is a block diagram showing a part of outlined configuration of a video camera that is Embodiment 27.

Embodiment 27 of the present invention will be described. FIG. 81 is a block diagram showing part of the outlined configuration of a video camera that is Embodiment 27. The basic configuration of the video camera is similar to that in Embodiment 25 except that the amplifier circuit 8108 is replaced with a variable gain amplifier circuit 8601. Components similar to those shown in FIG. 76 are denoted by the same reference numerals and will not be described below in detail.

The variable gain amplifier circuit 8601 changes the gain of the sensor output from the inclination sensor 8107 to enable a variation in the detection sensitivity of the inclination detector constituted by the inclination sensor 8107 and the variable gain amplifier circuit 8601. A gain controlling part 8603 provided in a camera system controlling microcomputer 8602 changes the gain setting of the variable gain amplifier circuit 8601 depending on the image pickup mode set via the image pickup mode setting switch 8113.

Figure 84:
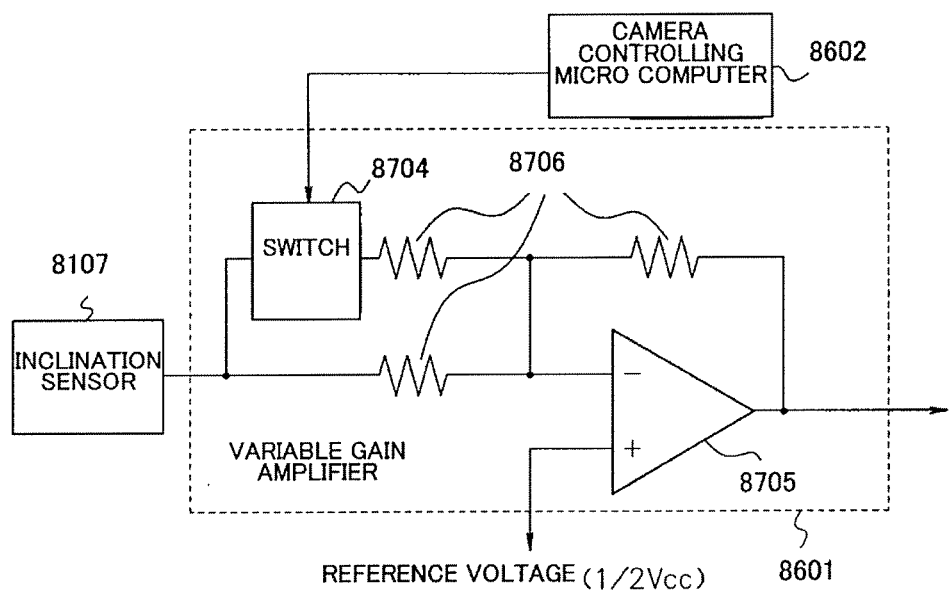
FIG. 84 is a diagram showing an example of configuration of a variable gain amplifier circuit that is Embodiment 27.

FIG. 84 is a diagram showing an example of configuration of the variable gain amplifier circuit 8601. The variable gain amplifier circuit 8601 is constituted by an amplifier 8705, resistors 8706, and a gain switch 8704. A switch signal from the camera system controlling microcomputer 8602 connects input resistors in parallel with each other with respect to the amplifier 8705 to increase the amplifier gain. The gain is changed in order to exaggerate the inclination guide display in the scenery image pickup mode.

Figure 82:
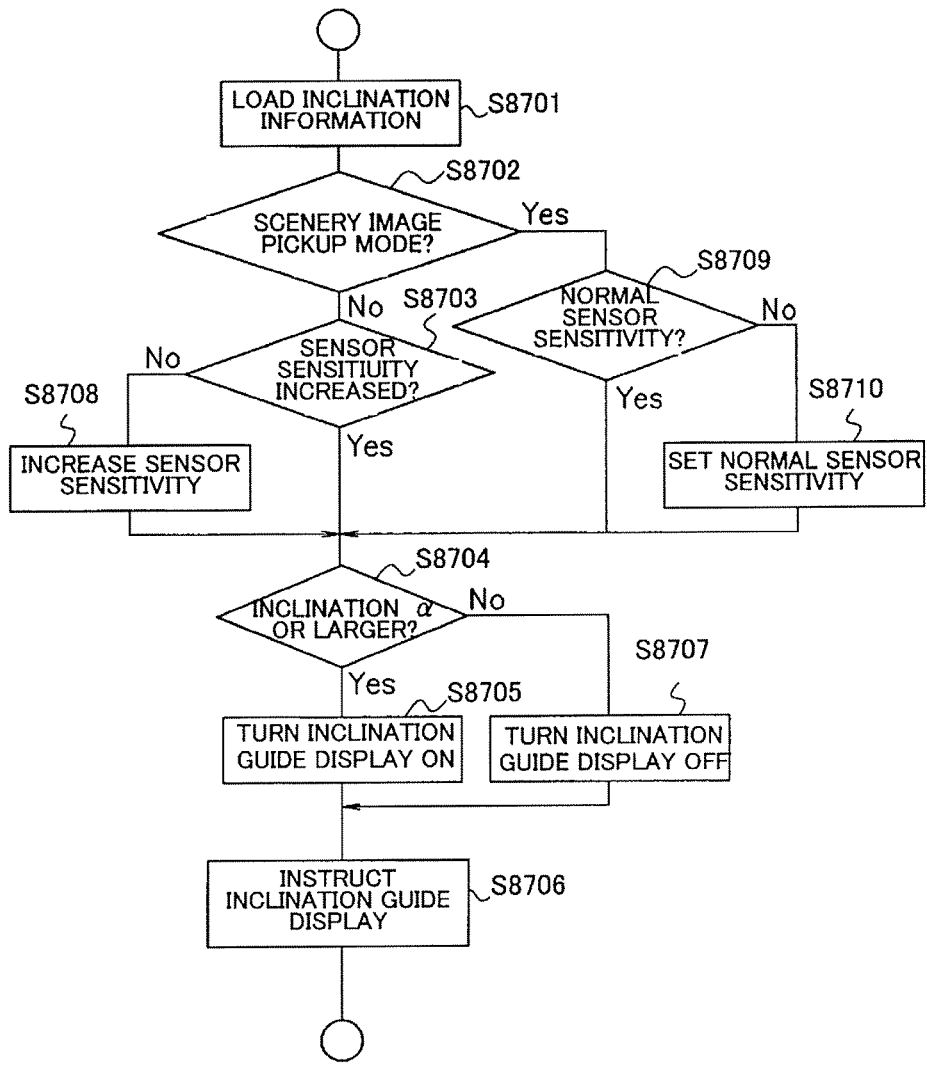
FIG. 82 is a flowchart illustrating the processing operation performed by a video camera that is Embodiment 27.

FIG. 82 is a flowchart illustrating the processing operation performed by the video camera 8100 of Embodiment 27. In step S701, the camera system controlling microcomputer 8602 loads the inclination information. In step S8702, the camera system controlling microcomputer 8602 determines the current setting of the image pickup mode. Specifically, the camera system controlling microcomputer 8602 determines whether or not the scenery image pickup mode is set.

In step S8702, if the scenery image pickup mode is set, the process proceeds to step S8703 to check whether or not the sensor sensitivity has been increased, that is, whether or not the gain of the variable gain amplifier 8601 is set higher. If the sensor sensitivity has not been increased, then in step S8708, setting is made to increase the sensor sensitivity.

Then, in S8704, the camera system controlling microcomputer 8602 determines whether or not the current inclination of the video camera 8100 is equal to or larger than the set value α. If the current inclination of the video camera 8100 is equal to or larger than the set value α, the process proceeds to step S8705 to turn on the inclination guide display (the inclination guide display is provided). If the current inclination of the video camera 8100 is smaller than the set value α, the process proceeds to step S8707 to turn off the inclination guide display (the inclination guide display is not provided).

On the other hand, in step S8702, if the scenery image pickup mode is not set, the process proceeds to step S8709 to check whether or not the sensor sensitivity is set at a normal level. If the sensor sensitivity is not set at the normal level, that is, the sensor sensitivity is set for the scenery image pickup mode, it is changed to the normal level in step S8710. This is an operation for turning off the gain switch 8704 in the variable gain amplifier circuit 8601.

In step S8704, the camera system controlling microcomputer 8602 determines whether or not the current inclination of the video camera 8100 is equal to or larger than the set value α. If the inclination is equal to or larger than the set value α, the process proceeds to step S8705 to turn on the inclination guide display (the inclination guide display is provided). If the inclination is smaller than the set value α, the process proceeds to step S8707 to turn off the inclination guide display (the inclination guide display is not provided).

In step S8706, the camera system controlling microcomputer 8602 outputs the inclination guide display control information to the guide display setting part 8112 to give an instruction on the inclination guide display thereto.

As described above, in the scenery image pickup mode, the sensor sensitivity is set higher than in the other image pickup modes. Thus, since the level of exaggeration of the inclination guide display is increased as in Embodiment 26 in the scenery image pickup mode, in which the inclination of a picked-up image is noticeable, the user can be noticed of the inclination of the video camera 8100 in an easier-to-understand manner. Moreover, the user can clearly recognize the inclining displacement amount of the video camera 8100 resulting from its slight inclination, so that the user can easily set the video camera 8100 horizontal. On the other hand, the inclination guide display is not exaggerated in the sports image pickup mode or the portrait image pickup mode, in which a wide angle of view is infrequently used. This makes it possible to reduce the complicatedness of the image monitored during image pickup.

Embodiment 28

Embodiment 28 of the present invention will be described. Embodiment 28 is a combination of Embodiments 25 and 26, described above. That is, the inclination at which the provision and non-provision of the inclination guide display are switched is changed between the scenery image pickup mode and the other image pickup modes. The level of exaggeration of the inclination guide display is increased for the scenery image pickup mode. The configuration of a video camera that is Embodiment 28 is similar to that in Embodiment 25 and will not be described below in detail.

Figure 85:
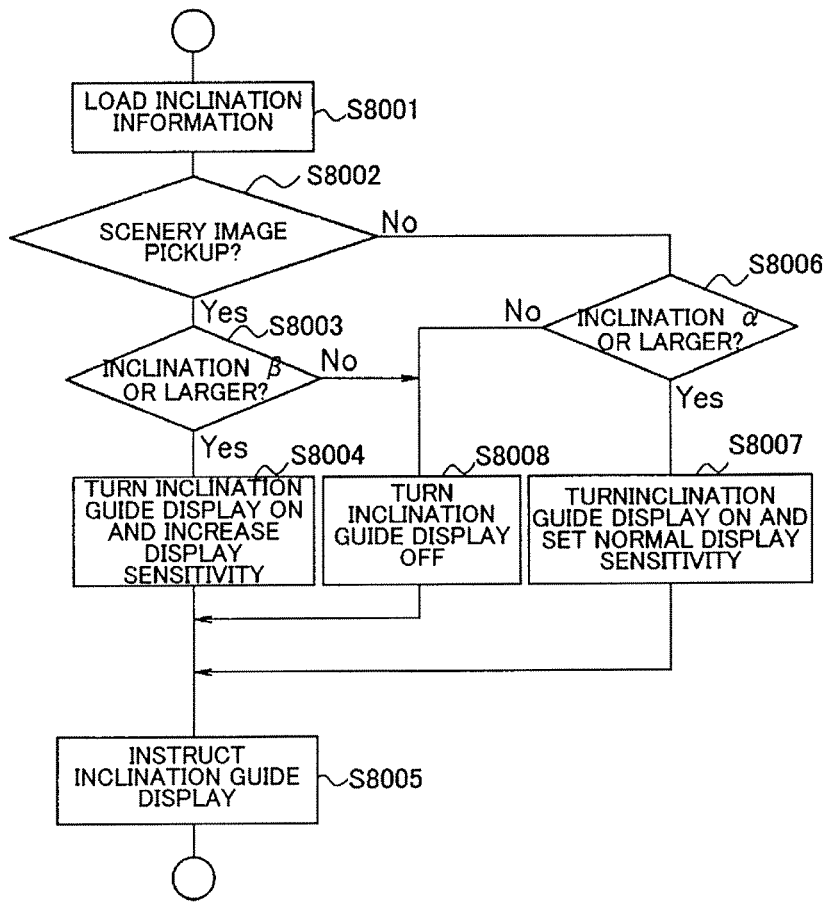
FIG. 85 is a flowchart illustrating the processing operation performed by a video camera that is Embodiment 28.

FIG. 85 is a flowchart illustrating the processing operation performed by the video camera 8100 that is Embodiment 28. In step S8001, the camera system controlling microcomputer 8109 loads the inclination information. In step 8002, the camera system controlling microcomputer 8109 determines the current setting of the image pickup mode. Specifically, the camera system controlling microcomputer 8109 determines whether or not the scenery image pickup mode is set.

In step S8002, if the scenery image pickup mode is set, the process proceeds to step S8003, where the camera system controlling microcomputer 8109 determines whether or not the current inclination of the video camera 8100 is equal to or larger than a set value β. If the current inclination of the video camera 8100 is equal to or larger than the set value β, the process proceeds to step S8004 to turn on the inclination guide display and further to increase the level of exaggeration. If the current inclination of the video camera 8100 is smaller than the set value β, the process proceeds to step S8008 to turn off the inclination guide display.

On the other hand, in step S8002, if the scenery image pickup mode is not set, the process proceeds to step S8006, where the camera system controlling microcomputer 8109 determines whether or not the current inclination of the video camera 8100 is equal to or larger than a set value α. If the current inclination of the video camera 8100 is equal to or larger than the set value α, the process proceeds to step S8007 to turn on the inclination guide display and to set the level of exaggeration at the normal value. If the current inclination of the video camera 8100 is smaller than the set value α, the process proceeds to step S8008 to turn off the inclination guide display.

Here, the relationship between α and β is:

>(exaggeration coefficient×β).

The exaggeration coefficient indicates the number of times by which the output value from the inclination sensor 8107 is increased to set the angle of the inclination guide display. In the present embodiment, the exaggeration coefficient is 1.5 in the scenery image pickup mode. Accordingly, the angles α and β are set so as to satisfy the relationship α>1.5×β. This makes the inclination at which the inclination guide display is turned on or off (the inclination guide display is provided or not provided) always smaller in the scenery image pickup mode than in the other image pickup modes. Moreover, the level of exaggeration of the inclination guide display in the scenery image pickup mode increases as the inclination of the video camera 8100 increases.

As described above, the inclination guide display showing the inclination of the video camera 8100 is provided at a smaller inclination in the scenery image pickup mode, in which the inclination of the video camera 8100 is noticeable. This enables the user to be quickly noticed of the inclination of the video camera 8100 and causes the actual inclination to be exaggerated when the video camera 8100 is steeply inclined. This in turn makes the inclination of the camera clearer and enables the user to easily recognize a variation in inclination resulting from a slight movement. The camera can thus be easily set horizontal, increasing horizontal accuracy.

In Embodiments 25 to 28 described above, the inclination guide display is changed between the scenery image pickup mode and the other image pickup modes. The present invention is not limited thereto. For example, the above inclination guide display in the scenery image pickup mode is applicable to a new green leaves/autumn leaves image pickup mode belonging to the scenery image pickup mode, a firework image pickup mode, in which image pickup is performed in such a dark scene that the horizon of the scenery cannot be easily determined, and the like.

Embodiment 29

Figure 86:
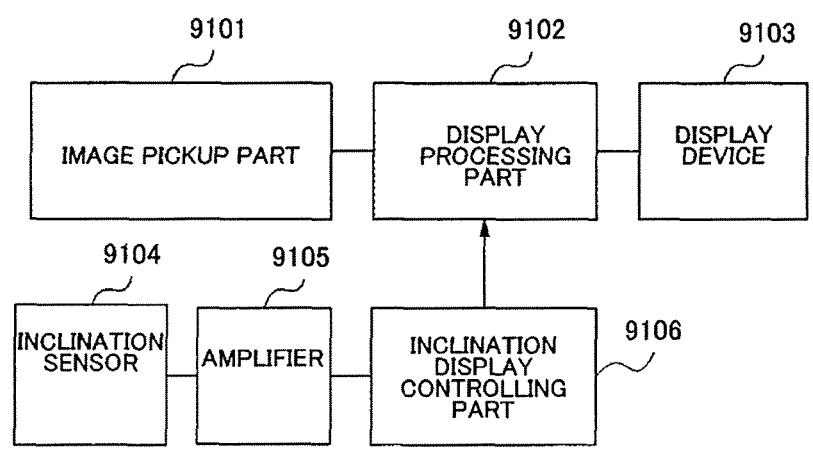
FIG. 86 is a diagram illustrating the configuration of a video camera that is Embodiment 29 of the present invention.

FIG. 86 is a block diagram showing the configuration of a video camera that is Embodiment 29 of the present invention.

In FIG. 86, reference numeral 9101 denotes an image pickup part in the video camera constituted by an image pickup lens, an image pickup element, a camera signal processing part, and the like to output a video signal. Reference numeral 9102 denotes a display processing part that superimposes an inclination guide display or the like on the output video signal. Reference numeral 9103 denotes a display device such as an electronic viewfinder or a liquid crystal panel. Reference numeral 9104 denotes an inclination sensor that detects the inclination of the video camera. Reference numeral 9105 denotes an amplifier that amplifies an output from the inclination sensor 9104 to obtain a predetermined output level. Reference numeral 9106 denotes an inclination guide display controlling part which controls, based on inclination information, whether or not to provide the inclination guide display and what display is to be provided, the inclination guide display controlling part 9106 being constituted by a microcomputer or the like.

Figure 87:
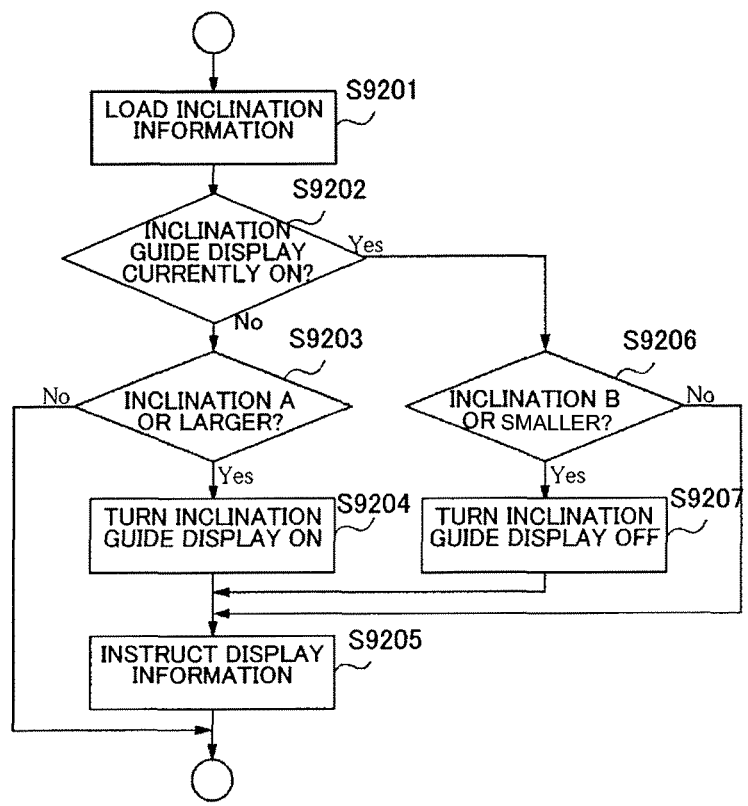
FIG. 87 is a diagram illustrating the flow of the operation performed by the video camera that is Embodiment 29.

FIG. 87 is a flowchart of inclination display control performed by the inclination guide display controlling part 9106 in Embodiment 29 of the present invention. The operation in Embodiment 29 of the present invention will be described below with reference to FIGS. 86 and 87.

First, the inclination information is loaded in S9201. This means that a signal is loaded which is generated by amplifying the output from the inclination sensor 9104 by the amplifier 9105. Then, the process determines in S9207 whether or not the inclination guide display is currently set on.

If the inclination guide display is not set on (that is, the inclination guide display is off), the process proceeds to S9203 to determine whether or not the inclination acquired in S9201 is equal to or larger than a predetermined angle A. If the inclination is smaller than the predetermined angle A, no action is taken and the inclination guide display is kept off. Thus, the inclination display is not provided.

On the other hand, if the inclination information acquired in S9201 indicates the predetermined angle A or larger, then in S9204, the setting of the inclination guide display is changed from turn-off to turn-on. Then, in S9205, the display processing part 9102 is instructed to provide the inclination guide display, in accordance with the inclination information acquired in S9201. This operation enables the inclination guide display corresponding to the inclination of the camera to be provided on the display device 9103.

In S9202, if the inclination guide display is currently set on, the process proceeds to S9206. In S9206, the process determines whether or not the inclination acquired in S9201 is equal to or smaller than a predetermined angle B. In S9206, if the process determines that the inclination is equal to or smaller than the predetermined angle B, the process proceeds to S9207. The predetermined angles A and B are in the relationship A>B. In S9207, the inclination guide display is turned off. In S9205, the display processing part 9102 is instructed to turn off the inclination guide display. This operation turns off the inclination guide display provided on the display device 9103.

On the other hand, in S9206, if the process determines that the inclination of the camera is not equal to or smaller than the predetermined angle B, the inclination guide display is kept on. In S9205, the display processing part 9102 is provided with display information in accordance with the inclination information acquired in S9201. The inclination guide display is thus provided.

Figure 88:
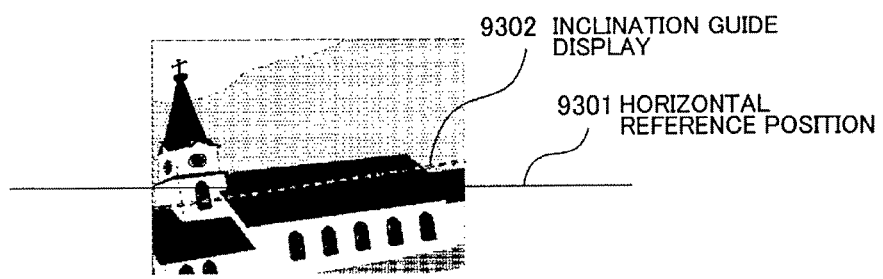
FIG. 88 is a diagram showing a display example of an inclination guide display.

FIG. 88 is a diagram showing an example of the inclination guide display showing that the camera is inclined counterclockwise. The above display processing part 102 superimposes, on the video signal, a display corresponding to the inclination of the camera from a horizontal reference position 9301 not displayed in the display device, to provide the inclination guide display 9302. In FIG. 88, the inclination guide display 9302 is shown by a dashed line, but may be shown by any conspicuous line such as a solid line or a colored line.

Figure 89:
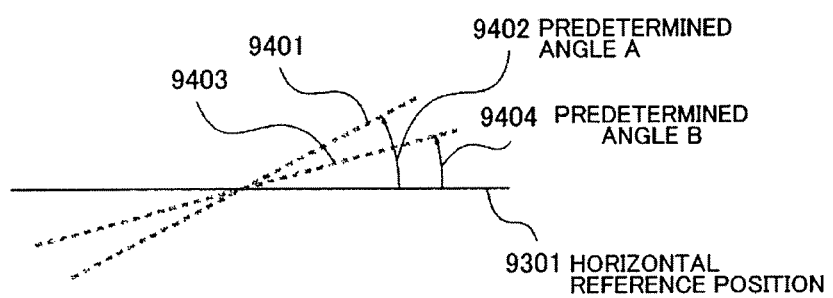
FIG. 89 is a diagram showing how an inclination guide display is provided.

FIG. 89 is a diagram illustrating the relationship between the predetermined angles A and B for the inclination of the camera, as well as the inclination guide display. In FIG. 89, even if the setting of the inclination guide display is off, the inclination guide display 9401 is provided when the inclination of the camera is equal to or larger than the predetermined angle A (9402). Further, even if the setting of the inclination guide display is on, the inclination guide display 9403 is not provided when the inclination of the camera is smaller than the predetermined angle B (9404).

Accordingly, the predetermined angle B is the lower limit value at which the inclination guide display 9403 is provided when the setting of the inclination guide display is on, and the predetermined angle A is the lower limit value at which the inclination guide display 9401 is provided when the setting of the inclination guide display is off. If the setting of the inclination guide display is on and then the inclination of the camera becomes smaller than the predetermined value B (9404), the inclination guide display is turned from on to off.

Then, when the inclination of the camera becomes equal to the predetermined angle A (9402), the guide display is provided again. When the inclination of the camera is in the range from the predetermined angle B (9404) to the predetermined angle A (9402), the inclination guide display is kept off.

When the setting of the inclination guide display is off, the inclination guide display is turned from on to off by that the inclination of the camera becomes smaller than the predetermined angle B (9404) after becoming equal to or larger than it.

When the inclination of the camera becomes equal to the predetermined angle A (9402), the guide display is provided again. When the inclination of the camera is in the range from the predetermined angle B (9404) to the predetermined angle A (9402), the inclination guide display is kept off.

Thus, in the present embodiment, the angle at which the inclination guide display is turned from on to off is different from the angle at which the inclination guide display is turned from off to on. This makes it possible to prevent the displayed image from making the user feel cumbersome by that the provision and non-provision of the inclination guide display change quickly and repeatedly, even with a slight variation in inclination.

Figures 1, 2, 3, 90A:
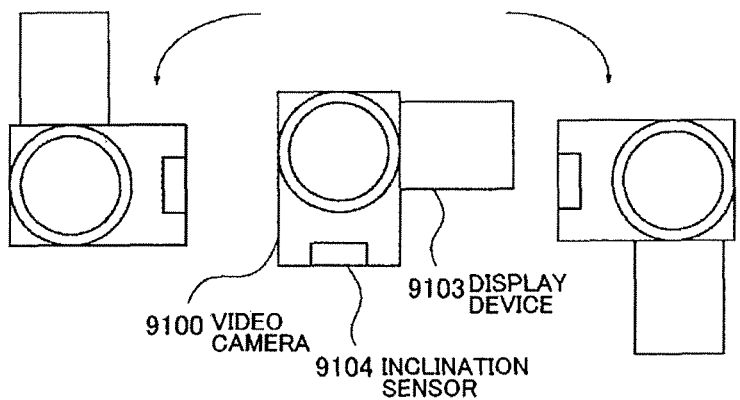
Figure 90B:
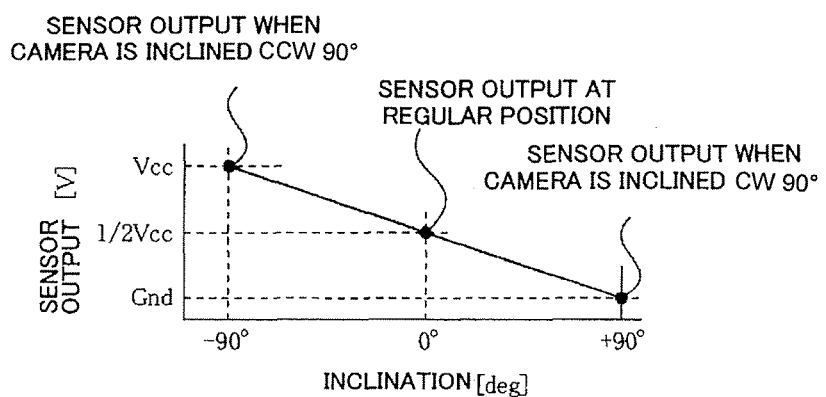

Next, the detection of inclination will be described. The present embodiment uses an acceleration sensor as the inclination sensor 9104. FIGS. 90A-1 to 90A-3 show the inclination of the video camera 9100. FIG. 90A-1 shows that the video camera is inclined counterclockwise by 90°, FIG. 90A-2 shows that the video camera is at the regular position, and FIG. 90A-3 shows that the video camera is inclined clockwise by 90°. Further, FIG. 90B shows the output from the amplifier 9105 obtained for the inclination of the video camera 9100. The setting of the gain of the amplifier 9105 results in such an output as shown in FIG. 90B for the inclination of the video camera 9100.

As shown in FIG. 90B, when the video camera 9100 is at the regular position, that is, when the inclination is 0°, the output from the amplifier 9105 is equal to half of a power supply voltage Vcc. In contrast, as shown in FIG. 90A-1, inclining the video camera 9100 counterclockwise by 90° provides a sensor output equal to the power supply voltage. Conversely, inclining the video camera 9100 clockwise by 90° as shown in FIG. 90A-3 provides a sensor output at a GND level. For the inclinations between those shown in FIG. 90A-1 and FIG. 90A-3, the amplifier output changes linearly with the inclination as shown in FIG. 90B. Accordingly, whether or not a predetermined angle has been reached can be determined by setting a predetermined threshold with respect to the output obtained at the regular position, shown in FIG. 90A-2.

Reversing the direction in which the sensor is mounted reverses the variation in sensor output voltage when the video camera is inclined, with respect to that shown in FIG. 90B.

As described above, the video camera of the present embodiment can turn on the inclination guide display when the camera is steeply inclined and turn it off when the camera is gently inclined. This enables the inclination of the camera to be easily checked and makes it possible to prevent a picked-up image displayed on the display device from being complicated because of the always provided inclination guide display. Moreover, applying hysteresis to the angle at which the turn-on and turn-off of the inclination guide display are switched, it is possible to prevent the user from feeling cumbersome owing to the repeated turn-on and turn-off of the inclination guide display.

Embodiment 30

Figure 92:
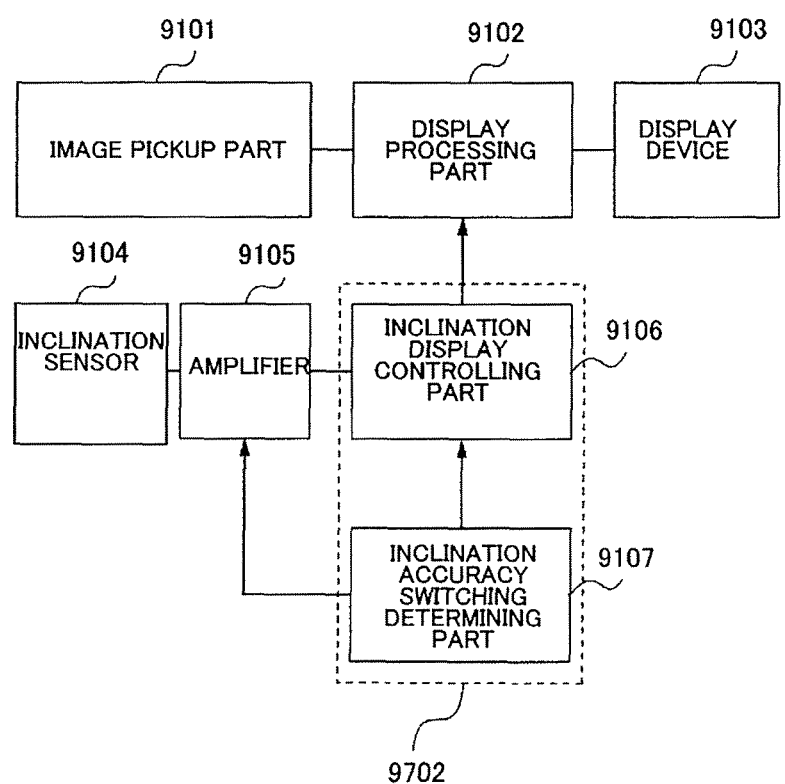
FIG. 92 is a diagram illustrating the configuration of the video camera that is Embodiment 30.

Next, Embodiment 30 of the present invention will be described. FIG. 92 shows the configuration of Embodiment 30. In FIG. 92, the same components as those in FIG. 86 are denoted by the same reference numerals and will not be described below. In FIG. 92, reference numeral 9107 denotes an inclination accuracy switching determining part that determines whether or not to switch the detection accuracy of the inclination of the video camera. Reference numeral 9702 denotes a microcomputer including the inclination guide display controlling part 9106 and the inclination accuracy switching determining part 9107.

The determination of increasing the detection accuracy is made when, for example, the installation of the video camera on a tripod has been detected via a switch (not shown), a menu setting or the like, or the user has set the accuracy to be increased via a switch (not shown). The horizontal position is thus detected more accurately. In the present embodiment, even if the inclination accuracy switching determining part 9107 changes the inclination detection accuracy, the complicatedness of the displayed image caused by the inclination guide display can be avoided.

Figure 91:
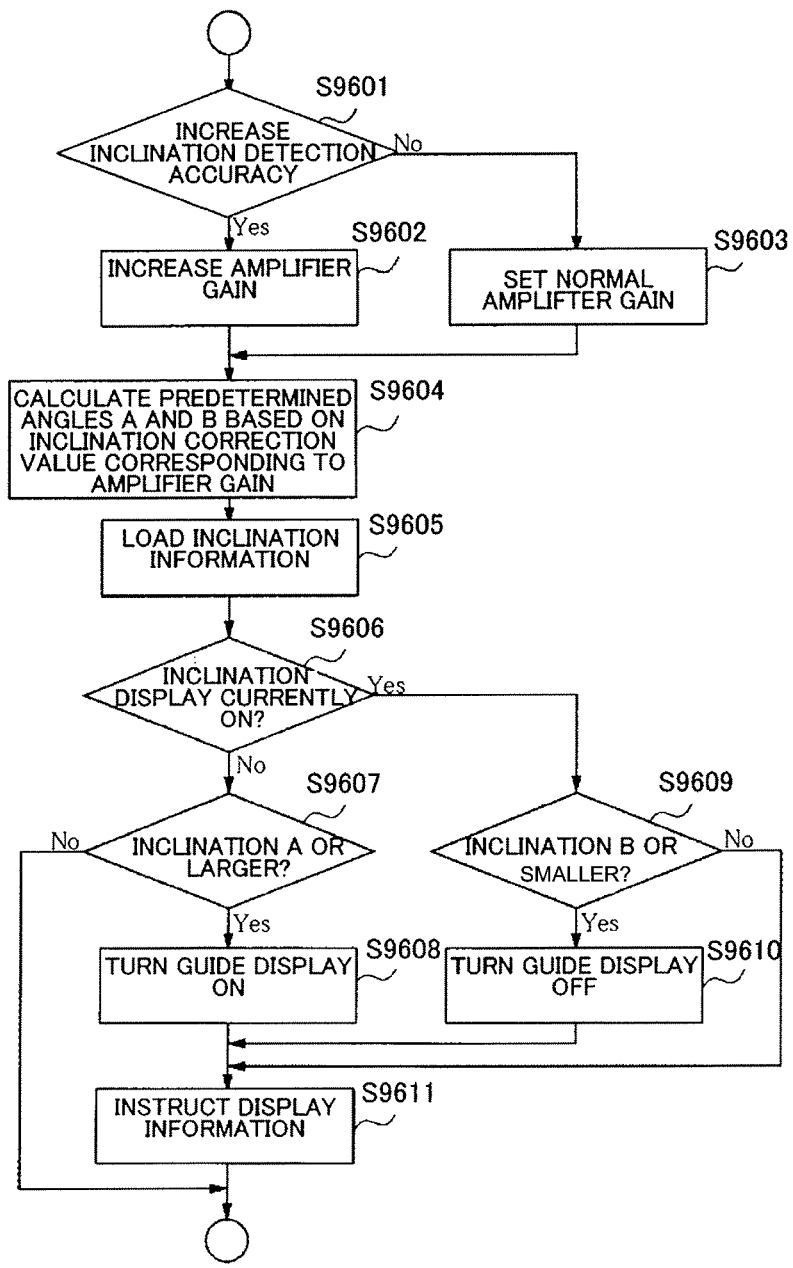
FIG. 91 is a diagram illustrating the flow of the operation performed by a video camera that is Embodiment 30.

FIG. 91 is a flowchart of the inclination display control executed by the microcomputer 9702 in Embodiment 30. Embodiment 30 of the present invention will be described below with reference to FIG. 91.

In FIG. 91, in S9601, the inclination accuracy switching determining part 9107 determines whether or not to increase the inclination detection accuracy. To increase the detection accuracy, the amplifier gain of the sensor is set higher in S9602. For normal accuracy, the amplifier gain is set to a normal level in S9603. Then, in S9604, predetermined angles A and B are calculated on the basis of an inclination correction value depending on the amplifier gain.

Here, the predetermined angle A is used to turn on the inclination display. The predetermined angle B is used to turn off the inclination display. When the amplifier gain for increased accuracy is N times as high as the normal one, the predetermined angle B for the increased accuracy is calculated by multiplying the predetermined angle B for the normal accuracy by a coefficient 1/N, and the predetermined angle A for the increased accuracy is calculated by multiplying the predetermined angle A for the normal accuracy by a coefficient in the range from 1/N to 1/1.

For example, when the amplifier gain is doubled, the predetermined angle B is multiplied by 0.5, and the predetermined angle A is multiplied by a coefficient set between 0.5 and 1. The detection accuracy of the horizontal position is increased in order to enable the accurate detection of the angle at which the inclination guide display is turned off, that is, the angle at which the horizon is determined to be detected. Accordingly, the predetermined angle B needs to be precisely set on the basis of the amplifier gain of the sensor.

In contrast, the predetermined angle A is used to notice the user of the inclination of the video camera. Consequently, the predetermined angle A may be set similarly to the predetermined angle B or may remain at the normal value.

This correction operation determines the predetermined angles. The actual detection angle can be precisely set by appropriately increasing the gain of the inclination sensor. For example, if the minimum resolution is 0.1 (deg) when the gain is at the normal level, doubling the gain sets the minimum resolution at 0.05 (deg).

Further, the relationship between the sensor amplifier output voltage and the inclination is such that when ¼ Vcc corresponds to 45° at the normal gain, doubling the gain causes ½ Vcc to correspond to 45°. Accordingly, the inclination resulting from a change in gain can be determined by converting the output voltage into an angle on the basis of the sensor gain.

After the settings in S9604, the inclination information is loaded in S9605. This means that a signal is loaded which is generated by amplifying the output from the inclination sensor 9104 by the amplifier 9105 as in Embodiment 29. Then, the process determines in S9606 whether or not the inclination guide display is currently set on.

If the inclination guide display is not set on (that is, the inclination guide display is off), the process proceeds to S9607 to determine whether or not the inclination is equal to or larger than the predetermined angle A. If the inclination is smaller than the predetermined angle A, no action is taken and the inclination guide display is kept off.

On the other hand, if the inclination acquired in S9605 indicates the predetermined angle A or larger, then in S9608, the setting of the inclination guide display is turned from off to on. Then, in S9611, the display processing part 9102 is instructed to provide the inclination guide display, in accordance with the inclination information acquired in S9605. This operation enables the inclination guide display corresponding to the inclination of the camera to be provided on the display device 9103.

In S9606, if the inclination guide display is currently set on, the process proceeds to S9609. In S9609, the process determines whether or not the inclination acquired in S9605 is equal to or smaller than the predetermined angle B. In S9609, if the process determines that the inclination is equal to or smaller than the predetermined angle B, the process proceeds to S9610. The predetermined angles A and B are in the relationship A>B. In S9610, the inclination guide display is turned off. In S9611, the display processing part 9102 is instructed to turn off the inclination guide display. This operation turns off the inclination guide display provided on the display device 9103.

On the other hand, in S9609, if the process determines that the inclination of the camera is not equal to or smaller than a predetermined angle B, the inclination guide display is kept on. In S9611, the display processing part 102 is provided with display information in accordance with the inclination information acquired in S9605. The inclination guide display is thus provided.

In Embodiment 30, the predetermined angles A and B are modified in accordance with the amplifier gain, whereas the relationship between A and B is always A>B as is the case with Embodiment 29.

As described above, in addition to the effects of Embodiment 29, the video camera of the present embodiment sets the predetermined angles A and B in accordance with the amplifier gain for inclination detection. This enables appropriate control to be performed in accordance with the state of the video camera.

In Embodiments 29 and 30, an acceleration sensor is used for the inclination sensor. However, any sensor may be used which can output a signal corresponding to the inclination of the camera.

Further, all the embodiments have been described taking the case of the video camera. However, the present invention is widely applicable to image pickup apparatuses having a display device such as a viewfinder or a liquid crystal panel, such as video cameras and digital still cameras which can record moving images or still images.

Moreover, the preferred embodiments of the present invention have been described. However, the present invention is not limited to these embodiments, but many variations and modifications may be made to the embodiments without departing from the scope of the claims.

Industrial Applicability

The present invention can provide an image pickup apparatus that can provide an appropriate inclination guide display in accordance with the image pickup mode, the aspect ratio of a picked-up image, the shaking state of the image pickup apparatus, the zoom state, and the like.

What is claimed is:

1. An image pickup apparatus comprising:
an inclination detector which detects an inclination of the image pickup apparatus;
a display device capable of showing an inclination guide display corresponding to a detection output from the inclination detector;
a shake detector which detects a shake of the image pickup apparatus;
a determiner which determines, based on a detection output from the shake detector, whether or not the image pickup apparatus is fixed; and
a display controller which controls display of the inclination guide display based on the detection output from the shake detector,
wherein, when a state in which a frequency or an amplitude of the detection output from the shake detector is equal to or larger than a predetermined value is continuous for a predetermined time or a predetermined number of times, the display controller controls so that the inclination guide display is not provided.

2. The image pickup apparatus according to claim 1, when a state in which a frequency or an amplitude of the detection output from the shake detector is lower than the predetermined value is continuous for a predetermined time or a predetermined number of times, the display controller controls so that the inclination guide display is provided.

3. The image pickup apparatus according to claim 1, wherein the display controller shows the inclination guide display so that, when determination that the image pickup apparatus is fixed is made by the determiner, a display angle of the inclination guide display for a same inclination detected by the inclination detector is larger than that when determination that the image pickup apparatus is not fixed is made by the determiner.

4. The image pickup apparatus according to claim 3, wherein the determiner determines that the image pickup apparatus is fixed when the shake detected by the shake detector is smaller than a predetermined shake.

5. The image pickup apparatus according to claim 1, wherein the display controller switches between a display and a non-display of the inclination guide display in accordance with the inclination set by detected by the inclination detector, and changes a set value of the inclination to switch between the display and the non-display of the inclination guide display in accordance with whether or not it is determined by the determiner that the image pickup apparatus is fixed.

6. The image pickup apparatus according to claim 5, wherein, when the determiner determines that the image pickup apparatus is fixed, the display controller makes small the set value of the inclination to switch between the display and the non-display of the inclination guide display.

7. An image pickup apparatus comprising:
an inclination detector which detects an inclination of the image pickup apparatus;
a display device capable of showing an inclination guide display corresponding to a detection output from the inclination detector;
a shake detector which detects a shake of the image pickup apparatus;
a determiner which determines, based on a detection output from the shake detector, whether or not the image pickup apparatus is fixed; and
a display controller which controls display of the inclination guide display based on the detection output from the shake detector,
when a state in which a frequency or an amplitude of the detection output from the shake detector is lower than the predetermined value is continuous for a predetermined time or a predetermined number of times, the display controller controls so that the inclination guide display is provided.

8. The image pickup apparatus according to claim 7, wherein the display controller shows the inclination guide display so that, when determination that the image pickup apparatus is fixed is made by the determiner, a display angle of the inclination guide display for a same inclination detected by the inclination detector is larger than that when determination that the image pickup apparatus is not fixed is made by the determiner.

9. The image pickup apparatus according to claim 8, wherein the determiner determines that the image pickup apparatus is fixed when the shake detected by the shake detector is smaller than a predetermined shake.

10. The image pickup apparatus according to claim 7, wherein the display controller switches between a display and a non-display of the inclination guide display in accordance with the inclination set by detected by the inclination detector, and changes a set value of the inclination to switch between the display and the non-display of the inclination guide display in accordance with whether or not it is determined by the determiner that the image pickup apparatus is fixed.

11. The image pickup apparatus according to claim 10, wherein, when the determiner determines that the image pickup apparatus is fixed, the display controller makes small the set value of the inclination to switch between the display and the non-display of the inclination guide display.

12. An image pickup apparatus comprising:
an inclination detector which detects an inclination of the image pickup apparatus;
a display device capable of showing an inclination guide display corresponding to a detection output from the inclination detector;
a shake detector which detects a shake of the image pickup apparatus;
a determiner which determines, based on a detection output from the shake detector, whether or not the image pickup apparatus is fixed; and
a display controller which controls display of the inclination guide display based on the detection output from the shake detector,
wherein the display controller shows the inclination guide display so that, when determination that the image pickup apparatus is fixed is made by the determiner, a display angle of the inclination guide display for a same inclination detected by the inclination detector is larger than that when determination that the image pickup apparatus is not fixed is made by the determiner.

13. The image pickup apparatus according to claim 12, wherein the determiner determines that the image pickup apparatus is fixed when the shake detected by the shake detector is smaller than a predetermined shake.

14. An image pickup apparatus comprising:
a display device which displays a picked-up image;
an inclination detector which detects an inclination of the image pickup apparatus;
a display processor which shows an inclination guide display corresponding to the inclination detected by the inclination detector, on the display device;

a shake detector which detects a shake of the image pickup apparatus;

a determiner which determines, based on the detection output from the shake detector, whether or not the image pickup apparatus is fixed; and a setter which sets sensitivity of the inclination detector so that, when determination that the image pickup apparatus is fixed is made by the determiner, the sensitivity of the inclination is higher than that when determination that the image pickup apparatus is not fixed is made by the determiner.

15. The image pickup apparatus according to claim 14, wherein the determiner determines that the image pickup apparatus is fixed when the shake detected by the shake detector is smaller than a predetermined shake.

16. An image pickup apparatus comprising:

an inclination detector which detects an inclination of the image pickup apparatus;

a display device capable of showing an inclination guide display corresponding to a detection output from the inclination detector;

a shake detector which detects a shake of the image pickup apparatus;

a determiner which determines, based on a detection output from the shake detector, whether or not the image pickup apparatus is fixed; and a display controller which controls display of the inclination guide display based on the detection output from the shake detector, wherein the display controller switches between a display and a non-display of the inclination guide display in accordance with the inclination detected by the inclination detector, and changes a set value of the inclination to switch between the display and the non-display of the inclination guide display in accordance with whether or not it is determined by the determiner that the image pickup apparatus is fixed.

17. The image pickup apparatus according to claim 16, wherein, when the determiner determines that the image pickup apparatus is fixed, the display controller makes small the set value of the inclination to switch between the display and the non-display of the inclination guide display.

18. A control method of an image pickup apparatus, the method comprising the steps of:

displaying a picked-up image;

detecting an inclination of the image pickup apparatus;

showing an inclination guide display corresponding to the detected inclination;

detecting a shake of the image pickup apparatus;

determining, based on an output of the detected shake, whether or not the image pickup apparatus is fixed; and setting sensitivity of detecting the inclination so that, when determination that the image pickup apparatus is fixed is made in the determining step, the sensitivity of the inclination is higher than that when determination that the image pickup apparatus is not fixed is made in the determining step.

* * * * *